US010493564B2

(12) United States Patent
Buller et al.

(10) Patent No.: US 10,493,564 B2
(45) Date of Patent: Dec. 3, 2019

(54) APPARATUSES, SYSTEMS AND METHODS FOR THREE-DIMENSIONAL PRINTING

(71) Applicant: Velo3D, Inc., Campbell, CA (US)

(72) Inventors: Benyamin Buller, Cupertino, CA (US); Erel Milshtein, Cupertino, CA (US); Thai Cheng Chua, San Jose, CA (US)

(73) Assignee: Velo3D, Inc., Campbell, CA (US)

( * ) Notice: Subject to any disclaimer, the term of this patent is extended or adjusted under 35 U.S.C. 154(b) by 440 days.

(21) Appl. No.: 15/188,885

(22) Filed: Jun. 21, 2016

(65) Prior Publication Data

US 2016/0297006 A1 Oct. 13, 2016

Related U.S. Application Data

(63) Continuation of application No. 14/744,675, filed on Jun. 19, 2015, now Pat. No. 9,399,256.
(Continued)

(51) Int. Cl.
*B23K 26/34* (2014.01)
*B33Y 10/00* (2015.01)
(Continued)

(52) U.S. Cl.
CPC ............ *B23K 26/346* (2015.10); *B22F 3/003* (2013.01); *B22F 3/004* (2013.01); *B22F 3/105* (2013.01); *B22F 3/1055* (2013.01); *B22F 3/24* (2013.01); *B23K 10/006* (2013.01); *B23K 10/027* (2013.01); *B23K 15/002* (2013.01); *B23K 15/0026* (2013.01); *B23K 15/0086* (2013.01); *B23K 15/0093* (2013.01); *B23K 15/02* (2013.01); *B23K 26/0853* (2013.01);
(Continued)

(58) Field of Classification Search
CPC ..................................................... B33Y 30/00
See application file for complete search history.

(56) References Cited

U.S. PATENT DOCUMENTS 430,047 A 6/1890 Tylee
3,790,787 A 2/1974 Geller
(Continued)

FOREIGN PATENT DOCUMENTS

CN 1648802 A 8/2005
CN 101835554 A 9/2010
(Continued)

OTHER PUBLICATIONS

Mumtaz et al., "A Method to Eliminate anchors/supports from directly laser melted metal powder bed processes", Aug. 2011, Conference: Proc. Solid Freeform Fabrication Symposium, pp. 55-64.*
(Continued)

*Primary Examiner* — Geoffrey S Evans
(74) *Attorney, Agent, or Firm* — Wilson Sonsini Goodrich & Rosati

(57) ABSTRACT

The present disclosure provides three-dimensional (3D) objects, 3D printing processes, as well as methods, apparatuses and systems for the production of a 3D object. Methods, apparatuses and systems of the present disclosure may reduce or eliminate the need for auxiliary supports. The present disclosure provides three dimensional (3D) objects printed utilizing the printing processes, methods, apparatuses and systems described herein.

28 Claims, 28 Drawing Sheets

Related U.S. Application Data

(60) Provisional application No. 62/168,699, filed on May 29, 2015, provisional application No. 62/136,378, filed on Mar. 20, 2015, provisional application No. 62/063,867, filed on Oct. 14, 2014, provisional application No. 62/028,760, filed on Jul. 24, 2014, provisional application No. 62/015,230, filed on Jun. 20, 2014.

(51) Int. Cl.

| | | |
|---|---|---|
| *B33Y 30/00* | (2015.01) | |
| *B22F 3/105* | (2006.01) | |
| *B23K 26/346* | (2014.01) | |
| *B28B 1/00* | (2006.01) | |
| *B33Y 50/02* | (2015.01) | |
| *B28B 17/00* | (2006.01) | |
| *B23K 26/12* | (2014.01) | |
| *C22C 38/02* | (2006.01) | |
| *C22C 38/44* | (2006.01) | |
| *C22C 38/58* | (2006.01) | |
| *C04B 35/64* | (2006.01) | |
| *B33Y 40/00* | (2015.01) | |
| *B33Y 70/00* | (2015.01) | |
| *B23K 26/144* | (2014.01) | |
| *B23K 26/342* | (2014.01) | |
| *B23K 26/70* | (2014.01) | |
| *B23K 10/02* | (2006.01) | |
| *B23K 15/00* | (2006.01) | |
| *B23K 26/16* | (2006.01) | |
| *B23K 26/32* | (2014.01) | |
| *B23K 26/22* | (2006.01) | |
| *C22C 38/00* | (2006.01) | |
| *C04B 35/52* | (2006.01) | |
| *C04B 35/56* | (2006.01) | |
| *C04B 35/565* | (2006.01) | |
| *B33Y 80/00* | (2015.01) | |
| *B22F 3/24* | (2006.01) | |
| *B23K 15/02* | (2006.01) | |
| *B23K 26/08* | (2014.01) | |
| *B22F 3/00* | (2006.01) | |
| *B23K 10/00* | (2006.01) | |
| *H05B 6/68* | (2006.01) | |
| *H05B 6/80* | (2006.01) | |
| *B29C 64/264* | (2017.01) | |
| *B29C 64/153* | (2017.01) | |
| *B29C 64/255* | (2017.01) | |
| *B29C 64/194* | (2017.01) | |
| *B29C 64/171* | (2017.01) | |
| *B29C 64/188* | (2017.01) | |
| *B29C 64/106* | (2017.01) | |
| *B29C 64/35* | (2017.01) | |
| *B23K 103/00* | (2006.01) | |
| *B22F 7/00* | (2006.01) | |
| *B29K 105/00* | (2006.01) | |
| *B29C 64/214* | (2017.01) | |

(52) U.S. Cl.
CPC ........ *B23K 26/123* (2013.01); *B23K 26/1224* (2015.10); *B23K 26/144* (2015.10); *B23K 26/16* (2013.01); *B23K 26/22* (2013.01); *B23K 26/32* (2013.01); *B23K 26/342* (2015.10); *B23K 26/70* (2015.10); *B23K 26/702* (2015.10); *B28B 1/001* (2013.01); *B28B 17/0072* (2013.01); *B28B 17/0081* (2013.01); *B29C 64/106* (2017.08); *B29C 64/153* (2017.08); *B29C 64/171* (2017.08); *B29C 64/188* (2017.08); *B29C 64/194* (2017.08); *B29C 64/255* (2017.08); *B29C 64/264* (2017.08); *B29C 64/35* (2017.08); *B33Y 10/00* (2014.12); *B33Y 30/00* (2014.12); *B33Y 40/00* (2014.12); *B33Y 50/02* (2014.12); *B33Y 70/00* (2014.12); *B33Y 80/00* (2014.12); *C04B 35/522* (2013.01); *C04B 35/565* (2013.01); *C04B 35/5626* (2013.01); *C04B 35/64* (2013.01); *C22C 38/00* (2013.01); *C22C 38/02* (2013.01); *C22C 38/44* (2013.01); *C22C 38/58* (2013.01); *H05B 6/68* (2013.01); *H05B 6/80* (2013.01); *B22F 7/00* (2013.01); *B22F 2003/1054* (2013.01); *B22F 2003/1056* (2013.01); *B22F 2003/1057* (2013.01); *B22F 2003/1058* (2013.01); *B22F 2003/1059* (2013.01); *B22F 2003/248* (2013.01); *B22F 2998/10* (2013.01); *B22F 2999/00* (2013.01); *B23K 2103/50* (2018.08); *B23K 2103/52* (2018.08); *B29C 64/214* (2017.08); *B29K 2105/251* (2013.01); *C04B 2235/6026* (2013.01); *Y02P 10/24* (2015.11); *Y02P 10/295* (2015.11)

(56) References Cited

U.S. PATENT DOCUMENTS

| | | |
|---|---|---|
| 3,864,809 A | 2/1975 | Donachie |
| 4,177,087 A | 12/1979 | Hills et al. |
| 4,323,756 A | 4/1982 | Brown et al. |
| 4,359,622 A | 11/1982 | Dostoomian et al. |
| 4,823,158 A | 4/1989 | Casey et al. |
| 4,863,538 A | 9/1989 | Deckard |
| 4,927,582 A | 5/1990 | Bryson |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,223,781 A | 6/1993 | Criswell et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,396,333 A | 3/1995 | Aleshin et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,530,221 A * | 6/1996 | Benda .................. B22F 3/1055 219/121.83 |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,640,667 A | 6/1997 | Freitag et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |

(56) References Cited

U.S. PATENT DOCUMENTS

| | | |
|---|---|---|
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,764,874 A | 6/1998 | White |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,859,786 A | 1/1999 | Klein |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 5,951,864 A | 9/1999 | Hazrati et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,341,042 B1 | 1/2002 | Matsunaka et al. |
| 6,376,148 B1 | 4/2002 | Liu et al. |
| 6,391,251 B1 | 5/2002 | Keicher et al. |
| 6,401,001 B1 | 6/2002 | Jang et al. |
| 6,483,596 B1 | 11/2002 | Philippi et al. |
| 6,492,651 B2 | 12/2002 | Kerekes |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |
| 6,688,886 B2 | 2/2004 | Hughes et al. |
| 6,722,872 B1 | 4/2004 | Swanson et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,861,613 B1 | 3/2005 | Meiners et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,949,216 B2 | 9/2005 | Brice et al. |
| 6,955,023 B2 | 10/2005 | Rotheroe |
| 6,963,338 B1 | 11/2005 | Bachelder et al. |
| 6,986,654 B2 | 1/2006 | Imiolek et al. |
| 6,989,115 B2 | 1/2006 | Russell et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,296,599 B2 | 11/2007 | Cox et al. |
| 7,326,377 B2 | 2/2008 | Adams |
| 7,419,632 B2 | 9/2008 | Keller |
| 7,435,368 B2 | 10/2008 | Davidson et al. |
| 7,452,500 B2 | 11/2008 | Uckelmann |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,799,253 B2 | 9/2010 | Hochsmann et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 7,991,465 B2 | 8/2011 | Bartic et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | M et al. |
| 8,303,886 B2 | 11/2012 | Philippi |
| 8,308,466 B2 | 11/2012 | Ackelid et al. |

(56) References Cited

U.S. PATENT DOCUMENTS

| | | |
|---|---|---|
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,556,981 B2 | 10/2013 | Jones et al. |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 | 12/2014 | Detor et al. |
| 8,915,620 B2 | 12/2014 | Vaes et al. |
| 8,945,456 B2 | 2/2015 | Zenere et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,037,068 B2 | 5/2015 | Kojima |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,272,369 B2 | 3/2016 | Bruck et al. |
| 9,308,583 B2 | 4/2016 | El-Dasher et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,366,422 B2 | 6/2016 | McClure et al. |
| 9,380,304 B1 | 6/2016 | Chang et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,700,908 B2 | 7/2017 | Baker et al. |
| 9,757,760 B2 | 9/2017 | Halder et al. |
| 9,827,717 B2 | 11/2017 | Huang et al. |
| 9,835,568 B2 | 12/2017 | Woods et al. |
| 9,886,526 B2 | 2/2018 | Huang et al. |
| 9,919,360 B2 | 3/2018 | Buller et al. |
| 9,919,476 B2 | 3/2018 | Paternoster et al. |
| 1,003,530 A1 | 7/2018 | Reinarz et al. |
| 10,035,188 B2 | 7/2018 | Weilhammer et al. |
| 10,112,236 B2 | 10/2018 | Schlick et al. |
| 1,028,645 A1 | 5/2019 | Buller et al. |
| 1,028,660 A1 | 5/2019 | Buller et al. |
| 2002/0017509 A1 | 2/2002 | Ishide et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0090410 A1 | 7/2002 | Tochimoto et al. |
| 2002/0104973 A1 | 8/2002 | Kerekes |
| 2002/0145213 A1 | 10/2002 | Liu et al. |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0106378 A1 | 6/2003 | Giannakopoulos et al. |
| 2003/0201255 A1 | 10/2003 | Manetsberger et al. |
| 2003/0222066 A1 | 12/2003 | Low et al. |
| 2003/0232512 A1 | 12/2003 | Dickinson et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0121257 A1 | 6/2004 | Kaminsky et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0200816 A1* | 10/2004 | Chung ............... G05D 23/1919 219/121.83 |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |
| 2005/0035285 A1 | 2/2005 | Tan et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar et al. |
| 2005/0258570 A1 | 11/2005 | Kong et al. |
| 2005/0278933 A1 | 12/2005 | Macke, Jr. et al. |
| 2005/0287031 A1* | 12/2005 | Macke, Jr. ............ B29C 64/153 419/53 |
| 2006/0003095 A1 | 1/2006 | Bullen et al. |
| 2006/0019232 A1 | 1/2006 | Fischer et al. |
| 2006/0054079 A1 | 3/2006 | Withey et al. |
| 2006/0111807 A1 | 5/2006 | Gothait et al. |
| 2006/0118532 A1 | 6/2006 | Chung et al. |
| 2006/0156978 A1 | 7/2006 | Lipson et al. |
| 2006/0181700 A1 | 8/2006 | Andrews et al. |
| 2006/0187326 A1 | 8/2006 | Spencer et al. |
| 2006/0192322 A1 | 8/2006 | Abe et al. |
| 2006/0208396 A1 | 9/2006 | Abe et al. |
| 2006/0214335 A1 | 9/2006 | Cox et al. |
| 2006/0228248 A1 | 10/2006 | Larsson |
| 2006/0228897 A1 | 10/2006 | Timans et al. |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0019028 A1 | 1/2007 | Renn et al. |
| 2007/0023977 A1 | 2/2007 | Braun et al. |

(56) References Cited

U.S. PATENT DOCUMENTS

| | | |
|---|---|---|
| 2007/0035069 A1 | 2/2007 | Wust et al. |
| 2007/0051704 A1 | 3/2007 | Husmann et al. |
| 2007/0052836 A1 | 3/2007 | Yamada et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0026338 A1 | 1/2008 | Cinader et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0257672 A1 | 10/2009 | Sullender et al. |
| 2009/0314391 A1 | 12/2009 | Crump et al. |
| 2010/0006228 A1 | 1/2010 | Abe et al. |
| 2010/0044547 A1 | 2/2010 | Higashi et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0174392 A1 | 7/2010 | Fink et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |
| 2011/0052927 A1 | 3/2011 | Martinoni et al. |
| 2011/0061591 A1 | 3/2011 | Stecker |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0187713 A1 | 8/2011 | Pershing et al. |
| 2011/0190904 A1* | 8/2011 | Lechmann ......... A61B 17/7208 623/23.61 |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0013710 A1 | 1/2012 | Ehrlich et al. |
| 2012/0052145 A1 | 3/2012 | Chen et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0133928 A1 | 5/2012 | Urano et al. |
| 2012/0134386 A1 | 5/2012 | Bender et al. |
| 2012/0139166 A1 | 6/2012 | Abe et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0213615 A1 | 8/2012 | Sakaue |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0235548 A1 | 9/2012 | Cordes et al. |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0080866 A1 | 3/2013 | Ogilvie et al. |
| 2013/0089642 A1 | 4/2013 | Lipson et al. |
| 2013/0093866 A1 | 4/2013 | Ohlhues et al. |
| 2013/0101746 A1 | 4/2013 | Keremes et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0186558 A1 | 7/2013 | Comb et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0329098 A1 | 12/2013 | Lim et al. |
| 2013/0330470 A1 | 12/2013 | Gersch et al. |
| 2013/0341313 A1 | 12/2013 | Himmelsbach et al. |
| 2014/0034626 A1 | 2/2014 | Illston |
| 2014/0035182 A1 | 2/2014 | Boyer et al. |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0147328 A1 | 5/2014 | Abe et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0271965 A1 | 9/2014 | Ferrar |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1 | 11/2014 | Fockele et al. |
| 2014/0335313 A1 | 11/2014 | Chou et al. |

(56) References Cited

U.S. PATENT DOCUMENTS

| | | |
|---|---|---|
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0084240 A1 | 3/2015 | Shuck et al. |
| 2015/0088295 A1 | 3/2015 | Hellestam |
| 2015/0091200 A1 | 4/2015 | Mech et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0178286 A1 | 6/2015 | Dhollander et al. |
| 2015/0185454 A1 | 7/2015 | Kalkbrenner et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0298211 A1 | 10/2015 | Abe et al. |
| 2015/0298397 A1 | 10/2015 | Chen et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367417 A1 | 12/2015 | Buller et al. |
| 2015/0367418 A1 | 12/2015 | Buller et al. |
| 2015/0367419 A1 | 12/2015 | Buller et al. |
| 2015/0367446 A1 | 12/2015 | Buller et al. |
| 2015/0367447 A1 | 12/2015 | Buller et al. |
| 2015/0367448 A1 | 12/2015 | Buller et al. |
| 2015/0367453 A1 | 12/2015 | Herzog |
| 2015/0367574 A1 | 12/2015 | Araie et al. |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0026337 A1 | 1/2016 | Wassvik et al. |
| 2016/0026889 A1 | 1/2016 | Parkhomenko et al. |
| 2016/0059310 A1 | 3/2016 | Junker et al. |
| 2016/0059352 A1 | 3/2016 | Sparks et al. |
| 2016/0067740 A1 | 3/2016 | Voris et al. |
| 2016/0067779 A1 | 3/2016 | Dautova et al. |
| 2016/0082666 A1 | 3/2016 | De Pena et al. |
| 2016/0082668 A1 | 3/2016 | Perret et al. |
| 2016/0107263 A1 | 4/2016 | Koerber |
| 2016/0114431 A1 | 4/2016 | Cheverton et al. |
| 2016/0114432 A1 | 4/2016 | Ferrar et al. |
| 2016/0114531 A1 | 4/2016 | Chuang et al. |
| 2016/0114535 A1 | 4/2016 | Kritchman et al. |
| 2016/0121399 A1 | 5/2016 | Buller et al. |
| 2016/0121548 A1 | 5/2016 | Nauka et al. |
| 2016/0129502 A1 | 5/2016 | Varetti |
| 2016/0129631 A1 | 5/2016 | Chen et al. |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151833 A1 | 6/2016 | Tsao |
| 2016/0151860 A1 | 6/2016 | Engeli et al. |
| 2016/0154906 A1 | 6/2016 | Schmidt et al. |
| 2016/0159010 A1 | 6/2016 | Perez et al. |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193785 A1 | 7/2016 | Bell et al. |
| 2016/0193790 A1 | 7/2016 | Shuck et al. |
| 2016/0207109 A1 | 7/2016 | Buller et al. |
| 2016/0214175 A1 | 7/2016 | Nordstrom |
| 2016/0228987 A1 | 8/2016 | Baudimont et al. |
| 2016/0236279 A1 | 8/2016 | Ashton et al. |
| 2016/0236414 A1 | 8/2016 | Reese et al. |
| 2016/0236419 A1 | 8/2016 | Griffin et al. |
| 2016/0241885 A1 | 8/2016 | Ström et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0284123 A1 | 9/2016 | Hare et al. |
| 2016/0288254 A1 | 10/2016 | Pettit et al. |
| 2016/0299996 A1 | 10/2016 | Huang |
| 2016/0300356 A1 | 10/2016 | Kitamura et al. |
| 2016/0303687 A1 | 10/2016 | Ljungblad |
| 2016/0311025 A1 | 10/2016 | Kaneko |
| 2016/0318129 A1 | 11/2016 | Hu et al. |
| 2016/0320236 A1 | 11/2016 | Fortin et al. |
| 2016/0320771 A1 | 11/2016 | Huang |
| 2016/0321384 A1 | 11/2016 | Pal et al. |
| 2016/0326880 A1 | 11/2016 | Slavens et al. |
| 2016/0332384 A1 | 11/2016 | De Pena et al. |
| 2016/0339639 A1 | 11/2016 | Chivel |
| 2016/0361874 A1 | 12/2016 | Park et al. |
| 2017/0001371 A1 | 1/2017 | Sobue et al. |
| 2017/0001379 A1 | 1/2017 | Long |
| 2017/0014902 A1 | 1/2017 | Tanaka et al. |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0087769 A1 | 3/2017 | Lancaster-Larocque et al. |
| 2017/0090461 A1 | 3/2017 | Chong et al. |
| 2017/0102689 A1 | 4/2017 | Khajepour et al. |
| 2017/0106603 A1 | 4/2017 | Pobihun |
| 2017/0123222 A1 | 5/2017 | Demuth et al. |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144374 A1 | 5/2017 | Ono et al. |
| 2017/0144874 A1 | 5/2017 | Huebinger et al. |
| 2017/0145586 A1 | 5/2017 | Xiao |
| 2017/0157704 A1 | 6/2017 | Ladewig et al. |
| 2017/0157845 A1 | 6/2017 | Bihari et al. |
| 2017/0216917 A1 | 8/2017 | Zhang et al. |
| 2017/0225198 A1 | 8/2017 | Nevarez et al. |
| 2017/0232515 A1 | 8/2017 | Demuth et al. |
| 2017/0246810 A1 | 8/2017 | Gold |

(56) References Cited

U.S. PATENT DOCUMENTS

| | | |
|---|---|---|
| 2017/0252975 A1 | 9/2017 | Park et al. |
| 2017/0259337 A1 | 9/2017 | Furukawa |
| 2017/0259502 A1 | 9/2017 | Chapiro et al. |
| 2017/0259504 A1 | 9/2017 | Lin et al. |
| 2017/0266878 A1 | 9/2017 | Furukawa |
| 2017/0266887 A1 | 9/2017 | Roviaro et al. |
| 2017/0274589 A1 | 9/2017 | Wu et al. |
| 2017/0282245 A1 | 10/2017 | Yasuda et al. |
| 2017/0282294 A1 | 10/2017 | Uchida |
| 2017/0291372 A1 | 10/2017 | Milshtein et al. |
| 2017/0297110 A1 | 10/2017 | Echigo et al. |
| 2017/0304894 A1 | 10/2017 | Buller |
| 2017/0304944 A1 | 10/2017 | Symeonidis et al. |
| 2017/0305140 A1 | 10/2017 | Wüst et al. |
| 2017/0320265 A1 | 11/2017 | Baumann et al. |
| 2017/0333994 A1 | 11/2017 | Schmitt et al. |
| 2017/0341143 A1 | 11/2017 | Abe et al. |
| 2017/0341183 A1 | 11/2017 | Buller et al. |
| 2017/0341299 A1 | 11/2017 | Kniola et al. |
| 2017/0341307 A1 | 11/2017 | Vilajosana et al. |
| 2017/0348771 A1 | 12/2017 | Kawada et al. |
| 2017/0355146 A1 | 12/2017 | Buller et al. |
| 2017/0355147 A1 | 12/2017 | Buller et al. |
| 2018/0001553 A1 | 1/2018 | Buller et al. |
| 2018/0001556 A1 | 1/2018 | Buller et al. |
| 2018/0001557 A1 | 1/2018 | Buller et al. |
| 2018/0015670 A1 | 1/2018 | Gu et al. |
| 2018/0021855 A1 | 1/2018 | De Lajudie et al. |
| 2018/0029126 A1 | 2/2018 | Ng et al. |
| 2018/0056391 A1 | 3/2018 | Buller et al. |
| 2018/0071986 A1 | 3/2018 | Buller et al. |
| 2018/0093416 A1 | 4/2018 | Prexler et al. |
| 2018/0093418 A1 | 4/2018 | Lappas et al. |
| 2018/0093419 A1 | 4/2018 | Lappas et al. |
| 2018/0095450 A1 | 4/2018 | Lappas et al. |
| 2018/0099454 A1 | 4/2018 | Hümmeler et al. |
| 2018/0104892 A1 | 4/2018 | Herzog et al. |
| 2018/0111193 A1 | 4/2018 | Romano et al. |
| 2018/0111194 A1 | 4/2018 | Buller et al. |
| 2018/0111195 A1 | 4/2018 | Romano et al. |
| 2018/0111196 A1 | 4/2018 | Brezoczky et al. |
| 2018/0111197 A1 | 4/2018 | Romano et al. |
| 2018/0111198 A1 | 4/2018 | Vitanov et al. |
| 2018/0111319 A1 | 4/2018 | Brezoczky et al. |
| 2018/0111320 A1 | 4/2018 | Zhao et al. |
| 2018/0117845 A1 | 5/2018 | Buller et al. |
| 2018/0126460 A1 | 5/2018 | Murphree et al. |
| 2018/0126461 A1 | 5/2018 | Buller et al. |
| 2018/0126462 A1 | 5/2018 | Murphree et al. |
| 2018/0126629 A1 | 5/2018 | Staal et al. |
| 2018/0126649 A1 | 5/2018 | Romano et al. |
| 2018/0126650 A1 | 5/2018 | Murphree et al. |
| 2018/0133635 A1 | 5/2018 | Hofmann et al. |
| 2018/0133801 A1 | 5/2018 | Buller et al. |
| 2018/0133956 A1 | 5/2018 | Buller et al. |
| 2018/0141126 A1 | 5/2018 | Buller et al. |
| 2018/0154442 A1 | 6/2018 | Milshtein et al. |
| 2018/0154443 A1 | 6/2018 | Milshtein et al. |
| 2018/0178286 A1 | 6/2018 | Martin et al. |
| 2018/0185915 A1 | 7/2018 | Beauchamp et al. |
| 2018/0185961 A1 | 7/2018 | Meidani et al. |
| 2018/0186079 A1 | 7/2018 | Vilajosana et al. |
| 2018/0207721 A1 | 7/2018 | Schlick et al. |
| 2018/0236550 A1 | 8/2018 | Herzog et al. |
| 2018/0244034 A1 | 8/2018 | Sutcliffe et al. |
| 2018/0281067 A1 | 10/2018 | Small et al. |
| 2018/0281236 A1 | 10/2018 | Elgar et al. |
| 2018/0281237 A1 | 10/2018 | Frechman et al. |
| 2018/0281282 A1 | 10/2018 | Elgar et al. |
| 2018/0281283 A1 | 10/2018 | Frechman et al. |
| 2018/0281284 A1 | 10/2018 | Elgar et al. |
| 2018/0319150 A1 | 11/2018 | Buller et al. |
| 2019/0022944 A1 | 1/2019 | Döhler et al. |
| 2019/0118286 A1 | 4/2019 | Sugatani et al. |

FOREIGN PATENT DOCUMENTS

| | | |
|---|---|---|
| CN | 102076456 A | 5/2011 |
| CN | 102695476 A | 9/2012 |
| CN | 103341625 A | 10/2013 |
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 203635913 U | 6/2014 |
| CN | 105904729 A | 8/2016 |
| CN | 105921747 A | 9/2016 |
| DE | 19939616 A1 | 3/2001 |
| DE | 102004061836 A1 | 7/2006 |
| DE | 102007029142 A1 | 1/2009 |
| DE | 102009036153 A1 | 2/2011 |
| DE | 102010048335 A1 | 4/2012 |
| DE | 202013009787 U1 | 12/2013 |
| DE | 102013208651 A1 | 11/2014 |
| DE | 102014000022 A1 | 7/2015 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |
| EP | 2522446 A1 | 11/2012 |
| EP | 2583773 A2 | 4/2013 |
| EP | 2620241 A1 | 7/2013 |
| EP | 2789413 A1 | 10/2014 |
| EP | 2832473 A1 | 2/2015 |
| EP | 2832474 A1 | 2/2015 |
| EP | 2873751 A1 | 5/2015 |
| EP | 2992942 A1 | 3/2016 |
| EP | 3127635 A1 | 2/2017 |
| EP | 3208077 A1 | 8/2017 |
| EP | 3263316 A1 | 1/2018 |
| JP | 2001009921 A | 1/2001 |
| JP | 2003502184 A | 1/2003 |
| JP | 2003245981 A | 9/2003 |
| JP | 2004143581 A | 5/2004 |
| JP | 2006150977 A | 6/2006 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| KR | 20160059726 A | 5/2016 |
| KR | 20160076708 A | 7/2016 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9828124 A2 | 7/1998 |
| WO | WO-9933641 A1 | 7/1999 |
| WO | WO-0102160 A1 | 1/2001 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A2 | 8/2009 |
| WO | WO-2010026396 A2 | 3/2010 |
| WO | WO-2010115588 A2 | 10/2010 |
| WO | WO-2013092997 A1 | 6/2013 |
| WO | WO-2013160188 A1 | 10/2013 |
| WO | WO-2013167903 A1 | 11/2013 |

(56) References Cited

FOREIGN PATENT DOCUMENTS

| | | |
|---|---|---|
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015025171 A2 | 2/2015 |
| WO | WO-2015034362 A1 | 3/2015 |
| WO | WO-2015040433 A2 | 3/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO 2017054842 A1 | 4/2017 |
| WO | WO-2017079091 A1 | 5/2017 |
| WO | WO-2017100695 A1 | 6/2017 |
| WO | WO-2017118569 A1 | 7/2017 |
| WO | WO-2017143077 A1 | 8/2017 |
| WO | WO-2017179001 A1 | 10/2017 |
| WO | WO-2018005439 | 1/2018 |
| WO | WO-2018064349 A1 | 4/2018 |
| WO | WO-2018075741 A1 | 4/2018 |
| WO | WO-2018106586 A1 | 6/2018 |
| WO | WO-2018128695 A2 | 7/2018 |
| WO | WO-2018129089 A1 | 7/2018 |
| WO | WO-2018160807 A1 | 9/2018 |
| WO | WO-2018183396 A1 | 10/2018 |
| WO | WO-2019195062 A1 | 10/2019 |

OTHER PUBLICATIONS

Co-pending U.S. Appl. No. 15/288,251, filed Oct. 7, 2016.
Office action dated Nov. 1, 2016 for U.S. Appl. No. 15/085,884.
Office action dated Nov. 18, 2016 for U.S. Appl. No. 15/188,939.
International search report and written opinion dated Sep. 20, 2016 for PCT/US2016/034454.
Co-pending U.S. Appl. No. 15/668,662, filed Aug. 3, 2017.
Extended European Search Report dated Jul. 7, 2017 for European Patent Application No. EP17156707.6.
International Search Report and Written Opinion dated Aug. 30, 2017 for International PCT Patent Application No. PCT/US2017/039422.
Notice of Allowance dated Aug. 7, 2017 for U.S. Appl. No. 14/744,910.
Office Action dated Jul. 3, 2017 for U.S. Appl. No. 15/435,120.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office Action dated Aug. 25, 2017 for U.S. Appl. No. 15/339,712.
Office Action dated Sep. 11, 2017 for U.S. Appl. No. 15/374,821.
Office Action dated Sep. 15, 2017 for U.S. Appl. No. 15/374,616.
Anusci, Victor. Aerosint Is Developing the First Commercial Multi-powder SLS 3D Printer. 3D Printing Media Network. Web. Published Jan. 28, 2018. 4 pages. URL:<https://www.3dprintingmedia.network/aerosint-multi-powder-sls-3d-printer/>.
Arnet et al. Extending Laser Bending for the Generation of Convex Shapes. Proc. Instn. Mech. Engrs., vol. 209, Dec. 1, 1995, pp. 433-442.
Ashby, Mike. Teach Yourself: Phase Diagrams and Phase Transformations. 5th Edition, Mar. 2009, Cambridge. 55 pages.
Co-pending U.S. Appl. No. 15/855,744, filed Dec. 27, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/871,763, filed Jan. 15, 2018.
Co-pending U.S. Appl. No. 15/886,544, filed Feb. 1, 2018.
Co-pending U.S. Appl. No. 15/893,523, filed Feb. 9, 2018.
Co-pending U.S. Appl. No. 15/909,388, filed Mar. 1, 2018.
Co-pending U.S. Appl. No. 15/909,396, filed Mar. 1, 2018.
Co-pending U.S. Appl. No. 15/909,406, filed Mar. 1, 2018.
Co-pending U.S. Appl. No. 15/909,783, filed Mar. 1, 2018.
Co-pending U.S. Appl. No. 15/909,784, filed Mar. 1, 2018.
Co-pending U.S. Appl. No. 15/909,806, filed Mar. 1, 2018.
Co-pending U.S. Appl. No. 15/909,809, filed Mar. 1, 2018.
Co-pending U.S. Appl. No. 15/909,826, filed Mar. 1, 2018.
Dahotre et al. Laser Fabrication and Machining of Materials. Springer; 2008 edition (Nov. 26, 2007).561 pages. DOI: 10.1007/978-0-387-72344-0.
David et al. Welding: Solidification and microstructure. The Journal of the Minerals, Metals & Materials Society (TMS). Jun. 2003, vol. 55, Issue 6, pp. 14-20 .
Doxygen. CGAL 4.11.1—Kinetic Data Structures. User Manual. Web. Published Apr. 8, 2006. 4 pages. URL:< https://doc.cgal.org/latest/Manual/how_to_cite_cgal.html>.
European Search Report and Search Opinion dated Nov. 30, 2017 for European Patent Application No. EP17178143.8.
Gaudin, Sharon. Researcher works to make 3D-printed metals stronger, customizable. Oct. 2014. Accessed online on Mar. 22, 2018. 4 pages. URL:< https://www.computerworld.com/article/2838780/researcher-works-to-make-3d-printed-materials-stronger-customizable.html>.
Geiger, et al. The Mechanisms of Laser Forming. Annals of the CIRP, vol. 42, Jan. 1993, pp. 301-304.
Gibson et al. Additive Manufacturing Technologies. Springer. Jan. 2010. 472 pages.
Hu, et al. Computer simulation and experimental investigation of sheet metal bending using laser beam scanning. International Journal of Machine Tools and Manufacture, 41, Mar. 2001, pp. 589-607.
Hu et al. Experimental and numerical modeling of buckling instability of laser sheet forming. International Journal of Machine Tools & Manufacture, 42, Oct. 2002, pp. 1427-1439.
integrativemodeling.org. IMP, the Integrative Modeling Platform. Web. Published Jul. 26, 2013.1 page. URL:< https://integrativemodeling.org/>.
International Search Report and Written Opinion dated Jan. 9, 2018 for International PCT Patent Application No. PCT/2017/054043.
International Search Report and Written Opinion dated Feb. 12, 2018 for International PCT Patent Application No. PCT/US2017/057340.
International Search Report and Written Opinion dated Feb. 14, 2017 for International PCT Patent Application No. PCT/US2016/042818.
International Search Report and Written Opinion dated Sep. 20, 2016 for International PCT Patent Application No. PCT/US2016/034454.
International Search Report and Written Opinion dated Oct. 18, 2016 for International PCT Patent Application No. PCT/US2016/041895.
Maji et al. Finite Element Analysis and Experimental Investigations on Laser Bending of A151304 Stainless Steel Sheet. Procedia Engineering 64, Dec. 2013, pp. 528-535.

(56) References Cited

OTHER PUBLICATIONS

Merriam-Webster. Definition of "reservoir". Retrieved Dec. 21, 2017. 13 pages. URL:< https://merriam-webster.com/dictionary/reservoir>.
Mumatz, et al. A Method to Eliminate Anchors/Supports from Directly Laser Melted Metal Powder Bed Processes. Aug. 2011, Additive Manufacturing Research Group, Wolfson School of Mechanical Engineering, Loughborough University, pp. 55-64.
Notice of Allowability dated Oct. 17, 2017 for U.S. Appl. No. 14/744,910.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Notice of Allowance dated Dec. 08, 2017 for U.S. Appl. No. 15/435,128.
Notice of Allowance dated Dec. 11, 2017 for U.S. Appl. No. 15/435,120.
Office Action dated Jan. 2, 2018 for U.S. Appl. No. 15/288,251.
Office Action dated Jan. 24, 2018 for U.S. Appl. No. 15/615,004.
Office Action dated Jan. 25, 2018 for U.S. Appl. No. 15/634,727.
Office Action dated Feb. 7, 2018 for U.S. Appl. No. 15/614,979.
Office Action dated Feb. 7, 2018 for U.S. Appl. No. 15/719,229.
Office Action dated Feb. 14, 2018 for U.S. Appl. No. 15/634,228.
Office Action dated Mar. 7, 2018 for U.S. Appl. No. 15/399,186.
Office Action dated Sep. 18, 2017 for U.S. Appl. No. 15/634,228.
Office Action dated Oct. 19, 2017 for U.S. Appl. No. 15/399,186.
Office Action dated Nov. 16, 2017 for U.S. Appl. No. 15/634,267.
Office Action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. LENS 850R 3D Printer for Structural Metals. Optomec. YouTube—Web. Published on Jun 3, 2012. 3 pages. URL:< https://www.youtube.com/watch?v=mkUVURLkxS4>.
PCT/US2017/064474 International Search Report and Written Opinion dated Apr. 30, 2018.
PCT/US2018/012250 International Search Report and Written Opinion dated Apr. 30, 2018.
Rhinehart, R.R. §2.13 Control Theory: Mode-Based Control, in Bela G. Liptak, Instrument Engineers' Handbook, vol. 2: Process Control and Optimization, 209-213. CRC Press; 4 edition (Sep. 29, 2005), ISBN-13: 978-0849310812.
RP Photonics Consulting GmbH. Definition of "Optical Intensity". Encyclopedia of Laser Physics and Technology. Jun. 2012. 3 pages. URL:< https://www.rp-photonics.com/optical_intensity.html>.
Sandvik Materials Technology website. Accessed Nov. 14, 2014. http://www.smt.sandvik.com/en/products/metal-powder/additive-manufacturing/.
Saunders, Marc. Real-time AM monitoring opens up new process control opportunities. Web: LinkedIn. Published on Jan. 3, 2018. 12 pages. URL:< https://www.linkedin.com/pulse/real-time-am-monitoring-opens-new-process-control-marc-saunders/>.
SCHOTT. TIE-19: Temperature Coefficient of the Refractive Index. Technical Information: Advanced Optics. SCHOTT AG. Jul. 2016. 10 pages.
SCHOTT. TIE-19: Temperature Coefficient of the Refractive Index. Technical Information: Advanced Optics. SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.
Symeonidis, Kimon. The Controlled Diffusion Solidification Process: Fundamentals and Principles. Ph.D. Thesis. Worcester Polytechnic Institute. Apr. 2009. 137 pages.
Thorlabs, Inc. Fiber Optic Reflection/Backscatter Probe Bundles. Web. Copyright 1999-2018. Printed Mar. 28, 2018. 5 pages. URL:<https://www.thorlabs.com/newgrouppage9.cfm?objectgroup_id=7794>.
U.S. Appl. No. 15/339,712 Notice of Allowance dated May 23, 2018.
U.S. Appl. No. 15/339,712 Office Action dated Jan. 10, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Office Action dated Mar. 26, 2018.
U.S. Appl. No. 15/374,821 Notice of Allowance dated Apr. 4, 2018.
U.S. Appl. No. 15/435,090 Office Action dated May 18, 2018.
U.S. Appl. No. 15/435,110 Office Action dated Apr. 19, 2018.
U.S. Appl. No. 15/614,979 Office Action dated Jun. 8, 2018.
U.S. Appl. No. 15/615,004 Office Action dated Jun. 8, 2018.
U.S. Appl. No. 15/634,228 Office Action dated Jun. 14, 2018.
U.S. Appl. No. 15/634,267 Office Action dated Apr. 3, 2018.
U.S. Appl. No. 15/634,727 Office Action dated May 25, 2018.
U.S. Appl. No. 15/719,133 Office Action dated Mar. 28, 2018.
U.S. Appl. No. 15/853,700 Office Action dated Apr. 6, 2018.
U.S. Appl. No. 15/855,744 Office Action dated Apr. 27, 2018.
U.S. Appl. No. 15/870,561 Office Action dated Jun. 15, 2018.
U.S. Appl. No. 15/871,763 Office Action dated Apr. 19, 2018.
U.S. Appl. No. 15/893,523 Notice of Allowance dated Jun. 15, 2018.
U.S. Appl. No. 15/893,523 Notice of Allowance dated May 7, 2018.
U.S. Appl. No. 15/909,826 Office Action dated May 2, 2018.
U.S. Appl. No. 15/339,712 Notice of Allowance dated Jun. 18, 2018.
Wang et al. Effects of thermal cycles on the microstructure evolution of Inconel 718 during selective laser melting process. Additive Manufacturing. vol. 18, Dec. 2017, pp. 1-14.
Barriobero-Vila et al. Inducing Stable $\alpha + \beta$ Microstructures during Selective Laser Melting of Ti-6Al-4V Using Intensified Intrinsic Heat Treatments. Materials (Basel). Mar. 2017; 10(3): 268.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Bonnet, M. Advances in the Design of Pneumatic Conveyors. International Chemical Engineering, vol. 25, No. 3, Jul. 1985, pp. 387-405.
Co-pending U.S. Appl. No. 16/030,795, filed Jul. 9, 2018.
Co-pending U.S. Appl. No. 16/031,896, filed Jul. 10, 2018.
De Dietrich Process Systems, Inc. Powder Pump™. Product Brochure. Created Jul. 3, 2012. 2 pages.
EP15809160.3 European Search Report dated Aug. 7, 2018.
EP15866668.5 European Search Report dated Aug. 7, 2018.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.

(56) References Cited

OTHER PUBLICATIONS

Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/339,712 Notice of Allowance dated Jul. 10, 2018.
U.S. Appl. No. 15/374,616 Office Action dated Aug. 15, 2018.
U.S. Appl. No. 15/435,065 Office Action dated Aug. 16, 2018.
U.S. Appl. No. 15/435,078 Office Action dated Aug. 16, 2018.
U.S. Appl. No. 15/634,267 Office Action dated Sep. 6, 2018.
U.S. Appl. No. 15/719,084 Office Action dated Jul. 12, 2018.
U.S. Appl. No. 15/830,421 Office Action dated Jul. 26, 2018.
U.S. Appl. No. 15/830,470 Office Action dated Jul. 5, 2018.
U.S. Appl. No. 15/861,553 Office Action dated Aug. 7, 2018.
U.S. Appl. No. 15/861,548 Office Action dated Sep. 6, 2018.
U.S. Appl. No. 15/871,763 Notice of Allowance dated Aug. 15, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,784 Office Action dated Jul. 13, 2018.
U.S. Appl. No. 15/909,806 Office Action dated Aug. 13, 2018.
U.S. Appl. No. 15/909,809 Office Action dated Aug. 10, 2018.
U.S. Appl. No. 15/909,826 Notice of Allowance dated Aug. 30, 2018.
Xu et al. In situ tailoring microstructure in additively manufactured Ti-6Al-4V for superior mechanical performance. Acta Materialia. vol. 125, Feb. 15, 2017, pp. 390-400.
Co-pending U.S. Appl. No. 15/339,759, filed Oct. 31, 2016.
Co-pending U.S. Appl. No. 15/339,775, filed Oct. 31, 2016.
Co-pending U.S. Appl. No. 15/374,318, filed Dec. 9, 2016.
Co-pending U.S. Appl. No. 15/374,442, filed Dec. 9, 2016.
Co-pending U.S. Appl. No. 15/374,535, filed Dec. 9, 2016.
Co-pending U.S. Appl. No. 15/374,616, filed Dec. 9, 2016.
Co-pending U.S. Appl. No. 15/374,821, filed Dec. 9, 2016.
Co-pending U.S. Appl. No. 15/435,065, filed Feb. 16, 2017.
Co-pending U.S. Appl. No. 15/435,078, filed Feb. 16, 2017.
Co-pending U.S. Appl. No. 15/435,090, filed Feb. 16, 2017.
Co-pending U.S. Appl. No. 15/435,110, filed Feb. 16, 2017.
Co-pending U.S. Appl. No. 15/435,120, filed Feb. 16, 2017.
Co-pending U.S. Appl. No. 15/435,128, filed Feb. 16, 2017.
Co-pending U.S. Appl. No. 15/436,558, filed Feb. 17, 2017.
Co-pending U.S. Appl. No. 15/490,219, filed Apr. 18, 2017.
Ex Parte Quayle Action dated Apr. 19, 2017 for U.S. Appl. No. 15/374,821.
International search report and written opinion dated Sep. 13, 2016 for PCT Application No. PCT/US2016/034857.
Manzhirov, et al. Mathematical Modeling of Additive Manufacturing Technologies. Proc. of the World Congress on Engineering 2014, vol. II. WCE 2014, Jul. 2-4, 2014, London, U.K. 6 pages.
NETFABB-Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of allowance dated Jan. 5, 2017 for U.S. Appl. No. 15/085,884.
Notice of Allowance dated Mar. 16, 2017 for U.S. Appl. No. 15/339,775.
Notice of Allowance dated Mar. 20, 2017 for U.S. Appl. No. 15/339,759.
Office Action dated Feb. 7, 2017 for U.S. Appl. No. 14/744,988.
Office Action dated Feb. 8, 2017 for U.S. Appl. No. 14/744,859.
Office Action dated Mar. 6, 2017 for U.S. Appl. No. 14/744,910.
Office Action dated Mar. 23, 2017 for U.S. Appl. No. 15/399,186.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
International Search Report and Written Opinion dated Apr. 5, 2017 for International PCT Patent Application No. PCT/US2016/066000.
International Search Report and Written Opinion dated May 18, 2017 for International PCT Patent Application No. PCT/US2017/018191.

Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Notice of Allowance (second) dated Apr. 6, 2017 for U.S. Appl. No. 15/339,759.
Office action dated Mar. 7, 2017 for U.S. Appl. No. 15/339,712.
Office Action dated Apr. 28, 2017 for U.S. Appl. No. 15/374,616.
Office Action dated Jun. 15, 2017 for U.S. Appl. No. 15/288,251.
Office Action dated Jun. 29, 2017 for U.S. Appl. No. 15/435,128.
Co-pending U.S. Appl. No. 15/399,186, filed Jan. 5, 2017.
International Search Report and Written Opinion dated Jan. 16, 2017 for International PCT Patent Application No. PCT/US2016/059781.
Notice of Allowance dated Dec. 9, 2016 for U.S. Appl. No. 15/188,939.
Chivel, et al. On-line temperature monitoring in selective laser sintering/melting. Physics Procedia. Dec. 31, 2010; (5):515-521.
Notice of allowance dated Aug. 10, 2016 for U.S. Appl. No. 14/967,118.
Notice of allowance dated Sep. 6, 2016 for U.S. Appl. No. 14/745,032.
Office action dated Aug. 25, 2016 for U.S. Appl. No. 14/744,988.
Office action dated Sep. 13, 2016 for U.S. Appl. No. 15/188,939.
Bremen et al. Selective Laser Melting. Laser Technik Journal 9(2); Apr. 2012. 6 pages.
Co-pending U.S. Appl. No. 16/125,644, filed Sep. 7, 2018.
Co-pending U.S. Appl. No. 16/137,295, filed Sep. 20, 2018.
Co-pending U.S. Appl. No. 16/177,090, filed Oct. 31, 2018.
Co-pending U.S. Appl. No. 16/183,557, filed Nov. 7, 2018.
Co-pending U.S. Appl. No. 16/195,810, filed Nov. 19, 2018.
Das et al. Producing metal parts with selective laser sintering/hot isostatic pressing. JOM; Dec. 1998, vol. 50, Issue 12, pp. 17-20.
*Formlabs v. DWS.* Civil Action filed on Jun. 29, 2018 in the United States Court for the Eastern District of Virginia. Case No. 1:18-cv-00810-CMH-IDD. 13 pages.
U.S. Appl. No. 15/374,442 Notice of Allowance dated Oct. 3, 2018.
U.S. Appl. No. 15/374,535 Notice of Allowance dated Sep. 24, 2018.
U.S. Appl. No. 15/399,186 Notice of Allowance dated Sep. 17, 2018.
U.S. Appl. No. 15/435,110 Notice of Allowance dated Sep. 25, 2018.
U.S. Appl. No. 15/490,219 Office Action dated Oct. 12, 2018.
U.S. Appl. No. 15/614,979 Office Action dated Nov. 5, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,666 Office Action dated Oct. 18, 2018.
U.S. Appl. No. 15/634,727 Office Action dated Sep. 20, 2018.
U.S. Appl. No. 15/719,133 Office Action dated Sep. 24, 2018.
U.S. Appl. No. 15/719,229 Office Action dated Oct. 5, 2018.
U.S. Appl. No. 15/788,495 Office Action dated Oct. 3, 2018.
U.S. Appl. No. 15/803,686 Office Action dated Sep. 19, 2018.
U.S. Appl. No. 15/803,688 Office Action dated Sep. 20, 2018.
U.S. Appl. No. 15/830,421 Office Action dated Nov. 13, 2018.
U.S. Appl. No. 15/853,700 Office Action dated Sep. 11, 2018.
U.S. Appl. No. 15/855,744 Office Action dated Nov. 19, 2018.
U.S. Appl. No. 15/870,561 Office Action dated Nov. 19, 2018.
U.S. Appl. No. 15/871,763 Notice of Allowance dated Nov. 5, 2018.
U.S. Appl. No. 15/871,763 Notice of Allowance dated Sep. 17, 2018.
U.S. Appl. No. 15/937,778 Office Action dated Sep. 21, 2018.
U.S. Appl. No. 15/937,790 Office Action dated Sep. 25, 2018.
U.S. Appl. No. 15/937,798 Office Action dated Oct. 26, 2018.
U.S. Appl. No. 15/937,812 Office Action dated Sep. 7, 2018.
U.S. Appl. No. 15/937,817 Office Action dated Nov. 23, 2018.
Adam, et al. Design for additive manufacturing—element transitions and aggregated structures. CIRP Journal of Manufacturing Science and Technology. Nov. 2014; 7:20-28.
Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

(56) References Cited

OTHER PUBLICATIONS

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR_kR6ua0GOMlyJ1mpCKh342iL1.

Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.

Childs, et al. Raster scan of selective laser melting of the surface layer of a tool steel powder bed. Proc. IMechE. Jan. 26, 2005; vol. 219, Part B, pp. 379-384.

Childs, et al. Selective laser sintering (melting) of stainless and tool steel powders: Experimental modelling. Proc. IMechE. 2005, Published Oct. 18, 2004; vol. 219 Part B, J. Engineering Manufacture, pp. 338-357.

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.

Co-pending U.S. Appl. No. 15/188,939, filed Jun. 21, 2016.

Craeghs, et al. Feedback control of layerwise laser melting using optical sensors. Physics Procedia. Dec. 2010; 5:505-514.

Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.

Direct Manufacturing: ARCAM. Uploaded on Jun. 6, 2011. 2 pages. https://www.youtube.com/watch?v=M_qSnjKN7f8.

EOS. Direct Metal Laser Sintering Published Aug. 22, 2012. https://www.youtube.com/watch?v=cRE-Pzl6uZA.

Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.

Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.

Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.

Hauser, et al. Further Developments in Process Mapping and modelling in direct metal selective laser melting. Aug. 2004, 15th solid Free Form Fabrication Proceedings. Austin, Texas, pp. 448-459.

Hussein. The development of Lightweight Cellular Structures for Metal Additive Manufacturing. Nov. 2013, thesis of University of Exeter, pp. 1-228.

International search report and written opinion dated Feb. 19, 2016 for PCT/US2015/059790.

International search report and written opinion dated Apr. 11, 2016 for PCT/US2015/065297.

International search report and written opinion dated Oct. 30, 2015 for PCT Application No. US2015/036802.

Kannatey-Asibu Jr, Elijah. Principles of laser materials processing. John Wiley & Sons, 2009, Chapter 10, pp. 231-405. Published: Apr. 20, 2009.

Kannatey-Asibu Jr, Elijah. Principles of laser materials processing. John Wiley & Sons, 2009, Chapter 16, pp. 502-668. Published: Apr. 20, 2009.

Kruth, et al. Feedback control of selective laser melting. Proceedings of the 3rd International Conference on Advanced Research in Virtual and Rapid Prototyping, Leiria, Portugal, Sep. 2007. 521-527.

Kruth, et al. Selective laser melting of iron-based power. Journal of Materials Processing Technology. Nov. 2004; 149:616-622.

Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).

Kumar, et al. Designing and slicing heterogenous components for rapid prototyping. Department of Mechanical Engineering, University of Florida. Aug. 2000; 428-436.

Kumar, et al. Electrophotographic Layered Manufacturing. J. Manuf. Sci. Eng 126(3), 571-576 (Sep. 7, 2004) (6 pages) doi:10.1115/1.1765146.

Kumar, et al. Electrophotographic powder deposition for freeform fabrication. Department of Mechanical Engineering, University of Florida. Aug. 1999; 647-654.

Kumar, et al. Electrophotographic printing of part and binder powders. Rapid Prototyping Journal. Jul. 2004; 10(1):7-13.

Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.

Kumar, et al. Solid freeform fabrication by electrophotographic printing. Department of Mechanical and Aerospace Engineering, University of Florida. Aug. 2003; 39-49.

Kumar. Powder deposition and sintering for a two-powder approach to solid freeform fabrication. Department of Mechanical Engineering, University of Florida. Aug. 1998; 169-173.

Laser Engineered Net Shaping (LENS) 850-R system overview. System features and example application video clips. Published Jun. 3, 2012. https://www.youtube.com/watch?v=mkUVURLkxS4.

Leirvag. Additive Manufacturing for Large Products. Feb. 2013, thesis. Norwegian University of Science and Technology.

Lyckfeldt. Powder rheology of steel powders for additive manufacturing. Swerea IVF. Oct. 24, 2013.

Manfredi, et al. From Powders to Dense Metal Parts: Characterization of a Commercial AlSiMg Alloy Processed through Direct Metal Laser Sintering. Mar. 2013, Materials, vol. 6, pp. 856-869.

Mertens, et al. Optimization fo scan strategies in selective laser melting of aluminum parts with down facing areas. Journal of Manufacturing Science and Technology. Dec. 2014; 136:061012-1-7.

Moridi, et al. Cold spray coating: review of material systems and future perspectives. Surface engineering. Jun. 2014; 36(6):369-395.

Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.

Notice of allowance dated Mar. 1, 2016 for U.S. Appl. No. 14/745,108.

Notice of allowance dated May 11, 2016 for U.S. Appl. No. 14/744,955.

Notice of allowance dated May 25, 2016 for U.S. Appl. No. 14/744,675.

Notice of allowance dated Jun. 20, 2016 for U.S. Appl. No. 14/744,675.

Notice of allowance dated Sep. 17, 2015 for U.S. Appl. No. 14/745,081.

Notice of allowance dated Sep. 28, 2015 for U.S. Appl. No. 14/745,081.

Notice of allowance dated Nov. 30, 2015 for U.S. Appl. No. 14/745,081.

Notice of allowance dated Dec. 14, 2015 for U.S. Appl. No. 14/745,081.

Notice of allowance dated Dec. 15, 2015 for U.S. Appl. No. 14/745,081.

Office action dated Jan. 7, 2016 for U.S. Appl. No. 14/744,859.
Office action dated Jan. 11, 2016 for U.S. Appl. No. 14/745,032.
Office action dated Feb. 10, 2016 for U.S. Appl. No. 14/744,910.
Office action dated Feb. 16, 2016 for U.S. Appl. No. 14/744,955.
Office action dated Mar. 4, 2016 for U.S. Appl. No. 14/744,988.
Office action dated Mar. 10, 2016 for U.S. Appl. No. 14/744,675.
Office action dated Jun. 29, 2016 for U.S. Appl. No. 14/744,859.

(56) References Cited

OTHER PUBLICATIONS

Office action dated Jul. 1, 2016 for U.S. Appl. No. 14/745,032.
Office action dated Jul. 19, 2016 for U.S. Appl. No. 15/085,884.
Office action dated Jul. 21, 2016 for U.S. Appl. No. 14/744,910.
Office action dated Sep. 10, 2015 for U.S. Appl. No. 14/744,675.
Office action dated Oct. 2, 2015 for U.S. Appl. No. 14/744,955.
Office action dated Nov. 12, 2015 for U.S. Appl. No. 14/745,108.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Selective Laser Sintering (SLS) Process at Loughborough University. Published May 4, 2015. 2 pages. https://www.youtube.com/watch?v=oO77VKDB89I.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Van Der Eijk, et al. Metal printing process: development of a new rapid manufacturing process for metal parts. Proceedings of the World PM 2004 conference held in Vienna. Oct. 17-21, 2004. 5 pages.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgry, Ch. 19, Elsevier, 2011, pp. 279-283. Published: Nov. 17, 2010.
Yin. Accurately quantifying process-relevant powder properties for AMPM applications. Freeman Technology. May 2014. 39 pages.
Calvert, Jack G. Glossary of Atmospheric Chemistry Terms (Recommendations 1990). Pure & Appl. Chem., vol. 62, No. 11, Jan. 1, 1990, pp. 2167-2219.
Co-pending U.S. Appl. No. 16/245,183, filed Jan. 10, 2019.
Co-pending U.S. Appl. No. 16/248,665, filed Jan. 15, 2019.
Co-pending U.S. Appl. No. 16/253,103, filed Jan. 21, 2019.
Co-pending U.S. Appl. No. 16/291,759, filed Mar. 4, 2019.
IUPAC. "Inert gas". IUPAC Compendium of Chemical Terminology. Published Feb. 24, 2014.< http://goldbook.iupac.org/html/l/103027.html.
Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
Ryan et al. Fabrication methods of porous metals for use in orthopaedic applications. Biomaterials. May 2006; vol. 27, Issue 13, pp. 2651-2670.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/399,186 Notice of Allowance dated Dec. 20, 2018.
U.S. Appl. No. 15/435,078 Office Action dated Jan. 10, 2019.
U.S. Appl. No. 15/435,110 Notice of Allowance dated Dec. 20, 2018.
U.S. Appl. No. 15/479,531 Office Action dated Jan. 9, 2019.
U.S. Appl. No. 15/634,228 Notice of Allowance dated Feb. 20, 2019.
U.S. Appl. No. 15/634,267 Notice of Allowance dated Dec. 28, 2018.
U.S. Appl. No. 15/634,727 Notice of Allowance dated Feb. 7, 2019.
U.S. Appl. No. 15/719,084 Office Action dated Feb. 8, 2019.
U.S. Appl. No. 15/803,686 Notice of Allowance dated Feb. 19, 2019.
U.S. Appl. No. 15/855,744 Notice of Allowance dated Feb. 15, 2019.
U.S. Appl. No. 15/861,544 Office Action dated Feb. 15, 2019.
U.S. Appl. No. 15/861,553 Office Action dated Dec. 14, 2018.
U.S. Appl. No. 15/886,544 Office Action dated Mar. 21, 2019.
U.S. Appl. No. 15/909,388 Office Action dated Dec. 14, 2018.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,784 Notice of Allowance dated Mar. 27, 2019.
U.S. Appl. No. 15/909,784 Office Action dated Jan. 18, 2019.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,826 Office Action dated Feb. 13, 2019.
U.S. Appl. No. 15/937,778 Office Action dated Feb. 12, 2019.
U.S. Appl. No. 15/937,790 Office Action dated Jan. 31, 2019.
U.S. Appl. No. 15/937,798 Office Action dated Mar. 7, 2019.
U.S. Appl. No. 15/937,812 Office Action dated Feb. 7, 2019.
Co-pending U.S. Appl. No. 16/404,579, filed May 6, 2019.
Co-pending U.S. Appl. No. 16/419,912, filed May 22, 2019.
Co-pending U.S. Appl. No. 16/439,614, filed Jun. 12, 2019.
Co-pending U.S. Appl. No. 16/449,965, filed Jun. 24, 2019.
Co-pending U.S. Appl. No. 16/450,853, filed Jun. 24, 2019.
Co-pending U.S. Appl. No. 16/505,520, filed Jul. 8, 2019.
Co-pending U.S. Appl. No. 16/506,911, filed Jul. 9, 2019.
EP16862767.7 European Search Report dated Jun. 26, 2019.
EP18209400.3 European Search Report dated May 7, 2019.
PCT/US2019/014635 International Search Report and Written Opinion dated May 13, 2019.
Salvati et al. An Investigation of Residual Stress Gradient Effects in FIB-DIC Micro-Ring-Core Analysis. Proceedings of the International MultiConference of Engineers and Computer Scientists 2015 vol. II, IMECS 2015, Hong Kong, Mar. 18-20, 2015. 4 pages.
U.S. Appl. No. 15/435,078 Notice of Allowance dated May 20, 2019.
U.S. Appl. No. 15/436,558 Office Action dated May 23, 2019.
U.S. Appl. No. 15/719,229 Office Action dated May 16, 2019.
U.S. Appl. No. 15/909,406 Notice of Allowance dated May 6, 2019.
U.S. Appl. No. 15/435,078 Notice of Allowance dated Jul. 10, 2019.
U.S. Appl. No. 15/523,524 Office Action dated Jun. 7, 2019.
U.S. Appl. No. 15/803,683 Office Action dated Jun. 19, 2019.
U.S. Appl. No. 15/861,544 Office Action dated Jul. 11, 2019.
U.S. Appl. No. 15/909,784 Notice of Allowance dated Jun. 27, 2019.
U.S. Appl. No. 15/909,809 Notice of Allowance dated Jun. 19, 2019.
U.S. Appl. No. 15/909,809 Notice of Allowance dated May 31, 2019.
U.S. Appl. No. 15/909,826 Notice of Allowance dated Jul. 1, 2019.
U.S. Appl. No. 15/937,798 Notice of Allowance dated Jun. 12, 2019.

(56) References Cited

OTHER PUBLICATIONS

U.S. Appl. No. 15/436,558 Notice of Allowance dated Aug. 21, 2019.
Co-pending U.S. Appl. No. 16/542,208, filed Aug. 15, 2019.
PCT/US2019/024402 International Search Report and Written Opinion dated Aug. 6, 2019.

* cited by examiner

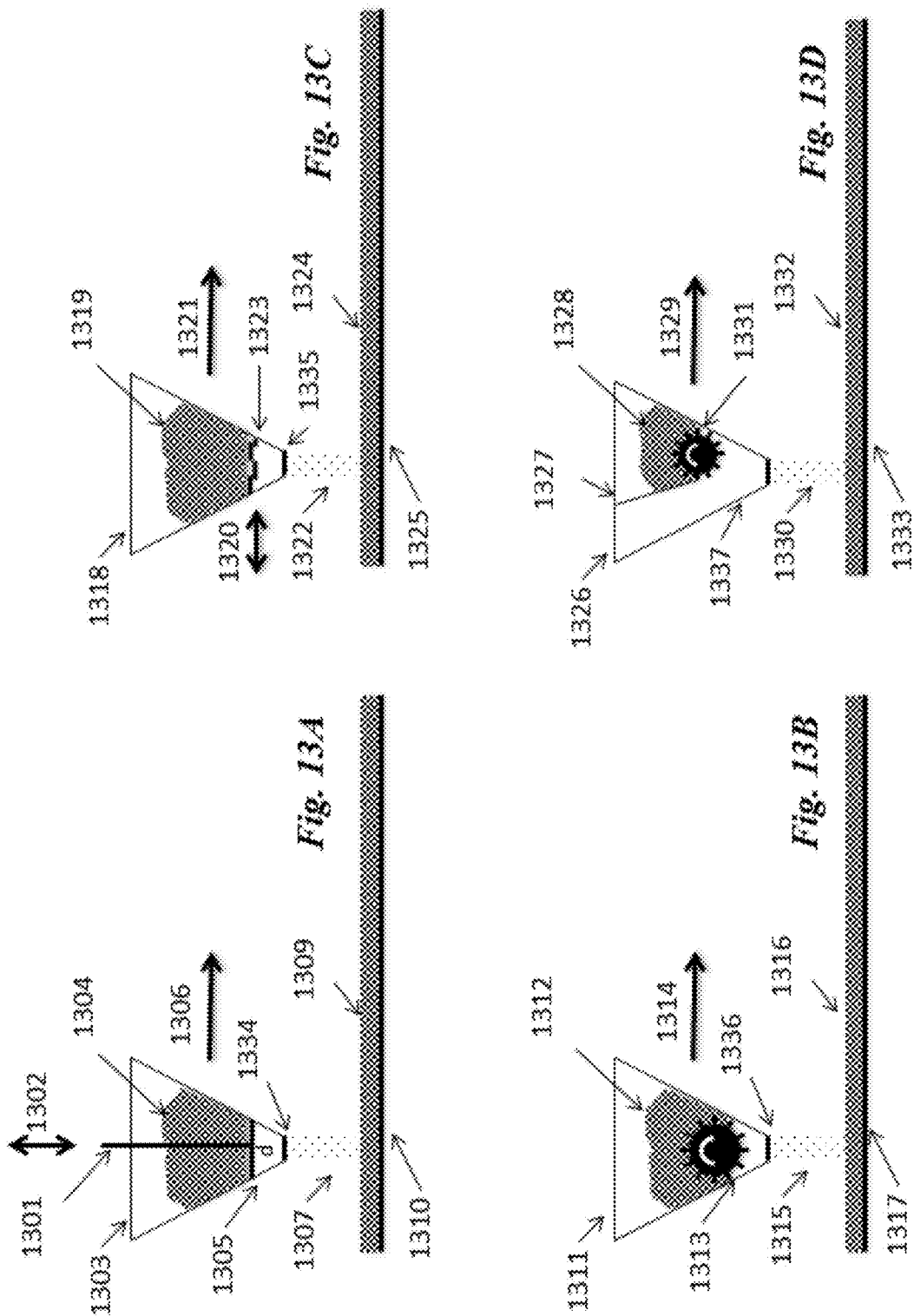

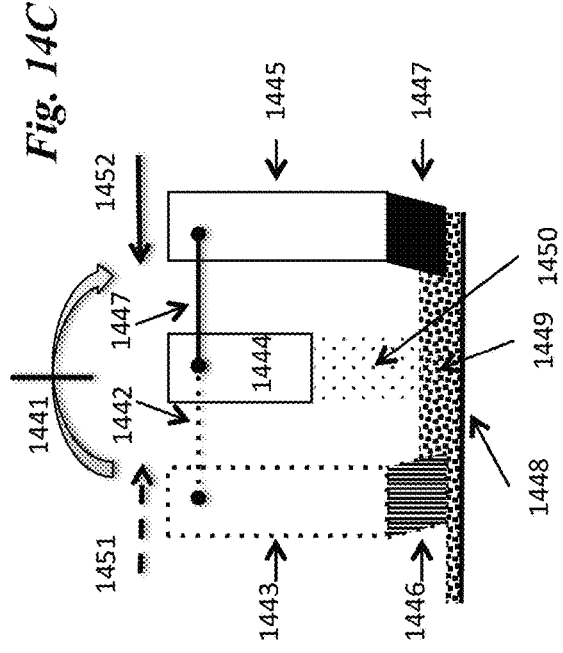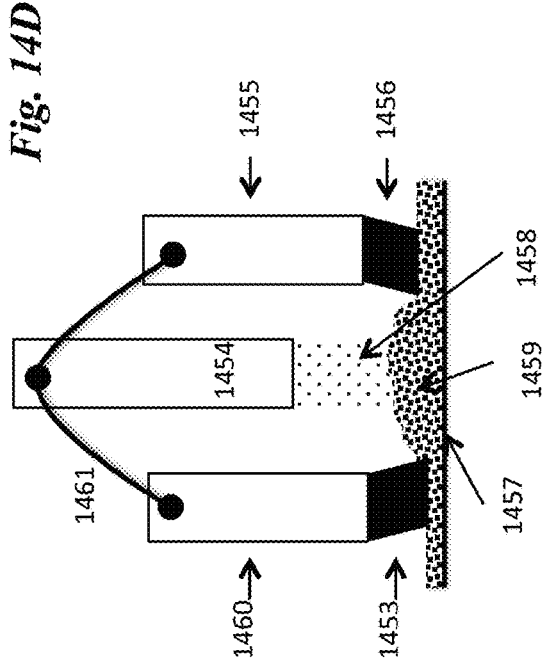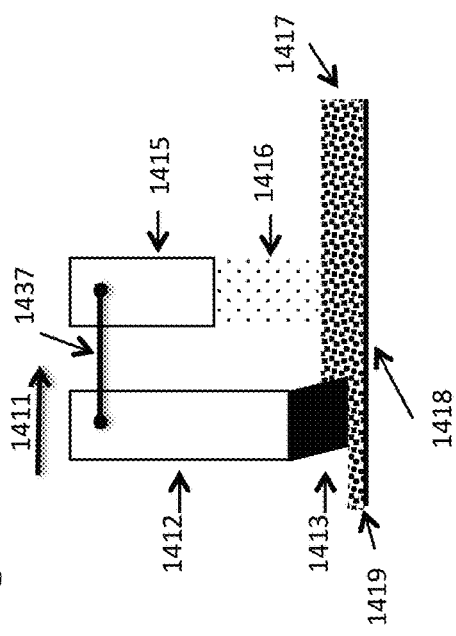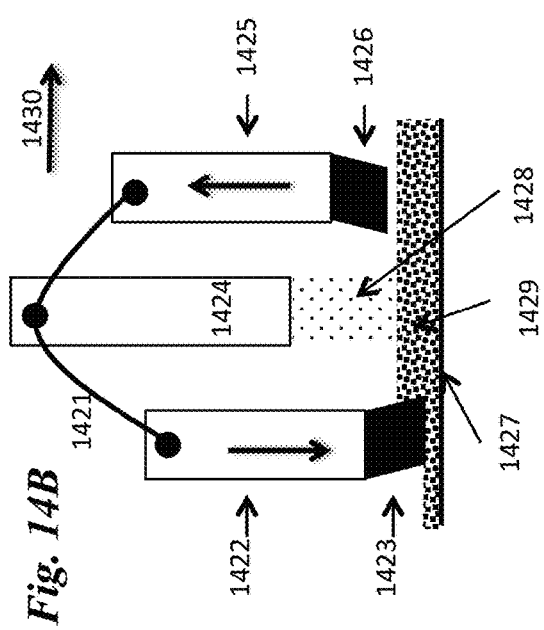

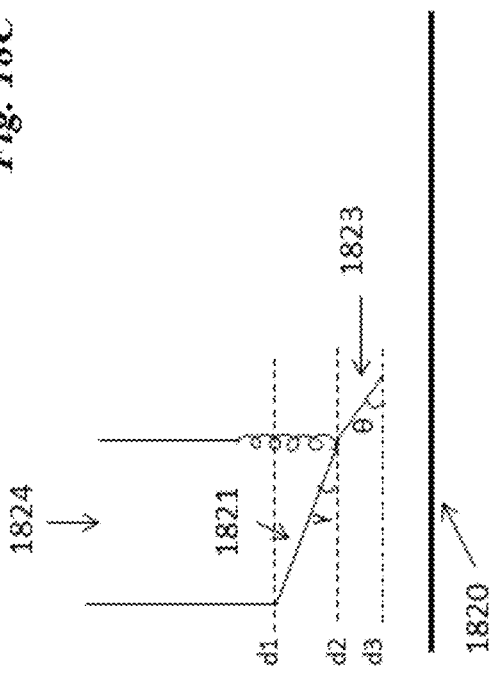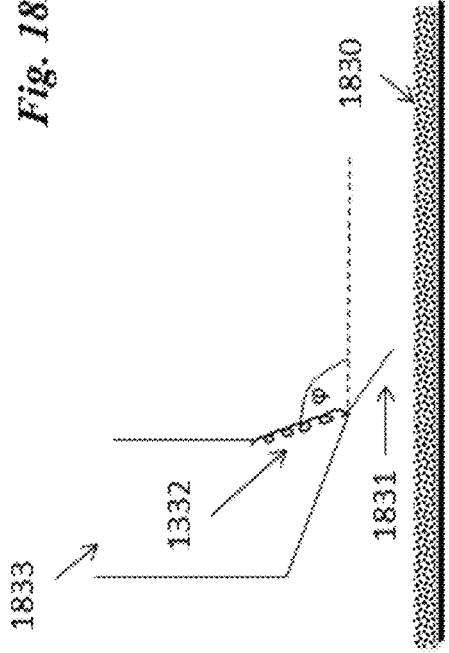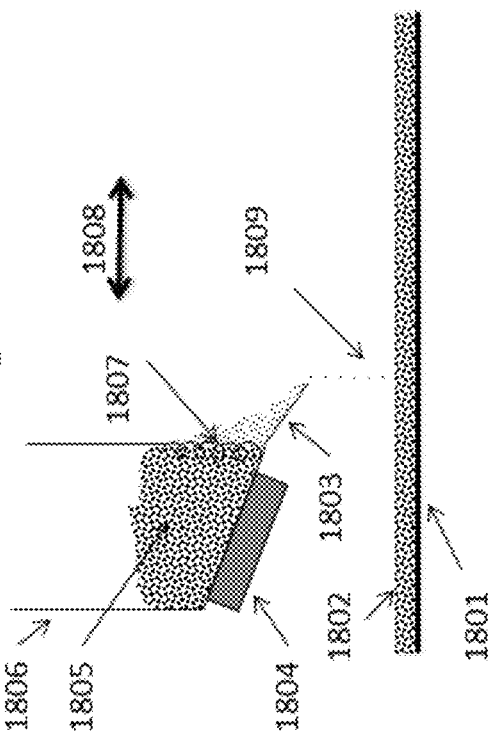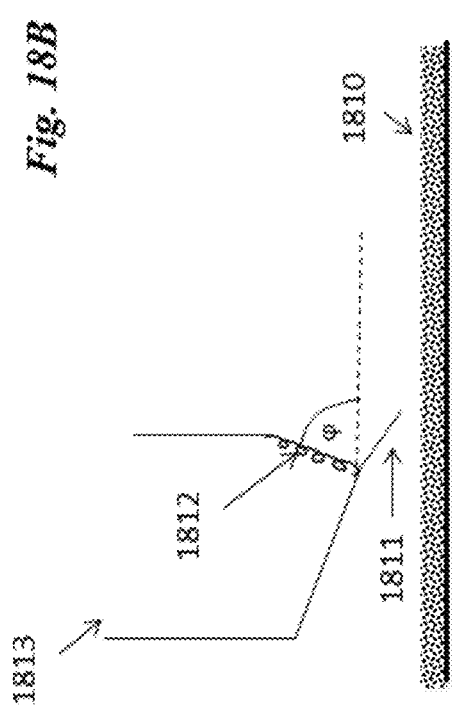
Fig. 18A
Fig. 18B
Fig. 18C
Fig. 18D

APPARATUSES, SYSTEMS AND METHODS FOR THREE-DIMENSIONAL PRINTING

CROSS-REFERENCE

This application is a continuation application of U.S. patent application Ser. No. 14/744,675, filed Jun. 19, 2015, now issued as U.S. Pat. No. 9,399,256, which claims priority to U.S. Provisional Patent Application Ser. No. 62/015,230, filed Jun. 20, 2014, U.S. Provisional Patent Application Ser. No. 62/028,760, filed Jul. 24, 2014, U.S. Provisional Patent Application Ser. No. 62/063,867, filed Oct. 14, 2014, U.S. Provisional Patent Application Ser. No. 62/136,378, filed Mar. 20, 2015, and U.S. Provisional Patent Application Ser. No. 62/168,699, filed May 29, 2015, each of which is entirely incorporated herein by reference.

BACKGROUND

Three-dimensional (3D) printing (e.g., additive manufacturing) is a process for making a three-dimensional object of any shape from a design. The design may be in the form of a data source such as an electronic data source, or may be in the form of a hard copy. The hard copy may be a two dimensional representation of a three dimensional object. The data source may be an electronic 3D model. 3D printing may be accomplished through an additive process in which successive layers of material are laid down on top of each other. This process may be controlled (e.g., computer controlled, manually controlled, or both). A 3D printer can be an industrial robot.

3D printing can generate custom parts quickly and efficiently. A variety of materials can be used in a 3D printing process including metal, metal alloy, ceramic or polymeric material. In an additive 3D printing process, a first material-layer is formed, and thereafter successive material-layers are added one by one, wherein each new material-layer is added on a pre-formed material-layer, until the entire designed three-dimensional structure (3D object) is materialized.

3D models may be created with a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, three-dimensional models of the scanned object can be produced.

A large number of additive processes are currently available. They may differ in the manner layers are deposited to create the materialized structure. They may vary in the material or materials that are used to materialize the designed structure. Some methods melt or soften material to produce the layers. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

At times, the printed 3D object may bend, warp, roll, curl, or otherwise deform during the 3D printing process. Auxiliary supports may be inserted to circumvent such bending, warping, rolling, curling or other deformation. These auxiliary supports may be removed from the printed 3D object to produce a desired 3D product (e.g., 3D object).

SUMMARY

In an aspect, a method for generating a three dimensional object comprises (a) providing (i) a first layer of powder material in an enclosure at a first time ($t_1$) and (ii) a second layer of powder material in the enclosure at a second time ($t_2$) that follows $t_1$, wherein the second layer of material is provided adjacent to the first layer of powder material; (b) transforming at least a portion of the powder material in the second layer to form a transformed material, wherein the transforming is with the aid of an energy beam having a first energy per unit area ($S_1$); and (c) removing energy from the second layer at a time interval from $t_2$ to a third time ($t_3$), wherein the thermal energy is removed along a direction that is different from below the first layer of powder material, wherein during the time interval from $t_2$ to $t_3$, the energy is removed at a second energy per unit area ($S_2$) that is at least about 0.3 times $S_1$, and wherein upon removal of the energy, the transformed material solidifies to form at least a part of the three dimensional object.

The method can further comprise repeating operations (a) to (d). The energy beam can be an electromagnetic beam, charged particle beam, or non-charged beam. The energy beam can be an electromagnetic beam, electron beam, or plasma beam. The energy that is removed can be thermal energy. $S_2$ can be at least about 0.5 times $S_1$. $S_2$ can be at least about 0.8 times $S_1$. On operation (b), a remainder of the first layer can be a portion of the powder material that was not transformed to form at least a part of the three dimensional object. The remainder can be heated to a maximum temperature that is below a transforming temperature of the material.

The remainder of the first layer can be a portion of the powder material that was not transformed to form at least a part of the three dimensional object. The remainder can be supplied with energy at a third energy per unit area $S_3$ that is less than or equal to about 0.1 times $S_1$. The method may further comprise cooling the remainder at substantially the same rate as the rate of cooling the transformed material. Operations (b) and (c) can be performed substantially simultaneously. Operation (b) can be performed using an electromagnetic radiation beam. The electromagnetic radiation beam can be a laser light. Operation (c) can be performed using an electromagnetic radiation beam. The electromagnetic radiation beam can comprise infrared light. In operation (b) the portion of the layer of material can be transformed at a first temperature ($T_1$) without transforming the remainder. The remainder can be heated to a second temperature ($T_2$) that is less than about $T_1$. The remainder can be devoid of a continuous layer extending over about 1 millimeter or more. The remainder can be devoid of a scaffold enclosing at least part of the three-dimensional object. The remainder can be devoid of a scaffold enclosing the three-dimensional object. The scaffold can comprise transformed material.

Adjacent can be above. The material can comprise elemental metal, metal alloy, ceramic or an allotrope of elemental carbon. The material can comprise a powder material. Transforming can comprise fusing (e.g., individual particles of the powder material). Fusing can comprise melting, sintering or bonding (e.g., individual particles of the powder material). Bonding can comprise chemically bonding. Chemically bonding can comprise covalent bonding.

In another aspect, an apparatus for forming a three-dimensional object comprises a controller that is programmed to: (a) supply powder material from a powder dispensing member to a powder bed operatively coupled to the powder dispensing member, wherein the supply of powder material comprises supply of (i) a first layer of powder material in an enclosure at a first time ($t_1$) and (ii) a second layer of powder material in the enclosure at a second time ($t_2$) that follows $t_1$, wherein the second layer of material is provided adjacent to the first layer of powder material; (b) direct an energy beam from an energy source to the powder bed to transform at least a portion of the powder material to a transformed material that subsequently hardens to yield the three-dimensional object, wherein the energy beam has a first energy per unit area ($S_1$); and (c) direct a cooling member to remove thermal energy from the second layer at a time interval from $t_2$ to a third time ($t_3$), wherein the thermal energy is removed along a direction that is different from below the first layer of powder material, wherein during the time interval from $t_2$ to $t_3$, the energy is removed at a second energy per unit area ($S_2$) that is at least about 0.3 times $S_1$, and wherein upon removal of the energy, the transformed material solidifies to form at least a part of the three dimensional object.

In another aspect, a method for generating a three dimensional object comprises (a) providing (i) a first layer of material in an enclosure at a first time ($t_1$) and (ii) a second layer of material in the enclosure at a second time ($t_2$) that follows $t_1$, wherein the second layer of material is provided adjacent to the first layer of material, wherein the first layer of powder material and second layer of powder material form a powder bed, and; transforming at least a portion of the material in the second layer to form a transformed material; and (b) using a cooling member adjacent to the first layer or the second layer to remove thermal energy from the second layer at a time interval from $t_2$ to a third time ($t_3$), wherein the thermal energy is removed along a direction above the powder bed, and wherein upon removal of thermal energy, the transformed material solidifies to form at least a portion of the three-dimensional object.

During the time interval from $t_2$ to $t_3$, an average temperature at a point in the second layer can be maintained at less than or equal to about 250° C. During the time interval from $t_2$ to $t_3$, the average temperature can be maintained at less than or equal to about 100° C.

Transforming can be with the aid of an energy beam having a first energy per unit area ($S_1$). In operation (c), during the time interval from $t_2$ to $t_3$, thermal energy can be removed at a second energy per unit area ($S_2$) that can be at least about 0.3 times $S_1$. The second energy per unit area ($S_2$) can be at least about 0.5 times $S_1$. The thermal energy can be removed from a side of the first layer of powder material or the second layer of powder material. The thermal energy can be removed from a top surface of the powder bed. The transforming operation may comprise fusing (e.g., individual particles of the powder material). The fusing can comprise melting or sintering (e.g., the individual particles). At time $t_3$, a third layer of powder material can be provided adjacent to the second layer of powder material. The transforming can comprise directing an energy beam to at least a portion of the second layer.

In another aspect, a system for generating a three-dimensional object comprises an enclosure that accepts a first layer of powder material at a first time (t1) and a second layer of powder material at a second time (t2) that follows t1 to form a powder bed, wherein the second layer of powder material is adjacent to the first layer of powder material, and wherein the powder material comprises an elemental metal, metal alloy, ceramic, or an allotrope of elemental carbon; a cooling member adjacent to the first layer or the second layer, wherein the cooling member removes thermal energy from the second layer; and a controller operatively coupled to the cooling member and programmed to (i) transform at least a portion of the powder material in the second layer to form a transformed material, and (ii) use the cooling member to remove thermal energy from the second layer at a time interval from t2 to a third time (t3), wherein the thermal energy is removed along a direction above the powder bed, and wherein upon removal of thermal energy, the transformed material solidifies to form at least a portion of the three-dimensional object.

The cooling member can be disposed outside of the powder material (e.g., not within the powder material). The system may further comprise an energy source that provides an energy beam to at least a portion of the second layer. The controller can be operatively coupled to the energy source and programmed to direct the energy beam to at least the portion of the second layer. The controller can be programmed to (1) transform at least a portion of the powder material in the second layer to form a transformed material using an energy beam having a first energy per unit area ($S_1$), and (2) use the cooling member to remove thermal energy during the time interval from $t_2$ to $t_3$ at a second energy per unit area ($S_2$) that can be at least about 0.3 times $S_1$. The second energy per unit area ($S_2$) can be at least about 0.5 times $S_1$. The controller can be programmed to use the cooling member to remove the thermal energy from a side of the first layer of material or the second layer of material, wherein the side can be different than the exposed surface of the second layer, or can be opposite to the exposed surface of the second layer. The controller can be programmed to use the cooling member to remove the thermal energy from a top surface of the powder bed.

The controller can be programmed to control an average temperature of the second layer of powder material. During the time interval from $t_2$ to $t_3$, the controller can be programmed to maintain an average temperature at a point in the second layer at less than or equal to about 250° C. During the time interval from $t_2$ to $t_3$, the controller can be programmed to maintain the average temperature at less than or equal to about 100° C. The cooling member can be movable. The controller can be programmed to move the cooling member. The cooling member can be separated from the powder bed by a gap. The gap can be at a spacing of less than or equal to about 50 millimeters. The gap can be at an adjustable spacing between the cooling member and the powder bed. The controller can be programed to regulate the adjustable spacing. The cooling member can comprise a material with a thermal conductivity of at least about 20 Watts per meter per Kelvin (W/mK). The cooling member may further comprise a cleaning member that removes the powder material or debris from a surface of the cooling member. The system may further comprise a collection member that collects a remainder of the powder material or debris from the cooling member or the powder bed.

In another aspect, an apparatus for forming a three-dimensional object comprises a controller that is programmed to: (a) supply powder material from a powder dispensing member to a powder bed operatively coupled to the powder dispensing member, wherein the supply of powder material comprises supply of (i) a first layer of powder material in an enclosure at a first time ($t_1$) and (ii) a second layer of powder material in the enclosure at a second time ($t_2$) that follows $t_1$, wherein the second layer of material is provided adjacent to the first layer of powder material; (b) direct an energy beam from an energy source to the powder bed to transform at least a portion of the powder material to a transformed material that subsequently hardens to yield the three-dimensional object; and (c) direct a cooling member adjacent to the first layer or the second layer to remove thermal energy from the second layer at a time interval from $t_2$ to a third time ($t_3$), wherein the thermal energy is removed along a direction above the powder bed, and wherein upon removal of thermal energy, the transformed material solidifies to form at least a portion of the three-dimensional object.

In another aspect, a method for generating a three dimensional object comprises (a) providing (i) a first layer of material in an enclosure at a first time ($t_1$) and (ii) a second layer of material in the enclosure at a second time ($t_2$) that follows $t_1$, wherein the second layer of material is provided adjacent to the first layer of material; (b) transforming at least a portion of the material in the second layer to form a transformed material; and (c) removing thermal energy from the second layer at a time interval from $t_2$ to a third time ($t_3$), wherein during a time interval from $t_1$ to $t_2$, an average temperature at any point in the second layer is maintained within at most about 250 degrees Celsius, and wherein removing the energy results in hardening the transformed material to form at least a portion of the three dimensional object.

A third layer of material can be provided at times $t_3$. The average temperature at any point in the second layer can be maintained within at most about 100 degrees Celsius. The average temperature at any point in the second layer can be maintained within at most about 10 degrees Celsius range. The method may further comprise fusing a portion of the first layer prior to providing the second layer. Fusing may comprise melting or sintering. The method may further comprise cooling the portion prior to operation (b).

In another aspect, an apparatus for forming a three-dimensional object comprises a controller that is programmed to: (a) supply powder material from a powder dispensing member to a powder bed operatively coupled to the powder dispensing member, wherein the supply of powder material comprises supply of (i) a first layer of material in an enclosure at a first time ($t_1$) and (ii) a second layer of material in the enclosure at a second time ($t_2$) that follows $t_1$, wherein the second layer of material is provided adjacent to the first layer of material; (b) direct an energy beam from an energy source to the powder bed to transform at least a portion of the powder material to a transformed material that subsequently hardens to yield the three-dimensional object; and (c) direct a cooling member adjacent to the first layer or the second layer to remove thermal energy from the second layer at a time interval from $t_2$ to a third time ($t_3$), wherein during a time interval from $t_1$ to $t_2$, an average temperature at any point in the second layer is maintained within at most about 250 degrees Celsius, and wherein removing the energy results in hardening the transformed material to form at least a portion of the three dimensional object.

In another aspect, a system for generating a three-dimensional object comprises an enclosure that accepts a first layer of material at a first time ($t_1$) and a second layer of material at a second time ($t_2$) that follows $t_1$, wherein the second layer of material is adjacent to the first layer of powder material; a cooling member adjacent to the first layer or the second layer, wherein the cooling member removes thermal energy from the second layer; and a controller operatively coupled to the cooling member and programmed to (i) transform at least a portion of the material in the second layer to form a transformed material, and (ii) using the cooling member to remove thermal energy from the second layer at a time interval from $t_2$ to a third time ($t_3$), wherein during a time interval from $t_1$ to $t_2$, an average temperature at any point in the second layer is maintained within at most about 250 degrees Celsius, and wherein upon removal of thermal energy, the transformed material solidifies to form at least a part of the three-dimensional object.

In another aspect, a method for generating a three dimensional object comprises (a) providing (i) a first layer of material in an enclosure at a first time ($t_1$) and (ii) a second layer of material in the enclosure at a second time ($t_2$) that follows $t_1$, wherein the second layer of material is provided adjacent to the first layer of material; (b) transforming at least a portion of the material in the second layer to form a transformed material; and (c) removing thermal energy from the second layer at a time interval from $t_2$ to a third time ($t_3$), wherein a maximum temperature of the transformed material is at least about 400° C. or more, and wherein a remainder of the powder material that did not transform to subsequently form a hardened material that is at least a portion of the three dimensional object, does not exceed a temperature of about 300° C., and wherein removing the energy results in hardening the transformed material to form at least a portion of the three dimensional object.

The hardened material can be devoid of auxiliary supports. The remainder may not exceed a temperature of about 200° C. The remainder may not exceed a temperature of about 150° C. The method can further comprise repeating operations (a) to (c). Operations (a)-(c) can be performed at a pressure that can be about $10^{-6}$ Torr or more. The method may further comprise removing the hardened material from the remainder of powder material that did not fuse to form at least a portion of the three dimensional object. The method may further comprise cooling the portion and the remainder of powder material that did not fuse to form at least a part of the three dimensional object. The portion and the remainder can be cooled at substantially the same rate. The second temperature can be at most about 350° C. or less. The method may further comprise separating the remainder of powder material that did not fuse to form at least a part of the three dimensional object, from the at least a portion of the three dimensional object.

The material can comprise powder material. The material can comprise elemental metal, metal alloy, ceramics, or an allotrope of elemental carbon. Transforming can comprise fusing. Fusing can comprise melting or sintering. The hardened material can comprise solidified material.

In another aspect, an apparatus for forming a three-dimensional object comprises a controller that is programmed to (a) supply powder material from a powder dispensing member to a powder bed operatively coupled to the powder dispensing member, wherein the supply of powder material comprises supply of (i) a first layer of material in an enclosure at a first time ($t_1$) and (ii) a second layer of material in the enclosure at a second time ($t_2$) that follows $t_1$, wherein the second layer of material is provided adjacent to the first layer of material; (b) direct an energy beam from an energy source to the powder bed to transform at least a portion of the powder material to a transformed material that subsequently hardens to yield the three-dimensional object; and (c) direct a cooling member adjacent to the first layer or the second layer to remove thermal energy from the second layer at a time interval from $t_2$ to a third time ($t_3$), wherein a maximum temperature of the transformed material is at least about 400° C. or more, and wherein a remainder of the powder material that did not transform to subsequently form a hardened material that is at least a portion of the three dimensional object, does not exceed a temperature of about 300° C., and wherein removing the energy results in hardening the transformed material to form at least a portion of the three dimensional object.

In another aspect, a system for generating a three-dimensional object comprises: an enclosure that accepts a first layer of material at a first time ($t_1$) and a second layer of material at a second time ($t_2$) that follows $t_1$, wherein the second layer of material is adjacent to the first layer of powder material; a cooling member adjacent to the first layer or the second layer, wherein the cooling member removes thermal energy from the second layer; and a controller operatively coupled to the cooling member and programmed to (i) transform at least a portion of the material in the second layer to form a transformed material, and (ii) using the cooling member to remove thermal energy from the second layer at a time interval from $t_2$ to a third time ($t_3$), wherein a maximum temperature of the transformed material is at least about 400° C. or more, and wherein a remainder of the powder material that did not transform to subsequently form a hardened material that is at least a part of the three dimensional object, does not exceed a temperature of about 300° C., and wherein upon removal of thermal energy, the transformed material solidifies to form at least a part of the three-dimensional object.

In another aspect, a method for generating a three dimensional object comprises (a) providing a layer of material in an enclosure having an average temperature ($T_0$); (b) transforming at least a portion of the material in the second layer to form a transformed material, wherein the portion reaches a maximum temperature ($T_2$), that is greater than $T_0$; and (c) removing thermal energy from the layer to reach an average temperature $T_1$ in a time period that is at most about 240 seconds, to form from the transformed material a hardened material that is at least a part of the three dimensional object, wherein $T_1$ is greater or equal to $T_0$ and lower than $T_2$, wherein $T_1$ is not greater than $T_0$ by more than about 0.8 times ($T_2-T_0$).

The method may further comprise repeating operations (a) to (c), wherein a subsequent layer of powder material is provided on a previously provided layer of powder material. A first provided layer of powder material can be provided on a base. The time period can be at most about 120 seconds. The time period can be at most about 60 seconds. The time period can be at most about 30 seconds. $T_1$ can be not greater than $T_0$ by more than about 0.5 times ($T_2-T_0$). $T_1$ can be not greater than $T_0$ by more than about 0.3 times ($T_2-T_0$). $T_1$ can be not greater than $T_0$ by more than about 0.1 times ($T_2-T_0$).

Hardening can comprise solidifying. Transforming can comprise fusing. Fusing can comprise melting or sintering. The energy can comprise an energy beam. The energy beam can comprise an electromagnetic beam, electron beam, or a plasma beam. The electromagnetic beam can comprise a laser beam or a microwave beam.

In another aspect, an apparatus for forming a three-dimensional object comprises a controller that is programmed to: (a) supply a layer of powder material having an average temperature ($T_0$) from a powder dispensing member to a powder bed operatively coupled to the powder dispensing member; (b) direct an energy beam from an energy source to the powder bed to transform at least a portion of the powder material to a transformed material that subsequently hardens to yield the three-dimensional object, wherein the portion reaches a maximum temperature ($T_2$), that is greater than $T_0$; and (c) direct a cooling member adjacent to the layer to remove thermal energy from the layer to reach an average temperature $T_1$ in a time period that is at most about 240 seconds, to form from the transformed material a hardened material that is at least a part of the three dimensional object, wherein $T_1$ is greater or equal to $T_0$ and lower than $T_2$, wherein $T_1$ is not greater than $T_0$ by more than about 0.8 times ($T_2-T_0$).

In another aspect, a system for generating a three-dimensional object comprises: an enclosure that accepts a layer of material having an average base temperature ($T_0$); a cooling member adjacent to the layer, wherein the cooling member removes thermal energy from the layer; and a controller operatively coupled to the cooling member and programmed to (i) transform at least a portion of the material in the layer to form a transformed material, wherein the transformed material reaches a maximum temperature ($T_2$) and (ii) using the cooling member to remove thermal energy such that after 240 seconds or less, the transformed material forms hardened material that is at least a part of the three dimensional object, wherein $T_1$ is greater or equal to $T_0$ and lower than $T_2$, wherein $T_1$ is not greater than $T_0$ by more than about 0.8 times ($T_2-T_0$).

In another aspect, an apparatus for forming a three-dimensional object comprises a controller that is programmed to: (a) supply a layer of powder material from a powder dispensing member to a powder bed operatively coupled to the powder dispensing member, wherein the powder material comprises elemental metal, metal alloy, ceramic or an allotrope of elemental carbon; (b) direct an energy beam from an energy source to the powder bed to transform at least a portion of the powder material to a transformed material that subsequently hardens to yield the three-dimensional object; and (c) direct a cooling member to remove energy from the powder bed, wherein the cooling member facilitates removal of at least 30 percent of the energy in the direction above an exposed surface of the powder bed.

In another aspect, a method for generating a three-dimensional object comprises (a) providing a material bed in an enclosure; (b) directing an energy beam at the material along a path to transform at least a portion of the material to form a transformed material, which transformed material hardens to form a hardened material as part of the three-dimensional object; and (c) bringing a heat sink adjacent to an exposed surface of the material bed to remove thermal energy from the material bed, wherein during the removal of thermal energy from the material bed, the heat sink is separated from the exposed surface by a gap, and wherein the exposed surface of the material bed is a top surface of the powder bed.

The gap can be at a spacing between the heat sink and the top surface that is less than or equal to about 50 millimeters. The path can be generated according to a model of the three-dimensional object. The transforming can comprise fusing individual particles of the powder material. Fusing can comprise sintering, melting or binding the individual particles.

In another aspect, an apparatus for forming a three-dimensional object, comprises a controller that is programmed to: (a) supply a layer of material from a material dispensing member to a material bed operatively coupled to the material dispensing member; (b) direct an energy beam from an energy source to the material bed to transform at least a portion of the powder material to a transformed material that subsequently hardens to yield the three-dimensional object; and (c) direct a cooling member to remove energy from the material bed, wherein the cooling member is disposed adjacent to an exposed surface of the material bed, wherein during the removal of thermal energy from the material bed, the heat sink is separated from the exposed surface by a gap, and wherein the exposed surface of the material bed is a top surface of the powder bed.

In another aspect, a system for generating a three-dimensional object comprises: an enclosure that accommodates a material bed; an energy source that provides an energy beam to the material in the material bed; a heat sink that removes thermal energy from the powder bed, wherein during removal of thermal energy from the material bed, the heat sink is separated from an exposed surface of the material bed by a gap, and wherein the exposed surface of the powder bed is a top surface of the powder bed; and a controller operatively coupled to the energy source and the heat sink and programmed to (i) direct the energy beam at the material along a path to transform at least a portion of the material to form a transformed material, which transformed material hardens to form a hardened material as at least a part of the three-dimensional object, and (ii) bring the heat sink adjacent to the exposed surface of the powder bed to remove thermal energy from the powder bed.

The energy beam can comprise an electromagnetic beam, a charged particle beam or a non-charged particle beam. The energy beam can comprise a laser beam.

The heat sink can be disposed within a path of the energy beam that extends from the energy source to the powder material. The heat sink can comprise at least one opening, and during use, the energy beam can be directed from the energy source to the powder material through the at least one opening. The heat sink can be movable. The controller can be programmed to move the heat sink. The enclosure can be a vacuum chamber. The enclosure has a pressure of at least about $10^{-6}$ Torr. The heat sink can be thermally coupled to the powder material trough the gap. The gap can comprise a gas. The gap can be at a spacing between the heat sink and the exposed surface that is less than or equal to about 50 millimeters. The gap can be at an adjustable spacing between the heat sink and the exposed surface. The controller can be programed to regulate the spacing. The controller can be programmed to regulate the spacing by using an energy per unit area that is sufficient to transform the at least a portion of the material. The controller can be programmed to regulate at least one of the spacing and the energy source to provide an energy per unit area that is sufficient to form the three-dimensional object at a deviation from a model of the three-dimensional object that is less than or equal to about the sum of 25 micrometers and one thousandths of the fundamental length scale of the three-dimensional object. The heat sink can facilitate the transfer of thermal energy from the powder material via convective heat transfer. The heat sink can comprise a material with a thermal conductivity of at least about 20 Watts per meter per Kelvin (W/mK). The heat sink can further comprise a cleaning member that removes the powder material or debris from a surface of the heat sink. The cleaning member can comprise a rotating brush. The cleaning mechanism can comprise a rotating brush that rotates when the heat sinks moves. The heat sink can comprise at least one surface that can be coated with an anti-stick layer that reduces or prevents absorption of the powder material or debris on the at least one surface. The system may further comprise a collection member that collects a remainder of the powder material or debris from the heat sink or the powder bed. The mechanism for collection of at least one of remaining powder and debris can comprise a venturi scavenging nozzle. The venturi scavenging nozzle can be aligned with the energy source such that an energy beam from the energy source passes through an opening of the venturi scavenging nozzle. The mechanism for collection of at least one of remaining powder and debris can comprise one or more vacuum suction port. The mechanism for collection of at least one of remaining powder and debris can be coupled to the heat sink. The collection member can comprise one or more sources of negative pressure. The collection member can be operatively coupled to the heat sink. The system may further comprise a source of the material that supplies the material to the enclosure. The heat sink may facilitate the removal of energy without substantially changing the position of the at least part of the three dimensional object. The heat sink can be in proximity to at least the layer. The heat sink can be located between the energy source and the layer. The heat sink can be movable to or from a position that can be between the energy source and the base. The heat sink can comprise at least one opening through which energy from the energy source can be directed to the portion of the layer. The system may further comprise an additional energy source that provides energy to a remainder of the layer that did not transform to subsequently form at least a portion of the three dimensional object. The energy source can supply energy at an energy per unit area S1 and the additional energy source can supply energy at a second energy per unit area S2, wherein S2 can be less than S1. S2 can be less than or equal to about 0.5 times S1. S2 can be less than or equal to about 0.2 times S1. S2 can be less than or equal to about 0.1 times S1. The system may further comprise a chamber containing the base. The chamber can be a vacuum chamber. The chamber can be at a pressure that is greater than about $10^{-6}$ Torr. The chamber may provide an inert gaseous environment. The gap can comprise a gas. The gap can be at an adjustable distance between the layer and the heat sink. The heat sink can be integrated with a leveling mechanism that provides and/or moves the material adjacent to the base or to a previously deposited layer of material. The heat sink can be integrated with a removing mechanism that removes and/or recycles the material adjacent to the base or to a previously deposited layer of powder material. The heat sink may facilitate the transfer of energy from the layer via convective heat transfer.

Transform can comprise fuse. Fuse can comprise melt, sinter or bind. Bind can comprise chemically bind. Chemically bind can comprise covalently bind. The energy source provides energy by an electromagnetic beam, laser beam, electron beam, plasma beam, or microwave beam.

In another aspect, an apparatus for forming a three-dimensional object comprises a controller that is programmed to: (a) supply a layer of powder material from a powder dispensing member to a powder bed operatively coupled to the material dispensing member; (b) direct an energy beam from an energy source to the powder bed to transform at least a portion of the powder material to a transformed material that subsequently hardens to yield the three-dimensional object that is suspended in the powder bed; and (c) direct a leveling member to level an exposed surface of the material bed such that the three-dimensional object suspended in the material bed is displaced by about 300 micrometers or less.

In another aspect, a method for generating a three-dimensional object suspended in a material bed, comprises (a) dispensing a material into an enclosure to provide the material bed; (b) generating the three-dimensional object from a portion of the material, wherein upon generation the three-dimensional object is suspended in the material bed; and (c) using a leveling member to level an exposed surface of the material bed such that the three-dimensional object suspended in the material bed is displaced by about 300 micrometers or less.

Generating can comprise additively generating. The material bed can be devoid of a supporting scaffold substantially enclosing the three-dimensional object. In operation (c), the three-dimensional object can be displaced by about 20 micrometers or less. The material may comprise a powder material. The material may comprise elemental metal, metal alloy, ceramic, or an allotrope of elemental carbon. The powder material can be devoid of at least two metals that are present at a ratio that forms a eutectic alloy. The powder material can comprise at most a metal that can be substantially of a single elemental metal composition. The powder material can comprise a metal alloy that can be of a single metal alloy composition. The three-dimensional object can be planar. The three-dimensional object can be a wire. The three-dimensional object can be devoid of auxiliary support features. The three-dimensional object can comprise auxiliary support features that are suspended in the powder bed.

In another aspect, a system for generating a three-dimensional object suspended in a material bed comprises: an enclosure that accommodates the powder bed; an energy source that provides an energy beam to the material in the material bed; a leveling member that levels an exposed surface of the material bed; and a controller operatively coupled to the energy source and the leveling member and programmed to (i) receive instructions to generate the three-dimensional object, (ii) generate the three-dimensional object from a portion of the material in accordance with the instructions, wherein upon generation the three-dimensional object is suspended in the material bed, and (iii) direct the leveling member to level the exposed surface of the material bed such that the three-dimensional object suspended in the material bed is displaced by about 300 micrometers or less.

Upon generation of the three-dimensional object, the material bed can be devoid of a supporting scaffold substantially enclosing the three-dimensional object. The material can comprise elemental metal, metal alloy, ceramic, or an allotrope of elemental carbon. The material can comprise a powder material. The system may further comprise a powder dispenser that provides the powder material into the enclosure. The leveling mechanism can be coupled to the powder dispenser. The powder dispenser can be disposed adjacent to the powder bed. The powder dispenser may comprise an exit opening that can be located at a different location than a bottom portion of the powder dispenser that faces the powder bed. The exit opening can be located at a side of the powder dispenser. The side can be a portion of the powder dispenser that does not face the powder bed or does not face a direction opposite to the powder bed. The exit opening can comprise a mesh. The controller can be operatively coupled to the powder dispenser and programmed to control an amount of the material that can be dispensed by the powder dispenser into the enclosure. The controller can be operatively coupled to the powder dispenser and programmed to control a position of the powder dispenser. The powder dispenser can be movable. The system may further comprise one or more mechanical members operatively coupled to the powder dispenser, wherein the one or more mechanical members subject the powder dispenser to vibration. The controller can be operatively coupled to the one or more mechanical members. The controller can be programmed to control the one or more mechanical members to regulate an amount of the powder material that is dispensed by the powder dispenser into the enclosure. The controller can be programmed to control a position of the leveling member, wherein the leveling member can be movable. The controller can be programmed to control a force or pressure exerted by the leveling member on the powder material. The system may further comprise a removal unit that removes excess material from the material bed. The removal unit can comprise a source of vacuum, magnetic force, electric force, or electrostatic force. The removal unit can comprise a reservoir for accommodating an excess of powder material. The removal unit can comprise one or more sources of negative pressure in communication (e.g., fluid communication) with the powder bed, which one or more sources of negative pressure are for removing an excess of powder material from the powder bed. The controller can be programmed to direct removal of an excess of powder material using the removal unit. The leveling member can comprise a knife. The system may further comprise a cooling member. The cooling member may be in proximity to the layer. The cooling member can be located between the energy source and the layer. The three dimensional object can be devoid of auxiliary supports. The cooling member can be movable to or from a position that can be between the energy source and the powder material. The cooling member may facilitate the cooling of the fused portion of the layer and/or facilitates the cooling of a remainder of the layer that did not transform to subsequently form at least a portion of the three dimensional object. The cooling member may facilitate the cooling of the portion and the remainder at substantially the same rate. The cooling member can be separated from the layer and/or from the base by a gap. The gap can comprise a gas. The gap has a cross-section that can be at most about 1 millimeter or less. The gap can be adjustable. The controller can be operatively coupled to the cooling member and can be able to adjust the gap distance from the material bed. The cooling member can be adapted to be positioned between the base and the energy source. The cooling member may track an energy that can be applied to the portion of the layer by the energy source. The controller can be operatively coupled to the cooling member and regulates the tracking of the cooling member. The cooling member can comprise at least one opening through which energy from the energy source can be directed to the portion of the layer. The cooling member can be substantially transparent. The cooling member can comprise one or more heat sinks. The energy source may direct energy to the portion of the layer through radiative heat transfer. The energy source can be a laser. The system may further comprise an additional energy source that provides energy to a remainder of the layer that did not fuse to subsequently form at least a part of the three dimensional object. The additional energy source can be a laser or an infrared (IR) radiation source. The energy source may provide energy via an electromagnetic beam, laser beam, electron beam, plasma beam, or microwave beam. The system may further comprise a chamber comprising a base above which the material bed can be disposed. The chamber can be a vacuum chamber. The chamber may provide an inert gaseous environment. The system may further comprise an optical system that direct energy from the energy source to a predetermined position of the layer. The optical system can comprise a mirror (e.g., deflection mirror or galvanometer mirror), a lens, a fiber, a beam guide, a rotating polygon or a prism. The controller can control the deflection and/or the modulation of the energy beam (e.g., electromagnetic beam). The controller can control the optical path (e.g., vector) travelled by the energy beam (e.g., by controlling the optical system). The controller can be programmed to control a trajectory of the energy source with the aid of the optical system. The processor can be in communication with a central processing unit that supplies instructions to the controller to generate the three dimensional object. The communication can be network communication. The central processing unit can be a remote computer. The remote computer system may provide instructions pertaining to a three dimensional model to the controller, and wherein the controller directs the energy source to supply energy based on the instructions pertaining to the three dimensional model. The design instructions may be provided using a file having a Standard Tessellation Language file format. The controller can be programed to optimize at least the amount, intensity or duration of energy supplied by the energy source. The controller can be programmed to optimize a trajectory or a path of energy supplied from the energy source to the at least a portion of the layer. The controller can be programmed to optimize the removal of energy from the at least a portion of the layer. The controller can be programmed to control a temperature profile of the base that can be separate from a temperature profile of the layer. The controller can be programmed to regulate the transformation of the portion of the layer without transforming a remainder of the layer.

In another aspect, an apparatus for generating a three-dimensional object comprises: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, (ii) has an exposed layer surface with a surface area of about one centimeter squared ($cm^2$) or more, and (iii) is devoid of an auxiliary support feature or auxiliary support feature mark that is indicative of a presence or removal of the auxiliary support feature, and wherein a given layer of the layered structure is devoid of at least two metals that form a eutectic alloy.

In another aspect, an apparatus for forming a three-dimensional object, comprises a controller that is programmed to: (a) supply a layer of powder material from a powder dispensing member to a powder bed operatively coupled to the powder dispensing member, wherein the powder material comprises elemental metal, metal alloy, ceramic or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, (ii) has an exposed layer surface with a surface area of about one centimeter squared ($cm^2$) or more, and (iii) is devoid of an auxiliary support feature or auxiliary support feature mark that is indicative of a presence or removal of the auxiliary support feature, and wherein a given layer of the layered structure is devoid of at least two metals that form a eutectic alloy.

In another aspect, an apparatus for generating a three-dimensional object, comprising: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, (ii) has an exposed layer surface with a surface area of about one centimeter squared ($cm^2$) or more, and (iii) is devoid of an auxiliary support feature or auxiliary support feature mark that is indicative of a presence or removal of the auxiliary support feature, and wherein a given layer of the layered structure is devoid of at least two metals that form a eutectic alloy.

In another aspect, a three-dimensional object formed by a three-dimensional printing process comprises a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, (ii) has an exposed layer surface with a surface area of about one centimeter squared ($cm^2$) or more, and (iii) is devoid of an auxiliary support feature or auxiliary support feature mark that is indicative of a presence or removal of the auxiliary support feature, and wherein a given layer of the layered structure is devoid of at least two metals that form a eutectic alloy.

The surface area can be about two centimeter squared ($cm^2$) or more.

The auxiliary support feature can comprise a linear structure. The auxiliary support feature can comprise a non-linear structure. The auxiliary support feature can comprise a ledge, column, fin, pin, blade, or scaffold. The auxiliary support feature can comprise a sintered powder scaffold. The sintered powder scaffold can be formed of the material. The auxiliary support feature mark can comprise a mark of a mold embedded on the three-dimensional object. The auxiliary support feature mark can comprise a geometric deformation of one or more of the successive solidified melt pools, which deformation can be complementary to the auxiliary support feature. A given layer of the layered structure can comprise a plurality of solidified material melt pools.

The three-dimensional object can be devoid of surface features that are indicative of the use of a trimming process during or after the formation of the three-dimensional object. The trimming process may be an operation conducted after the completion of the 3D printing process. The trimming process may be a separate operation from the 3D printing process. The trimming may comprise cutting (e.g., using a piercing saw). The trimming can comprise polishing or blasting. The blasting can comprise solid blasting, gas blasting or liquid blasting. The solid blasting can comprise sand blasting. The gas blasting can comprise air blasting. The liquid blasting can comprise water blasting. The blasting can comprise mechanical blasting. The layered structure can be a substantially repetitive layered structure. Each layer of the layered structure has an average layer thickness greater than or equal to about 5 micrometers ($\mu m$). Each layer of the layered structure has an average layer thickness less than or equal to about 1000 micrometers ($\mu m$). The layered structure can comprise individual layers of the successive solidified melt pools. A given one of the successive solidified melt pools can comprise a substantially repetitive material variation selected from the group consisting of variation in grain orientation, variation in material density, variation in the degree of compound segregation to grain boundaries, variation in the degree of element segregation to grain boundaries, variation in material phase, variation in metallurgical phase, variation in material porosity, variation in crystal phase, and variation in crystal structure. A given one of the successive solidified melt pools can comprise a crystal. The crystal can comprise a single crystal.

The layered structure can comprise one or more features indicative of solidification of melt pools during the three-dimensional printing process. The layered structure can comprise a feature indicative of the use of the three-dimensional printing process. The three-dimensional printing process can comprise selective laser melting (SLM), selective laser sintering (SLS), direct metal laser sintering (DMLS), or fused deposition modeling (FDM). The three-dimensional printing process can comprise selective laser melting. A fundamental length scale of the three-dimensional object can be at least about 120 micrometers.

The allotrope of elemental carbon can be selected from the group consisting of amorphous carbon, graphite, graphene, fullerene, and diamond. The fullerene can be selected from the group consisting of spherical, elliptical, linear, and tubular. The fullerene can be selected from the group consisting of buckyball and carbon nanotube. The material can comprise a reinforcing fiber. The reinforcing fiber can comprise carbon fiber, Kevlar®, Twaron®, ultra-high-molecular-weight polyethylene, or glass fiber.

In another aspect, an apparatus for generating a three-dimensional object, comprising: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of an auxiliary support feature or auxiliary support feature mark that is indicative of a presence or removal of the auxiliary support feature, (ii) is devoid of surface features indicative of layer removal during or after the three-dimensional printing process, and (iii) has an exposed layer surface with a surface area of at least about one centimeter squared ($cm^2$), and wherein each layer of the layered structure of the three-dimensional object comprises at most substantially a single elemental metal composition.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises elemental metal, metal alloy, ceramic or an allotrope of elemental carbon; and (b) direct an energy beam from an energy source to the powder bed to transform at least a portion of the powder material to a transformed material that subsequently hardens to yield the three-dimensional object that (i) is devoid of an auxiliary support feature or auxiliary support feature mark that is indicative of a presence or removal of the auxiliary support feature, (ii) is devoid of surface features indicative of layer removal during or after the three-dimensional printing process, and (iii) has an exposed layer surface with a surface area of at least about one centimeter squared ($cm^2$), and wherein each layer of the layered structure of the three-dimensional object comprises at most substantially a single elemental metal composition.

In another aspect, a three-dimensional object formed by a three-dimensional printing process comprises: a layered structure comprising successive solidified melt pools of a material that comprises an elemental metal, metal alloy, ceramic, or an allotrope of elemental carbon, wherein the three-dimensional object (i) is devoid of an auxiliary support feature or auxiliary support feature mark that is indicative of a presence or removal of the auxiliary support feature, (ii) is devoid of surface features indicative of layer removal during or after the three-dimensional printing process, and (iii) has an exposed layer surface with a surface area of at least about one centimeter squared ($cm^2$), and wherein each layer of the layered structure of the three-dimensional object comprises at most substantially a single elemental metal composition.

The surface area can be at least about two centimeter squared ($cm^2$). Each layer of the three-dimensional object can comprise at most a single metal alloy composition at a deviation of about 2% or less from a single metal alloy composition. Each layer of the three-dimensional object can comprise at most substantially a single metal alloy composition. Substantially can comprise a composition deviation of about 2% or less from a single metal alloy composition.

In another aspect, an apparatus for generating a three-dimensional object comprises: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, (ii) has an exposed layer surface with a surface area of at least about one centimeter squared ($cm^2$), and (iii) is devoid of an auxiliary support feature or auxiliary support feature mark that is indicative of a presence or removal of the auxiliary support feature, and wherein a given layer of the layered structure has a radius of curvature of at least about 50 centimeters as measured by optical microscopy.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises elemental metal, metal alloy, ceramic or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, (ii) has an exposed layer surface with a surface area of at least about one centimeter squared ($cm^2$), and (iii) is devoid of an auxiliary support feature or auxiliary support feature mark that is indicative of a presence or removal of the auxiliary support feature, and wherein a given layer of the layered structure has a radius of curvature of at least about 50 centimeters as measured by optical microscopy.

In another aspect, a three-dimensional object formed by a three-dimensional printing process comprises: a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, (ii) has an exposed layer surface with a surface area of at least about one centimeter squared ($cm^2$), and (iii) is devoid of an auxiliary support feature or auxiliary support feature mark that is indicative of a presence or removal of the auxiliary support feature, wherein a given layer of the layered structure has a radius of curvature of at least about 50 centimeters as measured by optical microscopy.

The given layer can be a first-generated layer. The radius of curvature can be at least about 100 centimeters (cm) as measured by optical microscopy. A plurality of layers of the layered structure have the radius of curvature of at least about 50 centimeters (cm) as measured by optical microscopy.

In another aspect, an apparatus for generating a three-dimensional object comprises: an enclosure that accommodates a powder bed comprising the powder material comprising a ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, and (ii) is devoid of one or more auxiliary support features or auxiliary support feature marks that are indicative of a presence or removal of the auxiliary support feature.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises ceramic or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, and (ii) is devoid of one or more auxiliary support features or auxiliary support feature marks that are indicative of a presence or removal of the auxiliary support feature.

In another aspect, a three-dimensional object formed by a three-dimensional printing process comprises a layered structure comprising successive solidified melt pools of a material that comprises a ceramic or an allotrope of elemental carbon, wherein the three-dimensional object (i) is devoid of surface features indicative of layer removal during or after the three-dimensional printing process, and (ii) is devoid of one or more auxiliary support features or auxiliary support feature marks that are indicative of a presence or removal of the auxiliary support feature.

In another aspect, an apparatus for generating a three-dimensional object comprises: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, and (ii) comprises two auxiliary support features or auxiliary support feature marks that is indicative of a presence or removal of the auxiliary support features; wherein the layered structure has a layering plane, wherein the two auxiliary support features or support marks are spaced apart by at least about 40.5 millimeters or more, and wherein the acute angle between the straight line connecting the two auxiliary support features or support marks and the direction of normal to the layering plane is from about 45 degrees to about 90 degrees.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, and (ii) comprises two auxiliary support features or auxiliary support feature marks that are indicative of a presence or removal of the auxiliary support features, wherein the layered structure has a layering plane, wherein the two auxiliary support features or support marks are spaced apart by at least about 40.5 millimeters or more; and wherein the acute angle between the straight line connecting the two auxiliary support features or support marks and the direction of normal to the layering plane is from about 45 degrees to about 90 degrees.

In another aspect, a three-dimensional object formed by a three-dimensional printing process comprises: a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, and (ii) comprises two auxiliary support features or auxiliary support feature marks that are indicative of a presence or removal of the auxiliary support features, wherein the layered structure has a layering plane, wherein the two auxiliary support features or support marks are spaced apart by at least about 40.5 millimeters or more, and wherein the acute angle between the straight line connecting the two auxiliary support features or support marks and the direction of normal to the layering plane is from about 45 degrees to about 90 degrees. Any two auxiliary support features or auxiliary support marks may be spaced apart by at least about 45 millimeters or more.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, and (ii) comprises an auxiliary support feature or auxiliary support feature mark that is indicative of a presence or removal of the auxiliary support feature, wherein the layered structure has a layering plane, wherein X is a point residing on the surface of the three dimensional object and Y is the closest auxiliary support feature or auxiliary support feature mark to X, wherein Y is spaced apart from X by at least about 10.5 millimeters or more; wherein the sphere of radius XY is devoid of auxiliary support feature or auxiliary support feature mark, and wherein the acute angle between the straight line XY and the direction of normal to the layering plane is from about 45 degrees to about 90 degrees.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, and (ii) comprises an auxiliary support feature or auxiliary support feature mark that is indicative of a presence or removal of the auxiliary support feature, wherein the layered structure has a layering plane, wherein X is a point residing on the surface of the three dimensional object and Y is the closest auxiliary support feature or auxiliary support feature mark to X, wherein Y is spaced apart from X by at least about 10.5 millimeters or more; wherein the sphere of radius XY is devoid of auxiliary support feature or auxiliary support feature mark that is indicative of a presence or removal of the auxiliary support feature, wherein the acute angle between the straight line XY and the direction of normal to the layering plane is from about 45 degrees to about 90 degrees.

In another aspect, a three-dimensional object formed by a three-dimensional printing process, comprises a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, and (ii) comprises an auxiliary support feature or auxiliary support feature mark that is indicative of a presence or removal of the auxiliary support feature, wherein the layered structure has a layering plane, wherein X is a point residing on the surface of the three dimensional object and Y is the closest auxiliary support feature or auxiliary support feature mark to X, wherein Y is spaced apart from X by at least about 10.5 millimeters or more; wherein the sphere of radius XY is devoid of auxiliary support feature or auxiliary support feature mark, wherein the acute angle between the straight line XY and the direction of normal to the layering plane is from about 45 degrees to about 90 degrees, and wherein the three dimensional object comprises elemental metal, metal alloy, ceramic or an allotrope of elemental carbon. X may be spaced apart from Y by at least about 10 millimeters or more.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object is devoid of surface features indicative of layer removal during or after the three-dimensional printing process, wherein N is a layering plane of the layered structure, wherein X and Y are points residing on the surface of the three dimensional object, wherein X is spaced apart from Y by at least about 10.5 millimeters or more, wherein the sphere of radius XY that is centered at X lacks auxiliary support feature or auxiliary support feature mark that is indicative of a presence or removal of the auxiliary support feature, and wherein the acute angle between the straight line XY and the direction of normal to N is from about 45 degrees to about 90 degrees.

In another aspect, an apparatus for forming a three-dimensional object comprises a controller that is programmed to: supply a layer of powder material from a powder dispensing member to a powder bed operatively coupled to the powder dispensing member, wherein the powder material comprises an elemental metal, metal alloy, ceramic, or an allotrope of elemental carbon; and direct an energy beam from an energy source to the powder bed to transform at least a portion of the powder material to a transformed material that subsequently hardens to yield the three-dimensional object that is devoid of surface features indicative of layer removal during or after the three-dimensional printing process, wherein N is a layering plane of the layered structure, wherein X and Y are points residing on the surface of the three dimensional object, wherein X is spaced apart from Y by at least about 10.5 millimeters or more, wherein the sphere of radius XY that is centered at X lacks auxiliary support feature or auxiliary support feature mark that is indicative of a presence or removal of the auxiliary support feature, and wherein the acute angle between the straight line XY and the direction of normal to N is from about 45 degrees to about 90 degrees.

In another aspect, a three-dimensional object formed by a three-dimensional printing process comprises a layered structure comprising successive solidified melt pools of a material that comprises an elemental metal, metal alloy, ceramic, or an allotrope of elemental carbon, wherein the three-dimensional object is devoid of surface features indicative of layer removal during or after the three-dimensional printing process, wherein N is a layering plane of the layered structure, wherein X and Y are points residing on the surface of the three dimensional object, wherein X is spaced apart from Y by at least about 10.5 millimeters or more, wherein the sphere of radius XY that is centered at X lacks auxiliary support feature or auxiliary support feature mark that is indicative of a presence or removal of the auxiliary support feature, and wherein the acute angle between the straight line XY and the direction of normal to N is from about 45 degrees to about 90 degrees. In some cases, B is spaced apart from C by at least about 10 millimeters or more.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein any two metals residing within the layer are incapable of forming a eutectic alloy.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein any two metals residing within the layer are incapable of forming a eutectic alloy.

In another aspect, a three-dimensional object formed by a three-dimensional printing process, comprising a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein any two metals residing within the layer are incapable of forming a eutectic alloy.

In another aspect, an apparatus for forming a three-dimensional object, comprising a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon; and (b) direct an energy beam from an energy source to the powder bed to transform at least a portion of the powder material to a transformed material that subsequently hardens to yield the three-dimensional object that (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein each layer of the three dimensional object comprises at most substantially a single elemental metal.

In another aspect, an apparatus for generating a three-dimensional object comprises: an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein each layer of the three dimensional object comprises at most substantially a single elemental metal.

In another aspect, a three-dimensional object formed by a three-dimensional printing process comprises a layered structure comprising successive solidified melt pools of a material that comprises an elemental metal, metal alloy, ceramic, or an allotrope of elemental carbon, wherein the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein each layer of the three dimensional object comprises at most substantially a single elemental metal.

The layered structure can comprise substantially repetitive layers. The layers can have an average layer size of at most about 500 μm or less. The layered structure can be indicative of layered deposition. The layered structure can be indicative of solidification of melt pools formed during a three dimensional printing process. The structure indicative of a three dimensional printing process can comprise substantially repetitive variation comprising: variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The layered structure can comprise substantially repetitive layers, wherein the layers have an average layer size of at least about 5 μm or more. The melt pools are indicative of a additive manufacturing process comprising selective laser melting (SLM), selective laser sintering (SLS), direct metal laser sintering (DMLS), or fused deposition modeling (FDM). The melt pools may be indicative of an additive manufacturing process comprising selective laser melting. The melt pools may comprise crystals. The melt pools may comprise single crystals.

In another aspect, an apparatus for forming a three-dimensional object comprises a controller that is programmed to supply a layer of powder material from a powder dispensing member to a powder bed operatively coupled to the powder dispensing member, wherein the powder material comprises an elemental metal, metal alloy, ceramic, or an allotrope of elemental carbon; and direct an energy beam from an energy source to the powder bed to transform at least a portion of the powder material to a transformed material that subsequently hardens into a hardened material to yield the three-dimensional object that is suspended in the powder bed, wherein at least one layer of the hardened material has a radius of curvature of at least about 50 centimeters as measured by optical microscopy, and wherein the powder bed is devoid of a supporting scaffold substantially enclosing the three-dimensional object.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form a hardened material that is at least a portion of a three-dimensional object, wherein upon formation the three-dimensional object is suspended in the powder bed, wherein at least one layer of hardened material has a radius of curvature of at least about 50 centimeters as measured by optical microscopy, and wherein the powder bed is devoid of a supporting scaffold substantially enclosing the three-dimensional object.

In another aspect, a method for generating a three-dimensional object suspended in a powder bed comprises: (a) providing the powder bed in an enclosure, wherein the powder bed comprises a powder material having an elemental metal, metal alloy, ceramic, or an allotrope of elemental carbon; (b) transforming at least a portion of the powder material into a transformed material; and (c) hardening the transformed material to form at least one layer of hardened material as part of the three-dimensional object, which three-dimensional object is suspended in the powder bed, wherein the at least one layer of hardened material has a radius of curvature of at least about 50 centimeters as measured by optical microscopy, and wherein the powder bed is devoid of a supporting scaffold substantially enclosing the three-dimensional object.

The supporting scaffold can be a sintered structure. The at least one layer of hardened material can have a radius of curvature of one meter or more. The layer of hardened material can be devoid of at least two metals that form a eutectic alloy. The layer of hardened material can comprise at most a metal that can be of a single elemental metal composition. The layer of hardened material can comprise a metal alloy that can be of a single metal alloy composition. The layer of hardened material can be of a single material composition. A fundamental length scale of the three-dimensional object can be about 120 micrometers or more. The three-dimensional object can be non-supported by one or more auxiliary support features in the powder bed. The three-dimensional object can be devoid of auxiliary support features. The three-dimensional object can comprise one or more auxiliary support features that are suspended in the powder bed. The transforming operation can be performed according to a model of the three-dimensional object, and wherein the three-dimensional object deviates from the model by at most about 50 micrometers. The transforming operation can comprise fusing individual particles of the powder material. Fusing can comprise sintering or melting the individual particles. The hardening can comprise solidifying the transformed material.

The powder material can comprise an elemental metal or metal alloy. The powder material can be provided adjacent to a base that can be positioned within the enclosure. In some embodiments, upon formation of the at least one layer of hardened material, the three-dimensional object is not in contact with the base.

In another aspect, a system for generating a three-dimensional object suspended in a powder bed comprises: an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform at least a portion of the powder material to a transformed material that hardens to form at least one layer of hardened material as part of the three-dimensional object, which three-dimensional object is suspended in the powder bed, wherein the at least one layer of hardened material has a radius of curvature of at least about 50 centimeters as measured by optical microscopy, and wherein upon formation of the at least one layer of hardened material, the powder bed is devoid of a supporting scaffold substantially enclosing the three-dimensional object.

The powder material can be disposed adjacent to a base that can be positioned within the enclosure. In some instances, upon the transformed material hardening into the three-dimensional object, the three-dimensional object is not in contact with the base. The three-dimensional object can be devoid of auxiliary support features. The supporting scaffold may extend over at least about one millimeter. The powder bed can be devoid of a supporting scaffold substantially enclosing the three-dimensional object The at least one layer of hardened material can be devoid of at least two metals that form a eutectic alloy. The energy beam can comprise an electromagnetic energy beam, a charged particle beam, or a non-charged particle beam. The energy beam can comprise an electromagnetic energy beam. The system may further comprise a heat sink for removing heat from the powder bed, and wherein the heat sink can be disposed within the enclosure. In some instances, upon formation of the at least one layer of hardened material, at least about 30 percent of the heat removal occurs from the top surface of the powder bed using the heat sink. In some instances, upon formation of the at least one layer of hardened material, at least about 20%, 25%, 30%, 35%, 40%, 45%. 50%, 55%, 60%, 65%, 70%, 75%, 80%, 85%, 90%, or 95% of the heat removal occurs from the top surface of the powder bed using the heat sink. The powder material can be disposed adjacent to the base, and wherein the heat sink does not contact a base that can be positioned within the enclosure. The heat sink can be disposed adjacent to an exposed surface of the powder bed. The heat sink can be disposed along a path of the energy beam that extends from the energy source to the powder bed. The heat sink can be separated from the powder bed by a gap. The at least a portion of the three dimensional object deviates from the model by at most the sum of 25 micrometers and $\frac{1}{1000}$ of a fundamental length scale of the three dimensional object. Hardening can comprise allowing the transformed material to solidify. The transforming operation can comprise selectively transforming the portion of the powder material by directing a beam of laser light at the portion of the powder material. The system may further comprise heating a portion of a remainder of the powder material that did not fuse to form at least a portion of the three dimensional object by directing energy to the portion of the remainder. The energy can be directed using a laser beam. The powder material can comprise individual particles of particles sizes that are less than or equal to about 500 nanometers (nm). Transforming can be conducted according to a predetermined pattern that corresponds to a model of the three dimensional object.

In another aspect, an apparatus for forming a three-dimensional object comprises a controller that is programmed to supply a layer of powder material from a powder dispensing member to a powder bed operatively coupled to the powder dispensing member, wherein the powder material comprises an elemental metal, metal alloy, ceramic, or an allotrope of elemental carbon; and direct an energy beam from an energy source to the powder bed to transform at least a portion of the powder material to a transformed material that subsequently hardens to yield the three-dimensional object that is devoid of the auxiliary support features, wherein the three-dimensional object has a radius of curvature of at least about 50 centimeters as measured by optical microscopy.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object is devoid of the auxiliary support features, wherein the three-dimensional object has a radius of curvature of at least about 50 centimeters as measured by optical microscopy.

In another aspect, a method for generating a three-dimensional object devoid of auxiliary support features comprises: (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form the three-dimensional object that is devoid of the auxiliary support features, wherein the three-dimensional object has a radius of curvature of at least about 50 centimeters as measured by optical microscopy.

The auxiliary support can comprise a supporting scaffold substantially enclosing the three-dimensional object. The supporting scaffold can comprise a sintered structure. The three-dimensional object has a radius of curvature of about one meter or more. The three-dimensional object can be devoid of at least two metals that form a eutectic alloy. The three-dimensional object can comprise a metal that can be at most of a single elemental metal composition. The three-dimensional object can comprise a metal alloy that can be of a single metal alloy composition. The three-dimensional object can be of a single material composition. A fundamental length scale of the three-dimensional object can be at least about 120 micrometers. The transforming can comprise fusing individual particles of the powder material. Fusing can comprise sintering or melting the individual particles. Hardening can comprise solidifying the transformed material. Transforming can comprise directing an energy beam at the portion of the powder material along a path that can be generated according to a model of the three-dimensional object. The powder material can be provided adjacent to a base within the enclosure, and wherein upon the transformed material hardening into the three-dimensional object, the three-dimensional object can be not in contact with the base.

In another aspect, a system for generating a three-dimensional object devoid of auxiliary support features comprises: an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate the three-dimensional object and (ii) direct the energy beam along a path in accordance with the instructions to transform a portion of the powder material to a transformed material that hardens to form the three-dimensional object that is devoid of the auxiliary support features, and wherein the three-dimensional object has a radius of curvature of at least about 50 centimeters as measured by optical microscopy.

The powder material can be disposed adjacent to a base within the enclosure, and wherein the three-dimensional object can be not in contact with the base. The auxiliary support can comprise a supporting scaffold that substantially encloses the three-dimensional object. The supporting scaffold can be a sintered structure. The three-dimensional object has a radius of curvature of about one meter or more. The three-dimensional object can be devoid of at least two metals that form a eutectic alloy. The path can be generated from a model of the three-dimensional object. The system may further comprise a heat sink for removing heat from the powder bed, and wherein the heat sink can be disposed within the enclosure. In some embodiments, upon the transformed material hardening into the three-dimensional object, at least about 30 percent of heat removal occurs from the top surface of the powder bed using the heat sink. The powder material can be disposed adjacent to a base, and wherein the heat sink does not contact the base. The heat sink can be disposed adjacent to an exposed surface of the powder bed. The heat sink can be disposed along a path of the energy beam that extends from the energy source to the powder bed. The heat sink can be separated from the powder bed by a gap.

In another aspect, a method for generating a three dimensional object comprises: (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form at least one layer of hardened material as part of the three-dimensional object, wherein the at least one layer of hardened material has a radius of curvature of at least about 50 centimeters as measured by optical microscopy, and wherein, with X and Y being points on a surface of the three-dimensional object, (i) the surface of the three-dimensional object along a sphere of radius XY is devoid of auxiliary support features, and (ii) an acute angle between a straight line XY and a direction normal to an average layering plane (N) of the at least one layer of hardened material is from about 45 degrees to 90 degrees when X and Y are spaced apart by at least about 2 millimeters.

The acute angle between the straight line XY and the direction normal to N of the at least one layer of hardened material can be from about 45 degrees to 90 degrees when X and Y are spaced apart by at least about 10.5 millimeters. The acute angle between the straight line XY and the direction normal to N of the at least one layer of hardened material can be from about 45 degrees to 90 degrees when X and Y are spaced apart by at least about 40.5 millimeters. The powder bed can be devoid of a supporting scaffold substantially enclosing the three-dimensional object. The supporting scaffold can comprise a sintered structure. The at least one layer of hardened material may have a radius of curvature of at least about one meter. The at least one layer of hardened material can be devoid of at least two metals that form a eutectic alloy. The at least one layer of hardened material can comprise at most a metal that can be of a single elemental metal composition. The at least one layer of hardened material can comprise a metal alloy that can be of a single metal alloy composition. The at least one layer of hardened material can be of a single material composition. The method may further comprise repeating (a) to (c). A fundamental length scale of the three dimensional object can be about 120 micrometers or more. The three dimensional object can be devoid of auxiliary support features. The three-dimensional object can comprise auxiliary support features that are suspended in the powder bed. The acute angle between the straight line XY and the direction of normal to N can be from about 60 degrees to about 90 degrees (e.g., when X and Y are spaced apart by at least about 2 millimeters). The transforming can comprise fusing individual particles of the powder material. Fusing can comprise sintering or melting the individual particles. Hardening can comprise solidifying the transformed material. Transforming the powder material can comprise directing an energy beam at the portion of the powder material along a path that can be generated according to a model of the three-dimensional object. Transforming can be conducted according to a model of the three-dimensional object, and wherein the three-dimensional object deviates from the model by about 50 micrometers or less. The powder material can be disposed adjacent to a base that can be positioned within the enclosure, and wherein upon formation of the at least one layer of a hardened material, the three-dimensional object can be not in contact with the base. The method may further comprise repeating operations (a) to (c), wherein a subsequent layer of powder material can be provided on a previously provided layer of powder material. The remainder of the powder material that did not transform to form at least a part of the three dimensional object, can be devoid of a continuous structure extending over about 0.5 millimeter or more. The method may further comprise separating the at least a portion of the three dimensional object from the remainder of the powder material that did not transform to form at least a part of the three dimensional object. The three dimensional object and the remainder may be removed from a base on which the powder material can be disposed within the enclosure. Operations (a)-(c) may be performed at a pressure of at least $10^{-6}$ Torr. Operations (a)-(c) may be performed at a pressure of at most $10^{-1}$ Torr or more. The powder material can be devoid of two or more metals at a ratio that can form a eutectic alloy. A remainder of the powder material that did not form the at least a part of the three dimensional object, can be devoid of a continuous structure extending over about 1 millimeter or more. A remainder of the powder material that did not form the at least a part of the three dimensional object, can be devoid of a scaffold enclosing the three dimensional object. The solidus temperature of the material can be less than or equal to about 400° C. The liquidus temperature of the material can be greater than or equal to about 300° C. In some examples, in operation (b) the powder material can be transforming excludes sintering.

In another aspect, a system for generating a three-dimensional object comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a path in accordance with the instructions to transform a portion of the powder material to a transformed material that hardens to form at least one layer of a hardened material as part of the three-dimensional object, wherein the at least one layer of hardened material has a radius of curvature of at least about 50 centimeters as measured by optical microscopy, and wherein, X and Y being points on a surface of the three-dimensional object, (i) the surface of the three-dimensional object along a sphere of radius XY is devoid of auxiliary support features, and (ii) an acute angle between a straight line XY and a direction normal to an average layering plane (N) of the at least one layer of hardened material is from about 45 degrees to 90 degrees when X and Y are spaced apart by about 2 millimeters or more.

In some embodiments, upon formation of the at least one layer of a hardened material, the three dimensional object can be suspended in the powder bed. In some embodiments, the powder material can be disposed adjacent to a base that can be positioned within the enclosure. In some embodiments, upon formation of the at least one layer of a hardened material, the three-dimensional object can be not in contact with the base. In some embodiments, upon formation of the at least one layer of hardened material, the powder bed can be devoid of a supporting scaffold substantially enclosing the three-dimensional object. The supporting scaffold can comprise a sintered structure. The at least one layer of hardened material has a radius of curvature of about one meter or more. The energy beam can comprise an electromagnetic beam, a charged electron beam, or a non-charged electron beam. The system may further comprise a heat sink for removing heat from the powder bed. The path can be generated from a model of the three-dimensional object.

In another aspect, a method for generating a three dimensional object comprises: (a) providing a powder bed in an enclosure, wherein the powder bed comprises a powder material having a ceramic, or an allotrope of elemental carbon; (b) transforming a portion of the powder material into a transformed material; and (c) hardening the transformed material to form at least one layer of hardened material as part of the three-dimensional object, wherein the three-dimensional object (i) is devoid of surface features indicative of layer removal during or after the three-dimensional printing process, and (ii) is devoid of one or more auxiliary support features or auxiliary support feature marks that are indicative of a presence or removal of the auxiliary support feature.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform a portion of the powder material to a transformed material that hardens to form at least one layer of a hardened material as part of the three-dimensional object, wherein the three-dimensional object (i) is devoid of surface features indicative of layer removal during or after the three-dimensional printing process, and (ii) is devoid of one or more auxiliary support features or auxiliary support feature marks that are indicative of a presence or removal of the auxiliary support feature.

In another aspect, a method for generating a three dimensional object comprises (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form at least one layer of hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, and (ii) comprises two auxiliary support features or auxiliary support feature marks that are indicative of a presence or removal of the auxiliary support features, wherein the layered structure has a layering plane, wherein the two auxiliary supports or auxiliary support marks are spaced apart by at least about 40.5 millimeters or more; and wherein the acute angle between the straight line connecting the two auxiliary supports or auxiliary support marks and the direction of normal to the layering plane is from about 45 degrees to about 90 degrees.

In another aspect, a system for generating a three-dimensional object comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform a portion of the powder material to a transformed material that hardens to form at least one layer of a hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, and (ii) comprises two auxiliary support features or auxiliary support feature marks that are indicative of a presence or removal of the auxiliary support features, wherein the layered structure has a layering plane, wherein the two auxiliary support features or the two auxiliary support marks are spaced apart by at least about 40.5 millimeters or more, and wherein the acute angle between the straight line connecting the two auxiliary support features or auxiliary support marks and the direction of normal to the layering plane is from about 45 degrees to about 90 degrees.

In another aspect, a method for generating a three dimensional object comprises (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form at least one layer of hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, and (ii) comprises an auxiliary support feature or an auxiliary support mark that is indicative of a presence or removal of the auxiliary support feature, wherein the layered structure has a layering plane, wherein X is a point residing on the surface of the three dimensional object and Y is the closest auxiliary support mark to X, wherein Y is spaced apart from X by at least about 10.5 millimeters or more; wherein the sphere of radius XY is devoid of the auxiliary support feature or auxiliary support mark, wherein the acute angle between the straight line XY and the direction of normal to the layering plane is from about 45 degrees to about 90 degrees, and wherein the three dimensional object comprises elemental metal, metal alloy, ceramic or an allotrope of elemental carbon.

In another aspect, a system for generating a three-dimensional object comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform a portion of the powder material to a transformed material that hardens to form at least one layer of a hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, and (ii) comprises an auxiliary support feature or auxiliary support mark that is indicative of a presence or removal of the auxiliary support feature, wherein the layered structure has a layering plane, wherein X is a point residing on the surface of the three dimensional object and Y is the closest auxiliary support mark to X, wherein Y is spaced apart from X by at least about 10.5 millimeters or more; wherein the sphere of radius XY is devoid of the auxiliary support feature or auxiliary support mark, wherein the acute angle between the straight line XY and the direction of normal to the layering plane is from about 45 degrees to about 90 degrees, and wherein the three dimensional object comprises elemental metal, metal alloy, ceramic or an allotrope of elemental carbon.

In another aspect, a method for generating a three dimensional object comprises (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form at least one layer of hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein any two metals residing within the layer are incapable of forming a eutectic alloy.

In another aspect, a system for generating a three-dimensional object comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform a portion of the powder material to a transformed material that hardens to form at least one layer of a hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, (ii) has an exposed layer surface with a surface area of at least about one centimeter squared ($cm^2$), and (iii) is devoid of one or more auxiliary support features or auxiliary support feature marks that are indicative of a presence or removal of the auxiliary support feature, and wherein any two metals residing within the layer are incapable of forming a eutectic alloy.

In another aspect, a method for generating a three dimensional object comprises (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form at least one layer of hardened material as part of the three-dimensional object, wherein the at least one layer of hardened material has a radius of curvature of at least about 50 centimeters as measured by optical microscopy, wherein the three-dimensional object (i) is devoid of surface features indicative of layer removal during or after the three-dimensional printing process, (ii) has an exposed layer surface with a surface area of at least about one centimeter squared (cm²), and (iii) is devoid of one or more auxiliary support features or auxiliary support feature marks that are indicative of a presence or removal of the auxiliary support feature, and wherein each layer of the three dimensional object comprises at most substantially a single elemental metal.

In another aspect, a system for generating a three-dimensional object comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate at least a portion of the three-dimensional object and (ii) direct the energy beam along a predetermined path in accordance with the instructions to transform a portion of the powder material to a transformed material that hardens to form at least one layer of a hardened material as part of the three-dimensional object, wherein the three-dimensional object (i) is devoid of surface features indicative of layer removal during or after the three-dimensional printing process, (ii) has an exposed layer surface with a surface area of at least about one centimeter squared (cm²), and (iii) is devoid of one or more auxiliary support features or auxiliary support feature marks that are indicative of a presence or removal of the auxiliary support feature, and wherein each layer of the three dimensional object comprises at most substantially a single elemental metal.

The at least one layer of hardened material may have a radius of curvature of at least about 50 centimeters as measured by optical microscopy. The at least one layer of hardened material may have a radius of curvature of at least about 50 centimeters as measured by optical microscopy.

In another aspect, a method for generating a three-dimensional object devoid of auxiliary support features comprises (a) providing a powder bed in an enclosure, wherein the powder bed comprises a powder material having an elemental metal, metal alloy, ceramic, or an allotrope of elemental carbon; (b) transforming a portion of the powder material into a transformed material; and (c) hardening the transformed material to form the three-dimensional object that is devoid of the auxiliary support features, wherein the three-dimensional object is devoid of at least two metals that form a eutectic alloy.

The solidified material can be formed within a deviation from the designed three dimensional structure of at most about the sum of 25 micrometers and one thousandths of a fundamental length scale of the three dimensional object. The solidified material can be formed within a deviation from the designed three dimensional structure of at most about the sum of 25 micrometers and ½₅₀₀ of a fundamental length scale of the three dimensional object. Operations (a)-(c) can be performed at a pressure that can be greater than about $10^{-6}$ Torr. Operations (a)-(c) can be performed at a pressure that can be greater than or equal to about $10^{-1}$ Torr. The methods disclosed herein may further comprise removing the solidified material from the powder material that did not fuse to form at least a part of the three dimensional object.

In another aspect, a system for generating a three-dimensional object devoid of auxiliary support features comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate the three-dimensional object and (ii) direct the energy beam along a path in accordance with the instructions to transform a portion of the powder material to a transformed material that hardens to form the three-dimensional object that is devoid of the auxiliary support features, and wherein the three-dimensional object is devoid of at least two metals that form a eutectic alloy.

The auxiliary support can comprise a scaffold enclosing the three-dimensional object. The three dimensional object can comprise a single elemental metal composition. The three dimensional object can be devoid of an elemental metal. The powder material can be devoid of more than one metal. The three dimensional object can be devoid of more than one metal. The powder material can be devoid of two or more metals at a ratio that form a eutectic alloy.

In another aspect, a method for generating a three-dimensional object devoid of auxiliary support features comprises (a) providing a powder bed in an enclosure, wherein the powder bed comprises a powder material having an elemental metal, metal alloy, ceramic, or an allotrope of elemental carbon; (b) heating a portion of the layer of the powder material to a temperature that is at least a melting temperature of the powder material to form a molten material, wherein during the heating, a portion of a remainder of the powder material that was not heated to at least a melting temperature, is at a temperature that is below a sintering temperature of the powder material; and (c) solidifying the molten material to form at least part of the three-dimensional object that is devoid of the auxiliary support features, wherein the three-dimensional object is devoid of at least two metals that form a eutectic alloy.

The powder material can be devoid of two or more metals that form a eutectic alloy. In some instances, a remainder of the powder material that did not fuse and solidify to form at least a part of the three dimensional object, can be devoid of a continuous structure extending over about 1 millimeter or more. In some instances, a remainder of the powder material that did not fuse and solidify to form at least a part of the three dimensional object, can be devoid of a scaffold that encloses the three dimensional structure. The method may further comprise providing an additional layer of powder material adjacent to the layer subsequent to (c). The method may further comprise repeating operations (a) to (c). The method may further comprise cooling the portion and the remainder of the powder material that did not melt and solidify to form at least a portion of the three dimensional object. The portion and the remainder may be cooled at substantially the same rate.

The melting temperature can be at least about 400° C. or more and the sintering temperature can be at most about 400° C. or less. The melting temperature can be at least about 400° C. or more and the sintering temperature can be at most about 300° C. or less. The method may further comprise separating the remainder of the layer that did not fuse and solidify to form at least a portion of the three dimensional object, from the portion. The method may further comprise delivering the three dimensional object to a customer. The method may further comprise packaging the three dimensional object.

In another aspect, a system for generating a three-dimensional object devoid of auxiliary support features comprises an enclosure that accommodates the powder bed, wherein the powder bed comprises a powder material having an elemental metal, metal alloy, ceramic, or an allotrope of elemental carbon; an energy source that provides an energy beam to the powder material in the powder bed; and a controller operatively coupled to the energy source and programmed to (i) receive instructions to generate the three-dimensional object and (ii) direct the energy beam along a path in accordance with the instructions to heat and melt a portion of the powder material to a molten material that solidifies into the three-dimensional object that is devoid of the auxiliary support features, wherein a portion of a remainder of the powder material that was not heated to at least a melting temperature, is at a temperature that is below a sintering temperature of the powder material, and wherein the three-dimensional object is devoid of at least two metals that form a eutectic alloy.

In another aspect, an apparatus for selectively fusing powder material comprises a controller configured to: (a) control the provision of a layer of the powder material to a part bed from a powder material deposition device, wherein the powder material comprises elemental metal, metal alloy, ceramic or elemental carbon; (b) control the provision of radiation to fuse at least a portion of the powder material of the layer; (c) control the provision of an additional layer of powder material overlying the prior layer of particulate material, including the previously fused portion of material from the particulate material deposition device; (d) control the provision of radiation to fuse a further portion of the material within the overlying further layer and to fuse said further portion with the previously fused portion of material in the prior layer; and (e) control the successive repeating of operations (c) and (d) to form a three dimensional object, wherein the three dimensional object is formed without auxiliary supports.

In another aspect, a method for generating a three dimensional object comprises (a) receiving a request for generation of a requested three dimensional object from a customer, wherein the requested three dimensional object comprises an elemental metal, metal alloy, ceramic, or an allotrope of elemental carbon; (b) additively generating a generated three dimensional object according to a model of the three dimensional object; and (c) delivering the generated three dimensional object to the customer, wherein operation (b)-(c) are performed without removal of auxiliary features, wherein the generated three dimensional object is substantially identical to the requested three dimensional object.

The generated three dimensional object may deviate from the requested three dimensional object by at most about the sum of 25 micrometers and $\frac{1}{1000}$ times the fundamental length scale of the requested three dimensional object. The generated three dimensional object may deviate from the requested three dimensional object by at most about the sum of 25 micrometers and $\frac{1}{2500}$ times the fundamental length scale of the requested three dimensional object.

In another aspect, an apparatus for forming a three-dimensional object comprises a controller that is programmed to: supply a layer of powder material from a powder dispensing member to a powder bed operatively coupled to the powder dispensing member, wherein the powder material comprises an elemental metal, metal alloy, ceramic, or an allotrope of elemental carbon; and direct an energy beam from an energy source to the powder bed to transform at least a portion of the powder material to a transformed material that subsequently hardens to yield the three-dimensional object that is delivered to a customer without removal of auxiliary features, wherein the generated three dimensional object is substantially identical to the three dimensional object requested by the customer.

In another aspect, an apparatus for generating a three-dimensional object comprises an enclosure that accommodates a powder bed comprising the powder material comprising an elemental metal, metal alloy, ceramic, or an allotrope of elemental carbon; and an energy source that provides an energy beam to the powder material in the powder bed to form at least a portion of a three-dimensional object, wherein upon formation the three-dimensional object is delivered to a customer without removal of auxiliary features, wherein the generated three dimensional object is substantially identical to the three dimensional object requested by the customer.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; and a controller operatively coupled to the energy source and programmed to (i) receive instructions to generate a desired three-dimensional object according to a customer request, and (ii) direct the energy beam along a predetermined path in accordance with the instructions to transform a portion of the powder material to a transformed material that hardens to form at least one layer of a hardened material as part of the generated three-dimensional object, wherein the generated three-dimensional object is delivered to the customer without removal of auxiliary features, wherein the generated three dimensional object is substantially identical to the requested three dimensional object.

In another aspect, a method for generating a three dimensional object comprises (a) receiving a request for generation of a requested three dimensional object from a customer, wherein the requested three dimensional object comprises an elemental metal, metal alloy, ceramic, or an allotrope of elemental carbon; (b) additively generating a generated three dimensional object according to a model of the requested three dimensional object; and (c) delivering the generated three dimensional object to the customer, wherein operation (b) is performed without usage of auxiliary features; wherein the remainder of the powder material that did not form the three dimensional object, is devoid of a scaffold structure that encloses the generated three dimensional objet, and wherein the generated three dimensional object is substantially identical to the requested three dimensional object.

The powder material can be devoid of two or more metals at a ratio that can form at least one eutectic alloy. The request can comprise the model of the three dimensional object. The method may further comprise generating the model of the three dimensional object. The model can be generated from a representative physical model of the three dimensional object. The method may further comprise receiving an item of value from the customer in exchange for the three dimensional object. The three dimensional object can be additively generated at with a deviation of at most about 50 micrometers from the model of the three dimensional object. The generated three dimensional object may deviate from the requested three dimensional object by at most about the sum of 25 micrometers and $\frac{1}{1000}$ times the fundamental length scale of the requested three dimensional object. The generated three dimensional object may deviate from the requested three dimensional object by at most about the sum of 25 micrometers and $\frac{1}{2500}$ times the fundamental length scale of the requested three dimensional object. Operations (a)-(c) may be performed in a time period that can be at most about 2 days or less. Operations (a)-(c) may be performed in a time period that can be at most about 1 days or less. Operations (a)-(c) may be performed in a time period that can be at most about six hours or less. The additively generating can comprise successively depositing and fusing the powder material. The design can be devoid of auxiliary features. The method may further comprise transforming the design into instructions usable by the processor to generate the three dimensional object. Operation (b) can be performed without iterative and/or corrective printing. The request can be received from the customer.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; and a controller operatively coupled to the energy source and programmed to (i) receive instructions to generate a desired three-dimensional object according to a customer request, and (ii) direct the energy beam along a predetermined path in accordance with the instructions to transform a portion of the powder material to a transformed material that hardens to form at least one layer of a hardened material as part of the generated three-dimensional object, is devoid of auxiliary features; wherein the remainder of the powder material that did not form the three dimensional object, is devoid of a scaffold structure that encloses the generated three dimensional objet, and wherein the generated three dimensional object is substantially identical to the requested three dimensional object.

In another aspect, a method for generating a three dimensional object comprises (a) receiving a request for generation of a three dimensional object from a customer, wherein the three dimensional object comprises an elemental metal, metal alloy, ceramic, or an allotrope of elemental carbon; (b) additively generating the three dimensional object according to a model of the three dimensional object; and (c) delivering the three dimensional object to the customer, wherein operations (a)-(c) are performed in a time period that is about 72 hours or less, and wherein the three dimensional object is additively generated at a deviation from the models of at most about the sum of 50 micrometers plus $\frac{1}{1000}$ times the fundamental length scale of the three dimensional object.

The request can be accompanied by the model of the three dimensional object. The method may further comprise generating the model of the three dimensional object. The three dimensional object can be additively generated by deviating from the model by at most about the sum of 25 micrometers plus $\frac{1}{1000}$ times the fundamental length scale of the three dimensional object. The three dimensional object can be additively generated by deviating from the model by at most about the sum of 25 micrometers plus $\frac{1}{2500}$ times the fundamental length scale of the three dimensional object. The three dimensional object can be additively generated by deviating from the model by at most about 50 micrometers. The three dimensional object can be additively generated by deviating from the model by at most about 25 micrometers. Operations (a)-(c) may be performed in a time period that can be at most about 48 hours or less. Operations (a)-(c) may be performed in a time period that can be at most about 24 hours or less. Operations (a)-(c) may be performed in a time period that can be at most about 12 hours or less. Operations (a)-(c) may be performed in a time period that can be at most about 6 hours or less. Operations (a)-(c) may be performed in a time period that can be at most about 1 hour or less. The additively generating can comprise successively depositing and fusing the powder. The method may further comprise transforming the design into instructions usable by the processor to additively generate the three dimensional object. The method may further comprise receiving an item of value from the customer in exchange for the three dimensional object. Operation (b) can be performed without iterative and/or corrective printing. The request can be received from the customer.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon, wherein the powder bed is disposed within an enclosure, wherein the pressure in the enclosure is greater than about $10^{-6}$ Torr; and (b) direct an energy beam from an energy source to the powder bed to transform at least a portion of the powder material to a transformed material that subsequently hardens to yield the three-dimensional object that is generated within a time period that is about 72 hours or less, wherein the three dimensional object is additively generated at a deviation from the models of at most about the sum of 50 micrometers plus $\frac{1}{1000}$ times the fundamental length scale of the three dimensional object.

In another aspect, an apparatus for generating a three-dimensional object comprises (a) an enclosure that accommodates a powder bed comprising the powder material comprising an elemental metal, metal alloy, ceramic, or an allotrope of elemental carbon, wherein the pressure in the enclosure is greater than about $10^{-6}$ Torr; and (b) an energy source that provides an energy beam to the powder material in the powder bed to form at least a portion of a three-dimensional object, wherein upon formation the three-dimensional object is generated within a time period that is about 72 hours or less, wherein the three dimensional object is additively generated at a deviation from the models of at most about the sum of 50 micrometers plus $\frac{1}{1000}$ times the fundamental length scale of the three dimensional object.

In another aspect, a system for generating a three-dimensional object comprises an enclosure that accommodates the powder bed, wherein the powder bed comprises a powder material having a ceramic, or an allotrope of elemental carbon, wherein the pressure in the enclosure is greater than about $10^{-6}$ Torr; an energy source that provides an energy beam to the powder material in the powder bed; and a controller operatively coupled to the energy source and programmed to (i) receive instructions to generate the three-dimensional object according to a customer request, and (ii) direct the energy beam along a predetermined path in accordance with the instructions to transform a portion of the powder material to a transformed material that hardens to form at least one layer of a hardened material as part of the three-dimensional object, wherein the three dimensional object is generated within a time period that is about 72 hours or less, wherein the three dimensional object is additively generated at a deviation from the models of at most about the sum of 50 micrometers plus $\frac{1}{1000}$ times the fundamental length scale of the three dimensional object.

In another aspect, a method for generating a three dimensional object comprises (a) receiving a request for generation of a three dimensional object from a customer, wherein the three dimensional object comprises an elemental metal, metal alloy, ceramic, or an allotrope of elemental carbon; (b)

additively generating the three dimensional object according to a model of the three dimensional object; and (c) delivering the three dimensional object to the customer, wherein operation (b) is performed in a time period that is about 12 hours or less from the receiving in operation (a), and wherein operation (b) is performed at a pressure that is greater than about $10^{-6}$ Torr.

The request can be accompanied by the model design of the three dimensional object. The method may further comprise generating the model design of the three dimensional object. The three dimensional object can be additively generated by deviating from the model by at most about 50 micrometers or less. The method may further comprise transforming the design into instructions usable by the processor to additively generate the three dimensional object. The method may further comprise receiving an item of value from the customer in exchange for the three dimensional object. Operation (b) can be performed in a time period that can be less than or equal to about 6 hours. Operation (b) can be performed in a time period that can be less than or equal to about 1 hour. The pressure can be at least about $10^{-3}$ Torr or more. The pressure can be at least about 1 Torr or more. The pressure can be at least about 750 Torr or more. Operation (b) can be performed without iterative and/or corrective printing. The request can be received from the customer.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; and a controller operatively coupled to the energy source and programmed to (i) receive instructions to generate the three-dimensional object according to a customer request, and (ii) within at most about 12 hours, direct the energy beam along a predetermined path in accordance with the instructions to transform a portion of the powder material to a transformed material that hardens to form at least one layer of a hardened material as part of the three-dimensional object.

In another aspect, a method for printing a three dimensional object comprises (a) receiving a request for generation of a three dimensional object from a customer, wherein the three dimensional object comprises an elemental metal, metal alloy, ceramic, or an allotrope of elemental carbon; (b) additively generating the three dimensional object according to a model of the requested three dimensional object; and (c) delivering the three dimensional object to the customer, wherein the three dimensional object is generated without at least one of iterative printing and corrective printing.

Operation (b) can be performed without iterative and without corrective printing. Operation (b) can be performed at a pressure that is at least about $10^{-6}$ Torr or more. The three dimensional object can be additively generated at a deviation from the model by at most about 50 micrometers or less. The method may further comprise transforming the design into instructions usable by the processor to additively generate the three dimensional object. The method may further comprise receiving an item of value from the customer in exchange for the three dimensional object. In some instances, in operation (b), the formation of the three dimensional object reaches completion without iterative and corrective printing. The request can be received from the customer.

In another aspect, an apparatus for forming a three-dimensional object comprises a controller that is programmed to: (a) supply a layer of powder material from a powder dispensing member to a powder bed operatively coupled to the powder dispensing member, wherein the powder material comprises an elemental metal, metal alloy, ceramic, or an allotrope of elemental carbon; and (b) direct an energy beam from an energy source to the powder bed to transform at least a portion of the powder material to a transformed material that subsequently hardens to yield the three-dimensional object that is generated without at least one of iterative printing and corrective printing.

In another aspect, an apparatus for generating a three-dimensional object comprises (a) an enclosure that accommodates a powder bed comprising the powder material comprising an elemental metal, metal alloy, ceramic, or an allotrope of elemental carbon; and (b) an energy source that provides an energy beam to the powder material in the powder bed to form at least a portion of a three-dimensional object, wherein upon formation the three-dimensional object is generated without at least one of iterative printing and corrective printing.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; and a controller operatively coupled to the energy source and programmed to (i) receive instructions to generate the three-dimensional object according to a customer request, and (ii), direct the energy beam along a predetermined path in accordance with the instructions to transform a portion of the powder material to a transformed material that hardens to form at least one layer of a hardened material as part of the three-dimensional object, wherein the three dimensional object is generated without at least one of iterative printing and corrective printing.

In another aspect, a method for generating a three dimensional object comprises (a) providing a layer of powder material comprising an elemental metal, metal alloy, ceramic, or an allotrope of elemental carbon; (b) transforming at least a portion of the powder material in the layer to form a transformed material; (c) hardening the transformed material to form a hardened material that is at least a portion of the three dimensional object; (d) optionally repeating operations (a)-(c); and (e) removing the generated three dimensional object from a remainder of the powder material that did not form the three dimensional object, in a time period of 30 minutes or less after a last hardening operation.

In some instances, during the method the three dimensional object can be devoid of one or more auxiliary features. The one or more auxiliary support feature can comprise a scaffold that encloses the three dimensional object. The powder material can be devoid of two or more metals that form a eutectic alloy. A remainder of the powder material that did not form the at least a part of the three dimensional object, can be devoid of a continuous structure extending over about 1 millimeter or more. A handling temperature of the three dimensional object can be at most about 100° C. or less. The handling temperature can be at most about 80° C. or less.

In another aspect, a system for generating a three-dimensional object comprises an enclosure that accommodates the powder bed, wherein the powder bed comprises a powder material having a ceramic, or an allotrope of elemental carbon; an energy source that provides an energy beam to the powder material in the powder bed; an object removal mechanism that removes the three dimensional object from a remainder of the powder material that did not form the three dimensional object; and a controller operatively coupled to the energy source and programmed to (i) receive instructions to generate the three-dimensional object according to a customer request, (ii) direct the energy beam along a predetermined path in accordance with the instructions to transform a portion of the powder material to a transformed material that hardens to form at least one layer of a hardened material as part of the three-dimensional object, and (iii) direct the object removal mechanism to remove the three dimensional object from the remainder within at most about 30 minutes from a generation of the three dimensional object.

The object removal system can comprise a blockable mesh. The object removal system can comprise a robotic arm. The object removal system can comprise a conveyor. The object removal system can comprise a revolving opening.

In another aspect, an apparatus for leveling a top surface of powder material of a powder bed comprises an enclosure that accommodates the powder bed comprising the powder material; an energy source that provides an energy beam to the powder material in the powder bed to form at least a portion of a three-dimensional object, wherein upon formation, the at least the portion of the three-dimensional object is suspended in the powder bed; and a powder leveling member for leveling an the top surface of the powder bed, wherein the leveling member is disposed above the powder bed, wherein during use, the powder leveling member displaces at least a portion of the three dimensional object by less than or equal to 300 micrometers.

In another aspect, a method for generating a three-dimensional object suspended in a powder bed comprises (a) dispensing powder material into an enclosure to provide the powder bed, wherein the powder material comprises an elemental metal, metal alloy, ceramic, or an allotrope of elemental carbon; (b) generating the three-dimensional object from a portion of the powder material, wherein upon generation the three-dimensional object is suspended in the powder bed; and (c) using a leveling member to level an exposed surface of the powder bed such that the three-dimensional object suspended in the powder bed is displaced by about 300 micrometers or less.

The generating can comprise additively generating. The powder bed can be devoid of a supporting scaffold substantially enclosing the three-dimensional object. In some embodiments, in (c), the three-dimensional object can be displaced by about 20 micrometers or less. The powder material can be devoid of at least two metals that are present at a ratio that forms a eutectic alloy. The powder material can comprise at most a metal that can be substantially of a single elemental metal composition. The powder material can comprise a metal alloy that can be of a single metal alloy composition. The three-dimensional object can be planar. The three-dimensional object can be a wire. The three-dimensional object can be devoid of auxiliary support features. The three-dimensional object can comprise auxiliary support features that are suspended in the powder bed. The transforming can be conducted according to a model that can be representative of the three dimensional object. The leveling mechanism can comprise a roller. The leveling mechanism can comprise a rake. The leveling mechanism can be synchronized with a powder dispenser. The powder dispenser can comprise an air knife. The powder dispenser can comprise a curved tube with an opening through which the powder can be released. The powder dispenser can comprise an auger screw. The rake has a plurality of blades with varying height. The rake has a plurality of blades with varying angle of contact on the additional layer of powder material. In some instances, at least a fraction of the powder in the powder layer can be removed from the substrate prior to (b). At times, at least a fraction of the powder in the powder layer can be collected by a powder recycling system. The fraction of the powder collected by the powder recycling system can be re-circulated, and at least a fraction of the powder collected by the powder recycling system can be dispensed in operation (c). The leveling mechanism can comprise a plurality of needles distributed across the axis of the leveling mechanism. The needles can be arranged on the leveling mechanism such that each needle in the plurality of needles contacts a different location of the powder. The plurality of needles can level a powder dispensed from a top-dispense powder dispenser. The leveling mechanism can further comprise a roller adjacent to the plurality of needles. The needles can be distributed across the axis of the leveling mechanism. The leveling mechanism can comprise a blade. The leveling mechanism can comprise a powder level sensor configured to determine a powder level located ahead of the leveling mechanism. The powder level sensor can be an optical sensor. The powder level sensor can be in communication with a powder dispensing system configured to dispense powder when the powder level sensor detects a powder level below a predetermined threshold. The rake can comprise a set of blades each of which can be diagonal with respect to a surface of the powder layer or of the additional layer. Dispensing of powder from the auger screw can be controlled by a valve. The rake can comprise a smooth blade. The roller may flatten powder dispensed from a powder dispenser. The powder dispenser can comprise a top-dispense powder dispenser. A surface of the roller has a static friction coefficient of at least about 0.5 or more. The roller may comprise an active rotation mechanism configured to force rotation of the roller in a clockwise direction. The roller may comprise an active rotation mechanism configured to force rotation of the roller in a counterclockwise direction. The roller may comprise an eccentric shape such that during rotation it allows for multi-height planarization. The blade may level the powder dispensed from a top-dispense powder dispenser. The top-dispense mechanism can comprise of a vibrating mesh through which the powder is released to the powder bed. The vibration can be driven by an ultrasonic transducer. The vibration can be driven by a piezo-electric device. The vibration can be driven by a rotating motor with an eccentric cam.

In another aspect, a system for generating a three-dimensional object suspended in a powder bed comprises an enclosure that accommodates the powder bed, wherein the powder bed comprises powder material having an elemental metal, metal alloy, ceramic, or an allotrope of elemental carbon; a leveling member that levels an exposed surface of the powder bed; and a controller operatively coupled to the energy source and the leveling member and programmed to (i) receive instructions to generate the three-dimensional object, (ii) generate the three-dimensional object from a portion of the powder material in accordance with the instructions, wherein upon generation the three-dimensional object is suspended in the powder bed, and (iii) direct the leveling member to level the exposed surface of the powder bed such that the three-dimensional object suspended in the powder bed is displaced by about 300 micrometers or less.

In some embodiments, upon generation of the three-dimensional object, the powder bed can be devoid of a supporting scaffold substantially enclosing the three-dimensional object. The system may further comprise a powder dispenser that provides the powder material into the enclosure. The leveling mechanism can be coupled to the powder dispenser. The powder dispenser can be disposed adjacent to the powder bed, and wherein the powder dispenser has an exit opening that can be located at a different location than a bottom portion of the powder dispenser that faces the powder bed. The exit opening can be located at a side of the powder dispenser. The side can be a portion of the powder dispenser that does not face the powder bed or does not face a direction opposite to the powder bed. The exit opening can comprise a mesh. The controller can be operatively coupled to the powder dispenser and programmed to control an amount of the powder material that can be dispensed by the powder dispenser into the enclosure. The controller can be operatively coupled to the powder dispenser and programmed to control a position of the powder dispenser. The powder dispenser can be movable. The system may further comprise one or more mechanical members operatively coupled to the powder dispenser, wherein the one or more mechanical members subject the powder dispenser to vibration. The controller can be operatively coupled to the one or more mechanical members. The controller can be programmed to control the one or more mechanical members to regulate an amount of the powder material that can be dispensed by the powder dispenser into the enclosure. The controller can be programmed to control a position of the leveling member, wherein the leveling member can be movable. The controller can be programmed to control a force or pressure exerted by the leveling member on the powder material. The leveling member can comprise a removal unit that removes excess powder material from the powder bed. The removal unit may comprise a source of vacuum, magnetic force, electric force, or electrostatic force. The removal unit can comprise a reservoir for accommodating an excess of powder material. The removal unit can comprise one or more sources of negative pressure for removing an excess of powder material from the powder bed. The controller can be programmed to direct removal of an excess of powder material using the removal unit. The leveling member can comprise a knife.

In another aspect, an apparatus for removing a generating a three-dimensional object comprises (a) an enclosure that accommodates a powder bed comprising powder material having elemental metal, metal alloy, ceramics, or an allotrope of elemental carbon, wherein during use, at least a portion of the powder material is transformed in to a transformed material that subsequently hardens to form the three-dimensional object; and (b) a base that is situated within the enclosure, wherein during use the powder material is situated adjacent to the base, and wherein the base comprises a mesh that is operable in at least blocked and unblocked positions such that (i) when blocked, the mesh does not permit either the powder material or the three-dimensional object to pass through the mesh, and (ii) when unblocked, the mesh permits at least part of the powder material to pass through the mesh and prevents the three-dimensional object from passing through the mesh.

In another aspect, an apparatus for generating a three dimensional object comprises an enclosure containing a powder material comprising elemental metal, metal alloy, ceramics, or an allotrope of elemental carbon; and a base disposed within the enclosure; wherein the powder material is disposed adjacent to the base, wherein the base comprises a blockable mesh that when unblocked, the mesh is of a type that both permits at least part of the powder material to flow through, and prevents the three dimensional object from flowing through. In some embodiments, unblocked can comprise altering the position (e.g., vertical or horizontal position) of the base. In some embodiments, unblocked does not comprise altering the position of the base.

In another aspect, a system for generating a three-dimensional object comprises an enclosure that accommodates a powder bed, wherein the powder bed comprises a powder material comprising an elemental metal, metal alloy, ceramic, or an allotrope of elemental carbon; an energy source that provides an energy beam to the powder material in the powder bed; a base disposed adjacent to the powder bed, wherein the base comprises a blockable mesh that is alternately blocked or unblocked, wherein (i) when the blockable mesh is blocked, the powder material does not flow through the mesh, and (ii) when the blockable mesh is unblocked, at least part of the powder material flows through the mesh while the three-dimensional object is prevented from flowing through the mesh; and a controller operatively coupled to the energy source and programmed to (i) receive instructions to generate at least a portion of the three-dimensional object, (ii) direct the energy beam along a path in accordance with the instructions to transform a portion of the powder material to a transformed material that hardens to form at least one layer of a hardened material as part of the three-dimensional object, and (iii) directs the mesh blocking device to unblock the mesh. The blockable mesh can be unblocked by altering a position of the blockable mesh or a mesh blocking device adjacent to the blockable mesh. The mesh blocking device can be a movable plane that alternates between a vertical or horizontal position that blocks the blockable mesh and another vertical or horizontal position that unblocks the blockable mesh. The base can alternate between a vertical or horizontal position that blocks the blockable mesh and another vertical or horizontal position that unblocks the blockable mesh.

In another aspect, a method for generating a three dimensional object comprises (a) dispensing a layer of powder material adjacent to a base, wherein the base comprises a mesh that permits at least a portion of the powder to flow through when the mesh is unblocked; (b) transforming a portion of the powder material to a transformed material; (c) hardening the transformed material to provide a hardened material that is at least a portion of the three-dimensional object; and (d) unblocking the mesh to retrieve the hardened material from a remainder of the powder material that does not form the at least the portion of the three-dimensional object.

Upon retrieving the hardened material, the hardened material may rest on a substrate that is disposed below the base. Upon retrieving the hardened material, the remainder may be removed from the hardened material. The unblocking may comprise moving the mesh relative to the powder material. The unblocking may comprise moving the mesh relative to the base. A surface of the mesh may be moved relative to the powder material by pulling on one or more posts connected to the surface. The one or more posts may be removable from an edge of the base by a threaded connection. In some embodiments, the hardening comprises directing cooling gas to the transformed material to cool the transformed material and yield the hardened material.

In another aspect, a method for generating a three-dimensional object suspended in a powder bed comprises (a) dispensing powder material into an enclosure to provide a powder bed, wherein the powder bed comprises a top surface; (b) generating the three-dimensional object from a portion of the powder material by transforming the powder material into a transformed material that subsequently forms a hardened material, wherein the hardened material protrudes from the top surface of the powder bed, wherein the hardened material is movable within the powder bed; and (c) adding a layer of powder material on the top surface of the powder bed, wherein the adding displaces the hardened material by about 300 micrometers or less, wherein the top surface of the layer of powder material is substantially planar.

In another aspect, a method for generating a three dimensional object from a powder material comprises (a) dispensing powder material into an enclosure to provide a powder bed, wherein the powder bed comprises a top surface; (b) using an energy beam from an energy source, transforming the powder material into a transformed material that subsequently forms a hardened material, wherein the hardened material protrudes from the top surface of the powder bed, and wherein the hardened material is movable within the powder bed; and (c) dispensing a layer of powder material on the top surface of the powder bed such that the hardened material is displaced by about 300 micrometers or less, wherein upon dispensing the layer of powder material, the top surface of the powder bed is substantially planar.

The hardened material can be at least a portion of the three-dimensional object. The at least the portion of the three-dimensional object can comprise warping, buckling, bulging, curling, bending, rolling, or balling. The dispensing in (c) can further comprise using a powder dispensing member to deposit the layer of powder material on the top surface of the powder bed. The dispensing in (c) can further comprise using a powder leveling member to level the top surface of powder bed by shearing an excess of the powder material. The dispensing in (c) can further comprise using a powder removal member to remove an excess of powder material without contacting the layer of powder material. The three-dimensional object can be suspended in the powder bed. The three-dimensional object can be devoid of auxiliary support features. The auxiliary support features comprise a scaffold that substantially encloses the three-dimensional object. The three-dimensional object can comprise auxiliary support features that are suspended in the powder bed. The powder material can be devoid of at least two metals that are present at a ratio that forms a eutectic alloy. The leveling can be conducted after the powder dispensing mechanism completed dispensing a row of powder material in the enclosure. The leveling can be conducted after the powder dispensing mechanism completed dispensing a portion of a layer of powder material in the enclosure. The leveling can be conducted after the powder dispensing mechanism completed dispensing a layer of powder material in the enclosure. The powder dispensing mechanism can span at least part of the enclosure length. The powder dispensing mechanism can span an entire length of the enclosure. The powder dispensing mechanism can span at least part of the enclosure width. The powder dispensing mechanism can span an entire width of the enclosure. The powder dispensing mechanism can comprise a mesh through which the powder material can be able to dispense out of the dispensing mechanism. The powder dispensing mechanism can comprise a position of the mesh that prevents the powder material held within the powder dispensing mechanism to be dispensed out of the powder dispensing mechanism through the mesh. The powder dispensing mechanism can comprise a position of the mesh that allows the powder material held within the powder dispensing mechanism to be dispensed from the powder dispensing mechanism through the mesh. The position of the mesh may determine the amount of powder material dispensed from the powder dispensing mechanism through the mesh. The powder dispensing mechanism can comprise a first position of the mesh that prevents the powder material held within the powder dispensing mechanism to be dispensed out of the powder dispensing mechanism through the mesh, and a second position of the mesh that allows the powder material held within the powder dispensing mechanism to be dispensed from the powder dispensing mechanism through the mesh. The rate at which the powder dispensing mechanism alternates between the first and second position may alter at least one dispensing parameter of the powder material. The dispensing parameter can comprise homogeneity of powder distribution in the enclosure. The dispensing parameter can comprise amount of powder dispensed from the mesh. The rate at which the amount of time the mesh can be at in a first or in a second position may determine the amount of powder material dispensed from the powder dispensing mechanism. The rate at which the mesh alternates between the first and the second position may determine the area covered by the powder material dispensed from the powder dispensing mechanism in the enclosure. The powder dispensing mechanism can further comprise a control mechanism coupled to the powder dispensing mechanism. The control mechanism may regulate the amount of powder dispensed. The control mechanism may control the position of the powder dispensing mechanism. The control can be automatic or manual. The control mechanism may control the position of the mesh. The control mechanism can comprise a sensor sensing the amount of powder material dispensed by the dispensing mechanism. The control mechanism can comprise a sensor sensing the amount of powder material accumulated in the enclosure. The control mechanism can comprise a sensor sensing the amount of powder material accumulated in a position in the enclosure. The leveling can be conducted by a leveling mechanism. The leveling mechanism can comprise a leveling aid comprising a rolling cylinder, a rake, a brush, a knife, or a spatula. The movement of the leveling aid can comprise forward movement, backward movement, sideward movement or movement at an angle. The movement of the leveling aid can comprise a lateral movement. The leveling mechanism can span at least part of the enclosure length. The leveling mechanism can span an entire length of the enclosure. The leveling mechanism can span at least part of the enclosure width. The leveling mechanism can span an entire width of the enclosure. The leveling mechanism can further comprise a control mechanism coupled to the leveling aid. The control mechanism can comprise a sensor sensing the level of the powder material in the enclosure. The leveling aid can comprise a rolling cylinder. The rolling cylinder may rotate clockwise or anti clockwise in a position perpendicular to the long axis of the cylinder. The rolling cylinder may rotate with the direction of lateral movement of the leveling aid or opposite to the lateral movement of the leveling aid. The dispensing can comprise vibrating at least part of the powder material in the powder dispensing mechanism. The dispensing can comprise vibrating at least part of an opening through which the powder material exits the powder dispensing mechanism. The leveling may displace an object within or under the deposited layer of powder material by at most 20 micrometers. The displacement can be a horizontal displacement. Leveling may comprise utilizing a blade. The leveling mechanism may level the layer of powder material while moving in a first direction. Leveling can comprise moving the blade in the first direction. Leveling can comprise moving the blade in a direction opposite to the first direction.

In another aspect, a system for generating a three dimensional object comprises an enclosure that accommodates a powder bed comprising powder material, wherein the powder bed comprises a top surface; an energy source that provides an energy beam to the powder material in the powder bed; a layer dispensing mechanism that provides the powder material in the enclosure or on the top surface of the powder bed; and a controller operatively coupled to the energy source and the layer dispensing mechanism and programmed to (i) receive instructions to generate the three-dimensional object, (ii) in accordance with the instructions, use the energy beam to transform the powder material into a transformed material that subsequently forms a hardened material, wherein the hardened material protrudes from the top surface of the powder bed, and wherein the hardened material is movable within the powder bed, and (iii) direct the layer dispensing mechanism to dispense a layer of powder material on the top surface of the powder bed such that the hardened material is displaced by about 300 micrometers or less, wherein the top surface of the dispensed layer of powder material is substantially planar.

The hardened material can be at least a portion of the three-dimensional object. The layer dispensing mechanism can comprise a powder dispensing member that provides the powder material. The controller can be operatively coupled to the powder dispensing member and programmed to direct the powder dispensing member to dispense the layer of powder material on the top surface of the powder bed on in the enclosure. The layer dispensing mechanism can comprise a powder leveling member that levels the top surface of the powder bed without contacting the top surface of the powder bed. The controller can be operatively coupled to the powder leveling member and programmed to direct the powder leveling member to level the top surface of the powder bed. The powder leveling member may shear an excess of the powder material from the top surface of the powder bed. The powder leveling member may level the top surface of the powder bed without displacing the excess of powder material to another position in the powder bed. The powder leveling member can comprise a knife that shears an excess of powder material. The layer dispensing mechanism can comprise a powder removal member that removes an excess of powder material from the top surface of the powder bed without contacting the top surface of the powder bed. The controller can be operatively coupled to the powder removal member and programmed to direct the powder removal member to remove the excess of powder material from the top surface. The powder removal member can comprise a source of vacuum, a magnetic force generator, an electrostatic force generator, an electric force generator, or a physical force generator. The powder leveling member can be coupled to the powder removal member. The powder removal member can be coupled to a powder dispensing member. The excess of powder material can be reusable by the powder dispensing member. The powder dispensing member can be disposed adjacent to the powder bed. The powder dispensing member can comprise an exit opening that can be located at a location that can be different from the bottom of the powder dispensing member that faces the top surface of the powder bed. The exit opening can be located at a side portion of the powder dispensing mechanism. The side can be a portion of the powder dispensing mechanism may be one that either does not face the top surface of the powder bed, or does not face a direction opposite to the top surface of the powder bed. The controller may regulate an amount of the powder material that can be dispensed by the powder dispensing member. The system may further comprise one or more mechanical members operatively coupled to the powder dispensing member. The one or more mechanical members may subject the powder dispensing member to vibration. The controller can be operatively coupled to the one or more mechanical members. The controller can be programmed to control the one or more mechanical members to regulate an amount of the powder material that can be dispensed by the powder dispensing member into the enclosure. The powder dispensing member can be located adjacent to the top surface of the powder bed and can be separated from the top surface of the powder bed by a gap. The powder dispensing member can comprise a gas-flow. The powder dispensing member can comprise an airflow. The powder dispensing member can comprise a vibrator. The controller can be operatively coupled to the vibrator and regulate the vibrator. The controller may regulate the vibration amplitude of the vibrator. The controller may regulate the vibration frequency of the vibrator. The controller may regulate the amount of material released by the powder dispensing member. The controller may regulate the rate of powder dispensed by the powder dispensing member. The controller may regulate the velocity of powder dispensed by the powder dispensing member. The controller may regulate the position of the powder dispensing member. The position can be a vertical position. The position can be a horizontal position. The controller may regulate the position of the layer dispensing mechanism. The position can be a vertical position. The position can be a horizontal position. The controller may regulate the height of the powder layer formed by the layer dispensing mechanism. The leveling member can further comprise a blade. The controller can be operatively coupled to the blade and may regulate the rate of movement of the blade. The controller can be operatively coupled to the blade and may regulate the position of the blade. The position can be a vertical position. The position can be a horizontal position.

In another aspect, an apparatus for leveling a top surface of powder material of a powder bed comprises an enclosure that accommodates the powder bed comprising the powder material; an energy source that provides an energy beam to the powder material in the powder bed to form at least a portion of a three-dimensional object that is movable in the powder bed; and a layer dispensing mechanism for dispensing a layer of powder material that is substantially planar, wherein during use, the layer dispensing mechanism displaces at least a portion of the three dimensional object by less than or equal to 300 micrometers.

In another aspect, an apparatus for leveling a powder material for the formation of a three dimensional object comprises (a) a powder leveling member that shears an excess of powder material in a powder bed in which the three-dimensional object is generated; and (b) a powder removing member that removes the excess of powder material, wherein the powder removing member is coupled to the powder leveling member; wherein the leveling mechanism is able to displace the three-dimensional object by at most 300 micrometers.

The three dimensional object can be suspended in the powder material. The powder material can be devoid of a continuous structure extending over about 1 millimeter or more. The powder material can be devoid of a scaffold enclosing the three dimensional object. The powder material can be devoid of two or more metals at a ratio that can form at least one eutectic alloy. The leveling mechanism can be able to displace an object that can be suspended in the powder material by at most 20 micrometers. The apparatus may further comprise a moving member (e.g., a displacing member) coupled to at least one of the powder leveling member and the powder removing member. The translation member may translate the powder dispenser along a horizontal path that can comprise at least a portion of the horizontal cross-section of the powder bed. The leveling mechanism can be connected to a powder dispensing member that dispenses the powder material into an enclosure. The three dimensional object can be devoid of auxiliary supports. The object can comprise auxiliary supports.

In another aspect, an apparatus for dispensing a powder material for the formation of a three dimensional object comprises (a) a powder reservoir that accommodates a powder material; (b) an exit opening through which the powder material can exit the apparatus to the powder bed, wherein the apparatus facilitates a free fall of the powder material using gravitational force, wherein the apparatus is suspended above the powder bed and is separated from the exposed surface of the powder bed by a gap, wherein the exit opening is situated on a face of the apparatus that is different from a bottom of the apparatus; (c) a translation member coupled to the reservoir, wherein the translation member translated the powder dispenser along a horizontal and/or vertical path, wherein the horizontal path comprises a path within a horizontal cross section of the powder bed, wherein the vertical path comprises a path within the gap; and (d) an obstruction situated within the exit opening, wherein the obstruction regulates the amount of powder dispensed though the exit opening.

The exit opening can be situated on a side of the apparatus. The apparatus can be of a shape other than a sphere. The shape of the apparatus can be other than an ellipsoid. The bottom of the apparatus can comprise a first slanted bottom plane of the apparatus that faces the substrate. The first slanted bottom plane forms a first acute angle with a plane parallel to the average surface of the substrate, in a first direction. In some embodiments, any additional slanted bottom plane of the apparatus may form a second acute angle with a plane parallel to the average surface of the substrate, in the first direction. The first slanted bottom plane may form a first acute angle with a plane parallel to the average surface of the substrate, in a first direction. In some embodiments, any optional additional slanted bottom plane of the apparatus forms a second acute angle with a plane parallel to the average surface of the substrate, in a direction opposite to first direction. The additional slanted bottom plane can be separated from the exit opening by a gap. The gap can be a vertical gap. The gap can be a horizontal gap. The gap can be both a vertical and a horizontal gap. The obstruction can comprise a mesh. The mesh can comprise a hole that allows the powder material within the apparatus to exit the apparatus. The hole in the mesh may have a fundamental length scale from at least about fifty (50) micrometers to at most about one (1) millimeters. The powder material can comprise particles of average fundamental length scale from at least about 25 micrometers to at most about 45 micrometers. The obstruction can comprise a blade. The obstruction can comprise both a blade and a mesh. The blade can be a doctor blade. The apparatus can comprise a vibrator. The apparatus can comprise an array of vibrators. The array of vibrators may be arranged in a linear pattern. The array of vibrators may be arranged along a line. The array of vibrators may be arranged along the opening. The vibrator can comprise a motor. The powder material may exit the apparatus on operation of the vibrator. The vibrator may generate vibrations with a frequency of at least about 200 Hertz. The vibrator may generate vibrations with an amplitude of at least about 7 times the gravitational force (G). The apparatus may be able to travel in a horizontal direction from one side of the powder bed to the other side of the powder bed. The apparatus can further comprise a leveling member. The apparatus can be connected to the leveling member. The leveling member can comprise a blade. The blade can comprise a concave plane. The blade can comprise a tapered bottom plane. The tapered bottom plane forms an acute angle with the average top surface of the powder material. The blade can comprise a compliant mounting. The compliant mounting allows the blade to move vertically. The compliant mounting allows the blade to move vertically when confronting an object. The compliant mounting allows the blade to move vertically when confronting at least part of the three dimensional object. The concave plane can be utilized in leveling a layer of powder material deposited adjacent to the substrate. The concave plane may face the substrate. The concave plane can be slanted. The vertical position of the apparatus can be adjustable. The vertical position of the blade can be adjustable. The apparatus may further comprise a bulk reservoir capable of containing the powder material.

In another aspect, a method for generating a three-dimensional object comprises (a) dispensing a layer of powder material to provide a powder bed using a powder dispensing mechanism comprising: (i) a powder reservoir that accommodates a powder material; (ii) an exit opening through which the powder material can exit the apparatus to the powder bed, wherein the apparatus facilitates a free fall of the powder material using gravitational force, wherein the apparatus is suspended above the powder bed and is separated from the exposed surface of the powder bed by a gap wherein the exit opening is situated on a face of the apparatus that is different from a bottom of the apparatus; (iii) a translation member coupled to the reservoir, wherein the translation member translated the powder dispenser along a horizontal and/or vertical path, wherein the horizontal path comprises a path within a horizontal cross section of the powder bed, wherein the vertical path comprises a path within the gap; and (iv) an obstruction situated within the exit opening, wherein the obstruction regulates the amount of powder dispensed through the exit opening; (b) leveling the exposed surface of the powder bed; and (c) generating at least a portion of the three-dimensional object from at least a portion of the powder material.

In another aspect, a system for generating a three dimensional object comprises an enclosure that accommodates a powder bed; (a) an energy source that provides an energy beam to the powder material, and thereby transforms the powder material into a transformed material that subsequently hardens to form a hardened material, wherein the hardened material may form at least a part of the three-dimensional object; a powder dispensing member that dispenses the powder material into the powder bed, comprising: (i) a powder reservoir that accommodates a powder material; (ii) an exit opening through which the powder material can exit the apparatus to the powder bed, wherein the apparatus facilitates a free fall of the powder material using gravitational force, wherein the apparatus is suspended above the powder bed and is separated from the exposed surface of the powder bed by a gap wherein the exit opening is situated on a face of the apparatus that is different from a bottom of the apparatus; (iii) a translation member coupled to the reservoir, wherein the translation member translated the powder dispenser along a horizontal and/or vertical path, wherein the horizontal path comprises a path within a horizontal cross section of the powder bed, wherein the vertical path comprises a path within the gap; and (iv) an obstruction situated within the exit opening, wherein the obstruction regulates the amount of powder dispensed through the exit opening; (b) a powder leveling member that levels an exposed surface of the powder bed; and (c) a controller operatively coupled to the energy source, the powder dispensing member, the powder leveling member, and the powder removing member, and is programmed to: (i) direct the powder dispenser to dispense a first layer of the powder material having a first top surface into the powder bed, (ii) receive instructions to generate at least part of the three-dimensional object, (iii) generate the at least part of the three-dimensional object from a portion of the powder material in accordance with the instructions, (iv) direct the powder dispenser to dispense a second layer of powder material having a second top surface adjacent to the first top surface, and (v) direct the powder leveling member to level the second top surface to a first planar surface that is at or below the lowest point of the second top surface.

In another aspect, a method for generating a three-dimensional object comprises (a) dispensing a first layer of powder material in an enclosure to provide a powder bed having a first top surface; (b) directing an energy beam to the first layer of powder material to generate at least a portion of the three-dimensional object from at least a portion of the first layer; (c) subsequent to generating at least the portion of the three-dimensional object, dispensing a second layer of powder material in the enclosure, wherein the second layer of powder material comprises a second top surface; (d) shearing the second layer of powder material to form a first planar surface, wherein the first planar surface is at or below a lowest point of the second top surface; and (e) removing substantially all powder material that is above a second planar surface from the second layer of powder material, wherein the second planar surface is located below the first planar surface, and wherein the removing occurs in the absence of contacting the powder bed.

The generating can comprise transforming the powder material to generate a transformed material that subsequently hardens to form a hardened material, wherein at least a portion of the hardened material protrudes from the first top surface, thus forming a protrusion. The protrusion can be at least a portion of the three-dimensional object. The protrusion can comprise warping, bending, bulging, rolling, curling, or balling of the hardened material. The protrusion can comprise a hardened material that can be not a part of the three-dimensional object. The protrusion may have a height from about 10 micrometers to about 500 micrometers with respect to the first top surface. In some embodiments, an average vertical distance from the first top surface to the second planar surface can be from about 5 micrometers to about 1000 micrometers. The average vertical distance from the first top surface to the first planar surface can be from about 10 micrometers to about 500 micrometers. The removing can comprise using vacuum suction, magnetic force, electrostatic force, electric force, or physical force. In some examples, the removing can comprise vacuum suction. The method may further comprise reusing an excess of powder material from the first layer and/or second layer. The second planar surface can be situated above the first top surface. The first layer of powder material can be dispensed using gravitational force. The first layer of powder material can be dispensed using gas-flow that displaces the powder material. The airflow travels at a velocity having a Mach number from about 0.001 to about 1. In some embodiments, upon shearing the second layer of powder material to form the first planar surface, the at least the portion of the three-dimensional object can be displaced by about 300 micrometers or less.

In another aspect, a system for generating a three dimensional object comprises an enclosure that accommodates a powder bed comprising powder material; an energy source that provides an energy beam to the powder material in the powder bed; a powder dispensing member that dispenses the powder material into the enclosure to provide the powder bed; a powder leveling member that levels a top surface of the powder bed; a powder removing member that removes powder material from the top surface of the powder bed without contacting the top surface; and a controller operatively coupled to the energy source, the powder dispensing member, the powder leveling member, and the powder removing member, wherein the controller is programmed to: (i) direct the powder dispensing member to dispense a first layer of the powder material in the enclosure to provide the powder bed having a first top surface, (ii) direct the energy beam from the energy source to the first layer of powder material to generate at least a portion of the three-dimensional object from a portion of the first layer, (iii) direct the powder dispensing member to dispense a second layer of powder material in the enclosure, wherein the second layer of powder material comprises a second top surface, (iv) direct the powder leveling member to shear the second layer of powder material to form a first planar surface, wherein the first planar surface is at or below a lowest point of the second top surface, and (v) direct the powder removing member to remove substantially all powder material that is above a second planar surface from the second layer of powder material, wherein the second planar surface is located below the first planar surface.

The energy source can provide an energy beam to the powder material and thereby transforms the powder material into a transformed material that subsequently hardens to form a hardened material, wherein the hardened material may form at least a part of the three-dimensional object. The second planar surface can be disposed above the first top surface. In some embodiments, upon the powder leveling member shearing the second layer of powder material to form the first planar surface, the at least a portion of the three-dimensional object is displaced by about 300 micrometers or less. The powder dispensing member can be separated from the exposed surface of the powder bed by a gap. The gap may have a separation distance (e.g., vertical separation distance) that can be from about 10 micrometers to about 50 millimeters. In some embodiments, as the powder material exits the powder dispensing member to an environment of the enclosure and travels in the direction of the powder bed, it encounters at least one obstruction. In some examples, during operation, the powder dispensing member can be in (e.g., fluid) communication with the powder bed along a path that includes at least one obstruction. The obstruction can comprise a rough surface. The obstruction can comprise a slanted surface that forms an angle with the top surface of the powder bed. The powder removing member can be integrated with the powder dispensing member as a powder dispensing-removing member. The powder dispensing-removing member can comprise one or more powder exit ports and one or more vacuum entry ports. The powder dispensing-removing member can comprise one or more powder exits and one or more vacuum entries. The powder dispensing-removing member can comprise one or more powder exit ports and one or more vacuum entry ports are alternating arranged. The powder dispensing-removing member can comprise one or more powder exits and one or more vacuum entries that operate sequentially. The powder removing member can comprise a vacuum nozzle.

In another aspect, an apparatus for forming a three-dimensional object comprises a controller that is programmed to (a) supply a first layer of powder material from a powder dispensing member to a powder bed operatively coupled to the powder dispensing member, wherein the first layer comprises a first top surface; (b) direct an energy beam from an energy source to the powder bed to transform at least a portion of the powder material to a transformed material that subsequently hardens to yield at least a portion of the three-dimensional object; (c) subsequent to yielding at least the portion of the three-dimensional object, supply a second layer of powder material from the powder dispensing member to the powder bed operatively coupled to the powder dispensing member, wherein the second layer of powder material comprises a second top surface; (d) direct a powder removal member operatively coupled to the powder leveling member to remove substantially all powder material that is above a second planar surface from the second layer of powder material, wherein the second planar surface is located below the first planar surface, and wherein the removing occurs in the absence of contacting the powder bed.

In another aspect, an apparatus for generating a three dimensional object comprises (a) a powder bed comprising powder material; (b) powder dispenser that dispenses a predetermined amount of powder material at a position in the powder bed, wherein the powder dispenser is disposed above the powder bed and is separated from the powder bed by a gap; and (c) a leveling mechanism configured to level the powder material in the powder bed without relocating the excess amount of powder material onto a different position in the powder bed, wherein the leveling mechanism is located above the powder bed and laterally adjacent to the powder dispenser.

The leveling mechanism can comprise a knife. The leveling mechanism can comprise a knife that performs the shearing. The leveling mechanism can comprise a suction device that sucks the excess of powder material. The leveling mechanism can comprise a device for collecting the excess of powder material. The leveling mechanism can comprise a device for removing the excess of powder material from the powder bed.

In another aspect, an apparatus for forming a three-dimensional object, comprises a controller that is programmed to (a) supply a first layer of powder material from a powder dispensing mechanism to a powder bed operatively coupled to the powder dispensing member; (b) direct an energy beam from an energy source to the powder bed to transform at least a portion of the powder material to a transformed material that subsequently hardens to yield the three-dimensional object; (c) supply a second layer of powder material from the powder dispensing member to the powder bed, wherein the second layer is disposed adjacent to the first layer; and (d) direct a powder leveling mechanism operatively coupled to the powder dispensing member to level the exposed surface of the powder bed, wherein the leveling comprises removing an excess of the powder material without relocating the excess amount of powder material onto a different position in the powder bed.

In another aspect, a method for generating a three-dimensional object comprises (a) providing a first layer of powder material into an enclosure to provide a powder bed; (b) generating at least a portion of the three-dimensional object from at least a portion of the powder material; (c) dispensing a second layer of powder material onto the powder bed, wherein the second layer of powder material comprises an exposed surface; and (d) leveling the exposed surface, wherein the leveling comprises removing an excess of the powder material without relocating the excess amount of powder material onto a different position in the powder bed.

In another aspect, a system for generating a three dimensional object, comprising an enclosure that accommodates a powder bed; an energy source that provides an energy beam to the powder material, and thereby transforms the powder material into a transformed material that subsequently hardens to form a hardened material, wherein the hardened material may form at least a part of the three-dimensional object; a powder dispensing member that dispenses the powder material into the powder bed; a powder leveling member that levels an exposed surface of the powder bed without relocating the excess amount of powder material onto a different position in the powder bed; and a controller operatively coupled to the energy source, the powder dispensing member, the powder leveling member, and the powder removing member, and is programmed to: (i) direct the powder dispenser to dispense a first layer of the powder material into the powder bed, (ii) receive instructions to generate at least part of the three-dimensional object, (iii) generate the at least part of the three-dimensional object from a portion of the powder material in accordance with the instructions, (iv) direct the powder dispenser to dispense a second layer of powder material having an exposed surface, and (v) direct the powder leveling member to level the exposed surface.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIGS. 13A-13D schematically depict vertical side cross sections of various mechanisms for dispensing the powder material;

FIGS. 14A-14D schematically depict vertical side cross sections of various mechanisms for spreading and leveling the powder material;

FIGS. 18A-18D schematically depict vertical side cross sections of various mechanisms for dispensing the powder material;

Figure 1:
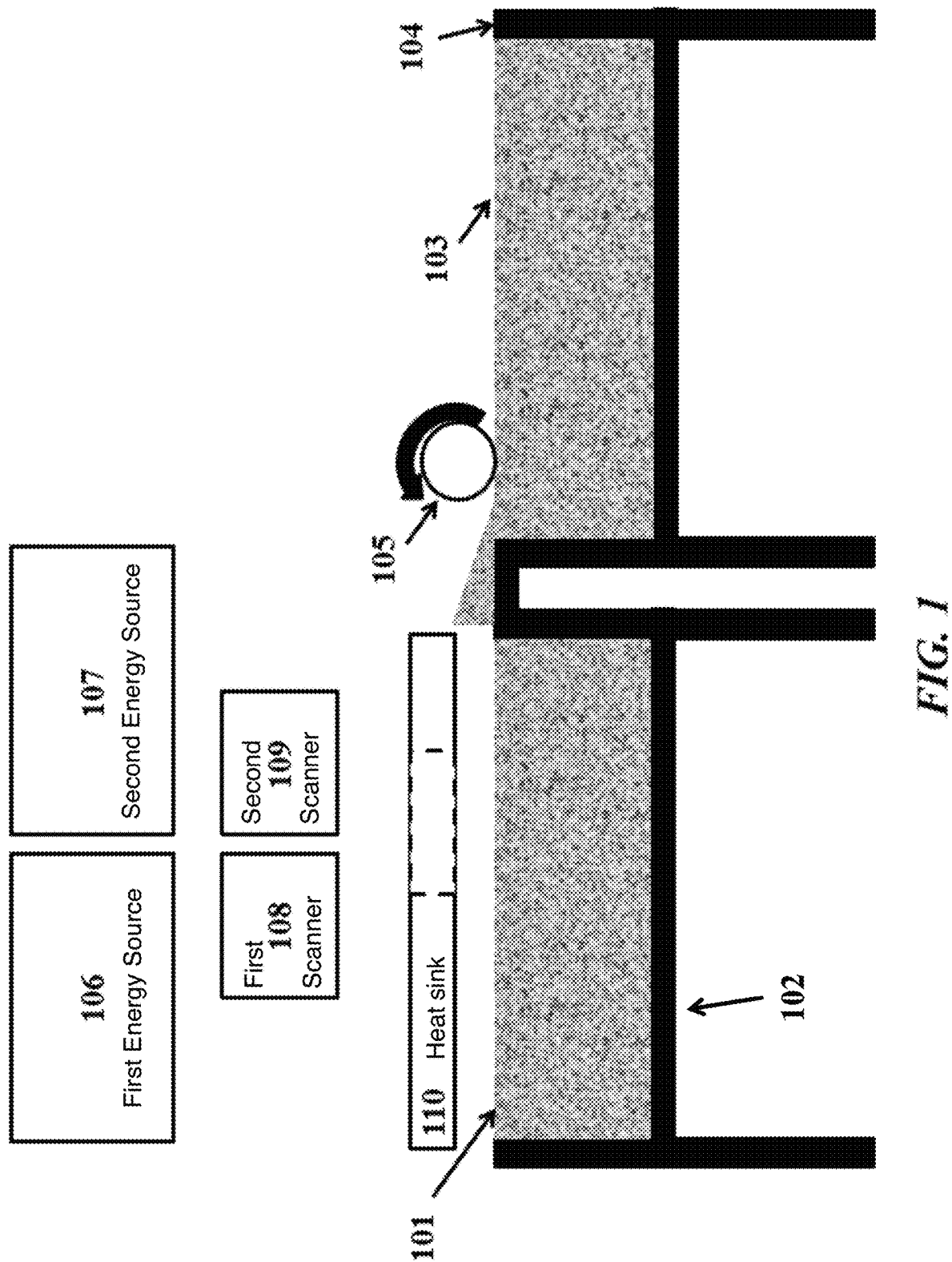
FIG. 1 illustrates a schematic of a three-dimensional (3D) printing system and its components.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Three-dimensional printing (also "3D printing") generally refers to a process for generating a 3D object. For example, 3D printing may refer to sequential addition of material layer or joining of material layers or parts of material layers to form a 3D structure, in a controlled manner (e.g., under automated control). In the 3D printing process, the deposited material can be fused, sintered, melted, bound or otherwise connected to form at least a part of the 3D object. Fusion, sintering, melting, binding or otherwise connecting the material is collectively referred to herein as transforming the material (e.g., powder material). Fusing the material may include melting or sintering the material. Binding can comprise chemical bonding. Chemical bonding can comprise covalent bonding. Examples of 3D printing include additive printing (e.g., layer by layer printing, or additive manufacturing). The 3D printing may further comprise subtractive printing.

The material may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. In some embodiments, the material may comprise an organic material, for example, a polymer or a resin. The material may comprise a solid or a liquid. The solid material may comprise powder material. The powder material may be coated by a coating (e.g., organic coating such as the organic material (e.g., plastic coating)). The powder material may comprise sand. The liquid material may be compartmentalized into reactors, vesicles or droplets. The compartmentalized material may be compartmentalized in one or more layers. The material may comprise at least two materials. The second material can be a reinforcing material (e.g., that forms a fiber). The reinforcing material may comprise a carbon fiber, Kevlar®, Twaron®, ultra-high-molecular-weight polyethylene, or glass fiber. The material can comprise powder (e.g., granular material) or wires.

3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP) or laminated object manufacturing (LOM).

Three-dimensional printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

The fundamental length scale of the printed 3D object (e.g., the diameter, spherical equivalent diameter, diameter of a bounding circle, or largest of height, width and length) can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The fundamental length scale of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases the fundamental length scale of the printed 3D object may be in between any of the afore-mentioned fundamental length scales. For example, the fundamental length scale of the printed 3D object may be from about 50 μm to about 1000 m, from about 120 μm to about 1000 m, from about 120 μm to about 10 m, from about 200 μm to about 1 m, from about 150 μm to about 10 m.

The term "powder," as used herein, generally refers to a solid having fine particles. The powder may also be referred to as "particulate material." Powders may be granular materials. In some examples, powders are particles having an average fundamental length scale (e.g., the diameter, spherical equivalent diameter, diameter of a bounding circle, or largest of height, width and length) of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 35 μm, 30 μm, 40 μm, 45 μm, 50 μm, 55 μm, 60 μm, 65 μm, 70 μm, 75 μm, 80 μm, or 100 μm. The particles comprising the powder may have an average fundamental length scale of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases the powder may have an average fundamental length scale between any of the values of the average particle fundamental length scale listed above. For example, the average fundamental length scale of the particles may be from about 5 nm to about 100 μm, from about 1 μm to about 100 μm, from about 15 μm to about 45 μm, from about 5 μm to about 80 μm, from about 20 μm to about 80 μm, or from about 500 nm to about 50 μm.

The powder can be composed of individual particles. The particles can be spherical, oval, prismatic, cubic, or irregularly shaped. The particles can have a fundamental length scale. The powder can be composed of a homogenously shaped particle mixture such that all of the particles have substantially the same shape and fundamental length scale magnitude within at most 1%, 5%, 8%, 10%, 15%, 20%, 25%, 30%, 35%, 40%, 50%, 60%, or 70% distribution of the fundamental length scale. In some cases the powder can be a heterogeneous mixture such that the particles have variable shape and/or fundamental length scale magnitude.

The term "base" as used herein, generally refers to any work piece on which a material used to form a 3D object, is placed on. The 3D object may be formed directly on the base, directly from the base, or adjacent to the base. The 3D object may be formed above the base. In some instances, the 3D object does not contact the base. The 3D object may be suspended adjacent (e.g., above) the base. At times, the base may be disposed on a substrate or on the bottom of an enclosure. The substrate may be disposed in an enclosure (e.g., a chamber). The enclosure can have one or more walls formed of various types of materials, such as elemental metal, metal alloy (e.g., stainless steel), ceramics, or an allotrope of elemental carbon. The enclosure can have shapes of various cross-sections, such as circular, triangular, square, rectangular, partial shapes, or combinations thereof. The enclosure may be thermally insulated. The enclosure may comprise thermal insulation. The enclosure may comprise a sealing lip (e.g., flexible sealing lip). The sealing lip may provide thermal insulation. The sealing lip may provide environmental (e.g., gasous) insulation. The enclosure may comprise an open top. The enclosure may comprise an open side or an open bottom. The base can comprise an elemental metal, metal alloy, ceramic, allotrope of carbon, or polymer. The base can comprise stone, zeolite, clay or glass. The elemental metal can include iron, molybdenum, tungsten, copper, aluminum, gold, silver or titanium. A metal alloy may include steel (e.g., stainless steel). A ceramic material may include alumina. The base can include silicon, germanium, silica, sapphire, zinc oxide, carbon (e.g., graphite, Graphene, diamond, amorphous carbon, carbon fiber, carbon nanotube or fullerene), SiC, AlN, GaN, spinel, coated silicon, silicon on oxide, silicon carbide on oxide, gallium nitride, indium nitride, titanium dioxide, aluminum nitride. In some cases, the base comprises a susceptor (i.e., a material that can absorb electromagnetic energy and convert it to heat). The base, substrate and/or enclosure can be stationary or translatable.

In some examples the powder material, the base, or both the powder and the base comprise a material wherein its constituents (e.g., atoms) readily lose their outer shell electrons, resulting in a free flowing cloud of electrons within their otherwise solid arrangement. In some examples the powder, the base, or both the powder and the base comprise a material characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be from about $1*10^5$ S/m to about $1*10^8$ S/m. The low electrical resistivity may be at most about $1*10^{-5}$ ohm times meter (Ω*m), $5*10^{-6}$ Ω*m, $1*10^{-6}$ Ω*m, $5*10^{-7}$ Ω*m, $1*10^{-7}$ Ω*m, $5*10^{-8}$ or $1*10^{-8}$ Ω*m. The low electrical resistivity can be from about $1\times10^{-5}$ Ω*m to about $1\times10^{-8}$ Ω*m. The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be from about 20 W/mK to about 1000 W/mK. The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be from about 1 g/cm$^3$ to about 25 g/cm$^3$.

Layers of a powder material can be provided additively or sequentially. At least parts of the layers can be transformed to form at least a fraction (also used herein "a portion," or "a part") of a hardened (e.g., solidified) 3D object. At times a transformed powder layer may comprise a cross section of a 3D object (e.g., a horizontal cross section). A layer can have a thickness of at least about 0.1 micrometer (μm), 0.5

μm, 1.0 μm, 10 μm, 50 μm, 100 μm, 150 μm, 200 μm, 300 μm, 400 μm, 500 μm, 600 μm, 700 μm, 800 μm, 900 μm, or 1000 μm. A layer can have a thickness of at most about 1000 μm, 900 μm, 800 μm, 700 μm, 60 μm, 500 μm, 450 μm, 400 μm, 350 μm, 300 μm, 250 μm, 200 μm, 150 μm, 100 μm, 75 μm, 50 μm, 40 μm, 30 μm, 20 μm, 10 μm, 5um, 1 μm, or 0.5 μm, or less. A layer may have any value in between the aforementioned layer thickness values. For example, the layer may be from about 1000 μm to about 0.1 μm, 800 μm to about 1 μm, 600 μm to about 20 μm, 300 μm to about 30 μm, or 1000 μm to about 10 μm. The material composition of at least one layer may differ from the material composition within at least one other layer in the powder bed. The materials of at least one layer may differ in its crystal structure from the crystal structure of the material within at least one other layer in the powder bed. The materials of at least one layer may differ in its grain structure from the grain structure of the material within at least one other layer in the powder bed. The materials of at least one layer may differ in the fundamental length scale of its powder material from the fundamental length scale of the material within at least one other layer in the powder bed. A layer may comprise two or more material types at any combination. For example, two or more elemental metals, two or more metal alloys, two or more ceramics, two or more allotropes of elemental carbon. For example an elemental metal and a metal alloy, an elemental metal and a ceramic, an elemental metal and an allotrope of elemental carbon, a metal alloy and a ceramic, a metal alloy and an allotrope of elemental carbon, a ceramic and an allotrope of elemental carbon. All the layers deposited during the 3D printing process may be of the same material composition. In some instances, a metal alloy is formed in situ during the process of transforming the powder material. In some cases, the layers of different compositions can be deposited at a predetermined pattern. For example, each layer can have composition that increases or decreases in a certain element, or in a certain material type. In some examples, each even layer may have one composition, and each odd layer may have another composition. The varied compositions of the layer may follow a mathematical series algorithm. In some cases, at least one area within a layer has a different material composition than another area within that layer.

A metallic material (e.g., elemental metal or metal alloy) can comprise small amounts of non-metallic materials, such as, for example, oxygen, sulfur, or nitrogen. In some cases, the metallic material can comprise the non-metallic materials in trace amounts. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (on the basis of weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (on the basis of weight, w/w) of non-metallic material. A trace amount can be any value between the afore-mentioned trace amounts. For example, a trace amount can be from about 10 parts per trillion (ppt) to about 100000 ppm, from about 1 ppb to about 100000 ppm, from about 1 ppm to about 10000 ppm, or from about 1 ppb to about 1000 ppm.

In some instances, adjacent components are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size disclosed herein.

The term "auxiliary features," as used herein, generally refers to features that are part of a printed 3D object, but are not part of the desired, intended, designed, ordered, or final 3D object. Auxiliary features (e.g., auxiliary supports) may provide structural support during and/or subsequent to the formation of the 3D object. Auxiliary features may enable the removal of energy from the 3D object that is being formed. Examples of auxiliary features comprise heat fins, anchors, handles, supports, pillars, columns, frame, footing, scaffold, flange, projection, protrusion, mold (a.k.a. mould) or other stabilization features. In some instances, the auxiliary support is a scaffold that encloses the 3D object or part thereof. The scaffold may comprise lightly sintered or lightly fused powder material.

The present disclosure provides systems, apparatuses and methods for 3D printing of an object from a material (e.g., powder material). The object can be pre-designed, or designed in real time (i.e., during the process of 3D printing). The 3D printing method can be an additive method in which a first layer is printed, and thereafter a volume of a material is added to the first layer as separate sequential layers. Each additional sequential layer can be added to the previous layer by transforming (e.g., fusing, e.g., melting) a fraction of the powder material.

Reference will now be made to the figures, wherein like numerals refer to like parts throughout. It will be appreciated that the figures and features therein are not necessarily drawn to scale.

An example of a system that can be used to generate an object by a 3D printing process is shown in FIG. 1. The system can comprise a powder bed 101 on a base 102. In some instances, the base 102 can be used during the formation process. In some situations, the nascent object, or object formed during the 3D printing process, floats in the powder bed 101 without touching the base 102. The base 102 can support at least one, two, three, four, five, six, seven, eight, nine, ten, eleven, twelve, thirteen, fourteen, or fifteen powder layers. The base can be heated or cooled to a predetermined temperature or according to a temperature gradient. The temperature gradient can be defined for a predetermined amount of time. The predetermined temperature can be at least about 10 degrees Celsius (° C.), 20° C., 25° C., 30° C., 40° C., 50° C., 60° C., 70° C., 80° C., 90° C., 100° C., 150° C., 200° C., 250° C., 300° C., 350° C., 400° C., 450° C., 500° C., 550° C., 600° C., 650° C., 700° C., 750° C., 800° C., 850° C., 900° C., or 1000° C. The predetermined temperature can be at most about 1000° C., 900° C., 800° C., 700° C., 600° C., 650° C., 600° C., 550° C., 500° C., 450° C., 400° C., 350° C., 300° C., 250° C., 200° C., 150° C., 100° C., 50° C., or 10° C. The predetermined temperature can be in between any of the values of temperature listed above. For example, from about 10° C. to about 1000° C., from about 100° C. to about 600° C., from about 200° C. to about 500° C., or from about 300° C. to about 450° C. The base can be thermostable. The base 102 can have walls. The base having walls can be referred to as a container that accommodates a powder bed. The base (e.g., the walls of the base) may comprise temperature sensors (e.g., one or more thermocouples). The temperature sensors may be operatively coupled to a controller. The controller may comprise a processor (e.g., a computer). In some instances, the temperature measures of the powder bed 101 and/or the base 102 can be made optically, for example by using an infrared (IR) temperature sensor. The temperature sensors can monitor the temperature at the edges of the powder bed, at one or more random places in the powder bed, at the center of the powder bed, at the base, or in any combination thereof. The temperature sensors can monitor the temperature at predetermined times, at random times, or at a whim. In some cases the walls of the base can be insulated. The base (e.g., the walls of the base) can be heated or cooled continuously or sporadically to maintain a desired temperature of the powder bed. The powder bed can have an exposed top surface, a covered top surface, or a partially exposed and partially covered top surface. The powder bed can be at least about 1 mm, 10 mm, 25 mm, 50 mm, 100 mm, 200 mm, 300 mm, 400 mm, or 500 mm wide. The powder bed can be at least about 1 mm, 10 mm, 25 mm, 50 mm, 100 mm, 200 mm, 300 mm, 400 mm, or 500 mm deep. The powder bed can be at least about 1 mm, 10 mm, 25 mm, 50 mm, 100 mm, 200 mm, 300 mm, 400 mm, or 500 mm long. The powder bed 101 on the base 102 can be adjacent to a powder reservoir (e.g., 103). The powder reservoir can be disposed in a container (e.g., 104). The container may be a stationary or a translatable. The powder bed 101 can be maintained at or near thermal equilibrium throughout the printing process. The average temperature of the powder bed can thermally fluctuate by at least 0.1° C., 0.2° C., 0.3° C., 0.4° C., 0.5° C., 0.6° C., 0.7° C., 0.8° C., 0.9° C., 1° C., 2° C., 3, ° C. 4° C., 5° C., 6° C., 7° C., 8° C., 9° C., 10° C., 15° C., 20° C., 30° C., 40° C., or 50° C., or less during the printing process. The average temperature of the powder bed can thermally fluctuate by at most about 50° C., 40° C., 30° C., 20° C., 10° C., or 5° C. during the printing process. The average temperature of the powder bed can thermally fluctuate between any of the aforementioned temperature fluctuation values. For example, the average temperature of the powder bed can fluctuate by a temperature range of from 50° C. to 5° C., or from 30° C. to 5° C.

During the printing process powder from the powder reservoir (e.g., 103) can be moved from the reservoir to the base (e.g., 102) to provide new powder, recycled powder, cool powder or any combination thereof to the powder bed (e.g., 101) on the base. Powder can be moved from the powder reservoir to the powder bed by a layer dispensing mechanism (also herein "translating mechanism" e.g., 105. Also herein "layer adding mechanism"). The layer dispensing mechanism can be a translating mechanism (e.g., translating device), which can include one or more moving parts. The layer dispensing mechanism can be a devise capable of moving the powder, depositing the powder, leveling the powder, removing the powder, or any combination thereof.

The layer dispensing mechanism may be translated substantially horizontally, vertically or at an angle. The layer dispensing mechanism may be translated laterally. In some examples, the base, the substrate, the enclosure, or the powder bed may be translatable. The layer dispensing mechanism may comprise springs. The base, substrate, enclosure or the powder bed may be translated substantially horizontally (e.g., right to left and vice versa), substantially vertically (e.g., top to bottom and vice versa) or at an angle. At least one of the enclosure, the substrate, and the base may comprise a lowerable platform (e.g., an elevator). The elevator may translate the powder bed (or the container thereof) to a first position. Powder may be deposited in the powder bed (or in the container thereof) in the first position. The powder bed may be subsequently translated to a second position. In some examples, the second position is lower than the first position. In the second position the powder bed may be vertically farther from the layer dispensing mechanism, as compared to the first position. In some examples, the powder bed or the container thereof may be stationary.

In some examples, the second position is higher than the first position (e.g., by the elevator). In some examples, layer dispensing mechanism may be able to move to the second position. The side of the layer dispensing mechanism that is closest to the exposed surface of the powder bed is designated herein as the bottom of the layer dispensing mechanism. When the powder bed (or the container thereof) is in the second position, at least part of the deposited powder may be located vertically above the bottom of the layer dispensing mechanism. At times, the container accommodating the powder bed may be devoid of powder material. At times, the container accommodating the powder bed comprises powder material. The layer dispensing mechanism may be translated laterally along the powder bed such that at least part of the powder material obstructs the movement of the layer dispensing mechanism in the second position. The layer dispensing mechanism may push, compress or collect the obstructing powder material as it moves laterally. The layer dispensing mechanism may level the powder material on its lateral movement along the powder bed (e.g., along the width or the length of the powder bed). The leveling of the powder may result in generating a plane with substantially planar uniformity in at least one plane (e.g., a horizontal plane) at the top (i.e., exposed surface) of the powder bed. The leveling of the powder may result in generating a plane with average planar uniformity in at least one plane (e.g., horizontal plane) at the top of the layer of powder material. The average plane may be a plane defined by a least squares planar fit of the top-most part of the surface of the layer of powder material. The average plane may be a plane calculated by averaging the powder height at each point on the top surface of the powder bed. The layer dispensing mechanism (e.g., 105) can comprise a roller, a brush, a rake (e.g., saw-tooth rake or dowel-tooth rake), a plough, a spatula or a knife blade. The layer dispensing mechanism may comprise a vertical cross section (e.g., side cross section) of a circle, triangle, square, pentagon, hexagon, octagon, or any other polygon. In some cases, the layer dispensing mechanism can comprise a roller. The roller can be a smooth roller. The roller can be a rough roller. The roller may have protrusions or depressions. The extrusions may be bendable extrusions (e.g., brush); the extrusion may be hard extrusions (e.g., rake). The extrusions may comprise a pointy end, a round end or a blunt end. The protrusions or depressions may form a pattern on the roller, or be randomly situated on the roller. Alternatively or additionally, the layer dispensing mechanism can comprise a plough or a rake. The layer dispensing mechanism may comprise a blade. The blade may comprise a planar concave, planar convex, chisel shaped, or wedge shaped blade. The blade may have a chisel or wedge shape, as well as a concave top surface (FIG. 12C at 1212) that may allow powder to accumulate on its top (e.g., 1214). The blade may have a chisel or wedge shape (e.g., FIG. 12B at 1207) and allow the powder to slide on its top. (e.g., 1209). The blade may comprise a sharp edge or a curved surface. The curved surface may comprise a radius of curvature of at least about 0.5 mm, 1 mm, 2 mm, 3 mm, 4 mm, 5 mm, 6 mm, 7 mm, 8 mm, 9 mm, 10 mm, or 11 mm. The radius of curvature may be of at most about 12 mm, 11 mm, 10 mm, 9 mm, 8 mm, 7 mm, 6 mm, 5 mm, 4 mm, 3 mm, 2 mm, or 1 mm. The radius of curvature of the curved surface may be of any value between the aforementioned values (e.g., from about 0.5 mm to about 12 mm, from about 0.5 mm to about 5 mm, or from about 5 mm to about 12 mm). The layer dispensing mechanism may be comprised of a ceramic, metallic, metal alloy (e.g., steel) or polymeric material (e.g., rubber). For example, the layer dispensing mechanism (e.g., 105) can comprise a rake with vertical features that can be used to move the powder, and vertical opening in between the features. In some cases the layer dispensing mechanism can have a substantially convex, concave, slanted, or straight edge that contact the powder bed. The edge of the layer dispensing mechanism can be perpendicular, parallel or at an acute angle that is between zero and 90 degrees with respect to the surface of the powder bed. The layer dispensing mechanism can be configured to provide a smooth, even, and/or leveled layer of recycled powder, new powder, cool powder, hot powder, powder at ambient temperatures, or any combination thereof across the top surface of the powder bed. The powder material can be chosen such that the powder material is the desired or otherwise predetermined material for the object. In some cases, a layer of the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramics, an alloy and an allotrope of elemental carbon). In certain embodiments each type of material comprises only a single member of that type. For example: a single member of elemental metal (e.g., iron), a single member of metal alloy (e.g., stainless steel), a single member of ceramic material (e.g., silicon carbide or tungsten carbide), or a single member (e.g., an allotrope) of elemental carbon (e.g., graphite). In some cases, a layer of the 3D object comprises more than one type of material. In some cases, a layer of the 3D object comprises more than one member of a material type.

The elemental metal can be an alkali metal, an alkaline earth metal, a transition metal, a rare earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare earth metal can be a lantanide, or an actinide. The lantinide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, *Neptunium*, Plutonium, Americium, Curium, Berkelium, Californium, Einsteinium, Fermium, Mendelevium, Nobelium, or Lawrencium. The other metal can be Aluminium, Gallium, Indium, Tin, Thallium, Lead, or Bismuth.

The metal alloy can be an iron based alloy, nickel based alloy, cobalt based allow, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace, automotive, marine, locomotive, satellite, defense, oil & gas, energy generation, semiconductor, fashion, construction, agriculture, printing, or medical. The metal (e.g., alloy or elemental) may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, i-pad), air conditioning, generators, furniture, musical equipment, art, jewelry, cooking equipment, or sport gear. The metal (e.g., alloy or elemental) may comprise an alloy used for products for human or veterinary applications comprising implants, or prosthetics. The metal alloy may comprise an alloy used for applications in the fields comprising human or veterinary surgery, implants (e.g., dental), or prosthetics.

The methods, apparatuses and systems of the present disclosure can be used to form 3D objects for various uses and applications. Such uses and applications include, without limitation, electronics, components of electronics (e.g., casings), machines, parts of machines, tools, implants, prosthetics, fashion items, clothing, shoes or jewelry. The implants may be directed (e.g., integrated) to a hard, a soft tissue or to a combination of hard and soft tissues. The implants may form adhesion with hard or soft tissue. The machines may include motor or motor parts. The machines may include a vehicle. The machines may comprise aerospace related machines. The machines may comprise airborne machines. The vehicle may include airplane, drone, car, train, bicycle, boat, or shuttle (e.g., space shuttle). The machine may include a satellite or a missile. The uses and application may include 3D objects relating to the industries and/or products listed above.

In some instances, the iron alloy comprises Elinvar, Fernico, Ferroalloys, Invar, Iron hydride, Kovar, Spiegeleisen, Staballoy (stainless steel), or Steel. In some instances the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may include cast iron, or pig iron. The steel may include Bulat steel, Chromoly, Crucible steel, Damascus steel, Hadfield steel, High speed steel, HSLA steel, Maraging steel, Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may include 316L, or 316LVM. The steel may include 17-4 Precipitation Hardening steel (also known as type 630, a chromium-copper precipitation hardening stainless steel, 17-4PH steel).

The titanium-based alloys may include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances the titanium base alloy includes Ti-6Al-4V or Ti-6Al-7Nb.

The Nickel alloy may include Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The brass may include Nickel hydride, Stainless or Coin silver. The cobalt alloy may include Megallium, Stellite (e. g. Talonite), Ultimet, or Vitallium. The chromium alloy may include chromium hydroxide, or Nichrome.

The aluminum alloy may include AA-8000, Al—Li (aluminum-lithium), Alnico, Duralumin, Hiduminium, Kryron Magnalium, Nambe, Scandium-aluminum, or Y alloy. The magnesium alloy may be Elektron, Magnox, or T-Mg—Al—Zn (Bergman phase) alloy.

The copper alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu, or Speculum metal.

The powder can be configured to provide support to the 3D object as it is formed in the powder bed by the 3D printing process. In some instances, a low flowability powder can be capable of supporting a 3D object better than a high flowability powder. A low flowability powder can be achieved inter alia with a powder composed of relatively small particles, with particles of non-uniform size or with particles that attract each other. The powder may be of low, medium or high flowability. The powder material may have compressibility of at least about 1%, 2%, 3%, 4%, 5%, 6%, 7%, 8%, 9%, or 10% in response to an applied force of 15 kilo Pascals (kPa). The powder may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The powder may have a basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The powder may have a basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The powder may have basic flow energy in between the above listed values of basic flow energy. For example, the powder may have a basic flow energy from about 100m[W]J to about 1000mJ, from about 100m[W]J to about 600mJ, or from about 500m[W]J to about 1000mJ. The powder may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0mJ/g. The powder may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The powder may have a specific energy in between any of the above values of specific energy. For example, the powder may have a specific energy from about 1.0mJ/g to about 5.0 mJ/g, from about 3.0 mJ/g to about 5mJ/g, or from about 1.0 mJ/g to about 3.5 mJ/g.

The 3D object can have auxiliary features that can be supported by the powder bed. The 3D object can have auxiliary features that can be supported by the powder bed and not touch the base, substrate, container accommodating the powder bed, or the bottom of the enclosure. The three-dimensional part (3D object) in a complete or partially formed state can be completely supported by the powder bed (e.g., without touching the substrate, base, container accommodating the powder bed, or enclosure). The three-dimensional part (3D object) in a complete or partially formed state can be completely supported by the powder bed (e.g., without touching anything except the powder bed). The 3D object in a complete or partially formed state can be suspended in the powder bed without resting on any additional support structures. In some cases, the 3D object in a complete or partially formed (i.e., nascent) state can float in the powder bed.

The 3D object can have various surface roughness profiles, which may be suitable for various applications. The surface roughness may be the deviations in the direction of the normal vector of a real surface, from its ideal form. The surface roughness may be measured as the arithmetic average of the roughness profile (hereinafter "Ra"). Ra may use absolute values. The 3D object can have a Ra value of at least about 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The formed object can have a Ra value of at most about 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The 3D object can have a Ra value between any of the aforementioned Ra values. For example, the Ra value can be from about 30 nm to about 50 µm, from about 5 µm to about 40 µm, from about 3 µm to about 30 µm, from about 10 nm to about 50 µm, or from about 15 nm to about 80 µm. The Ra values may be measured by electron microscopy (e.g., scanning electron microscopy), scanning tunneling microscopy, atomic force microscopy, optical microscopy (e.g., confocal, laser), or ultrasound. The Ra values may be measured by a contact or by a non-contact method.

The 3D object may be composed of successive layers (e.g., successive cross sections) of solid material that originated from a transformed material (e.g., fused, sintered, melted, bound or otherwise connected powder material). The transformed powder material may be connected to a hardened (e.g., solidified) material. The hardened material may reside within the same layer, or in another layer (e.g., a previous layer). In some examples, the hardened material comprises disconnected parts of the three dimensional object, that are subsequently connected by the newly transformed material (e.g., by fusing, sintering, melting, binding or otherwise connecting a powder material).

A cross section (e.g., vertical cross section) of the generated (i.e., formed) 3D object may reveal a microstructure or a grain structure indicative of a layered deposition. Without wishing to be bound to theory, the microstructure or grain structure may arise due to the solidification of transformed powder material that is typical to and/or indicative of the 3D printing method. For example, a cross section may reveal a microstructure resembling ripples or waves that are indicative of solidified melt pools that may be formed during the 3D printing process. The repetitive layered structure of the solidified melt pools may reveal the orientation at which the part was printed. The cross section may reveal a substantially repetitive microstructure or grain structure. The microstructure or grain structure may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure or grain structure may comprise substantially repetitive solidification of layered melt pools. The substantially repetitive microstructure may have an average layer size of at least about 0.5 µm, 1 µm, 5 µm, 10 µm, 20 µm, 30 µm, 40 µm, 50 µm, 60 µm, 70 µm, 80 µm, 90 µm, 100 µm, 150 µm, 200 µm, 250 µm, 300 µm, 350 µm, 400 µm, 450 µm, or 500 µm. The substantially repetitive microstructure may have an average layer size of at most about 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, or 10 µm. The substantially repetitive microstructure may have an average layer size of any value between the aforementioned values of layer size. For example, the substantially repetitive microstructure may have an average layer size from about 0.5 µm to about 500 µm, from about 15 µm to about 50 µm, from about 5 µm to about 150 µm, from about 20 µm to about 100 µm, or from about 10 µm to about 80 µm.

The printed 3D object may be printed without the use of auxiliary features, may printed using a reduced amount of auxiliary features, or printed using spaced apart auxiliary features. In some embodiments, the printed 3D object may be devoid of one or more auxiliary support features or auxiliary support feature marks that are indicative of a presence or removal of the auxiliary support features. The 3D object may be devoid of one or more auxiliary support features and of one or more marks of an auxiliary feature (including a base structure) that was removed (e.g., subsequent to the generation of the 3D object). The printed 3D object may comprise a single auxiliary support mark. The single auxiliary feature (e.g., auxiliary support or auxiliary structure) may be a base, a substrate, or a mold. The auxiliary support may be adhered to the base, substrate, or mold. The 3D object may comprise marks belonging to one or more auxiliary structures. The 3D object may comprise two or more marks belonging to auxiliary features. The 3D object may be devoid of marks pertaining to auxiliary support. The 3D object may be devoid of an auxiliary support. The 3D object may be devoid of one or more auxiliary support features and of one or more marks pertaining to an auxiliary support. The mark may comprise variation in grain orientation, variation in layering orientation, variation in layering thickness, variation in material density, variation in the degree of compound segregation to grain boundaries, variation in material porosity, variation in the degree of element segregation to grain boundaries, variation in material phase, variation in metallurgical phase, variation in crystal phase, or variation in crystal structure, where the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support (e.g., by a mold). For example, a mark may be a point of discontinuity that is not explained by the geometry of the 3D object, which does not include any auxiliary supports. A mark may be a surface feature that cannot be explained by the geometry of a 3D object, which does not include any auxiliary supports (e.g., a mold). The two or more auxiliary features or auxiliary support feature marks may be spaced apart by a spacing distance of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of at most 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of any value between the aforementioned auxiliary support space values. For example, the auxiliary features can be spaced apart by a distance from 1.5 mm to 500 mm, from 2 mm to 100 mm, from 15 mm to 50 mm, or from 45 mm to 200 mm (collectively referred to herein as the "auxiliary feature spacing distance").

The 3D object may comprise a layered structure indicative of 3D printing process that is devoid of one or more auxiliary support features or one or more auxiliary support feature marks that are indicative of a presence or removal of the one or more auxiliary support features. The 3D object may comprise a layered structure indicative of 3D printing process, which includes one, two or more auxiliary support marks. The supports or support marks can be on the surface of the 3D object. The auxiliary supports or support marks can be on an external, on an internal surface (e.g., a cavity within the 3D object), or both. The layered structure can have a layering plane. In one example, two auxiliary support features or auxiliary support feature or auxiliary support feature mark present in the 3D object may be spaced apart by the auxiliary feature spacing distance. The acute (i.e., sharp) angle alpha between the straight line connecting the two auxiliary supports or auxiliary support marks and the direction of normal to the layering plane may be at least about 45 degrees(°), 50°, 55°, 60°, 65°, 70°, 75°, 80°, or 85°. The acute angle alpha between the straight line connecting the two auxiliary supports or auxiliary support marks and the direction of normal to the layering plane may be at most about 90°, 85°, 80°, 75°, 70°, 65°, 60°, 55°, 50°, or 45°. The acute angle alpha between the straight line connecting the two auxiliary supports or auxiliary support marks and the direction of normal to the layering plane may be any angle range between the aforementioned angles. For example, from about 45 degrees (°), to about 90°, from about 60° to about 90°, from about 75° to about 90°, from about 80° to about 90°, from about 85° to about 90°. The acute angle alpha between the straight line connecting the two auxiliary supports or auxiliary support marks and the direction of normal to the layering plane may from about 87° to about 90°. The two auxiliary supports or auxiliary support marks can be on the same surface. The same surface can be an external surface or on an internal surface (e.g., a surface of a cavity within the 3D object). When the angle between the shortest straight line connecting the two auxiliary supports or auxiliary support marks and the direction of normal to the layering plane is greater than 90 degrees, one can consider the complementary acute angle. In some embodiments, any two auxiliary supports or auxiliary support marks are spaced apart by at least about 10.5 millimeters or more. In some embodiments, any two auxiliary supports or auxiliary support marks are spaced apart by at least about 40.5 millimeters or more. In some embodiments, any two auxiliary supports or auxiliary support marks are spaced apart by the auxiliary feature spacing distance.

The one or more layers within the 3D object may be substantially flat. The substantially flat one or more layers may have a large radius of curvature. The one or more layers may have a radius of curvature equal to the surface radius of curvature. The surface radius of curvature may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The surface radius of curvature may have a value of at most about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The surface radius of curvature may have any value between any of the afore-mentioned values of the radius of curvature. For example, from about 10 cm to about 90 m, from about 50 cm to about 10 m, from about 5 cm to about 1 m, from about 50 cm to about 5 m, or from about 40 cm to about 50 m In some examples, the one or more layers may be included in a planar section of the 3D object, or may be a planar 3D object. The radius of curvature may be measured by optical microscopy, electron microscopy, confocal microscopy, atomic force microscopy, spherometer, caliber caliper (e.g., vernier calibercaliper), positive lens, interferometer, or laser (e.g., tracker).

Each layer of the three dimensional structure can be made of a single material or of multiple materials as disclosed herein. A layer of the 3D object may be composed of a composite material. The 3D object may be composed of a composite material.

The 3D object may comprise a point X, which resides on the surface of the 3D object and Y, which is the closest auxiliary support or auxiliary support mark to X. In some embodiments, X is spaced apart from Y by the auxiliary feature spacing distance. The acute angle between the shortest straight line XY and the direction of normal to the layering plane may have the value of the acute angle alpha. When the angle between the shortest straight line XY and the direction normal to the layering plane is greater than 90 degrees, one can consider the complementary acute angle. In some embodiments, X is spaced apart from Y by at least about 10.5 millimeters or more. In some embodiments, X is spaced apart from Y by at least about 40.5 millimeters or more.

The 3D object may comprise a layering plane N of the layered structure. The 3D object may comprise points X and Y, which reside on the surface of the 3D object, wherein X is spaced apart from Y by at least about 10.5 millimeters or more. In some embodiments, X is spaced apart from Y by the auxiliary feature spacing distance. A sphere of radius XY that is centered at X lacks one or more auxiliary supports or one or more auxiliary support marks that are indicative of a presence or removal of the one or more auxiliary support features. In some embodiments, Y is spaced apart from X by at least about 10.5 millimeters or more. An acute angle between the straight line XY and the direction of normal to N may be from about 45 degrees to about 90 degrees. The acute angle between the straight line XY and the direction of normal to the layering plane may be of the value of the acute angle alpha. When the angle between the straight line XY and the direction of normal to N is greater than 90 degrees, one can consider the complementary acute angle. The layer structure may comprise any material used for 3D printing described herein. Each layer of the three dimensional structure can be made of a single material or of multiple materials. Sometimes one part of the layer may comprise one material, and another part may comprise a second material different than the first material.

The straight line XY, or the surface having a fundamental length scale (e.g., radius) of XY may be substantially flat. For example, the substantially flat surface may have a large radius of curvature. The straight line XY or the surface having a radius (or a fundamental length scale of) XY may have a radius of curvature equal to the values of the surface radius of curvature. The radius of curvature of the straight line XY may be normal to the length of the line XY. The curvature of the straight line XY may be the curvature along the length of the line XY.

One or more sensors (at least one sensor) can monitor the amount of powder in the powder bed. The at least one sensor can be operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, or proximity sensor. The sensor may include temperature sensor, weight sensor, powder level sensor, gas sensor, or humidity sensor. The gas sensor may sense any gas delineated herein. The temperature sensor may comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer, or Pyrometer. The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensors, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the powder bed can be monitored by one or more weight sensors in, or adjacent to, the powder. For example, a weight sensor in the powder bed can be at the bottom of the powder bed. The weight sensor can be between the bottom of the enclosure and the substrate. The weight sensor can be between the bottom of the enclosure and the base. The weight sensor can be between the bottom of the enclosure and the powder bed. A weight sensor can comprise a pressure sensor. The weight sensor may comprise a spring scale, a hydraulic scale, a pneumatic scale, or a balance. At least a portion of the pressure sensor can be exposed on a bottom surface of the powder bed. In some cases, the weight sensor can comprise a button load cell. The button load cell can sense pressure from powder adjacent to the load cell. In another example, one or more sensors (e.g., optical sensors or optical level sensors) can be provided adjacent to the powder bed such as above, below, or to the side of the powder bed. In some examples, the one or more sensors can sense the powder level. In some cases, the powder level sensors can monitor powder level ahead of a leveling mechanism (e.g., leveling device). The powder level sensor can be in communication with a powder dispensing system (also referred to herein as powder dispensing member, or powder dispensing mechanism) configured to dispense powder when the powder level sensor detects a powder level below a predetermined threshold. Alternatively, or additionally a sensor can be configured to monitor the weight of the powder bed by monitoring a weight of a structure that contains the powder bed. One or more position sensors (e.g., height sensors) can measure the height of the powder bed relative to the substrate. The position sensors can be optical sensors. The position sensors can determine a distance between one or more energy sources (e.g., a laser or an electron beam.) and a surface of the powder. The one or more sensors may be connected to a control system (e.g., to a processor, to a computer).

The system can comprise a first (e.g., FIG. 1, 106) and second (e.g., FIG. 1, 107) energy source. In some cases, the system can comprise three, four, five or more energy sources. The system can comprise an array of energy sources. In some cases, the system can comprise a third energy source. The third energy source can heat at least a fraction of a 3D object at any point during formation of a 3D object. Alternatively or additionally, the powder bed may be heated by a heating member comprising a lamp, a heating rod, or a radiator (e.g., a panel radiator). In some cases the system can have a single (e.g., first) energy source. An energy source can be a source configured to deliver energy to an area (e.g., a confined area). An energy source can deliver energy to the confined area through radiative heat transfer. The energy beam may include a radiation comprising an electromagnetic, charge particle, or non-charged particle beam. The energy beam may include a radiation comprising electromagnetic, electron, positron, proton, plasma, or ionic radiation. The electromagnetic beam may comprise microwave, infrared, ultraviolet, or visible radiation. The energy beam may include an electromagnetic energy beam, electron beam, particle beam or ion beam, for example. An ion beam may include a cation or an anion. A particle beam may include radicals. The electromagnetic beam may comprise a laser beam. The energy source may include a laser source. The energy source may include an electron gun. The energy source may include an energy source capable of delivering energy to a point or to an area. In some embodiments the energy source can be a laser. In an example a laser can provide light energy at a peak wavelength of at least about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 500 nm, or 100 nm. The laser can provide light energy at a peak wavelength between any of the afore-mentioned peak wavelength values. For example, the laser can provide light energy at a peak wavelength from about 100 nm to about 2000 nm, from about 500 nm to about 1500 nm, or from about 1000 nm to about 1100 nm. An energy beam from the first and/or second energy source can be incident on, or be directed to, the top surface of the powder bed (e.g., 101). The energy beam can be incident on a specified area of the powder bed for a specified time period. The powder material in the powder bed can absorb the energy from the energy beam and, and as a result, a localized region of the powder material can increase in temperature. The energy beam can be moveable such that it can translate relative to the top (i.e., exposed) surface of the powder bed. In some instances, the energy source may be movable such that it can translate relative to the top surface of the powder bed. The first and optionally the second energy beams and/or sources can be moved via a galvanometer scanner, a polygon a mechanical stage, or any combination of thereof. The first energy source and/or beam can be movable with a first scanner (e.g., FIG. 1, 108). The optionally second energy source and/or beam can be moveable with a second scanner (e.g., FIG. 1, 109). The first energy source and the optionally second energy source and/or beam can be translated independently of each other. In some cases the first and optionally second energy source and/or beam can be translated at different rates such that the movement of the first or second energy source and/or beam is faster compared to the movement of the optionally second or first energy source.

Energy (e.g., heat) can be transferred from the powder to a cooling member (e.g., heat sink FIG. 1, 110). The cooling member can facilitate transfer of energy away from a least a portion of a powder layer. In some cases the cooling member can be a thermally conductive plate. The cooling member can comprise a cleaning mechanism (e.g., cleaning device), which removes powder and/or process debris from a surface of the cooling member to sustain efficient cooling. Debris can comprise dirt, dust, powder (e.g., that result from heating, melting, evaporation and/or other process transitions), or hardened material that did not form a part of the 3D object. In some cases the cleaning mechanism can comprise a stationary rotating rod, roll, brush, rake, spatula, or blade that rotates when the heat sinks moves in a direction adjacent to the base. The cleaning mechanism may comprise a vertical cross section (e.g., side cross section) of a circle, triangle, square, pentagon, hexagon, octagon, or any other polygon. The vertical cross section may be of an amorphous shape. In some cases the cleaning mechanism rotates when the cooling member moves in a direction that is not lateral. In some cases the cleaning mechanism rotates without movement of the cooling member. In some cases, the cooling member comprises at least one surface that is coated with a layer that prevents powder and/or debris from attaching to the at least one surface (e.g., an anti-stick layer).

One or more temperature sensors can sense the temperature of the cooling member. The temperature sensor can comprise thermocouple, thermistor, pyrometer, thermometer (e.g., resistance thermometer), or a silicon band gap temperature sensor. The cooling member can comprise two or more thermally conductive plates. The cooling member can be made from a thermally conductive material, for example a metal or metal alloy. The cooling member can comprise copper or aluminum. The cooling member (e.g., heat sink) can comprise a material that conducts heat efficiently. The efficient heat conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The efficient heat conductivity may of any value between the aforementioned values. For example, the efficient heat conductivity may be from about 400 W/mK to about 1000 W/mK, or from about 20 W/mK to about 500 W/mK. The heat sink can comprise an elemental metal or a metal alloy. The heat sink can comprise elemental metal, metal alloy, ceramic, an allotrope of elemental carbon, or a polymer. The heat sink can comprise stone, zeolite, clay or glass. The heat sink (e.g., 110) can be placed above the top surface of the powder bed (e.g., 101). The heat sink can be placed below the powder bed, or to the side of the surface of the powder bed. In some cases the heat sink can contact a surface of the powder bed. The heat sink can just touch the surface of the powder bed. The heat sink can apply a compressive force to the exposed surface of the powder bed. In some cases the heat sink can extend past the edges of the top surface of the powder bed. In some cases the heat sink can extend up to the edges of the top surface of the powder bed. In some cases the heat sink can extend to the edges of the top surface of the powder bed. The heat sink can facilitate the transfer of energy from at least a portion of a powder layer without substantially changing and initial configuration of the powder material in the powder layer. In some cases the powder layer can comprise a fully or partially formed 3D object. The heat sink can facilitate the transfer of energy from at least a portion of a powder layer without substantially altering the position of the printed 3D object (or a part thereof) by any of the position alteration values disclosed herein.

The cooling member may be a heat transfer member that enables heating, cooling or maintaining the temperature of the powder bed or of the 3D object being formed in the powder bed. In some examples, the heat transfer member is a cooling member that enables the transfer of energy out of the powder bed. The heat transfer member can enable the transfer of energy to the powder bed.

Figure 2:
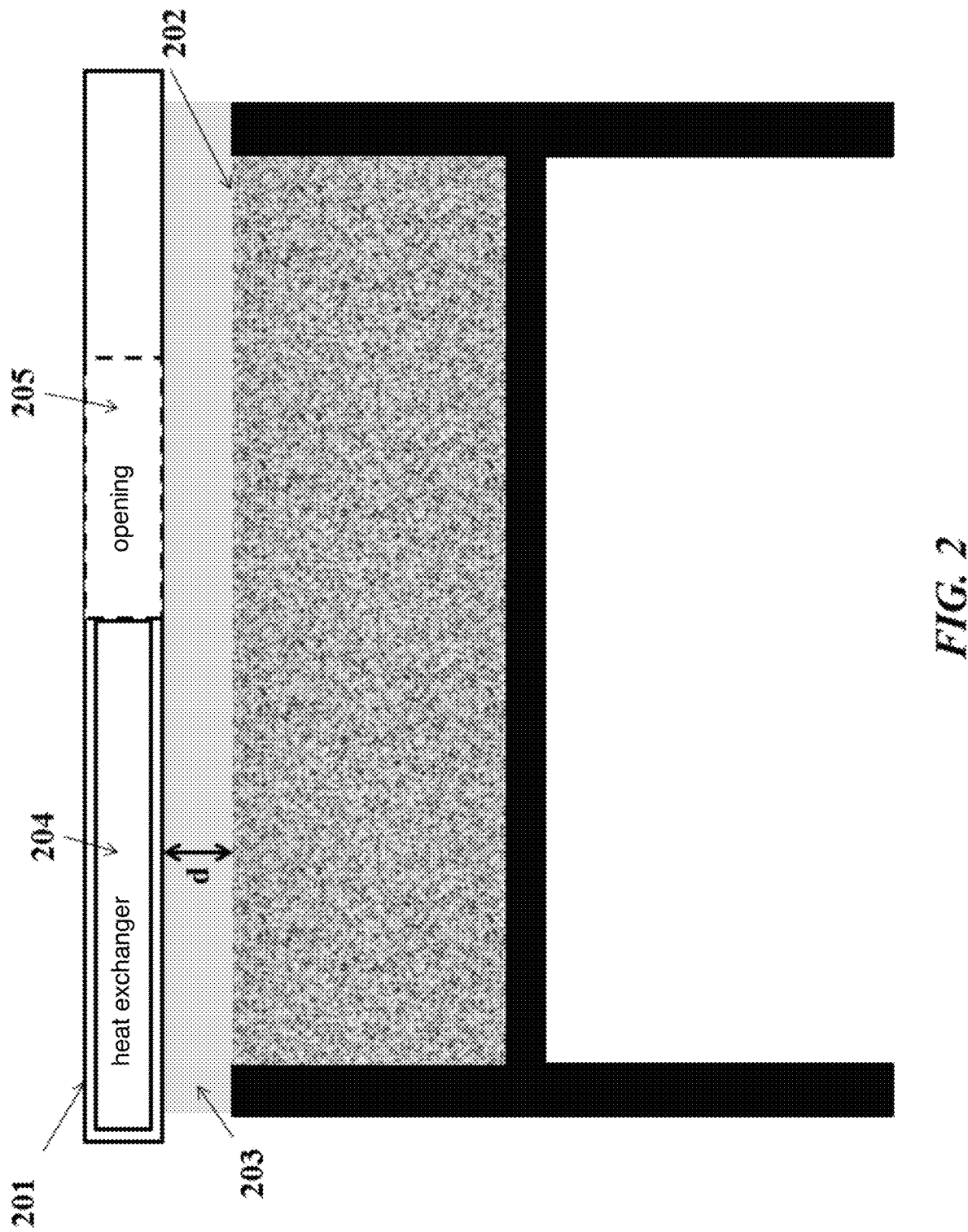
FIG. 2 illustrates a schematic of the cooling member provided in the 3D printing system.

Heat can be transferred from the powder bed to the heat sink through any one or combination of heat transfer mechanisms (e.g., conduction, natural convection, forced convection, and radiation). The heat sink can be solid, liquid or semi-solid. In some examples, the heat sink is solid. The heat sink may comprise a gas. Alternatively, the heat sink can comprise one or more openings (e.g., FIG. 2, 205). The openings can be arranged in a pattern or randomly. The openings can be arranged in a striped pattern or a chessboard pattern. In some cases, powder removal openings (e.g., suction nozzles) can be adjacent to the openings. In an example, the heat sink can be a plate. An example of a heat sink is shown in FIG. 2. In the example shown in FIG. 2 the heat sink 201 is a distance d from the surface of the powder bed 202, which constitutes a gap. The gap can be adjustable or fixed. The heat sink can be controlled by a control system (e.g., a processor). The gap can be adjusted by the control system based on a melting energy per unit area that is suitable to transform the powder bed or a portion thereof. A layer of gas (e.g., 203) can be provided between the heat sink and the surface of the powder bed. The heat sink can be thermally coupled to the powder bed through the layer of gas. The layer of gas can comprise ambient gas (e.g., air), argon, nitrogen, helium, neon, krypton, xenon, hydrogen, carbon monoxide, carbon dioxide, or oxygen. In some cases, the layer of gas can be chosen to achieve a desired heat transfer property between the top surface of the powder bed and the heat sink. A distance sensor can measure the distance of the gas gap. The distance sensor may comprise an optical sensor, a capacitance sensor, or both an optical sensor and a capacitance sensor. In an example, a gas with high thermal conductivity can be chosen. The gas gap can be an environment between the heat sink and an exposed surface of the powder bed. The size of the gap may be controlled. In some cases, rotational gas flow currents can be generated in the gap. The currents can increase, or cause, convective heat transfer between the powder bed and the heat sink. In some cases, the currents can be driven by movement of the heat sink with periodic wedges present along the heat sink to direct the currents to the powder bed. The wedges can be periodically spaced along a surface of the heat sink with a spacing distance from about 1 pin to about 100 mm, or from about 10 μm to about 10 mm. Alternatively or additionally, a convective current can be generated in the gas gap by forcing gas flow in the gap. The gas flow can be forced by a first array or matrix of nozzles embedded in the heat sink (e.g., in the surface of the heat sink). The nozzles can be oriented towards a surface of the powder bed and can allow gas to flow in to the gap (e.g., via release of a pressurized gas). A second array or matrix of nozzles can remove the gas introduced by the first array or matrix of nozzles to create gas flow (e.g., via vacuum mechanism).

In some cases the heat sink can comprise a heat exchanger (e.g., 204). The heat exchanger (e.g., thermostat) can be configured to maintain the temperature of the heat sink at a constant target temperature. In some cases the target temperature can be higher than, lower than, or substantially equivalent to the ambient temperature. The heat exchanger can circulate a cooling fluid through a plumbing system (e.g., pipe or coil) embedded in the heat sink. The cooling fluid can be configured to absorb heat from the heat sink through any one or combination of heat transfer mechanisms (e.g., conduction, natural convection, forced convection, and radiation). The cooling fluid can be water, oil, or a refrigerant (e.g., R34a). In some examples, the cooling member is not embedded within the powder bed (e.g., in a form of pipes).

The cooling member can cool a surface of the powder through mechanical contact. The cooling member can contact a surface of the powder bed for most about 1 second (s), 5 s, 10 s, 20 s, 30 s, 40 s, 50 s, 60 s, 70 s, 80 s, 90 s, 100 s, 110 s, 120 s, 130 s, 140 s, 150 s, 160 s, 170 s, 180 s, 190 s, 200 s, 210 s, 220 s, 230 s, 240 s, 250 s, 260 s, 270 s, 280 s, 290 s, 300 s, 10 minutes, 15 minutes, 30 minutes, 1 hour, 3 hours, 6 hours, 12 hours, 1 day, or less. The cooling member can contact a surface of the powder bed for at least about 1 second (s), 5 s, 10 s, 20 s, 30 s, 40 s, 50 s, 60 s, 70 s, 80 s, 90 s, 100 s, 110 s, 120 s, 130 s, 140 s, 150 s, 160 s, 170 s, 180 s, 190 s, 200 s, 210 s, 220 s, 230 s, 240 s, 250 s, 260 s, 270 s, 280 s, 290 s, 300 s, 10 minutes, 15 minutes, 30 minutes, 1 hour, 3 hours, 6 hours, 12 hours, 1 day, or more. The cooling member can contact a surface of the powder bed for at time between any of the aforementioned time periods. For example the cooling member can contact a surface of the powder bed for at time period from about 1 s to about 15 min, from about 1 s to about 10 min, from about 1 s to about 5 min, from about 1 s to about 1 min, or from about 1 s to about 30 s. The cooling member can be a plate that contacts the surface of the powder bed along a planar dimension. In some cases the cooling member can be a one or more cylinder that roll along the surface of the powder. Alternatively the cooling member can be a belt that runs along the surface of the powder. The cooling member can comprise spikes, ridges, or other protrusions features configured to penetrate into the powder to enhance cooling surface area and depth. The protruding features may be bendable (e.g., soft) or non-bendable (e.g., stiff).

In some instances the cooling member does not reside within the powder material. In other examples, the cooling member may reside within the powder material. The cooling member can be a duct or a pipe.

In some instances, the cooling member is not a plate. The cooling member can be a cooled powder layer. The cooled powder layer can act as a heat sink. The cooled powder layer can be integrated with a raking member that provides and/or moves the powder material adjacent to the base and/or another powder layer. A raking member can provide a layer of cooled powder with a thickness of at least about 0.5 mm, 1 mm, 5 mm, 10 mm, 15 mm, 20 mm, 25 mm, or 30 mm adjacent to a first powder layer. A raking member can provide a layer of cooled powder with a thickness of at most about 0.5 mm, 1 mm, 5 mm, 10 mm, 15 mm, 20 mm, 25 mm, or 30 mm adjacent to a first powder layer. Heat (e.g., thermal energy) from a first powder layer can be removed by transfer from the first powder layer to the cooled powder layer. The cooled powder layer can be provided at a temperature of at most about $-40°$ C., $-20°$ C., $-10°$ C., $0°$ C., $10°$ C., $20°$ C., $25°$ C., $30°$ C., $40°$ C., $50°$ C., $60°$ C., $70°$ C., $80°$ C., $90°$ C., $100°$ C., $200°$ C., $300°$ C., $400°$ C., or $500°$ C. The cooled powder layer can be provided at a temperature of at least about $-40°$ C., $-20°$ C., $-10°$ C., $0°$ C., $10°$ C., $20°$ C., $25°$ C., $30°$ C., $40°$ C., $50°$ C., $60°$ C., $70°$ C., $80°$ C., $90°$ C., $100°$ C., $200°$ C., $300°$ C., $400°$ C., or $500°$ C. The cooled powder layer can be provided at a temperature between the above listed temperature values. After the heat transfer has occurred most of the layer of cooled powder can be removed such that the remaining layer has a thickness of at most about 500 µm, 250 µm, 100 µm, 50 µm, 45 µm, 40 µm, 35 µm, 30 µm, 35 µm, 30 µm, 25 µm, 20 µm, 15 µm, 5 µm, 1 µm, or 0.5 µm. The remaining cooled powder can be exposed to either or both of the first and the optionally second (or additional) energy source to form at least a portion of a 3D object.

Figure 9:
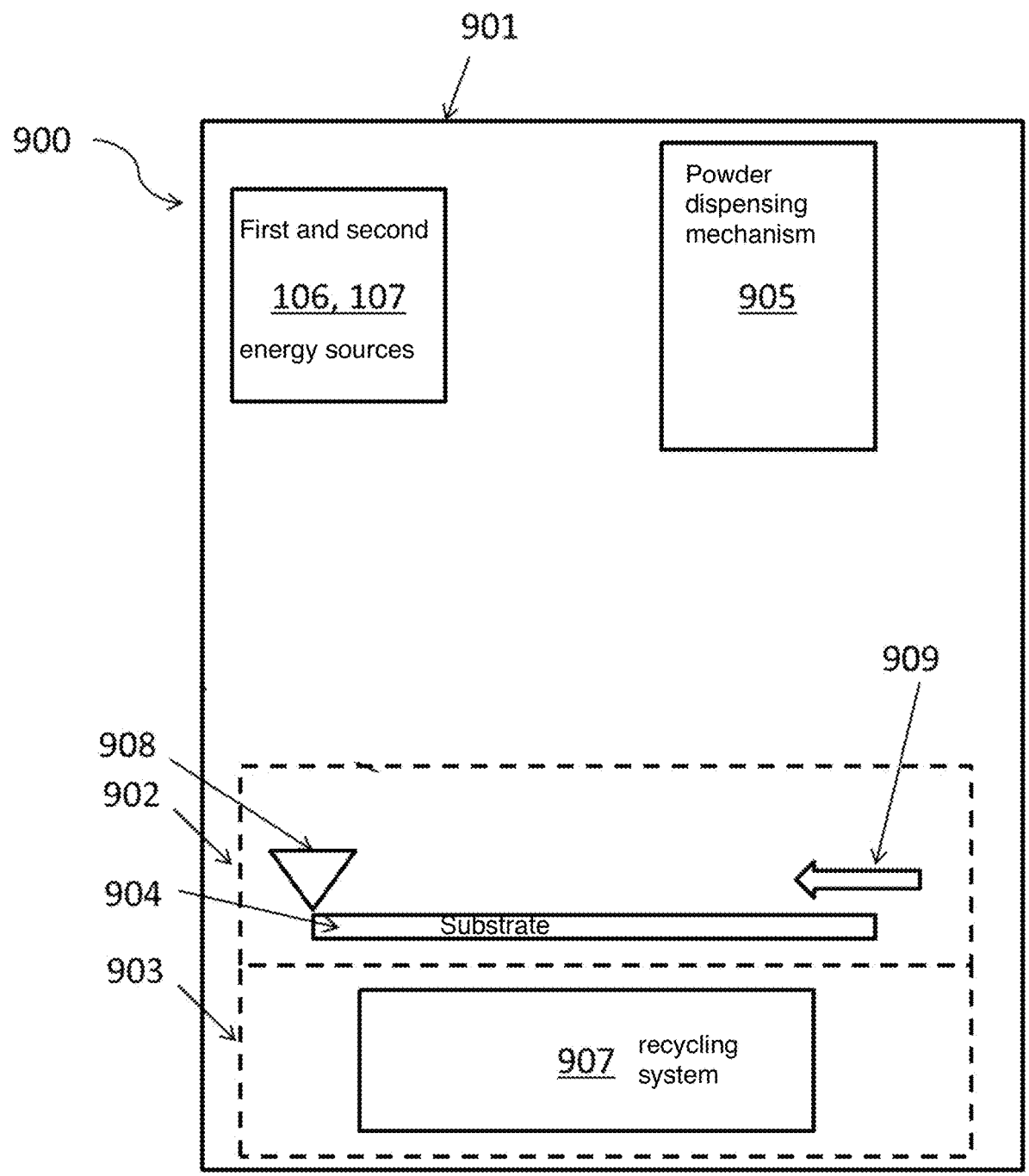
FIG. 9 depicts a schematic of select components of a three dimensional (3D) printing system which may be used to maintain planar uniformity of a powder layer.

FIG. 9 depicts another example of a system that can be used to generate a 3D object using a 3D printing process. The shown in FIG. 9 can be similar to the system shown in FIG. 1. The system 900 shown in FIG. 9 can comprise at least some of the components included in the system shown in FIG. 1. The system 900 shown in FIG. 9 can comprise additional components that are not included in FIG. 1.

The system 900 can include an enclosure (e.g., a chamber 901). At least a fraction of the components in the system 900 can be enclosed in the chamber 901. At least a fraction of the chamber 901 can be filled with a gas to create a gaseous environment. The gas can be an inert gas (e.g., Argon, Neon, or Helium). The chamber can be filled with another gas or mixture of gases. The gas can be a non-reactive gas (e.g., an inert gas). The gaseous environment can comprise argon, nitrogen, helium, neon, krypton, xenon, hydrogen, carbon monoxide, or carbon dioxide. The pressure in the chamber can be at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or more. The pressure in the chamber can be at least 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, 1200 Torr. The pressure in the chamber can be at most $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at a range between any of the aforementioned pressure values. For example, the pressure may be from about $10^{-7}$ Torr to about 1200 Torr, from about $10^{-7}$ Torr to about 1 Torr, from about 1 Torr to about 1200 Torr, or from about $10^{-2}$ Torr to about 10 Torr. In some cases the pressure in the chamber can be standard atmospheric pressure. In some examples, the chamber 901 can be under vacuum pressure.

The chamber can comprise two or more gaseous layers. The gaseous layers can be separated by molecular weight or density such that a first gas with a first molecular weight or density is located in a first region (e.g., 903) of the chamber and a second gas with a second molecular weight or density that is smaller than the first molecular weight or density is located in a second region (e.g., 902) of the chamber. The gaseous layers can be separated by temperature. The first gas can be in a lower region of the chamber relative to the second gas. The second gas and the first gas can be in adjacent locations. The second gas can be on top of, over, and/or above the first gas. In some cases the first gas can be argon and the second gas can be helium. The molecular weight or density of the first gas can be at least about 1.5*, 2*, 3*, 4*, 5*, 10*, 15*, 20*, 25*, 30*, 35*, 40*, 50*, 55*, 60*, 70*, 75*, 80*, 90*, 100*, 200*, 300*, 400*, or 500* larger or greater than the molecular weight or density of the second gas. "*" used herein designates the mathematical operation "times." The molecular weight of the first gas can be higher than the molecular weight of air. The molecular weight or density of the first gas can be higher than the molecular weight or density of oxygen gas (e.g., $O_2$). The molecular weight or density of the first gas can be higher than the molecular weight or density of nitrogen gas (e.g., $N_2$). At times, the molecular weight or density of the first gas may be lower than that of oxygen gas or nitrogen gas.

The first gas with the relatively higher molecular weight or density can fill a region of the system (e.g., 903) where at least a fraction of the powder is stored. The second gas with the relatively lower molecular weight or density can fill a region of the system (e.g., 902) where the 3D object is formed. The region where the 3D object is formed can comprise a powder layer that is receiving energy in a predetermined pattern to form at least a fraction of the 3D object; the powder layer can be supported on a substrate (e.g., 904). The substrate can have a circular, rectangular, square, or irregularly shaped cross-section. The substrate may comprise a base disposed above the substrate. The substrate may comprise a base disposed between the substrate and a powder layer (or a space to be occupied by a powder layer). The region where the 3D object is formed can further comprise a leveling mechanism (e.g., a roll, brush, rake, spatula or blade) configured to move and/or level powder material along the powder layer. The leveling mechanism may comprise a vertical cross section (e.g., side cross section) of a circle, triangle, square, pentagon, hexagon, octagon, or any other polygon, or partial shape or combination of shapes thereof. The leveling mechanism may comprise a vertical cross section (e.g., side cross section) of an amorphous shape. The leveling mechanism may comprise one or more blades. In some examples, the leveling mechanism comprises a blade with two mirroring sides, or two blades attached to form two mirroring blades. Such mirroring arrangement may ensure a similar action when the leveling mechanism is traveling in one side and in the opposite side. A thermal control unit (e.g., a cooling member such as a heat sink, a cooling plate, a heating plate, or a thermostat) can be provided inside of the region where the 3D object is formed or adjacent to the region where the 3D object is formed. The thermal control unit can be provided outside of the region where the 3D object is formed (e.g., at a predetermined distance). In some cases, the thermal control unit can form at least one section of a boundary region where the 3D object is formed (e.g., the container accommodating the powder bed).

The concentration of oxygen in the chamber can be minimized. The concentration of oxygen or humidity in the chamber can be maintained below a predetermined threshold value. For example, the gas composition of the chamber can contain a level of oxygen or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chamber can contain an oxygen or humidity level between any of the aforementioned values. For example, the gas composition of the chamber can contain a level of oxygen or humidity from about 100 ppb to about 0.001 ppm, from about 1 ppb to about 0.01 ppm, or from about 1 ppm to about 0.1 ppm. In some cases, the chamber can be opened at the completion of a formation of a 3D object. When the chamber is opened, ambient air containing oxygen and/or humidity can enter the chamber. Exposure of one or more components inside of the chamber to air can be reduced by, for example, flowing an inert gas while the chamber is open (e.g., to prevent entry of ambient air), or by flowing a heavy gas (e.g., argon) that rests on the surface of the powder bed. In some cases, components that absorb oxygen and/or water on to their surface(s) can be sealed while the chamber is open.

The chamber can be configured such that gas inside of the chamber has a relatively low leak rate from the chamber to an environment outside of the chamber. In some cases the leak rate can be at most about 100 milliTorr/minute (mTorr/min), 50 mTorr/min, 25 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the aforementioned leak rates (e.g., from about 0.0001 mTorr/min to about 100 mTorr/min, from about 1 mTorr/min to about 100 mTorr/min, or from about 1 mTorr/min to about 100 mTorr/min). The chamber (e.g., 901) can be sealed such that the leak rate of gas from inside the chamber to an environment outside of the chamber is low. The seals can comprise O-rings, rubber seals, metal seals, load-locks, or bellows on a piston. In some cases the chamber can have a controller configured to detect leaks above a specified leak rate (e.g., by using a sensor). The sensor may be coupled to a controller. In some instances, the controller is able to identify a leak by detecting a decrease in pressure in side of the chamber over a given time interval.

Powder can be dispensed on to the substrate (e.g., 904) to form a 3D object from the powder material. The powder can be dispensed from a powder dispensing mechanism (e.g., 905 such as a powder dispenser). The powder dispensing mechanism can be adjacent to the powder bed. The powder dispensing mechanism may span the entire width of the powder bed, entire length of the powder bed, or a portion of the powder bed. The powder dispensing mechanism may comprise an array of powder delivery components (e.g., array of powder dispensers). The array of powder delivery components may be spaced apart evenly or unevenly. The array of powder dispensing components may be spaced apart by at most 0.1 mm, 0.3 mm, 0.5 mm, 1 mm, 1.5 mm, 2 mm, 3 mm, 4 mm, or 5 mm. The array of powder delivery components may be spaced apart by at least 0.1 mm, 0.3 mm, 0.5 mm, 1 mm, 1.5 mm, 2 mm, 3 mm, 4 mm, or 5 mm. The array of powder delivery components (e.g., members) may be spaced apart between any of the afore-mentioned spaces of the leveling members (e.g., from about 0.1 mm to about 5 mm, from about 0.1 mm to about 2 mm, from about 1.5 mm to about 5 mm). The leveling mechanism may be coupled to or may be a part of the powder dispensing mechanism. The leveling mechanism may compact the powder within the layer of powder material. In some instances, the leveling mechanism substantially does not compact the powder in the layer of powder material.

FIGS. 13A-D schematically depict vertical side cross sections of various mechanisms for dispensing the powder material. FIG. 13A depicts a powder dispenser 1303 situated above the surface 1310 moving in the direction 1306. FIG. 13B depicts a powder dispenser 1311 situated above the surface 1317 moving in the direction 1314. FIG. 13C depicts a powder dispenser 1318 situated above the surface 1325 moving in the direction 1321. FIG. 13D depicts a powder dispenser 1326 situated above the surface 1333 moving in the direction 1329.

The powder dispensing mechanism may be coupled to or may be a part of a powder removal mechanism (e.g., a powder removal member). The powder removal member may be referred herein as a powder removal system. For example, FIG. 25C shows a powder dispensing mechanism that is integrated with the powder removal system (e.g., 2531). In that system (i.e., mechanism), the powder delivery components (e.g., 2533) are spaced apart, and are integrated with the powder removal mechanism components (e.g., 2532). The integration of the components may form a pattern, or may be separated into two groups each of which containing one type of component, or may be randomly situated. The one or more powder exit ports and one or more vacuum entry ports may be arranged in a pattern (e.g., sequentially), grouped together, or at random. The one or more powder exit ports and one or more vacuum entry ports operate sequentially, simultaneously, in concert, or separate from each other.

Figure 24:
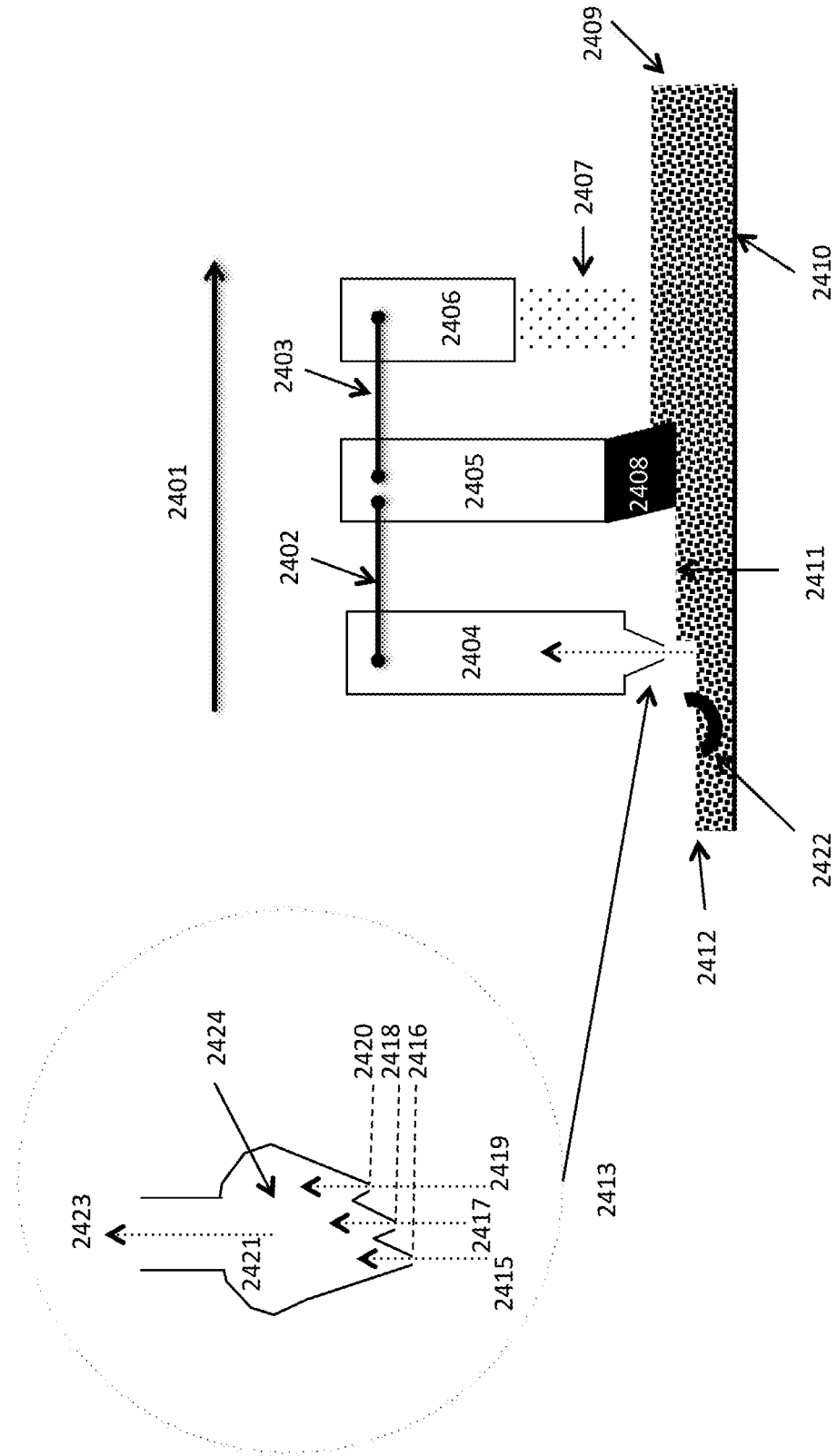
FIG. 24 schematically depicts vertical side cross sections of a mechanism for spreading and leveling and removing the powder material.

The powder dispensing mechanism may be integrated with both the powder removal system and the powder leveling system. FIG. 24 shows an example for an integration of the three systems. As the system moves along the direction 2401 above a powder bed 2409, the powder dispensing mechanism 2406 deposits powder material 2407. That delivery system is coupled (e.g., through 2403) to a powder leveling system 2405 that includes a leveling component 2408 (e.g., a knife) and levels the deposited powder material 2411. The powder leveling system is coupled (e.g., through 2402) to a powder removal system 2404 that removes the deposited and leveled powder material without contacting the top surface of the leveled powder layer 2411. The removal may utilize negative pressure (e.g., vacuum) as exemplified in FIG. 24, 2421.

Figure 25A:
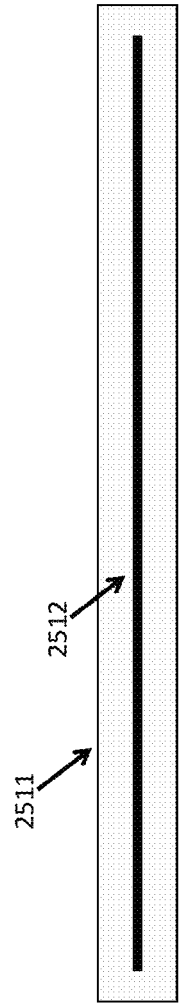
FIGS. 25A-25C schematically depict bottom views of various mechanisms for removing the powder material.
Figure 25B:
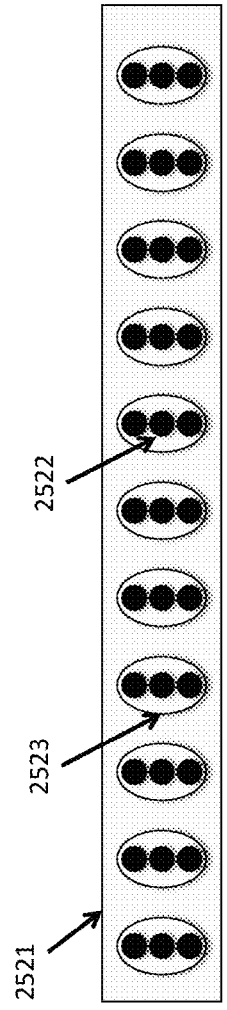
Figure 25C:
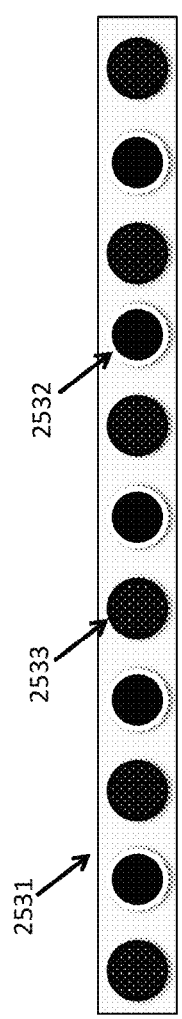

FIGS. 25A-C schematically depict bottom views of various mechanisms for removing the powder material. FIG. 25A schematically depicts a powder removal member 2511 having a powder entrance opening port 2512. FIG. 25B schematically depicts a powder removal member 2521 having manifolds (e.g., 2523) of multiple powder entrance opening ports (e.g., 2522). FIG. 25C schematically depicts an integrated powder dispensing-removal member 2531 having powder entrance opening ports (e.g., 2532), and powder exit opening ports (e.g., 2533).

The powder removal system can be oriented above, below, and/or to the side of the substrate (e.g., the substrate, the base or the powder bed). The powder removal system may rotate at an axis. The axis of rotation may be normal to the direction in which powder enters the powder removal system. In some examples, the powder removal system may not be rotatable. The powder removal system may be translatable horizontally, vertically or at an angle. The powder removal system may comprise a powder entrance opening and a powder exit opening port. The powder entrance and powder exit may be the same opening. The powder entrance and powder exit may be different openings. The powder entrance and powder exit may be spatially separated. The spatial separation may be on the external surface of the powder removal system. The powder entrance and powder exit may be connected. The powder entrance and powder exit may be connected within the powder removal system. The connection may be an internal cavity within the powder removal system. For example, FIG. 24 schematically shows a powder removal system 2404 having a nozzle 2413 opening through which the powder enters. The nozzle may comprise a single opening or a multiplicity of openings. The multiplicity of openings may be aggregated (e.g., in a nozzle). FIG. 24 schematically depicts a nozzle having three openings 2415, 2417, and 2419. The multiplicity of openings may be vertically leveled (e.g., aligned). In some instances, at least one opening within the multiplicity of openings may be vertically misaligned. In some examples, none of the openings may reside on the same vertical level. FIG. 24 exemplifies three openings that each resides on a different vertical level (e.g., 2416, 2418, and 2420).

The powder material may travel from the powder entry to the powder exit, through the internal cavity. For example, FIG. 24 shows a powder material that enters the openings 2415, 2417, and 2419 and travels through the internal cavity 2424 to an exit 2423. In some cases, the powder material can be dispensed from a top powder removal system that is located above the powder bed. The top powder removal system can remove powder from the powder bed from a position above the powder bed at a predetermined time, rate, location, removal scheme, or any combination thereof. In some examples, the powder removal system contacts the powder bed (e.g., the exposed surface of the powder bed). In some examples, the powder removal system does not contact the powder bed (e.g., the exposed surface of the powder bed). The powder removal system may be separated from the top surface of the powder bed (e.g., the exposed surface of the powder bed) by a gap. The gap may be adjustable. The vertical distance of the gap from the exposed surface of the powder bed may be at least about 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The vertical distance of the gap from the exposed surface of the powder bed may be at most about 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The vertical distance of the gap from the exposed surface of the powder bed may be any value between the aforementioned values (e.g., from about 0.5 mm to about 100 mm, from about 0.5 mm to about 60 mm, or from about 40 mm to about 100 mm). The top powder removal system may have at least one opening. The size of the opening, the shape of the opening, the timing and the duration of the opening may be controlled by a controller. The top-dispense powder dispenser can remove powder from a height that is higher compared to a surface of the top surface of the powder bed. The powder dispensing mechanism can remove powder from at least a fraction of the powder bed. The powder removal system may comprise a force that causes the powder material to travel from the powder bed towards the interior of the powder removal system. The powder removal system may comprise negative pressure (e.g., vacuum), electrostatic force, electric force, magnetic force or physical force. The powder removal system may comprise positive pressure (e.g., a gas) that causes the powder to leave the powder bed and travel into the openings of the powder removal pressure. The gas may comprise any gas disclosed herein. The gas may aid in fluidizing the powder material that remains in the powder bed. The removed powder material may be recycled and re-applied into the powder bed by the powder dispensing system. The powder may be continuously recycled through the operation of the powder removal system. The powder may be recycled after each layer of material has been deposited (e.g., and leveled). The powder may be recycled after several layers of material have been deposited (e.g., and leveled). The powder may be recycled after each 3D object has been printed.

Any of the powder removal systems described herein can comprise a reservoir of powder and/or a mechanism configured to deliver the powder from the reservoir to the powder dispensing system. The powder in the reservoir can be treated. The treatment may include heating, cooling, maintaining a predetermined temperature, sieving, filtering, or fluidizing (e.g., with a gas). A leveling mechanism (e.g., FIG. 11, 1103; FIGS. 12A-F, 1202, 1207, 1212, 1217, 1222, or 1227; or FIG. 15, 1503; such as a rake, roll, brush, spatula or blade) can be synchronized with the powder removing system.

Figure 23:
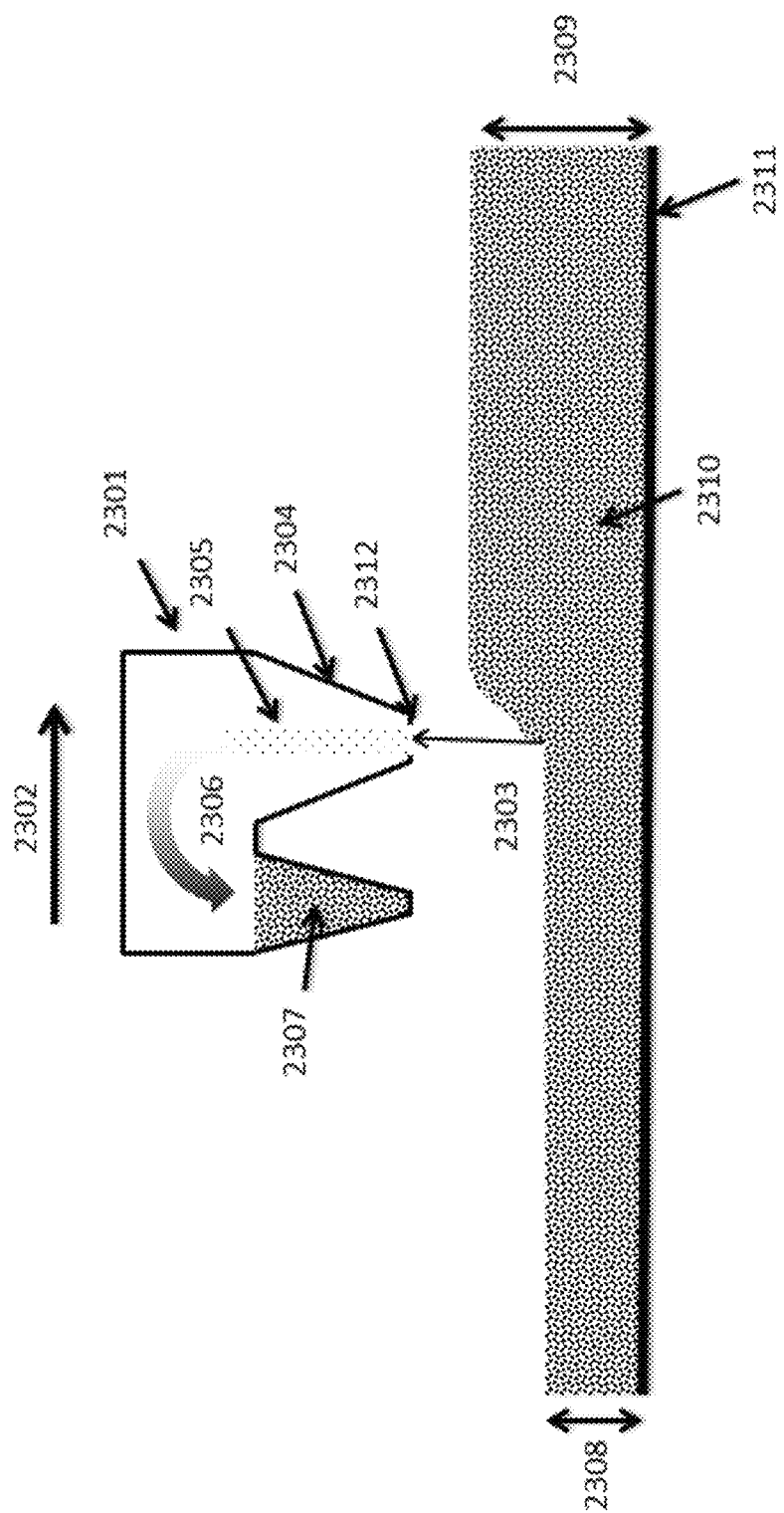
FIG. 23 schematically depicts a vertical side cross sections of a powder removal system (e.g., a suction device) described herein.

The powder removal mechanism may have an opening through which powder enters the suction device from the top surface of the powder bed (e.g., FIG. 23, 2312). The entrance chamber to which the powder enters the suction device (e.g., FIG. 23, 2305) can be of any shape. The entrance chamber can be a tube (e.g., flexible or rigid). The entrance chamber can be a funnel. The entrance chamber can have a rectangular cross section or a conical cross section. The entrance chamber can have an amorphic shape. The powder removal mechanism (e.g., suction device) may include one or more suction nozzles. The suction nozzle may comprise any of the nozzles described herein. The nozzles may comprise of a single opening or a multiplicity of openings as described herein. The openings may be vertically leveled or not leveled). The openings may be vertically aligned, or misaligned. In some examples, at least two of the multiplicity of openings may be misaligned. The multiplicity suction nozzles may be aligned at the same height relative to the substrate (e.g., FIG. 23, 2311), or at different heights (e.g., vertical height). The different height nozzles may form a pattern, or may be randomly situated in the suction device. The nozzles may be of one type, or of different types. The powder removal mechanism (e.g., suction device) may comprise a curved surface, for example adjacent to the side of a nozzle. Powder material that enters through the nozzle may be collected at the curved surface. The nozzle may comprise a cone. The cone may be a converging cone or a diverging cone. The powder removal mechanism (e.g., suction device) may comprise a powder reservoir. The powder that enters the powder removal mechanism may at times enter the powder removal mechanism reservoir. The reservoir can be emptied after each powder layer has been leveled, when it is filled up, at the end of the build cycle, or at a whim. The reservoir can be continuously emptied during the operation of the powder removal mechanism. FIG. 23, 2307 shows an example of a powder reservoir within the suction device. At times, the powder removal mechanism does not have a reservoir. At times, the powder removal mechanism constitutes a powder removal (e.g., a suction) channel that leads to an external reservoir. The powder removal mechanism may comprise an internal reservoir.

The powder removal mechanism may travel laterally before a leveling member (e.g., a roller) relative to the direction of movement. The powder removal mechanism may travel laterally after the leveling member, relative to the direction of movement. The powder removal mechanism may be part of the leveling member. The powder removal mechanism may be the leveling member. The powder removal mechanism may be connected to the leveling member (e.g., the roller). The powder removal mechanism may be disconnected from the leveling member. The powder removal mechanism may comprise an array of powder entries (e.g., suction devices or nozzles). The array of powder entries (e.g., nozzle, powder openings, or an aggregate of openings) may be spaced apart evenly or unevenly. The array of powder entries may be spaced apart at most about 0.1 mm, 0.3 mm, 0.5 mm, 1 mm, 1.5 mm, 2 mm, 3 mm, 4 mm, or 5 mm. The array of the powder entries may be spaced apart at least about 0.1 mm, 0.3 mm, 0.5 mm, 1 mm, 1.5 mm, 2 mm, 3 mm, 4 mm, or 5 mm. The array of powder entries may be spaced apart between any of the afore-mentioned spaces of the leveling members (e.g., from about 0.1 mm to about 5 mm, from about 0.1 mm to about 2 mm, from about 1.5 mm to about 5 mm).

A controller may control the powder removal system. The controller may control the speed (velocity) of lateral movement of the powder removal system. The controller may control the level of pressure (e.g., vacuum or positive pressure) in the powder removal system. The pressure level (e.g., vacuum or positive pressure) may be constant or varied. The pressure level may be turned on and off manually or by the controller. The pressure level may be less than about 1 atmosphere pressure (760 Torr). The pressure level may be any pressure level disclosed herein. The controller may control the amount of force exerted or residing within the powder removal system. For example, the controller may control the amount of magnetic force, electric force, electrostatic force or physical force exerted by the powder removal system. The controller may control if and when the aforementioned forces are exerted.

The powder dispensing mechanism can be oriented above, and/or below the powder bed (or the container thereof). The powder dispensing mechanism may rotate at an axis. The axis of rotation may be normal to the direction in which powder exits the powder dispensing mechanism. In some examples, the powder dispensing mechanism may not be rotatable. The powder dispensing mechanism may translatable horizontally, vertically or at an angle. The axis of rotation of the powder dispensing mechanism may be normal or parallel to the direction of translation. The powder dispensing mechanism may comprise a powder entrance opening and a powder exit opening port. The powder entrance and powder exit may be the same opening. The powder entrance and powder exit may be different openings. The powder entrance and powder exit may be spatially separated. The spatial separation may be on the external surface of the powder dispensing mechanism. The powder entrance and powder exit may be connected. The powder entrance and powder exit may be connected within the powder dispensing mechanism. The connection may be an internal cavity within the powder dispensing mechanism. The powder material may travel from the powder entry to the powder exit, through the internal cavity. In some cases, the powder material can be dispensed from a top-dispense powder dispenser that is located above the substrate. The top-dispense powder dispenser can release powder on to the substrate from a position above the substrate at a predetermined time, rate, location, dispensing scheme, or any combination thereof. The top-dispense powder dispenser may have at least one opening. The size of the opening, the shape of the opening, the timing and the duration of the opening may be controlled by a controller. The top-dispense powder dispenser can release powder on to the substrate from a height that is higher compared to a surface of the substrate. The powder dispensing mechanism can dispense powder onto at least a fraction of the substrate 904. The powder dispensing mechanism may comprise openings through which gas can travel through. The gas may comprise any gas disclosed herein. The gas may aid in fluidizing the powder material that resides in the powder dispenser reservoir, or that is dispensed from the powder dispensing mechanism.

Figure 27C:
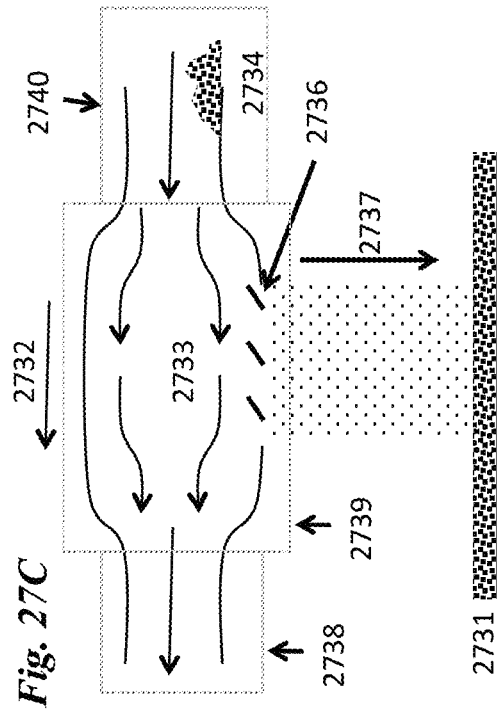
FIGS. 27A-27D schematically depict vertical side cross sections of various powder dispensing members described herein.

The powder dispensing mechanism may comprise a chamber through which gas flows. The powder dispensing mechanism chamber may comprise a single compartment or a multiplicity of compartments. The multiplicity of compartments may have identical or different vertical cross sections, horizontal cross sections, surface areas, or volumes. The walls of the compartments may comprise identical or different materials. The multiplicity of compartments may be connected such that gas may travel (flow) from one compartment to another (termed herein "flowably connected"). The multiplicity of compartments may be connected such that powder material that was picked up by the gas (e.g., airborne powder material) may travel (flow) from one compartment to another. FIG. 27C shows examples of a powder dispensing mechanism having three compartments of various vertical cross sections (2738, 2739, and 2740) that are flowably connected as illustrated by the gas flow 2733 within the internal cavity of the powder dispensing mechanism. The powder dispensing mechanism chamber may comprise a gas entrance, gas exit, powder entrance, and powder exit. In some examples, the powder dispensing mechanism chamber may be comprised of two powder exits. The gas entrance and the powder material entrance may be the same or different entrances. The gas exit and the powder material exit may be the same or different entrances. The portion that faces the substrate, the base, or the exposed surface of the powder bed is designated herein as the bottom portion. The portion that faces away from the substrate, the base, or the exposed surface of the powder bed is designated herein as the top portion. The portion that is different from the top or the bottom portion is designated herein as the side portion. In some examples, a powder exit faces the substrate, the base, or the exposed surface of the powder bed. In some examples, a powder exit resides at the bottom of the powder dispensing system. The bottom exit may comprise a mesh, slit, hole, slanted baffle, shingle, ramp, slanted plane or any combination thereof. For example, FIG. 27A shows an example of a mesh 2715 at the bottom of the powder dispensing mechanism; FIG. 27B shows an example of a combination of a mesh 2725 and slanted baffles (e.g., 2726); and FIG. 27C shows an example of slanted baffles (e.g., 2736) at the bottom of the powder dispensing mechanism.

The mesh may have any mesh values disclosed herein. In some examples, the mesh can comprise hole sizes of at least about 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, or 1000 µm. The mesh can comprise hole sizes of at most about 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, or 1000 µm. The mesh can comprise hole sizes between any of the hole sizes disclosed herein. For example, the mesh can comprise hole sizes from about 5 µm to about 1000 µm, from about 5 µm to about 500 µm, from about 400 µm to about 1000 µm, or from about 200 µm to about 800 µm.

Figure 27D:
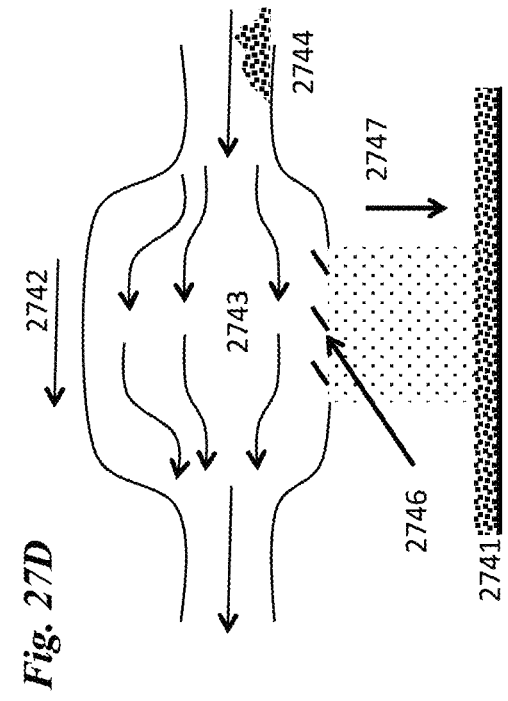
Figure 27A:
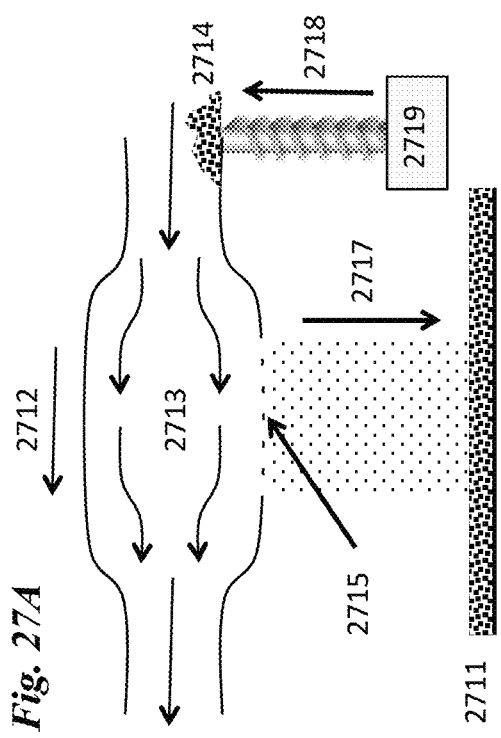
Figure 27B:
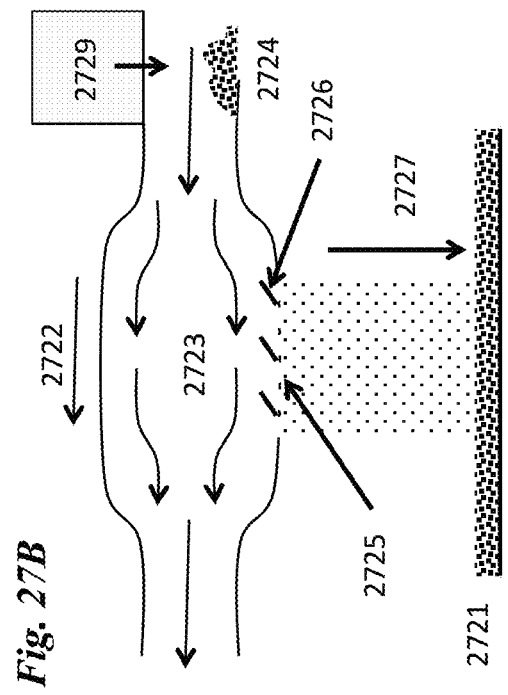

The chamber in which the bottom opening is situated can be symmetrical with respect to the incoming gas (e.g., FIG. 27A), or unsymmetrical (e.g., FIG. 27D). The direction of the gas flow can coincide with the direction of lateral movement of the powder dispensing system, not coincide, or flow opposite thereto. For example, FIG. 27A schematically shows a powder dispensing mechanism where the direction of the gas flow 2713 coincides with the direction of lateral movement of the powder dispensing system 2712. The powder can be disposed away from the bottom opening. The powder can be supplied from a reservoir. The supply of the powder can be from the top of the powder dispensing chamber, from the bottom, or from the side. For example, FIG. 27A shows a powder reservoir 2719 that delivers powder from the bottom of the powder dispenser chamber. The powder can be elevated by an elevation mechanism. The elevation mechanism can comprise a conveyor or an elevator. The elevation mechanism can comprise a mechanical lift. The elevation mechanism can comprise an escalator, elevator, conveyor, lift, ram, plunger, auger screw, or Archimedes screw. The elevation mechanism can comprise a transportation system that is assisted by gas (e.g., pressurized gas), gravity, electricity, heat (e.g., steam), or gravity (e.g., weights). The conveyor may be coarse; the conveyor may comprise ledges, protrusions, or depressions. The protrusions or depressions may trap powder material to be conveyed to the chamber interior where gas flows from one side to the other. FIG. 27B shows a powder reservoir 2729 that delivers powder from the top of the powder dispenser chamber. The powder delivery can include any other top-powder delivery methods described herein.

The gas may travel within the powder dispensing mechanism chamber at a velocity. The velocity may be varied. The velocity may be variable or constant. The velocity may be at least about 0.001 Mach, 0.03 Mach, 0.005 Mach, 0.07 Mach, 0.01 Mach, 0.03 Mach, 0.05 Mach, 0.07 Mach, 0.1 Mach, 0.3 Mach, 0.5 Mach, 0.7 Mach, or 1 Mach. The velocity may be varied. The velocity may be variable or constant. The velocity may be at most about 0.001 Mach, 0.03 Mach, 0.005 Mach, 0.07 Mach, 0.01 Mach, 0.03 Mach, 0.05 Mach, 0.07 Mach, 0.1 Mach, 0.3 Mach, 0.5 Mach, 0.7 Mach, or 1 Mach. The velocity may be between any of the aforementioned velocity values. For example, the velocity may be from about 0.01 Mach to about 0.7 Mach, from about 0.005 Mach to about 0.01 Mach, from about 0.05 Mach to about 0.9 Mach, from about 0.007 Mach to about 0.5 Mach, or from about 0.001 Mach to about 1 Mach. Mach as used herein refers to Mach number that represents the ratio of flow velocity past a boundary to the local speed of sound.

Any of the powder dispensing mechanisms described herein (e.g., FIG. 9, 905; FIG. 13C, 1318; or FIG. 15, 1508) can comprise a reservoir of powder and a mechanism configured to deliver the powder from the reservoir to the powder bed. Powder in the reservoir can be preheated, cooled, be at an ambient temperature or maintained at a predetermined temperature. A leveling mechanism (e.g., FIG. 11, 1103; FIG. 12A-F, 1202, 1207, 1212, 1217, 1222, or 1227; or FIG. 15, 1503; such as a rake, roll, brush, spatula or blade) can be synchronized with the powder dispenser.

A controller may control the powder dispensing mechanism. The controller may control the speed (velocity) of lateral movement of the powder dispensing mechanism. When applicable, the controller may control gas velocity in the powder dispensing system. The controller may control type of gas that travels within the powder dispensing system. The controller may control the amount of powder material released by the powder dispensing system. The controller may control the position in which the powder is deposited in the powder bed. The controller may control the radius of powder deposition in the powder bed. The controller may control the rate of powder deposition in the powder bed. The controller may control the vertical height of the powder dispensing system. The controller may control the gap between the bottom of the powder dispensing system and the top surface of the powder bed. The controller may control the gap between the opening of the powder dispensing system and the slanted plane that is included in the powder dispensing system. The controller may control the angle (theta) of that slanted plane. The controller may control the rate of vibration of the vibrators that are part of the powder dispensing system (e.g., FIG. 28, 2836). For example, the controller may control the rate of vibration of the powder in the powder reservoir within the powder dispensing system.

Figure 15:
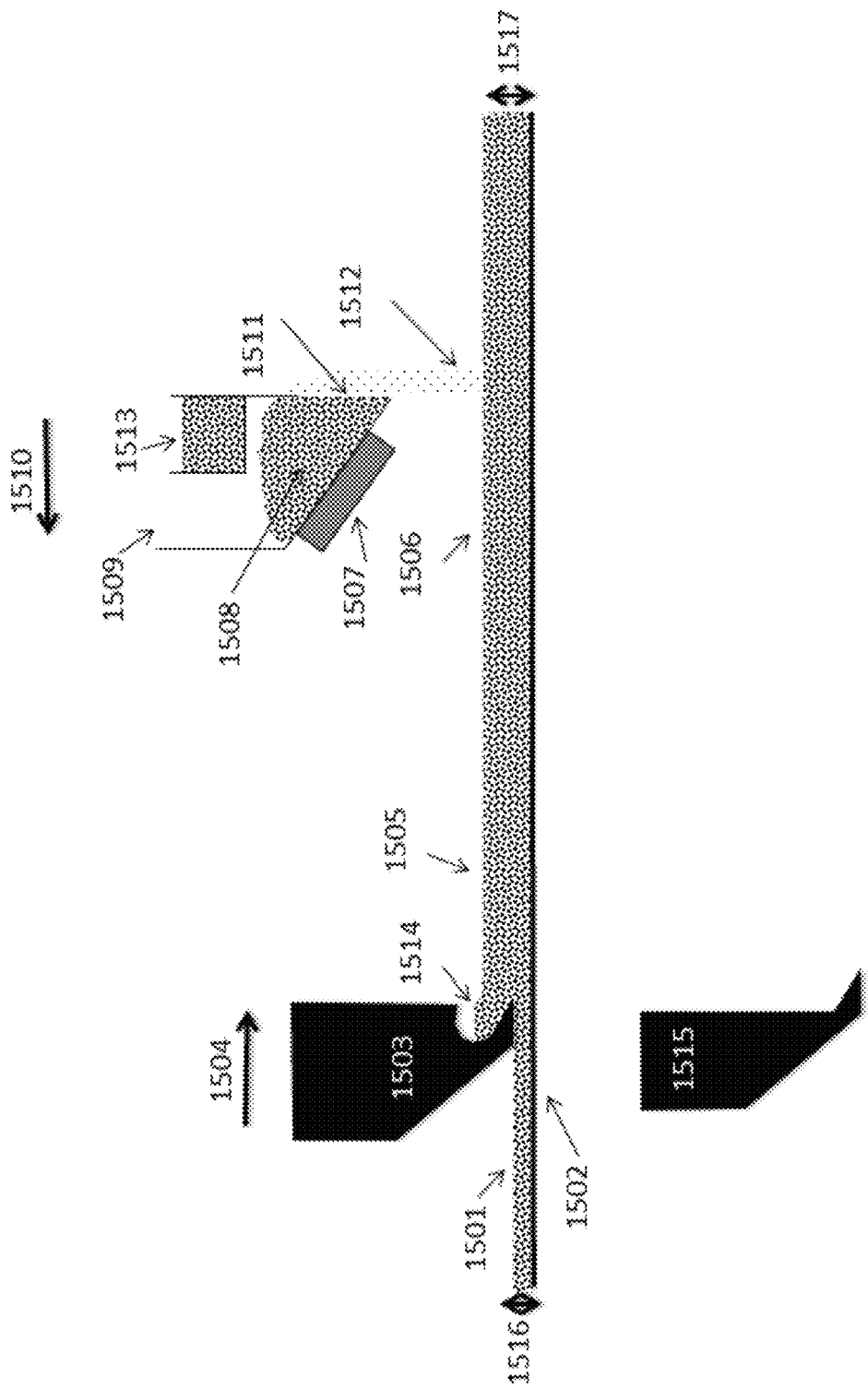
FIG. 15 schematically depicts vertical side cross sections of a leveling mechanism and a powder dispenser.

The layer dispensing mechanism can dispense the powder material, level, distribute, spread, and/or remove the powder in the powder bed. The leveling mechanism can level, distribute and/or spread the powder in the powder bed. The leveling mechanism can reduce the height of the powder layer deposited (e.g., on the top of the powder bed or within the container accommodating the powder bed). The leveling mechanism can relocate, cut, shear or scrape off a top portion of the powder layer. In some examples, the leveling mechanism can remove (e.g., evacuate) the powder material. In some examples, the removal of the powder material can be performed by a separate mechanism that is connected to the powder leveling mechanism (e.g., powder removal mechanism). For example, FIG. 15 shows a leveling mechanism 1503 that reduced the height level from a height of 1517 to a smaller height of 1516. The leveling can take place as the powder is dispensed by the powder dispenser, or after the powder is dispensed by the powder dispenser. The leveling can be synchronized with the powder dispensing mechanism. The leveling operation can be separate from the powder dispensing operation. The leveling operation can be integrated with the powder dispensing operation. The leveling mechanism may be heated or cooled. At least some of the components of the leveling mechanism may be heated or cooled. The leveling mechanism may comprise openings through which gas may travel through. The gas may be any gas disclosed herein. The gas may aid in fluidizing the powder material. In some embodiments, the leveling member (e.g., leveling mechanism) enables the powder to be substantially evenly distributed across a powder bed. The leveling member may be exchangeable, removable, non-removable or non-exchangeable. The leveling member may comprise exchangeable parts. The leveling member may distribute powder across the powder bed. The leveling member may be a part of the powder dispensing mechanism (e.g., powder dispenser). The rake (e.g., FIG. 11, 1103) is an example of a leveling member. The leveling member can provide powder uniformity across the bed such that portions of the bed that are separated from one another by at least about 1 mm, 2 mm, 3 mm, 4 mm, 5 mm, or 10 mm, have a height deviation of at most about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80 µm, 70 µm, 60 µm, 50 µm, 40 µm, 30 µm, 20 µm, or 10 µm; or of any value between the afore mentioned height deviation values. For example, the leveling member can provide powder uniformity across the bed such that portions of the bed that are separated from one another by a distance of from about 1 mm to about 10 mm, have a height deviation from about 10 mm to about 10 µm. The leveling member may achieve a deviation from a planar uniformity in at least one plane (e.g., horizontal plane) of at most about 20%, 10%, 5%, 2%, 1% or 0.5%, as compared to the average plane (e.g., horizontal plane) created by the top of the powder bed.

Figure 12A:
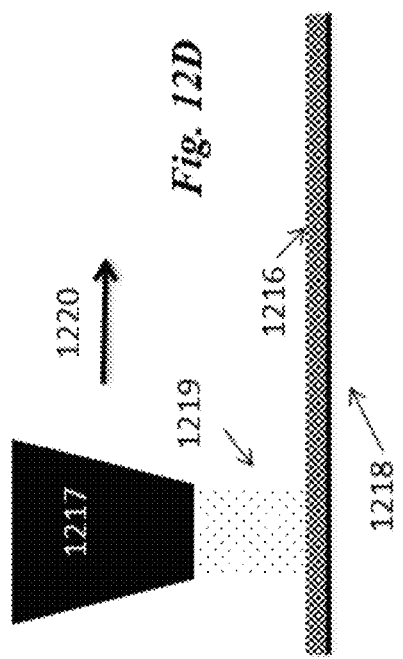
FIGS. 12A-12F schematically depict vertical side cross sections of various mechanisms for spreading and/or leveling the powder material.
Figure 12B:
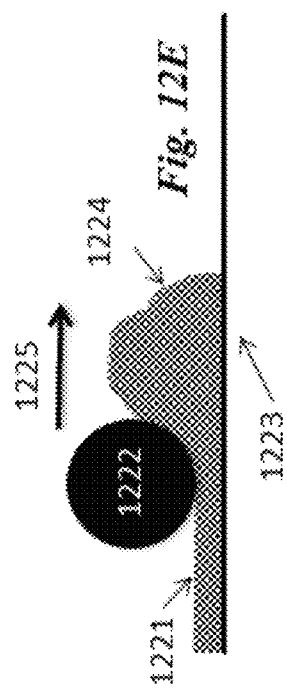
Figure 12D:
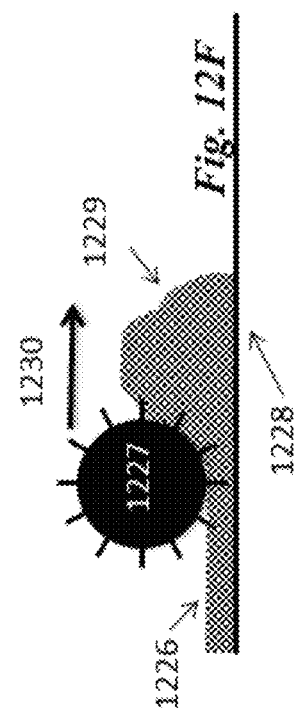
Figure 12C:
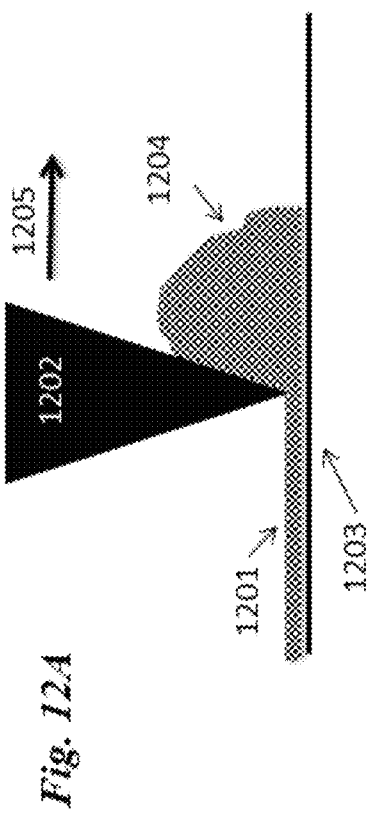
Figure 12E:
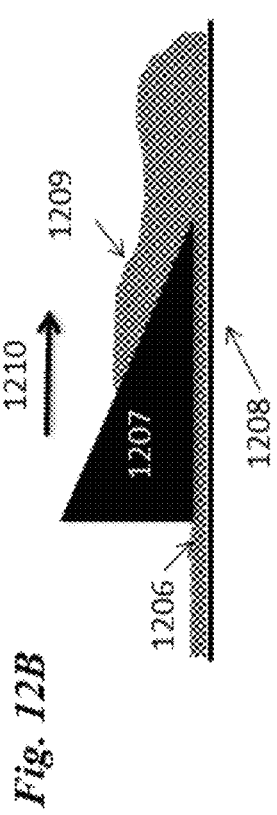
Figure 12F:
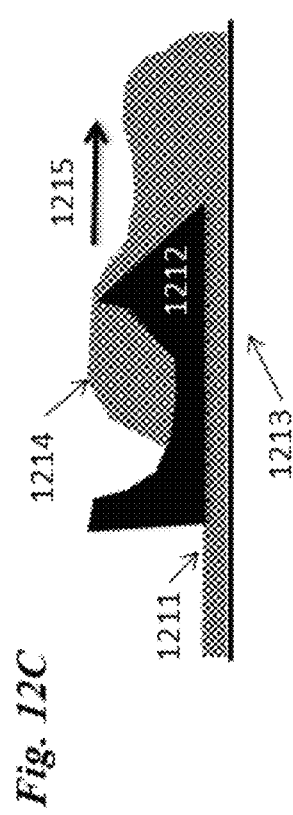

FIG. 12A-F schematically depict vertical side cross sections of various mechanisms for spreading and/or leveling the powder material. FIG. 12A schematically depicts a knife 1207 situated substantially perpendicular to the surface 1203 moving in the direction 1205. FIG. 12B schematically depicts a knife 1207 situated substantially parallel to the surface 1208 moving in the direction 1210. FIG. 12C schematically depicts a knife 1212 situated substantially parallel to the surface 1213 moving in the direction 1215. FIG. 12D schematically depicts a sprinkler 1217 situated moving in the direction 1220. FIG. 12E schematically depicts a roller 1222 situated substantially parallel to the surface 1223 moving in the direction 1225. FIG. 12F schematically depicts a roller 1227 situated substantially parallel to the surface 1228 moving in the direction 1230.

FIGS. 14A-D schematically depict vertical side cross sections of various mechanisms for spreading and leveling the powder material; parallelograms 1413, 1423, 1426, 1446, 1447, 1453, and 1456 schematically depict a schematic representation of any blade described herein; rectangles 1415, 1424, 1444 and 1454 schematically depict a schematic representation of any powder dispenser described herein.

FIG. 24 schematically depicts vertical side cross sections of a mechanism for spreading, leveling, and removing the powder material. In this figure, parallelogram 2408 depicts a schematic representation of any blade described herein, rectangle 2406 depict a schematic representation of any powder dispenser described herein, and rectangle 2404 depict a schematic representation of any powder removal member described herein.

In some examples, the leveling member comprises a roller (e.g., a cylinder). The roller may comprise one or more opening ports (i.e., powder exit ports) thorough which powder material can exit the roller. The exits may be located along the rectangular cross section of the roller (e.g., cylindrical roller). The rectangular cross section of the roller may comprise the height of the roller. The powder exit ports may be situated randomly or in a pattern along the rectangular cross section of the roller. The powder exit ports may be situated along a line within the rectangular cross section of the roller. The roller may comprise at least one opening port from which the powder enters the roller (i.e., the powder entrance port). The powder entrance may be situated at the circular surface area of the roller (e.g., the side of the roller), at its rectangular surface area, or at both circular of rectangular surfaces. An opening (e.g., port) may be in the form comprising an ellipse (e.g., a circle), parallelogram (e.g., rectangle or a square), triangle, any other geometric shape, an irregular shape, or any partial shape or combination of shapes thereof. The roller may comprise an internal cavity that connects the powder at least one entrance port and the one or more powder exit ports. The internal cavity may allow the powder to flow from the entrance port to the exit port, thus forming a fluid connection between the one or more entrance and exit ports. The powder material may travel (e.g., flow) though the internal cavity from the powder entrance to the powder exit. The shape and/or size of the powder opening port may determine the amount of powder distributed from the roller. The roller may be rotatable. The roller may rotate along its height (e.g., along its long axis). The long axis of the roller may span the entire powder bed, or a part of the powder bed. The rate of rotation of the roller (revolutions of the roller) may determine the amount of powder distributed by the roller. The rate of rotation may determine the area of powder distributed by the roller. The roller may be coupled to a control system. The control system may control the rate of rotations of the cylinder and/or the rate of its lateral (e.g., along a powder bed), horizontal or angular movement.

Figure 22:
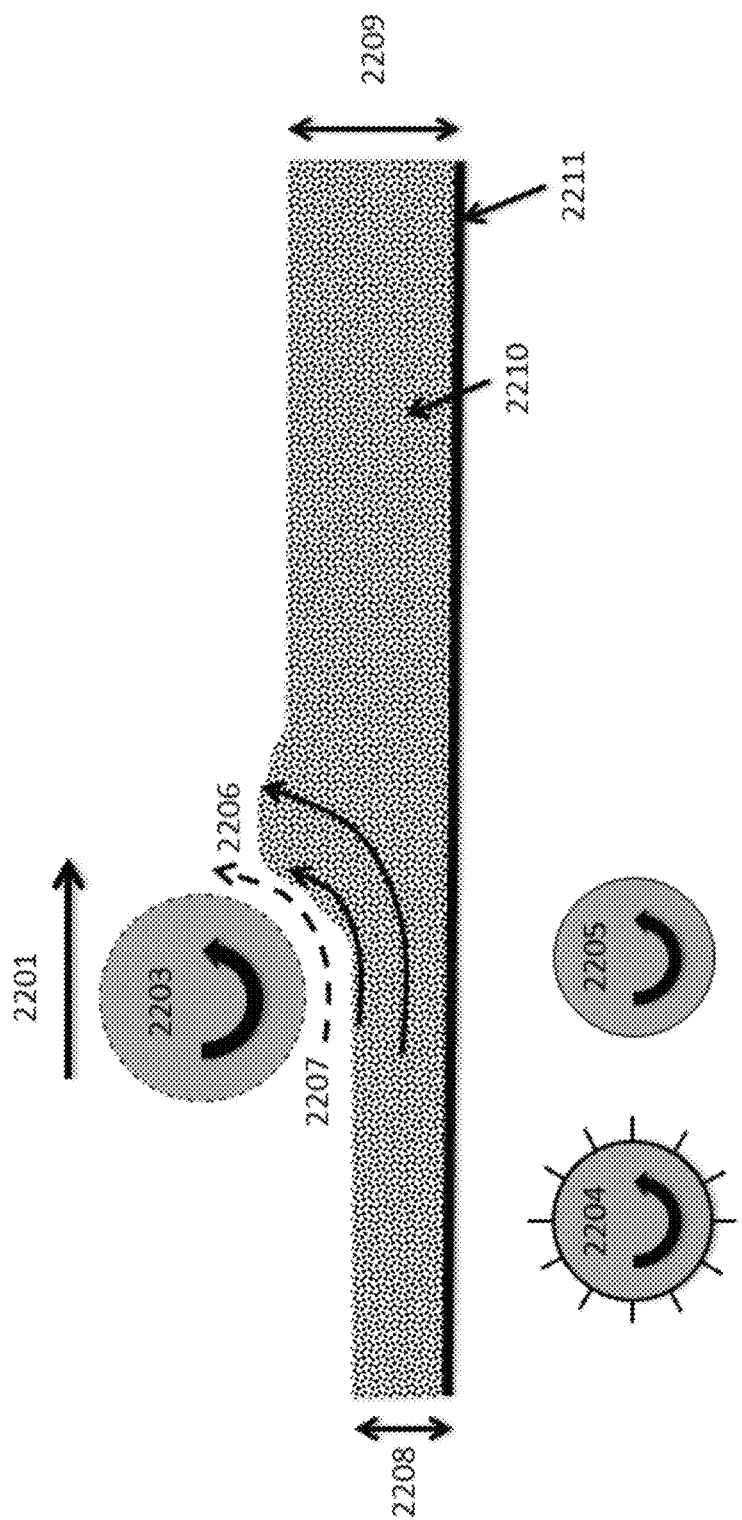
FIG. 22 schematically depicts a vertical side cross sections of a roll described herein.

The roller may comprise a smooth surface, a rough surface, an indentation, a depression, or a cavity. The roller may be any of the rollers disclosed herein. FIGS. 22, 2203, 2204 and 2205 shows examples of various alternative rollers described herein. The roller of the leveling mechanism may at times rotate in the direction of lateral movement of the leveling mechanism, or in a direction opposite of the direction of lateral movement of the leveling mechanism. FIG. 22, 2201 shows examples of the lateral movement direction of roller 2203. In this example, roller 2203 rotates opposite to the direction of movement of the leveling mechanism, along an axis that is both the long axis of the roller and normal to the lateral direction of the movement of the roller (2201). When the roller revolves (rotates), it may induce movement of any atmosphere surrounding the roller. FIG. 22, 2207 shows examples of the movement of atmosphere surrounding the roller. The roller may be situated at a first distance above the surface of the layer of powder material. The diameter of the roller may be at least 1*, 5*, 10*, 50*, 100*, 500*, or more times (i.e., "*") the first distance. The first distance may be at least about 10 µm, 50 µm, 100 µm, 150 µm, 200 µm, 250 µm, 300 µm, 350 µm, 400 µm, 450 µm, 500 µm, 550 µm, or 600 µm. The first distance may be at most about 10 µm, 50 µm, 100 µm, 150 µm, 200 µm, 250 µm, 300 µm, 350 µm, 400 µm, 450 µm, 500 µm, 550 µm, or 600 µm. The first distance may be any value between the afore-mentioned first distance values. For example, the first distance may be from about 10 µm to about 400 µm, from about 300 µm to about 600 µm, or from about 250 µm to about 450 µm. In some instances, the movement of the atmosphere surrounding the roller may induce movement of the powder in the direction of movement. In some instances, the powder may be suspended within the moving portion of the atmosphere. The velocity of movement of the atmosphere may be highest within the narrowest distance between the roller and the surface of the powder material. The atmosphere around the roller may comprise circular movement of atmosphere portions. The atmosphere around the roller may comprise laminar movement of atmosphere portions. In some instances, when the roller rolls in the direction (e.g., clockwise) of its lateral movement, powder may be pushed downwards into the powder bed (e.g., FIG. 22, 2210 depicting the powder bed). In some instances, when the roller rolls in the direction opposite (e.g., counter clockwise) to the direction of its lateral movement, powder may be directed upwards (e.g., FIG. 22, depicting solid arrows 2206 designating the direction of powder movement). The rotating roller may generate a motion opposite (e.g., counter clockwise) to the lateral translational movement of the roller across the powder bed. The opposite motion may comprise moving the powder forward (relative to the lateral motion of the roller). The opposite motion may comprise moving the powder upwards (e.g., above the top surface of the powder layer). The opposite motion may comprise moving the powder both forward (relative to the lateral motion of the roller) and upwards (e.g., above the surface of the powder layer). The upward and forward moving powder may form a boundary layer above the top leveled surface of the powder bed. The rotation of the roller may proceed to form the boundary layer until a predetermined height of powder is achieved. The roller may comprise a powder trapping compartment to trap any powder material that travels to the direction behind the roller (relative to its lateral motion). The powder trapping compartment may be in the form of a curved surface (e.g., a cup or a spoon). In some examples, when the powder is thrown upwards, a powder removal mechanism (e.g., powder suction device) may collect the excess of powder from the surface. FIG. 23, 2301 shows an example of a powder removal mechanism. The leveling mechanism may span the entire width of the powder bed, entire length of the powder bed, or a portion of the powder bed. The leveling mechanism may comprise an array of leveling members. The array of leveling members may be spaced apart evenly or unevenly. The array of leveling members may be spaced apart at most about 0.1 mm, 0.3 mm, 0.5 mm, 1 mm, 1.5 mm, 2 mm, 3 mm, 4 mm, or 5 mm. The array of leveling members may be spaced apart at least about 0.1 mm, 0.3 mm, 0.5 mm, 1 mm, 1.5 mm, 2 mm, 3 mm, 4 mm, or 5 mm. The array of leveling members may be spaced apart between any of the aforementioned spaces of the leveling members. For example, array of leveling members may be spaced apart from about 0.1 mm to about 5 mm, from about 1.5 mm to about 5 mm, or from about 0.1 mm to about 2 mm.

A controller may be operatively coupled to the leveling member and control (e.g., direct and/or regulate) the leveling member. The controller may control the rate of lateral movement of the roller. The controller may control the revolution rate of the roller. The controller may control the direction of the rotation of the roller. The controller may control the amount indentations or depressions on the surface of the roller. The controller may control the degree of indentations or depressions on the surface of the roller. The controller may control the temperature of the roller. The controller may control the roughness of the surface of the roller. The controller may control the roughness of the powder surface created by the roller.

In some examples, the leveling mechanism (e.g., leveling member) prevents the accumulation of powder in the direction of movement of the leveling member (e.g., a lateral movement). In some instances, the leveling mechanism comprises a blade. The blade may be of any blade shape disclosed herein. The blade may comprise a concave or convex plane. The blade may be able to level the powder material and cut, remove, shear or scoop the unwanted powder material. The blade may have a shape of a scoop, or shovel. The blade may have a shape of the letter "L" (e.g., FIG. 15, 1515 depicting an alternative blade). The blade may have an indentation, depression, or cavity. The indentation can be of any shape. For example, the indentation can comprise a shape having an elliptical (e.g., circular), rectangular (e.g., square), triangular, pentagonal, hexagonal, octagonal, any other geometric shape, or a random shape. The blade may have an indentation that is able to cut, push, lift and/or scoop the powder material as it moves (e.g., laterally). FIG. 15 shows an example of a blade 1503 having an indentation 1514 in which powder is scooped as the blade moves laterally in the direction 1504. In some instances, the blade can scoop at least about 0.1 cm$^3$, 0.15 cm$^3$, 0.2 cm$^3$, 0.25 cm$^3$, 0.3 cm$^3$, 0.35 cm$^3$, 0.4 cm$^3$, 0.45 cm$^3$, 0.5 cm$^3$, or 0.55 cm$^3$ of powder material. The blade can scoop at most about 0.1 cm$^3$, 0.15 cm$^3$, 0.2 cm$^3$, 0.25 cm$^3$, 0.3 cm$^3$, 0.35 cm$^3$, 0.4 cm$^3$, 0.45 cm$^3$, 0.5 cm$^3$, 0.55 cm$^3$, 0.6 cm$^3$, 0.65 cm$^3$, 0.7 cm$^3$, 0.8 cm$^3$, or 0.9 cm$^3$ of powder material. The blade can scoop powder material between any of the aforementioned quantities of powder material. For example, the blade can scoop powder material in a volume from about 0.1 cm$^3$ to about 0.55 cm$^3$, from about 0.1 cm$^3$ to about 0.3 cm$^3$, or from about 0.25 cm$^3$ to about 0.55 cm$^3$.

The blade may comprise at least one slanted plane. For example, the part closer to the tip of the blade may comprise at least one slanted plane (e.g., in FIG. 20, the blade part closer to the tip of blade 1503, is 2005). The blade may comprise a first slanted plane, which may form an angle delta ($\delta$) with average plane formed by the top surface of the layer of powder material, the substrate or the base (e.g., FIG. 20, 2001). The blade may comprise a second slanted plane, which may form an angle zeta ($\xi$) with average plane formed by the top surface of the layer of powder material, with the substrate or with the base (e.g., 2003). The first and second slanted planes may be curved or planar. The first and second plane may for a symmetric blade with the axis of symmetry in the center between the two planes. The first and second plane may form an asymmetric blade in relation to the axis of symmetry in the center between the two planes. The blade may comprise at least one plane perpendicular to the average plane formed by the top surface of the layer of powder material. In the direction of movement, the angle delta may be an acute positive angle or an obtuse positive angle (i.e., in counter-clockwise direction). The angles delta and zeta may be equal. The angles gamma and zeta may be different. Gamma may be larger than zeta. Zeta may be larger than delta. Viewed from the same direction, the angles delta, zeta or both may be obtuse angles. Viewed from the same direction, the angles gamma, zeta or both may be acute angles. Viewed from the same direction, the angles gamma, zeta or both may be rights angles. The first and second planes may be parallel to each other. The first and second planes may be non-parallel to each other. Zeta and/or delta may be at least about 1°, 5°, 10°, 15°, 20°, 30°, 40°, 50°, 60°, 70°, 80°, 90°, 100°, 120°, 125°, 130°, 135°, 140°, 145°, 150°, 155°, 160°, 165°, 170°, 175° (degrees) or more. Delta and/or zeta may be at most about 5°, 10°, 15°, 20°, 30°, 40°, 50°, 60°, 70°, 80°, 90°, 100°, 120°, 125°, 130°, 135°, 140°, 145°, 150°, 155°, 160°, 165°, 170°, 175° or less. Delta and/or zeta may be of any value between the afore-mentioned degree values for delta and/or zeta. For example, delta and/or zeta may be of a value from about 1° to about 175°, from about 1° to about 90°, from about 90° to about 175°, or from about 15° to about 135°.

Figure 20:
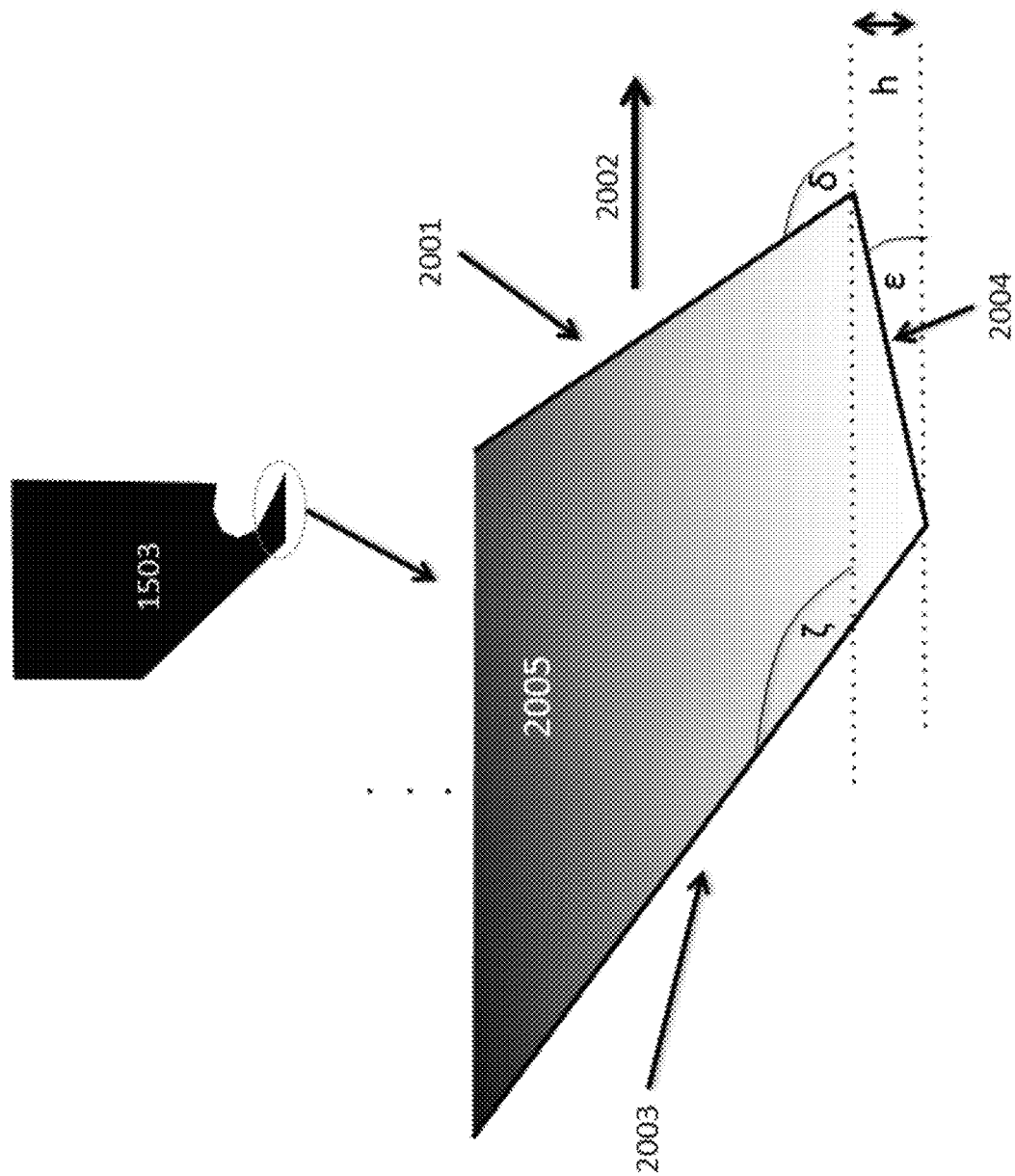
FIG. 20 schematically depicts vertical side cross sections of a knife having a tapered bottom.

The blade may comprise a tapered bottom plane (e.g., a chamfer). The tapered bottom plane may be planar or curved. The blade may comprise a planar or a curved plane. The radius of curvature may be above the tapered bottom plane (e.g., away from the direction of the substrate), or below the tapered bottom plane (e.g., towards the direction of the substrate). For example, FIG. 20 shows a bottom of a blade 2001 that is tapered in the direction of movement 2002, and is planar. The tapered bottom plane (e.g., a planar plane) may form an angle epsilon ($\delta$) with the average top surface of the powder material, with the substrate or with the base, or with a plane parallel thereto. The angle may be a positive acute angle or a positive obtuse angle. The blade angle (delta "$\delta$") may form a positive obtuse angle, and the tapered bottom angle (epsilon) may form a positive acute angle when viewed from the same viewing position. The blade angle (delta) may form a positive obtuse angle, and the tapered bottom angle (epsilon) may form a positive acute angle. The blade angle (delta) may form a positive acute angle, and the tapered bottom angle (epsilon) may form a positive obtuse angle. The blade may be substantially perpendicular to the average surface of the layer of powder material, the substrate, or the base. For example, FIG. 20 shows a blade forming an obtuse positive angle delta ($\delta$), having a tapered bottom, which forms a positive acute angle epsilon ($\epsilon$). In some instances, both the blade angle delta and the tapered bottom angle epsilon may form positive obtuse angles. In some instances, both the blade angle delta and the tapered bottom angle epsilon may form positive obtuse acute. Epsilon and delta may have a different value. Positive angles may be counter-clockwise angles. Positive may be designated as a first direction. Both positive angles may be positive when viewed from the same viewing position. Epsilon may be at least about 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 30°, 40°, or 50°. Epsilon may be at most about 0.1°, 0.2°, 0.3°, 0.4°, 0.5°, 0.6°, 0.7°, 0.8°, 0.9°, 1°, 2°, 3°, 4°, 5°, 6°, 7°, 8°, 9°, 10°, 15°, 20°, 30°, 40°, or 50°. Epsilon may be of any value between the aforementioned degree values for epsilon. For example, epsilon may be of a value from about 0.1° to about 50°, from about 0.1° to about 20°, from about 20° to about 50°, or from about 10° to about 30°.

In some instances, the tapered bottom is of a smaller height as compared to the height of the entire blade. An example of the relative heights is shown in FIG. 20, depicting "h" as the height of the tapered end. In some instances, "h" is at least about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.7 mm, 1.8 mm, 1.9 mm, or 2.0 mm. In some instances, "h" is at most 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.7 mm, 1.8 mm, 1.9 mm, or 2.0 mm. In some instances, "h" is any value between the afore-mentioned heights "h." For example, "h" may be from about 0.1 mm to about 2.0 mm, from about 0.1 mm to about 1.0 mm, from about 0.9 mm to about 2.0 mm, or from about 0.7 mm to about 1.5 mm.

At least part of the blade may comprise elemental metal, metal alloy, an allotrope of elemental carbon, ceramic, plastic, rubber, resin, polymer, glass, stone, or a zeolite. At least part of the blade may comprise a hard material. At least part of the blade may comprise a soft material. The at least part of the blade may comprise the tip of the blade; the bottom of the blade facing the bottom of the container, the substrate or the base. At least part of the blade may comprise a material that is non bendable during the leveling of the powder material. At least part of the blade may comprise a material that is substantially non-bendable when pushed against the powder material during the leveling process. At least part of the blade may comprise a material that is bendable when pushed against object comprising a transformed powder material that was allowed to harden. At least part of the blade may comprise a material that is substantially non-bendable during the leveling of the powder material, or during removal of an object comprising a transformed powder material that was allowed to harden. At least part of the blade may comprise an organic material. At least part of the blade may comprise plastic, rubber or Teflon®. The blade may comprise a material to which the powder material does not cling. At least part of the blade may comprise a coating to which the powder material does not cling. At least part of the blade may be charged to prevent clinging of the powder material.

The blade may comprise compliant mounting. The blade may be able to pivot or swivel relative to the compliant mounting. The blade may be suspended on springs. The spring may be attached to the compliant mounting. The blade may be permanently fastened (e.g., to the compliant mounting). In some embodiments, the blade may be prevented from pivoting. In some embodiments, the blade may be prevented from swiveling. The blade may be exchangeable, removable, non-removable, or non-exchangeable. FIG. 14A schematically shows a blade 1413 (which represents any blade described herein) on a mounting 1412 (e.g., a compliant mounting) that is able to translate horizontally 1411. The mounting may allow the blade to move vertically, horizontally, or at an angle. FIG. 14B schematically shows two blades 1423 and 1426 respectively on mountings 1422 and 1425 with arrows therein representing vertical movements. The mounting may comprise one or more springs. The mounting may allow the blade to move vertically when confronting an obstacle. The obstacle may be a hardened material as described herein. The obstacle may be a generated part of a 3D object, or a generated 3D object, or a hardened material that did not form part of the 3D object. The blade may be deformed when confronting the object. The blade may be substantially non-deformed when confronting the object. The concave plane may be utilized in leveling the layer of powder material that is deposited in the enclosure (e.g., above the substrate or above the base). The powder material may be pushed by the blade (e.g., by the concave plane). The powder material may be pushed by the blade in the direction of its movement. The powder material may be pushed (e.g., relocated, sheared, or removed) by the blade in the direction opposite to its movement. The powder material may be pushed by the blade in the direction other than a direction of its movement. The powder material may be pushed by the blade in the direction other than a direction of its movement or opposite to its movement. In some examples, the concave plane may not face the bottom of the enclosure, of the substrate or of the base.

The blade may be movable. For example, the blade may be movable horizontally, vertically or at an angle. The blade may be movable manually or automatically (e.g., by a mechanism controlled by a controller). The movement of the blade may be programmable. The movement of the blade may be predetermined. The movement of the blade may be according to an algorithm.

The layer dispensing mechanism may comprise a leveling mechanism. The layer dispensing mechanism may comprise a powder dispensing mechanism and a leveling mechanism. The layer dispensing mechanism may be movable. The layer dispensing mechanism may be movable horizontally, vertically or at an angle. The layer dispensing mechanism may be movable manually or automatically (e.g., controlled by a controller). The movement of the layer dispensing mechanism may be programmable. The movement of the layer dispensing mechanism may be predetermined. The movement of the layer dispensing mechanism may be according to an algorithm.

The powder dispensing mechanism (e.g., powder dispenser) may be movable. The powder dispensing mechanism may be movable horizontally, vertically or at an angle.

The powder dispensing mechanism may be movable manually or automatically (e.g., controlled by a controller).

The powder removal mechanism may be movable. The removal mechanism may be movable horizontally, vertically or at an angle. The removal mechanism may be movable manually or automatically (e.g., controlled by a controller). The movement of the powder removal mechanism may be programmable. The movement of the powder removal mechanism may be predetermined. The movement of the powder removal mechanism may be according to an algorithm.

The powder leveling mechanism may be movable. The leveling mechanism may be movable horizontally, vertically or at an angle. The leveling mechanism may be movable manually or automatically (e.g., controlled by a controller). The movement of the leveling mechanism may be programmable. The movement of the leveling mechanism may be predetermined. The movement of the leveling mechanism may be according to an algorithm.

The layer dispensing mechanism may be able to travel in a horizontal direction from one side of the enclosure to its other side. The powder dispensing mechanism, powder removal mechanism, leveling mechanism and/or blade may be able to travel in a horizontal direction from one side of the enclosure to its other side. The vertical position of the powder dispensing mechanism, powder removal mechanism, leveling mechanism and/or blade may be adjustable. The horizontal position of the powder dispensing mechanism, powder removal mechanism, leveling mechanism and/or blade may be adjustable. The angular position of the powder dispensing mechanism, powder leveling mechanism, leveling mechanism and/or blade may be adjustable.

In some examples, the layer dispensing mechanism comprises at least one powder dispensing mechanism and at least one leveling member. The at least one powder dispensing mechanism and at least one leveling member may be connected or disconnected. FIG. 14A schematically shows a blade 1413 (which represents any blade described herein) connected via a connector 1437 to a powder dispensing mechanism 1415 (which represents any powder dispensing mechanism described herein). The at least one powder dispensing mechanism and at least one leveling member may travel at different speeds or at the same speed. The at least one powder dispensing mechanism and at least one leveling member may be simultaneously controlled by the controller, or non-simultaneously controlled (e.g., sequentially controlled) by the controller. The speed and/or position of the at least one powder dispensing mechanism and the at least one leveling member may be simultaneously controlled by the controller, or non-simultaneously controlled (e.g., sequentially controlled) by the controller. The speed and/or position of the at least one powder dispenser and at least one leveling member may be dependent or independent on each other. Relative to the direction of travel, the leveling member may follow the powder dispensing mechanism. Relative to the direction of travel, the leveling member may precede the powder dispensing mechanism. In some embodiments, at least one powder dispenser may be disposed between two leveling members. FIG. 14B schematically show an example of a first leveling member having a blade 1423, a second leveling member having a blade 1426, and a powder dispenser 1424. The two leveling members may be vertically translatable (e.g., FIG. 14B) or non-translatable (e.g., FIG. 14D). In some examples, the bottom face of both leveling members (which faces the exposed surface of the powder bed) is positioned at the same vertical height relative to the bottom of the enclosure, substrate or base (e.g., FIG. 14D).

In some examples, the bottom face of both leveling members, which faces the powder bed, are positioned at the different vertical height relative to the bottom of the enclosure, substrate or base (e.g., FIG. 14B). For example, relative to the direction of movement, the bottom face of the frontal leveling member (e.g., FIG. 14B, 1426) may be higher than the bottom face of the distal leveling member (e.g., 1423) when moving in a first direction (e.g., 1430). When the layer dispensing mechanism reaches the end of the powder bed, or precedes the end of the powder bed, the direction of movement may switch and thus the level of the bottom face of the leveling members may switch accordingly.

In some examples, at least one powder dispensing member (e.g., powder dispenser, FIG. 14A, 1415) may precede at least one leveling member (e.g., 1412 and 1413 collectively) relative to the direction of movement (e.g., 1411). In this example, powder dispensed from the powder dispenser may be leveled as the leveling system follows the powder dispenser. When the layer dispensing mechanism reaches the end of the powder bed, or precedes the end of the powder bed, the direction of movement may switch and thus the leveling member may move to a position that allows the powder dispensing member to precede the leveling member. FIG. 14C shows an example of switching the position of the leveling member (from 1443 and 1446 to 1445 and 1447 respectively), relative to the powder dispenser 1444, while switching the direction of movement from 1451 to 1452. Such movement may be, for example, a 180-degree rotation about the axis that is substantially perpendicular to the average top surface of the layer of powder bed, to the substrate, or to the base. The axis of rotation may go through the powder dispensing mechanism (e.g., 1441). The axis of rotation may go through the chute (e.g., cascade or drop) of powder material from the powder dispensing mechanism. In some examples, the powder is dispensed when the layer dispensing mechanism (e.g., comprising the leveling member and the powder dispenser) moves in a first direction, and the deposited layer of powder material is leveled when the layer dispensing mechanism moves in the opposite direction. The powder material may be dispensed by the layer dispensing mechanism (e.g., the powder dispenser) when the layer dispensing mechanism travels in a first direction. The powder material may be leveled by the leveling mechanism when the layer dispensing mechanism travels in a second direction. The first and second direction may be the same direction. The first and second direction may be opposite directions.

In some cases, the mechanism that is configured to deliver a powdered material (e.g., the powder dispenser) to the powder bed can be an ultrasonic powder dispensing mechanism. The mechanism that is configured to deliver the powder to the powder bed can be a vibratory powder dispensing mechanism. The powder dispenser may comprise a vibrator or a shaker. The mechanism configured to deliver the powder from to the substrate can comprise a vibrating mesh. The vibration may be formed by an ultrasonic transducer, a piezo-electric device, a rotating motor (e.g., having an eccentric cam), or any combination thereof. The ultrasonic and/or vibratory powder dispensing mechanism can dispense powder in one, two, or three dimensions. The frequency of an ultrasonic and/or vibratory disturbance of the dispenser can be chosen such that powder is delivered to the powder bed at a predetermined rate. The ultrasonic and/or vibratory dispenser can dispense powder onto the powder bed from a location above the powder bed. The ultrasonic and/or vibratory dispenser can dispense powder onto the powder bed from a location that is at a relatively higher height relative to the powder bed (e.g., the top of the enclosure). The ultrasonic and/or vibratory dispenser can dispense powder onto the powder bed in a downward or sideward direction. The ultrasonic and/or vibratory dispenser can dispense powder onto the powder bed in a downward direction. The powder may be dispensed using gravitational force. The ultrasonic and/or vibratory dispenser can be a top-dispenser that dispenses the powder from a position above the substrate, the base or the powder bed (or a container for accommodating the powder bed). The vibrator may comprise a spring. The vibrator may be an electric or hydraulic vibrator.

Figure 16:
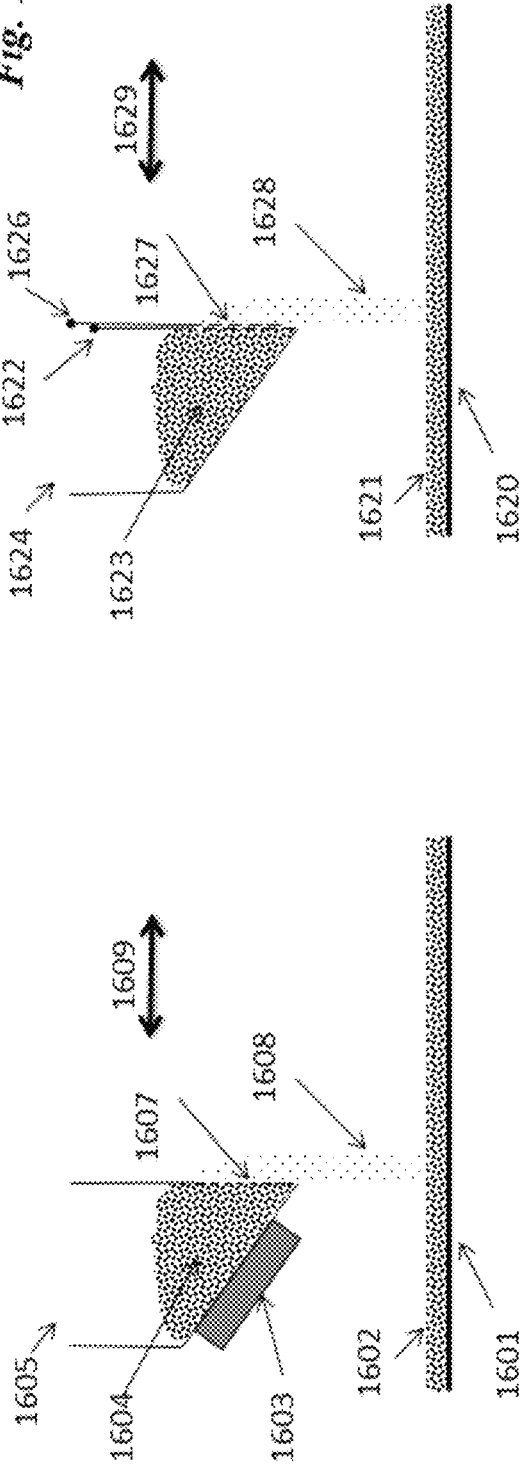
FIGS. 16A-16D schematically depict vertical side cross sections of various mechanisms for dispensing the powder material.

The powder dispenser can comprise a vibrator. FIG. 15, 1507 shows an example for a powder dispenser 1509 with a vibrator 1507. The powder dispenser can comprise two or more vibrators (e.g., an array of vibrators). The array of vibrators can be arranged linearly, non-linearly, or at random. The array of vibrators can be arranged along the opening of the powder dispenser, or in proximity thereto. The powder dispenser can comprise multiple opening ports. The array of vibrators can be situated along the array of opening ports (e.g., the multiple openings). The vibrators can be arranged along a line. The vibrators can be arranged along a linear pattern. The vibrators can be arranged along a non-linear pattern. The arrangement of the vibrators can determine the rate at which the powder exits the powder dispenser. The vibrator(s) may reside on a face of the powder dispenser. FIG. 16A shows an example of a powder dispenser 1605 comprising a mesh 1607 and a vibrator 1603. The vibrator may reside next to the exit opening (e.g., port). The powder dispenser can comprise a mesh that is connected to a vibrator. The powder dispenser comprises a mesh that is capable of vibrating. The vibrator(s) can vibrate at least part of the powder material within the powder dispenser (e.g., FIG. 16A, 1604). The vibrators(s) can vibrate at least a part of the powder dispenser body. The body of the powder dispenser (e.g., the powder reservoir) may comprise a light material such as a light elemental metal or metal alloy (e.g., aluminum). The vibrators can be controlled manually or automatically (e.g., by a controller). The vibrator frequency may be at least about 20 Hertz (Hz), 30 Hz, 40 Hz, 50 Hz, 60 Hz, 70 Hz, 80 Hz, 90 Hz, 100 Hz, 110 Hz, 120 Hz, 130 Hz, 140 Hz, 150 Hz, 160 Hz, 170 Hz, 180 Hz, 190 Hz, 200 Hz, 210 Hz, 220 Hz, 230 Hz, 240 Hz, 250 Hz, 260 Hz, 270 Hz, 280 Hz, 290 Hz, 300 Hz, 350 Hz, 400 Hz, 450 Hz, 500 Hz, 550 Hz, 600 Hz, 700 Hz, 800 Hz, 900 Hz, or 1000 Hz. The vibrator frequency may be at most about 20 Hertz (Hz), 30 Hz, 40 Hz, 50 Hz, 60 Hz, 70 Hz, 80 Hz, 90 Hz, 100 Hz, 110 Hz, 120 Hz, 130 Hz, 140 Hz, 150 Hz, 160 Hz, 170 Hz, 180 Hz, 190 Hz, 200 Hz, 210 Hz, 220 Hz, 230 Hz, 240 Hz, 250 Hz, 260 Hz, 270 Hz, 280 Hz, 290 Hz, 300 Hz, 350 Hz, 400 Hz, 450 Hz, 500 Hz, 550 Hz, 600 Hz, 700 Hz, 800 Hz, 900 Hz, or 1000 Hz. The vibrator frequency may be any number between the afore-mentioned vibrator frequencies. For example, the vibrator frequency may be from about 20 Hz to about 1000 Hz, from about 20 Hz, to about 400 Hz, from about 300 Hz to about 700 Hz, or from about 600 Hz to about 1000 Hz. The vibrators in the array of vibrators can vibrate in the same or in different frequencies. The vibrators can have a vibration amplitude of at least about 1 times the gravitational force (G), 2 times G, 3 times G, 4 times G, 5 times G, 6 times G, 7 times G, 8 times G, 9 times G, 10 times G, 11 times G, 15 times G, 17 times G, 19 times G, 20 times G, 30 times G, 40 times G, or 50 times G. The vibrators can have a vibration amplitude of at most about 1 times the gravitational force (G), 2 times G, 3 times G, 4 times G, 5 times G, 6 times G, 7 times G, 8 times G, 9 times G, 10 times G, 11 times G, 15 times G, 17 times G, 19 times G, 20 times G, 30 times G, 40 times G, or 50 times G. The vibrators can vibrate at an amplitude having any value between the afore-mentioned vibration amplitude values. For example, the vibrators can vibrate at an amplitude from about 1 times G to about 50 times G, from about 1 times G to about 30 times G, from about 19 times G to about 50 times G, or from about 7 times G to about 11 times G.

In some cases, the mechanism configured to deliver the powder from the reservoir to the substrate (i.e., powder dispenser) can be a screw, an elevator, or a conveyor. In some cases, the mechanism configured to deliver the powder from the reservoir to the substrate (i.e., powder dispenser) can be a screw. The screw can be a rotary screw in a vessel. When the screw is rotated powder can be dispensed from the screw though an exit opening (e.g., port). The screw can dispense powder in an upward, lateral or downward direction relative to the substrate. The spacing and size of the auger screw threads can be chosen such that a predetermined amount of powder is dispensed on to the substrate with each turn or partial turn of the screw in the screw. The turn rate of the screw in the auger can be chosen such that powder is dispensed on the substrate at a predetermined rate. In some cases, powder dispensed by the screw can be spread on at least a fraction of the substrate 904 by a rotary screw, linear motion of a spreading tool, and/or one or more baffles. The screw can be an Archimedes screw. The screw can be an auger screw.

The powder dispenser may be shaped as an inverted cone, a funnel, an inverted pyramid, a cylinder, any irregular shape, or any combination thereof. Examples of funnel dispensers are depicted in FIGS. 13A-D, showing side cross sections of a powder dispenser. The bottom opening of the powder dispenser (e.g., FIG. 13A, 1334) may be completely blocked by a vertically movable plane (e.g., 1305) above which powder is disposed (e.g., 1304). The plane can be situated directly at the opening, or at a vertical distance "d" from the opening. The movement (e.g., 1302) of the vertically movable plane may be controlled. When the plane is moved vertically upwards (e.g., away from the base (e.g., 1310)), side openings are formed between the plane and the edges of the powder dispenser, out of which powder can slide though the funnel opening (e.g., 1307). The powder dispenser may comprise at least one mesh that allows homogenous (e.g., even) distribution of the powder on to the powder bed (or container accommodating the powder bed). The mesh can be situated at the bottom opening of the powder dispenser (e.g., 1334) or at any position between the bottom opening and the position at which the plane completely blocks the powder dispenser (e.g., at any position within the distance "d" in FIG. 13A).

The powder dispenser can be a double mesh dispenser (e.g., FIG. 13C). The double mesh dispenser may be shaped as an inverted cone, a funnel, an inverted pyramid, a cylinder, any irregular shape, or any combination thereof. Examples of funnel dispensers are depicted in FIG. 13A-D, showing cross sections of a powder dispenser. The bottom of the double mesh dispenser can comprise an opening (e.g., 1335). The opening may comprise two meshes (e.g., 1323) of which at least one is movable (e.g., horizontally). The two meshes are aligned such that the opening of one mesh can be completely blocked by the second mesh. A horizontal movement (e.g., 1320) of the at least one movable mesh may misalign the two meshes and form openings that allow flow of powder from the reservoir above the two meshes down towards the direction of the powder bed (e.g., 1324). The misalignment of the meshes can alter the size and/or shape of the openings through which the powder material can exit the powder dispenser. The openings can have a fundamental length scale of at least about 0.001 mm, 0.01 mm, 0.03 mm, 0.05 mm, 0.07 mm, 0.09 mm, 0.1 mm, 1 mm, 2 mm, 3 mm, 4 mm, 5 mm, or 10 mm. The openings can have a fundamental length scale of at most about 0.001 mm, 0.01 mm, 0.03 mm, 0.05 mm, 0.07 mm, 0.09 mm, 0.1 mm, 1 mm, 2 mm, 3 mm, 4 mm, 5 mm, or 10 mm. The openings can have a fundamental length scale between any of the aforementioned values. For example, the openings can have a fundamental length scale from about 0.001 mm to about 10 mm, or from 0.1 mm to about 5 mm.

The powder dispenser may comprise an exit opening port that resides within a face of the powder dispenser. The face may be the bottom of the powder dispenser, which faces the substrate, the base, or the bottom of the enclosure (e.g., chamber). FIG. 13C shows an example of a powder dispenser 1318 having a bottom facing exit opening port 1335. The face in which the exit opening port resides may be different than the bottom face of the powder dispenser. For example, the face may be a side of the powder dispenser. The face may be a face that is not parallel to the layer of powder material. The face may be substantially perpendicular to the average plane formed by the top surface of the powder bed. FIG. 15 shows an example of a powder dispenser 1509 having a side exit opening port 1511 that is substantially perpendicular to the top surface of the powder bed 1506. The face may be substantially perpendicular to the average plane of the substrate or of the base. The face may be situated at the top face of the powder dispenser. The top face of the dispenser may be the face that faces away from the substrate, base or bottom of the enclosure. The top face of the dispenser may be the face that faces away from the exposed surface of the powder bed. The face may be a side face. The side face may be a face that is not the bottom or the top face. A plane in the face (e.g., the entire face) may lean towards the powder bed, the substrate, the bottom of the container, or the base. Leaning may comprise a plane that is curved towards the substrate, the base, and the bottom of the enclosure or towards the powder bed. The curved plane may have a radius of curvature centering at a point below the bottom of the powder dispenser. The curved plane may have a radius of curvature centering at a point above the bottom of the powder dispenser. Leaning may comprise a plane forming an acute angle with an average surface of the substrate, the base or a top surface of the layer of powder material, or with a plane parallel thereto. For example, a plane at the bottom face of the powder dispenser may from an acute or an obtuse angle (phi, $\varphi$) with the average plane formed by the top surface of the powder material, by the substrate or by the base. FIGS. 18B and 18D each shows an example of a powder dispenser (1813 and 1833 respectively), having a side exit opening port (1812 and 1831 respectively), that forms an angle phi ((p) with the top surface of the powder material 1810 and 1830 respectively (or with a line parallel thereto). FIG. 18B shows an example of an acute angle phi, and FIG. 18B shows an example of an obtuse angle phi. The angle phi may be at least about 5°, 10°, 15°, 20°, 30°, 40°, 50°, 60°, 70°, 80°, 90°, 100°, 110°, 120°, 130°, 140°, 150°, 160°, or 170°. Phi may be at most about 5°, 10°, 15°, 20°, 30°, 40°, 50°, 60°, 70°, 80°, 90°, 100°, 110°, 120°, 130°, 140°, 150°, 160°, or 170°. The angle phi may be of any value between the afore-mentioned degree values for phi. For example, the angle phi may be from about 5° to about 170°, from about 5° to about 90°, or from about 90° to about 170°.

Figure 17:
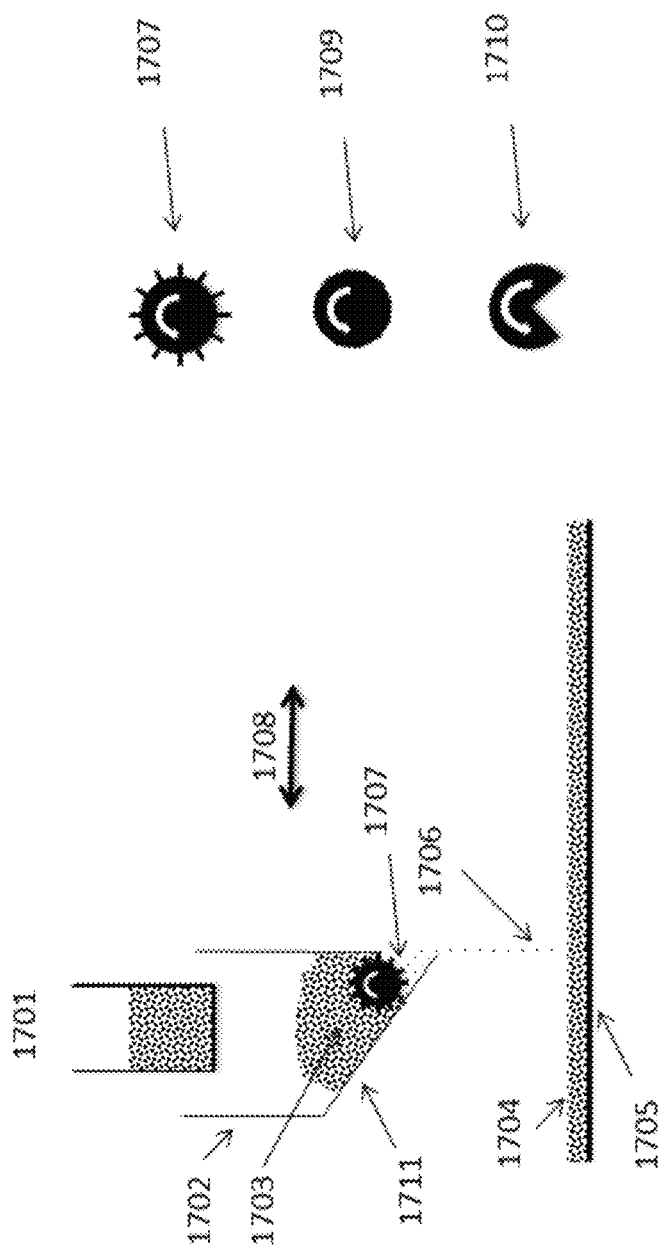
FIG. 17 schematically depicts vertical side cross sections of various mechanisms for dispensing the powder material.

The powder dispenser may comprise a bottom having a first slanted bottom plane. In some instances, one edge (side) of the plane at the bottom of the powder dispenser lies vertically above another edge of that plane. The plane may be convex or concave. The angle of the first slanted bottom plane may be adjustable or non-adjustable. The first slanted bottom plane may face the bottom of the enclosure, the substrate or the base. The bottom of the powder dispenser may be a slanted plane. FIG. 17 shows an example of a powder dispenser 1702 with a slanted bottom plane 1711. The first slanted bottom plane may form a first acute angle (gamma "y") in a first direction (e.g., positive direction) with a plane parallel to the average top surface of the powder material, the substrate or the base. The bottom of the powder dispenser may comprise one or more additional planes. The one or more additional planes may be adjacent to the bottom of the powder dispenser. The one or more additional planes may be connected to the bottom of the powder dispenser. The one or more additional planes may be disconnected from the powder dispenser. The one or more additional planes may be extensions of the bottom face of the powder dispenser. The one or more additional planes may be slanted. The angle of the one or more additional planes may be adjustable or non-adjustable. The one or more additional planes that are slanted may form an acute angle (theta "θ") in a second direction with a plane parallel to the average top surface of the powder material. The direction (first and/or second) may be clockwise or anti-clockwise direction. The direction may be positive or negative direction. The first direction may be the same as the second direction. The first direction may be opposite to the second direction. For example, the first and second direction may be clockwise. The first and second direction may be anti-clockwise. The first direction may be clockwise and the second direction may be anti-clockwise. The first direction may be anti-clockwise and the second direction may be clockwise. The first and second direction may be viewed from the same position. At least part of the one or more additional planes may be situated at a vertical position that is different than the bottom of the first slanted bottom plane. At least part of the one or more additional planes may be situated at a vertical position that is higher than the bottom of the first slanted bottom plane. At least part of the one or more additional planes may be situated at a vertical position that is lower than the bottom of the first slanted bottom plane. The lower most position of the one or more additional planes may be situated at a vertical position that is higher or lower than the lower most position of the first slanted bottom plane. The upper most position of the one or more additional planes may be situated at a vertical position that is higher or lower than the upper most position of the first slanted bottom plane. The one or more additional plane may comprise a conveyor. The conveyor can move in the direction of movement of the powder dispenser, or in a direction opposite to the direction of movement of the powder dispenser. FIG. 16D shows an example of a powder dispenser 1634 having a slanted bottom plane 1639, and an additional plane parallel to the base, which comprises a conveyor 1640, where the conveyor moves opposite to the direction of movement 1638. Theta and/or delta may be at least about 5°, 10°, 15°, 20°, 30°, 40°, 50°, 60°, 70°, or 80°. Theta and/or delta may be at most about 5°, 10°, 15, ° 20°, 30°, 40°, 50°, 60°, 70°, or 80°. Theta and/or delta may be of any value between the afore-mentioned degree values for gamma and/or delta. For example theta and/or delta may be from about 5° to about, 80°, from about 5° to about, 40°, or from about 40° to about, 80°.

Figure 28:
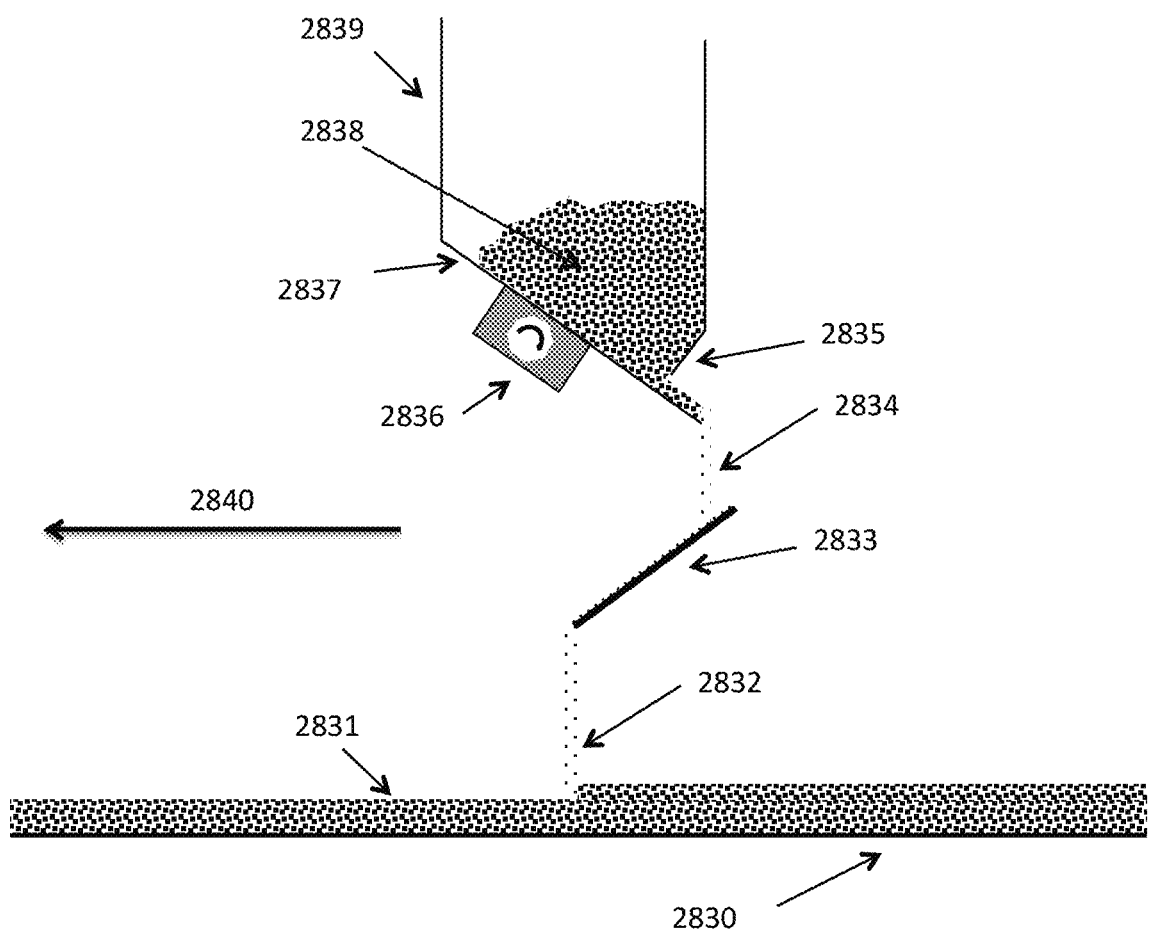
FIG. 28 schematically depicts vertical side cross sections of a powder dispensing member described herein.

The one or more additional plane may comprise a plane that is vertically separated from the powder exit opening (e.g., port) by a gap. FIG. 28 shows an example of a powder dispenser 2839 having an additional slanted plane 2833 that is separated from the opening 2835 by a gap. The gap may be adjustable. The angle of the slanted plane may be adjustable. The angle may be any of the aforementioned theta (θ) values. The top surface of the slanted plane may be flat or rough. The top surface of the slanted plane may comprise extrusions or depressions. The depressions or extrusions may be random or follow a pattern. The top surface of the slanted surface may be blasted (e.g., by any blasting method disclosed herein). The top surface of the slanted surface may be formed by sanding with a sand paper. The sand paper may be of at most about 24 grit, 30 grit, 36 grit, 40 grit, 50 grit, 60 grit, 70 grit, 80 grit, 90 grit, 100 grit, 120 grit, 140 grit, 150 grit, 160 grit, 180 grit, 200 grit, 220 grit, 240 grit, 300 grit, 360 grit, 400 grit, 600 grit, 800 grit, or 1000 grit. The sand paper may be of at least 24 grit, 30 grit, 36 grit, 40 grit, 50 grit, 60 grit, 70 grit, 80 grit, 90 grit, 100 grit, 120 grit, 140 grit, 150 grit, 160 grit, 180 grit, 200 grit, 220 grit, 240 grit, 300 grit, 360 grit, 400 grit, 600 grit, 800 grit, or 1000 grit. The sand paper may be a sand paper between any of the afore mentioned grit values. For example, the sand paper may be from about 60 grit to about 400 grit, from about 20 grit to about 300 grit, from about 100 grit to about 600 grit, or from about 20 grit to about 1000 grit. The roughness of the top surface of the slanted plane may be equivalent to the roughness of the sand paper mentioned herein. The roughness of the top surface of the slanted plane may be equivalent to a roughness of a treatment with the sand paper mentioned herein. The slanted plane (e.g., 2833) and the body of the powder dispenser (e.g., the reservoir 2839) may be of the same type of material or of different types of materials. The slanted plane may comprise a rougher material than the one substantially composing the body of the powder dispenser. The slanted plane may comprise a heavier material than the one substantially composing the body of the powder dispenser. The slanted plane may comprise a harder (e.g., less bendable) material than the one substantially composing the body of the powder dispenser. For example, the body of the powder dispenser may be made of a light metal (e.g., aluminum), while the slanted plane may be made of steel or a steel alloy. The slanted plane may be mounted, while the body of the powder dispenser may vibrate or bend. The powder dispensed out of the exit opening (e.g., port) of the powder dispenser reservoir (e.g., FIG. 28, 2839) may travel downwards using the gravitational force (e.g., 2834), contact the slanted plane (e.g., 2833) during its fall, bounce off the slanted plane, and continue its downward fall (e.g., 2832) to the powder bed (e.g., 2831), or to the substrate or base (e.g., 2830). In some embodiments, as the powder material exits the powder dispensing mechanism (e.g., member) to the environment of the enclosure (e.g., chamber) and travels in the vertical direction of the powder bed (i.e., travels down towards the powder bed), it encounters at least one obstruction. The obstruction can be a surface. The surface can be stationary or moving (e.g., a conveyor). The surface can be rough or smooth. The obstruction comprises a rough surface. The obstruction can be a slanted surface that forms an angle with the exposed surface of the powder bed. The angle can be any of the theta angles described herein. The powder removing mechanism (e.g., member) may be integrated within the powder dispensing member to form a powder dispensing-removing member described herein.

FIG. 18C shows an example of a powder dispenser 1824 with a slanted bottom plane 1821 that forms an anti-clockwise angle gamma with a plane parallel to the base 1820; the powder dispenser having an additional plane 1823 that is connected to the powder dispenser 1824, is slanted and forms an anti-clockwise angle theta with a plane parallel to the base, where theta is different (larger) than gamma; and the plane 1821 both starts at a higher vertical position (d1) than the plane 1823 (d2), and ends at a higher vertical position (d2) than the ending position of plane 1823 (d3) relative to the base.

Figure 19A:
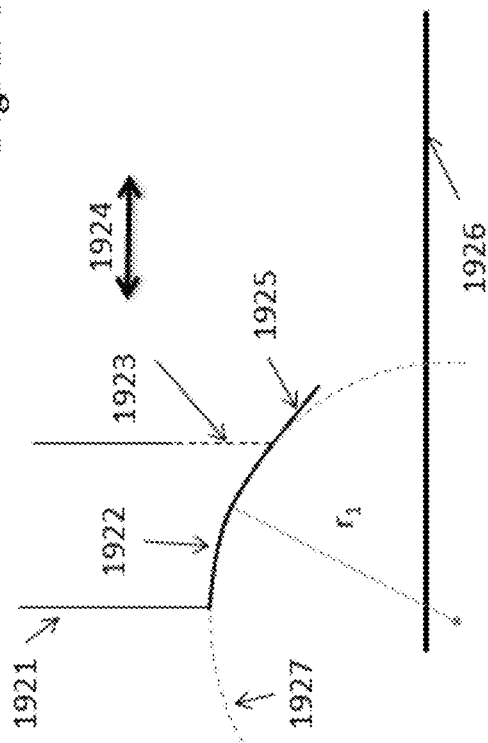
FIGS. 19A-19D schematically depict vertical side cross sections of various mechanisms for dispensing the powder material.
Figure 19C:
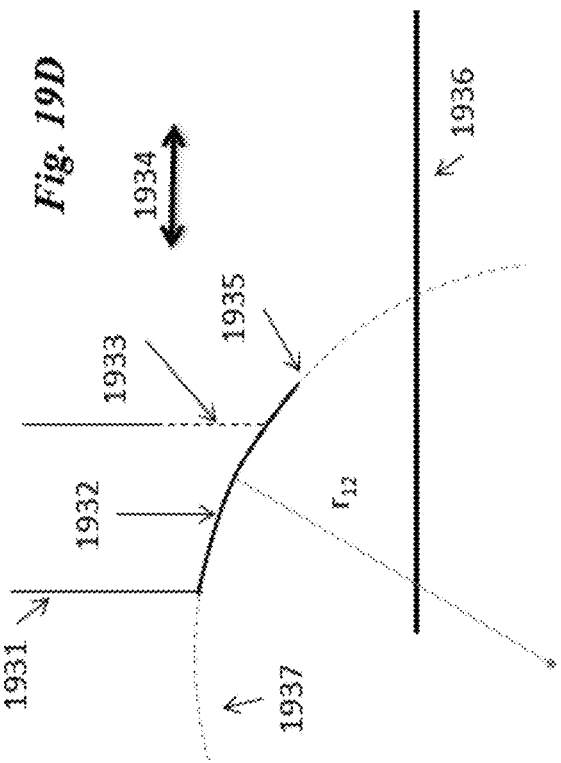
Figure 19B:
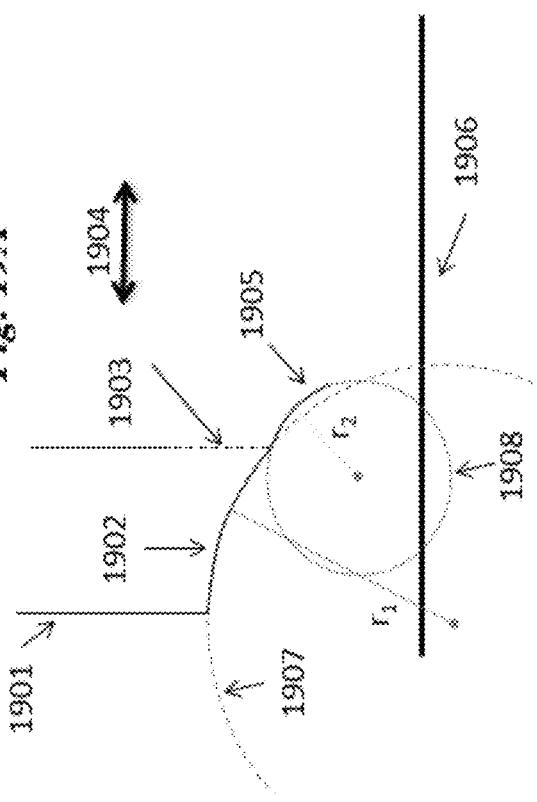
Figure 19D:
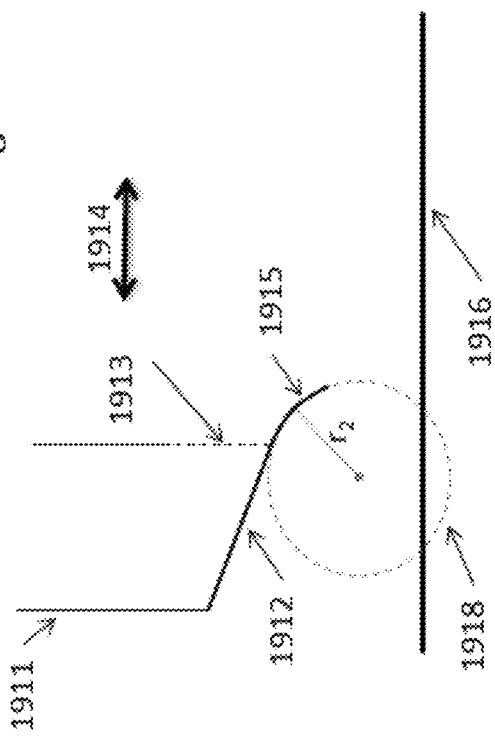

The powder dispenser may comprise a bottom having a vertical cross section forming a first curved bottom plane. The first curved bottom plane may have a radius of curvature that is situated below the bottom of the powder dispenser (e.g., in the direction of the substrate). The first curved bottom plane may have a radius of curvature that is situated above the bottom of the powder dispenser (e.g., in the direction away from the substrate). The radius of curvature of the first curved bottom plane may be adjustable or non-adjustable. FIG. 19A and FIG. 19C show examples of vertical cross sections of powder dispensers 1901 and 1921 respectively having curved bottom planes 1902 and 1922 respectively. The bottom of the powder dispenser may comprise one or more additional planes. The one or more additional planes may be adjacent to the bottom of the powder dispenser. The one or more additional planes may be connected to the bottom of the powder dispenser. The one or more additional planes may be disconnected from the powder dispenser. The one or more additional planes may be extensions of the bottom face of the powder dispenser. The one or more additional planes may be curved. The radius of curvature of the one or more additional planes may be adjustable or non-adjustable. The vertical cross section of the one or more additional curved planes may have a radius of curvature that is situated below the one or more additional curved planes (e.g., towards the direction of the substrate). The vertical cross section of the one or more additional curved planes may have a radius of curvature that is situated above the one or more additional curved planes (e.g., towards the direction away from the substrate). The radius of curvature of the one or more additional curved planes may be the same or different than the radius of curvature of the first curved bottom plane. The radius of curvature of the one or more additional curved planes may be smaller or larger than the radius of curvature of the first curved bottom plane. FIG. 19A shows an examples of a powder dispenser 1901 with curved bottom plane 1902 having a radius of curvature $r_1$, and an additional curved plane 1905 that is connected to the curved bottom plane 1902, and has a radius of curvature $r_2$, wherein $r_2$ is smaller than $r_1$, and both radii are situated below the bottom of the powder dispenser and the additional plane, towards the direction of the substrate 1906. The one or more additional curved planes and the first curved bottom plane may be situated on the same curve. FIG. 19D shows an examples of vertical cross section of a powder dispenser 1931 with curved bottom plane 1932 and having a radius of curvature $r_{12}$, that extends beyond the position of the powder dispenser exit opening port 1933, and thus forms an "additional curved plane" 1935. In this example, the vertical cross section of the "additional curved plane" and the bottom of the powder dispenser are situated on the same curve whose radius of curvature is situated below the bottom of the powder dispenser, in the direction of the substrate 1936. The powder dispenser may have a planar bottom that may or may not be slanted. The powder dispenser may have a planar bottom that is parallel to the substrate (or to an average plane formed by the substrate). The powder dispenser may have one or more additional planes that are curved. The radius of curvature of the curved planes (or a vertical cross section thereof) may be situated below the curved plane (e.g., in the direction of the substrate). FIG. 19B shows an example of vertical cross section of a powder dispenser 1911 with slanted bottom plane 1912 and a curved additional plane 1915. The powder dispenser may have a curved bottom. The powder dispenser may have one or more additional planes that are or are not slanted. The powder dispenser may have one or more additional planes that are parallel or perpendicular to the substrate. The radius of curvature of the curved planes (or a vertical cross section thereof) may be situated below the curved plane (e.g., towards the direction of the substrate). FIG. 19C shows an examples of a vertical cross section of a powder dispenser 1921 with a curved bottom plane 1922 and a slanted additional (extended) plane 1925. The radius of curvature $r_1$, $r_2$ and/or $r_{12}$ may be at least about 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The radius of curvature $r_1$, $r_2$ and/or $r_{12}$ may be at most about 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The radius of curvature $r_1$, $r_2$ and/or $r_{12}$ may be of any value between the afore-mentioned values (e.g., from 0.5 mm to about 100 mm, from about 0.5 mm to about 50 mm, from about 50 mm to about 100 mm).

In some examples, the powder dispenser comprises both an exit opening port and at least a first slanted surface as delineated above. For example, the powder dispenser can comprise both a side exit opening port and at least a first slanted surface as delineated above. The powder dispenser can comprise both a side exit opening and at least a first slanted plane and a second slanted plane as delineated above. The one or more slanted planes can reside at the bottom of the powder dispenser. The second plane can be an extension of the bottom of the powder dispenser. The second plane can be disconnected from the bottom of the powder dispenser.

The opening of the powder dispenser can comprise a mesh or a plane with holes (collectively referred to herein as "mesh", e.g., FIG. 16A, 1607). The mesh comprises a hole (or an array of holes). The hole (or holes) can allow the powder material to exit the powder dispenser. The hole in the mesh can have a fundamental length scale of at least about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 550 µm, 600 µm, 650 µm, 700 µm, 750 µm, 800 µm, 850 µm, 900 µm 950, µm, or 1000 µm. The hole in the mesh can have a fundamental length scale of at most about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 550 µm, 600 µm, 650 µm, 700 µm, 750 µm, 800 µm, 850 µm, 900 µm 950, µm, or 1000 µm. The hole in the mesh can have a fundamental length scale of any value between the afore-mentioned fundamental length scales. For example, the hole in the mesh can have a fundamental length scale from about 10 µm to about 1000 µm, from about 10 µm to about 600 µm, from about 500 µm to about 1000 µm, or from about 50 µm to about 300 µm. The fundamental length scale of the holes may be adjustable or fixed. In some embodiments the opening comprises two or more meshes. At least one of the two or more meshes may be movable. The movement of the two or more meshes may be controlled manually or automatically (e.g., by a controller). The relative position of the two or more meshes with respect to each other may determine the rate at which the powder passes through the hole (or holes). The fundamental length scale of the holes may be electrically controlled. The fundamental length scale of the holes may be thermally controlled. The mesh may be heated or cooled. The temperature of the mesh may be controlled manually or by a controller. The holes of the mesh can shrink or expand as a function of the temperature or electrical charge of the mesh. The mesh can be conductive. The mesh may comprise a mesh of standard mesh number 50, 70, 90, 100, 120, 140, 170, 200, 230, 270, 325, 550 or 625. The mesh may comprise a mesh of standard mesh number between any of the aforementioned mesh numbers. For example, the mesh may comprise a mesh of standard mesh number from 50 to 625, from 50 to 230, from 230 to 625, or from 100 to 325. The standard mesh number may be US or Tyler standard.

The two meshes may have at least one position where no powder can pass though the exit opening. The two meshes may have a least one position where a maximum amount of powder can pass though the exit opening. The two meshes can be identical or different. The size of the holes in the two meshes can be identical or different. The shape of the holes in the two meshes can be identical or different. The shape of the holes can be any hole shape as described herein. FIG. 16C shows an example of a powder dispenser 1624 having an opening 1627 having two meshes or two planes with holes. FIG. 16C shows an example where the extensions of two meshes 1622 and 1626 can be translated vertically.

The opening (e.g., port) of the powder dispenser can comprise a blade. The blade can be a "doctor's blade." FIG. 16B shows an example of a powder dispenser 1614 having an opening comprising a "doctor's blade" 1617. The blade can be any of the afore-mentioned blades. The opening may comprise both a blade and a mesh or a plane with holes. The mesh (or plane with holes) may be closer to the exit opening than the blade. The blade may be closer to the exit opening than the mesh (or plane with holes). The exit opening can comprise several meshes and blades. The exit opening can comprise a first blade followed by a mesh that is followed by a second blade closest to the surface of the exit opening. The exit opening can comprise a first mesh followed by a blade, which is followed by a second mesh closest to the surface of the exit opening. The first and second blades may be identical or different. The first and second meshes may be identical or different. The powder dispenser may comprise a spring at the exit opening. FIGS. 18A-D show examples of powder dispensers having an opening comprising a spring (e.g., 1807).

Any of the layer dispensing mechanisms described herein can comprise a bulk reservoir (e.g., a tank, a pool, a tub, or a basin) of powder and a mechanism configured to deliver the powder from the bulk reservoir to the layer dispensing mechanism. The powder reservoir can be connected or disconnected from the layer dispensing mechanism (e.g., from the powder dispenser). FIG. 15 shows an example of a bulk reservoir 1513, which is connected to the powder dispenser 1509. FIG. 17 shows an example of a bulk reservoir 1701, which is disconnected from the powder dispenser 1702. The disconnected powder dispenser can be located above, below or to the side of the powder bed. The disconnected powder dispenser can be located above the powder bed, for example above the powder entrance opening to the powder dispenser. The connected powder dispenser may be located above, below or to the side of the powder exit opening port. The connected powder dispenser may be located above the powder exit opening. Powder material can be stored in the bulk reservoir. The bulk reservoir may hold at least an amount of powder material sufficient for one layer, or sufficient to build the entire 3D object. The bulk reservoir may hold at least about 200 grams (gr), 400 gr, 500 gr, 600 gr, 800 gr, 1 Kilogram (Kg), or 1.5 Kg of powder material. The bulk reservoir may hold at most 200 gr, 400 gr, 500 gr, 600 gr, 800 gr, 1 Kg, or 1.5 Kg of powder material. The bulk reservoir may hold an amount of material between any of the afore-mentioned amounts of bulk reservoir material (e.g., from about 200 gr to about 1.5 Kg, from about 200 gr to about 800 gr, or from about 700 gr to about 1.5 Kg). The powder dispenser reservoir may hold at least an amount of powder material sufficient for at least one, two, three, four or five layers. The powder dispenser reservoir may hold at least an amount of powder material sufficient for at most one, two, three, four or five layers. The powder dispenser reservoir may hold an amount of material between any of the afore-mentioned amounts of material (e.g., sufficient to a number of layers from about one layer to about five layers). The powder dispenser reservoir may hold at least about 20 grams (gr), 40 gr, 50 gr, 60 gr, 80 gr, 100 gr, 200 gr, 400 gr, 500 gr, or 600 gr of powder material. The powder dispenser reservoir may hold at most about 20 gr, 40 gr, 50 gr, 60 gr, 80 gr, 100 gr, 200 gr, 400 gr, 500 gr, or 600 gr of powder material. The powder dispenser reservoir may hold an amount of material between any of the afore-mentioned amounts of powder dispenser reservoir material (e.g., from about 20 gr to about 600 gr, from about 20 gr to about 300 gr, or from about 200 gr to about 600 gr). Powder may be transferred from the bulk reservoir to the powder dispenser by any analogous method described herein for exiting of powder material from the powder dispenser. At times, the exit opening ports (e.g., holes) in the bulk reservoir exit opening may have a larger fundamental length scale relative to those of the powder dispenser exit opening port. For example, the bulk reservoir may comprise an exit comprising a mesh or a surface comprising at least one hole. The mesh (or a surface comprising at least one hole) may comprise a hole with a fundamental length scale of at least about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of at most about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of any value between the afore-mentioned values (e.g., from about 0.25 mm to about 1 cm, from about 0.25 mm to about 5 mm, or from about 5 mm to about 1cm). The bulk reservoir may comprise a plane that may have at least one edge that is translatable into or out of the bulk reservoir. The bulk reservoir may comprise a plane that may pivot into or out of the bulk reservoir (e.g., a flap door). Such translation may create an opening, which may allow powder in the reservoir to flow out of the reservoir (e.g., using gravity). A controller may be operatively coupled to the powder reservoir. The controller may control the amount of powder released from the bulk reservoir by controlling, for example, the amount of time the conditions for allowing powder to exit the bulk reservoir are in effect. A controller may control the amount of powder released from the powder dispenser by controlling, for example, the amount of time the conditions for allowing powder to exit the powder dispenser are in effect. In some examples, the powder dispenser dispenses of any excess amount of powder that is retained within the powder dispenser reservoir, prior to the loading of powder from the bulk reservoir to the powder dispenser reservoir. In some examples, the powder dispenser does not dispense of any excess amount of powder that is retained within the powder dispenser reservoir, prior to loading of powder from the bulk reservoir to the powder dispenser reservoir. Powder may be transferred from the bulk reservoir to the powder dispenser using a scooping mechanism that scoops powder from the bulk reservoir and transfers it to the powder dispenser. The scooping mechanism may scoop a fixed or predetermined amount of material. The scooped amount may be adjustable. The scooping mechanism may pivot (e.g., rotate) in the direction perpendicular to the scooping direction. The bulk reservoir may be exchangeable, removable, non-removable, or non-exchangeable. The bulk reservoir may comprise exchangeable parts. The powder dispenser may be exchangeable, removable, non-removable, or non-exchangeable. The powder dispensing mechanism may comprise exchangeable parts.

Powder in the bulk reservoir or in the powder dispensing mechanism can be preheated, cooled, be at an ambient temperature or maintained at a predetermined temperature. A leveling mechanism (e.g., FIG. 11, 1103, a rake, roll, brush, spatula or blade) can be synchronized with the powder dispensing mechanism to deliver the powder to the powder bed. The leveling mechanism can level, distribute and/or spread the powder on the substrate (or on the base when the substrate comprises a base) as the powder is dispensed by the mechanism.

Figure 21:
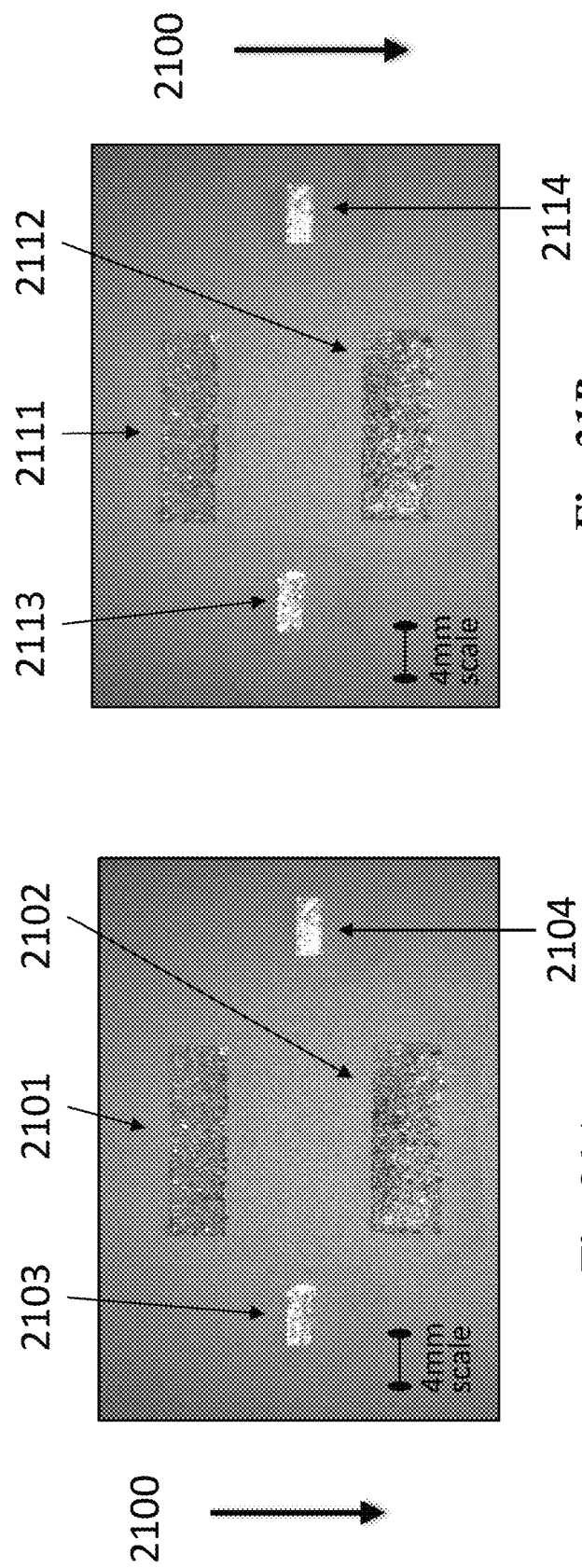
FIG. 21A depicts exposed metal planes within a layer of powder material before leveling of the layer of powder material.
FIG. 21B depicts exposed metal planes within a layer of powder material after leveling of the layer of powder material that was deposited on the planes in FIG. 21A, using a leveling mechanism described herein.

In one example, the leveling mechanisms (e.g., powder leveling mechanism), and/or powder removal mechanisms described herein is able to level the top surface of the powder material in any method described herein, without substantially altering the position of a hardened material that is disposed within the powder material and is suspended in the powder material. The hardened material may be debris or at least a part (or portion) of a_3D object. The hardened material that is suspended (e.g., floating) in the powder material may not connect to the enclosure, the substrate or the base. The hardened material may not be enclosed in a scaffold that is suspended in the powder material. The scaffold may be a filigree (e.g., a lace). The object may comprise auxiliary supports. The object suspended (e.g., floating) in the powder material may not touch the enclosure, the substrate or the base. The object may comprise auxiliary supports. The auxiliary supports may be suspended in the powder material. The suspended (e.g., floating) auxiliary supports may not be connected to the enclosure, the substrate or the base. The suspended (e.g., floating) auxiliary supports may not touch the enclosure, the substrate or the base. The leveling mechanisms may be able to level the top surface of the powder bed while altering the position of an object (e.g., 3D object or debris) by a position alteration value. The position alteration value may be at most about 1 micrometer ($\mu m$), 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 11 $\mu m$, 12 $\mu m$, 13 $\mu m$, 14 $\mu m$, 15 $\mu m$, 16 $\mu m$, 17 $\mu m$, 18 $\mu m$, 19 $\mu m$, 20 $\mu m$, 25 $\mu m$, 30 $\mu m$, 35 $\mu m$, 40 $\mu m$, 45 $\mu m$, 50 $\mu m$, 60 $\mu m$, 70 $\mu m$, 80 $\mu m$, 90 $\mu m$, 100 $\mu m$, 200 $\mu m$, or 300 $\mu m$. The position alteration value may be any value between the aforementioned values. For example, the position alteration value may be from about 1 $\mu m$ to about 300 $\mu m$, from about 1 $\mu m$ to about 50 $\mu m$, from about 1 $\mu m$ to about 20 $\mu m$, from about 1 $\mu m$ to about 10 $\mu m$, from about 1 $\mu m$ to about 50 $\mu m$, or from about 1 $\mu m$ to about 100 $\mu m$. Altering the position may be shifting the position. The leveling mechanisms may be able to level the top surface of the powder material while altering the position of a hardened material (e.g., 3D object or debris) by at most 20 micrometer (μm). The leveling mechanisms may be able to level the top surface of the powder material while altering the position of the hardened material by at most 10 micrometer (μm). The leveling mechanisms may be able to level the top surface of the powder material while altering the position of the hardened material by at most 5 micrometer (μm). The alteration of the position may be horizontal alteration. The alteration of the position may be vertical alteration. The alteration of the position may be horizontal or vertical alteration. The alteration of the position may be both vertical and horizontal. The object may be a 3D object. The 3D object may be a substantially planar object or a wire. The hardened material may comprise transformed powder (e.g., that was allowed to harden). The 3D object may be devoid of auxiliary supports. The 3D object may comprise spaced apart auxiliary supports as described herein. The leveling mechanism may level the layer of powder material while not substantially altering the position of the hardened material (e.g., suspended 3D object). Lack of substantial alteration may be relative to imaging, or image processing. The resolution of the imaging or image processing may be at most about 1 μm, 2 μm, 3 μm, 4 μm, 5 μm, 6 μm, 7 μm, 8 μm, 9 μm, 10 μm, 20 μm, 30 μm, 40 μm, 50 μm, or 60 μm. The resolution of the imaging or image processing may be at least about 1 μm, 2 μm, 3 μm, 4 μm, 5 μm, 6 μm, 7 μm, 8 μm, 9 μm, 10 μm, 20 μm, 30 μm, 40 μm, 50 μm, or 60 μm. The resolution of the imaging or image processing may of any value between the afore-mentioned resolution values (e.g., from about 1 μm to about 60 μm, from about 1 μm to about 10 μm, or from about 10 μm to about 60 μm). FIG. 21A shows an example of two suspended planes 2101 and 2102 within a layer of powder material before leveling by a leveling mechanism described herein, and two planes that are connected to a base 2103 and 2104 which serve as reference points. FIG. 21B shows an example of the two suspended planes (renumbered as 2111 and 2112 in FIG. 21B) after leveling by a leveling mechanisms described herein, and exposure by a soft blow of air from a position above each of the planes. Planes 2111 and 2112 correspond to the planes 2101 and 2102 respectively. Planes 2113 and 2114 correspond to 2103 and 2104, respectively, are attached to the base to serve as reference points.

The leveling member and/or the powder dispenser may travel at a speed of at least about 10 millimeters per second (mm/s), 15 mm/s, 20 mm/s, 25 mm/s, 30 mm/s, 35 mm/s, 40 mm/s, 45 mm/s, 50 mm/s, 70 mm/s, 90 mm/s, 100 mm/s, 120 mm/s, 140 mm/s, 150 mm/s, 160 mm/s, 180 mm/s, 200 mm/s, 220 mm/s, 240 mm/s, 260 mm/s, 280 mm/s, 300 mm/s, 350 mm/s, 400 mm/s, 450 mm/s, or 500 mm/s. The leveling member and/or the powder dispenser may travel at a speed of at most about 10 mm/s, 15 mm/s, 20 mm/s, 25 mm/s, 30 mm/s, 35 mm/s, 40 mm/s, 45 mm/s, 50 mm/s, 70 mm/s, 90 mm/s, 100 mm/s, 120 mm/s, 140 mm/s, 150 mm/s, 160 mm/s, 180 mm/s, 200 mm/s, 220 mm/s, 240 mm/s, 260 mm/s, 280 mm/s, 300 mm/s, 350 mm/s, 400 mm/s, 450 mm/s, or 500 mm/s. The leveling member and/or the powder dispenser may travel at any speed between the afore-mentioned speeds (e.g., from about 10 mm/s to about 500 mm/s, from about 10 mm/s to about 300 mm/s, or from about 200 mm/s to about 500 mm/s). The leveling member and the powder dispenser may travel at identical speeds or at different speeds. The traveling speeds of the leveling member and/or the powder dispenser may be controlled manually or automatically (e.g., by a controller). The traveling speed may refer the speed traveled across the powder bed (e.g., laterally).

The powder dispenser may dispense powder at an average rate of at least about 1000 cubic millimeters per second ($mm^3$/s), 1500 $mm^3$/s, 2000 $mm^3$/s, 2500 $mm^3$/s, 3000 $mm^3$/s, 3500 $mm^3$/s, 4000 $mm^3$/s, 4500 $mm^3$/s, 5000 $mm^3$/s, 5500 $mm^3$/s, or 6000 $mm^3$/s. The powder dispenser may dispense powder at an average rate of at most about 1000 $mm^3$/s, 1500 $mm^3$/s, 2000 $mm^3$/s, 2500 $mm^3$/s, 3000 $mm^3$/s, 3500 $mm^3$/s, 4000 $mm^3$/s, 4500 $mm^3$/s, 5000 $mm^3$/s, 5500 $mm^3$/s, or 6000 $mm^3$/s. The powder dispenser may dispense powder at an average rate between any of the afore-mentioned average rates (e.g., from about 1000 $mm^3$/s to about 6000 $mm^3$/s, from about 1000 $mm^3$/s to about 3500 $mm^3$/s, or from about 3000 $mm^3$/s to about 6000 mm3/s).

The powder dispenser can comprise a rotating roll. The surface of the roll may be a smooth surface or a rough surface. Examples of roll surfaces are shown in FIG. 17 and include a rough surface roll 1709, roll with protrusions 1707, roll with depression 1719. The surface of the roll may include depressions, protrusions or both protrusions and depressions (e.g., FIG. 13B, 1313, or FIG. 17). The roll may be situated such that at a certain position, the powder disposed above the roll (e.g. 1312 or 1703) is unable to flow downwards as the roll shuts the opening of the powder dispenser. When the roll rotates (either clockwise or counter clockwise), a portion of the powder may be trapped within the depressions or protrusions (or both), and may be transferred from the powder occupying side of the powder dispenser, to the powder free side of the powder dispenser. Such transfer may allow the powder to be expelled out of the bottom of the powder dispenser (e.g., 1336) towards the powder bed (e.g., 1316). A similar mechanism is depicted in FIG. 13D showing an example of a powder dispenser that comprises an internal wall within (e.g., 1327). The powder transferred by the roll 1331, may be thrown onto the wall 1337, and may then exit the funnel (e.g., 1330) though the exit opening port.

Figure 10A:
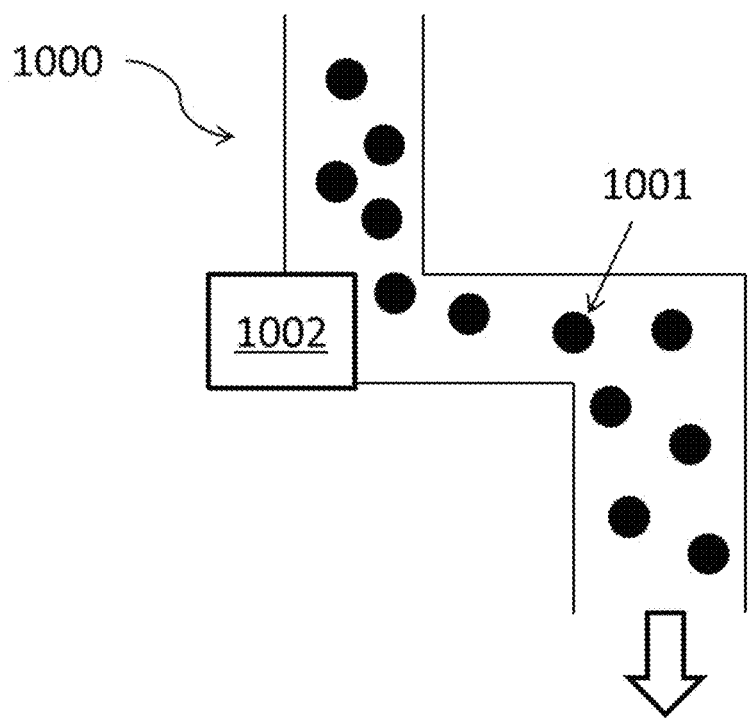
FIG. 10A schematically depicts an air knife for depositing powder onto a substrate.
Figure 10B:
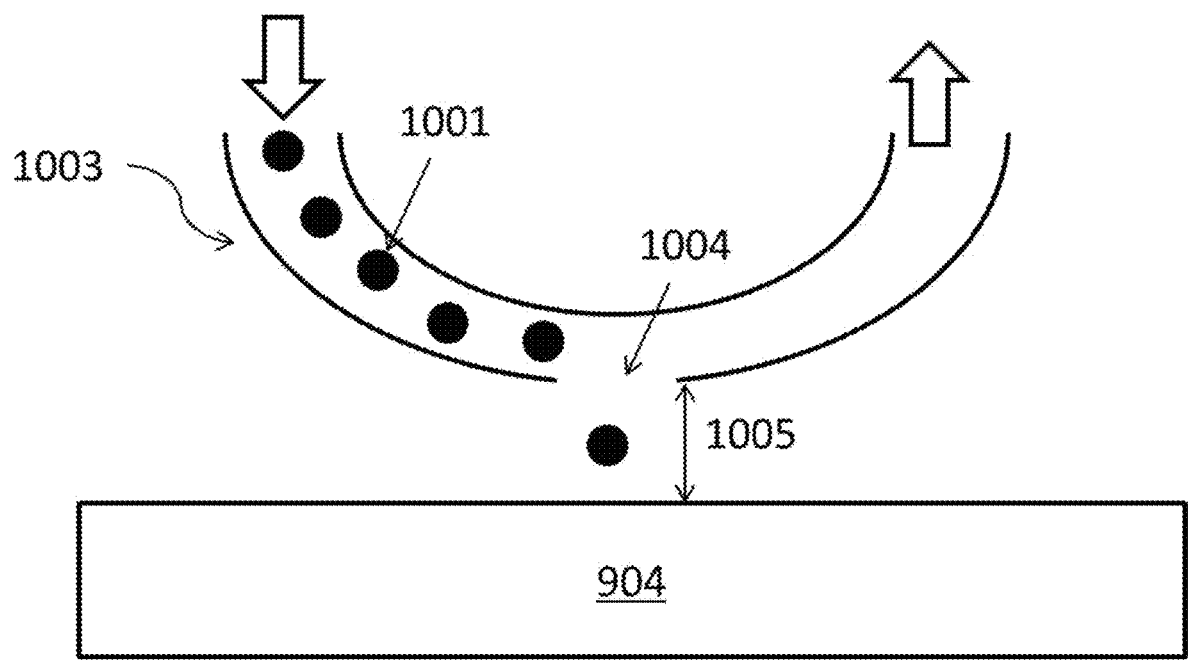
FIG. 10B schematically depicts a curved tube for depositing powder onto the substrate.

The mechanism configured to deliver the powder material to the substrate can comprise a flow of gas mixed with powder particles. FIGS. 10A and 10B show two example configurations of mechanisms configured to deliver the powder to the substrate (e.g., from the reservoir). The mechanism configured to deliver the powder to the substrate can be an air knife. The air knife can be articulated by a scanner to deliver powder to at least a fraction of the substrate (e.g., 904). The air knife can be articulated by a scanner that is also used to articulate one or more energy sources included in the system. FIG. 10A depicts a schematic of an air knife 1000 that can be configured to deliver the powder 1001 to the substrate (e.g., from the reservoir). The air knife 1000 can deliver a flow of gas and powder particles to the substrate. The powder particles can be suspended in the gas. At least one fan 1002 can be included in the air knife to drive the flow of the gas and particles. The number density of the particles in the gas and the flow rate of the gas can be chosen such that a predetermined amount of powder is dispensed on to the substrate in a predetermined time period. The gas flow rate can be chosen such that gas blown onto the substrate does not disturb a powder layer on the substrate and/or the three dimensional object. The gas flow rate can be chosen such that gas blown onto the substrate does not disturb at least the position of the three dimensional object.

FIG. 10B depicts a curved tube 1003 that can be another mechanism configured to deliver the powder from the reservoir to the substrate. The curved tube can comprise an opening 1004. The opening can be located at an inflection point of the curved tube shape. The opening can be located on the outside of the curved tube shape. The opening can be on a side of the tube that is adjacent to the substrate 904. The opening 1004 can be a pinhole. The pinhole can have a diameter or other maximum length scale of at least about 0.001 mm, 0.01 mm, 0.03 mm, 0.05 mm, 0.07 mm, 0.09 mm, 0.1 mm, 1 mm, 2 mm, 3 mm, 4 mm, 5 mm, or 10 mm. A mixture of gas and powder particles 1001 can be driven through the curved tube 1003. The powder particles (i.e., particles of the powder material) can be suspended in the gas. At least a fraction of the powder particles can exit the curved tube through the opening 1004 and dispensed onto the substrate 904. The number density of the particles in the gas and the flow rate of the gas can be selected such that a predetermined amount of powder is dispensed on to the substrate in a predetermined time period. The gas flow rate can be chosen such that gas blown onto the substrate does not disturb a powder layer on the substrate and/or the three dimensional object. The distance 1005 between the opening and the substrate can be adjusted such that a predetermined amount of powder is dispensed on to the substrate in a predetermined time period. In some cases, the size of the opening can be selected such that particles in a predetermined size range exit the curved tube through the opening 1004 and dispensed onto the substrate 904.

The powder dispensed onto the substrate by the leveling mechanism can be spread and/or leveled (e.g., a roll, see FIG. 12E at 1222). The leveling member can be configured to level a layer of the powder on the substrate (e.g., 1223), to be substantially planar (e.g., horizontal) (e.g., 1221). The leveling member can comprise a set of extrusions (e.g., hard or soft extrusions) (e.g., FIG. 12F at 1227). The extrusion may have a pointy, round or blunt end. The extrusions may be blades. The leveling member can move at least a fraction of the powder without substantially moving the 3D object. In some examples, substantially moving the at least portion of the 3D object comprises changing the position of the at least part of the three dimensional object by the position alteration value delineated herein. Substantially moving the at least portion of the 3D object comprises changing the position of the at least part of the three dimensional object by the position alteration value. The leveling member can move at least a fraction of the powder without substantially changing a location of the 3D object in the powder bed.

The leveling member can comprise a combination of a roller having a rolling surface that comprises protrusions, depressions or both protrusions and depressions. In some examples, the roller has a rolling surface that is smooth and does not have any protrusions or depressions (e.g., FIG. 12E at 1222). In some examples, the roller has a rolling surface that is rough. In some examples, the roller comprises depressions. In some examples, the roller comprises protrusions (e.g., 12F at 1227). The roller can be in front of or behind a combing mechanism (e.g., comprising a rake, brush, spatula or knife). The combing mechanism may comprise a vertical cross section (e.g., side cross section) of a circle, triangle, square, pentagon, hexagon, octagon, any other polygon, or an irregular shape. The roller can at least partially level the powder layer before the powder layer is leveled by the combing mechanism. The rotation of the roller can be in the direction in which the leveling member is moving (e.g., laterally), in the opposite direction in which the leveling member is moving, or any combination of both the directions. The roller can be in communication with an active rotation mechanism (e.g., motor shaft) to effectuate the rotation of the roller. The roller can rotate in a clockwise and/or counter-clockwise direction. The roller can have a rolling surface with a static friction coefficient of at least about 0.1, 0.2, 0.3, 0.4, 0.5, 0.6, 0.7, 0.8, 0.9, or 1.0. The roller can have a rolling surface with a dynamic friction coefficient of at least about 0.1, 0.2, 0.3, 0.4, 0.5, 0.6, 0.7, 0.8, 0.9, or 1.0. The roller can be a single roller. The roller can comprise two or more rollers. The two or more rollers can rotate in the same or different directions, at the same or at different rates. The rotation of the two or more rollers may be synchronized or not synchronized. The rollers can be rotated passively, actively (e.g., by a controller and power source), or any combination thereof. The rollers can be rotated manually or automatically (e.g., controlled by a controller). The roller can have an eccentric rotation. A roller with eccentric rotation can permit multi-height planarization. The roller can vibrate. When the roller comprises more than one roller, at least a fraction of the rollers can be configured to compress the powder and a fraction of the rollers can be configured to level (e.g., planarize) the layer of powder material. The surface (e.g., rolling surface) of the powder bed that was leveled by the roller can be smooth, leveled, or both. The surface of the roller can be rough. The surface of the roller can comprise indentations (e.g., depressions), protrusions (e.g., blades) or both. The blades can comprise one or more substantially smooth blades, sharp blades, or any combination thereof. A substantially smooth blade can have at least one cutting (e.g., shearing) surface with minimal amount of features protruding from the surface, or intruding into the surface (e.g., bumps or grooves). A substantially smooth blade can have at least one cutting surface with features protruding from the surface, or intruding into the surface, wherein the average distribution of the feature spans at most about 5 μm, 3 μm, 1 μm, 300 nm, 100 nm, 30 nm, or 10 nm. The roller can be made of material that is rigid such that the roller does not deform when translating along a surface of the powder material. In some cases, the rigid material can be metal (e.g., elemental or alloy), hard plastic, ceramic, composite material, or any combination thereof. In some cases, the roller can be made from a material that is flexible such that the roller at least partially deform when it translates along a surface of the powder. The flexible material can be metal foil, rubber, soft plastic, or any combination thereof.

The leveling mechanism can comprise a plurality of needles distributed across an axis of a smoothing mechanism. The plurality of needles can be arranged in a matrix or rows and columns, in an array, in a pattern, or randomly. The needles can be rigid, flexible or any combination thereof. The needles can be arranged on the leveling mechanism such that each needle in the plurality of needles contacts a different location on the bed of powder material. The plurality of needles can level and/or smooth the powder dispensed from the top-dispense powder dispenser. Leveling of the powder by the needles can arrange the powder such that the powder has a planar uniformity in at least one plane. Leveling of the powder material by the powder leveling mechanism and/or powder removing mechanism can result in a plane with a planar uniformity in at least one plane. The planar uniformity can be in at least one plane (e.g., horizontal plane). The planar uniformity can be at the top of the layer of powder material that is exposed. For example, the planar uniformity can be at the top of the layer of powder material that is exposed to the environment in the enclosure (e.g., the gas within the chamber). The average plane may be a plane defined by a least squares planar fit of the top-most part of the surface of the layer of powder material. The average plane may be a plane calculated by averaging the powder height at each point on the top surface of the powder bed. In some cases, either or both of a rake and a roller can be provided adjacent to the plurality of protrusions (e.g., extrusions).

In some cases an air knife can dispense powder ahead of the rake. Movement of the combing mechanism (e.g., rake) and the air knife can be synchronized or non-synchronized. Movement of the air knife and the rake can be controlled by the same scanner or by different scanners.

In some instances, the leveling mechanism comprises a gas knife (e.g., air knife) that shears or cuts the layer of powder material. The leveling gas knife may comprise a concentrated or pressurized stream of gas (e.g., air, $H_2$, He, or Ar). The blade of the leveling mechanism can comprise the gas knife.

Figure 11:
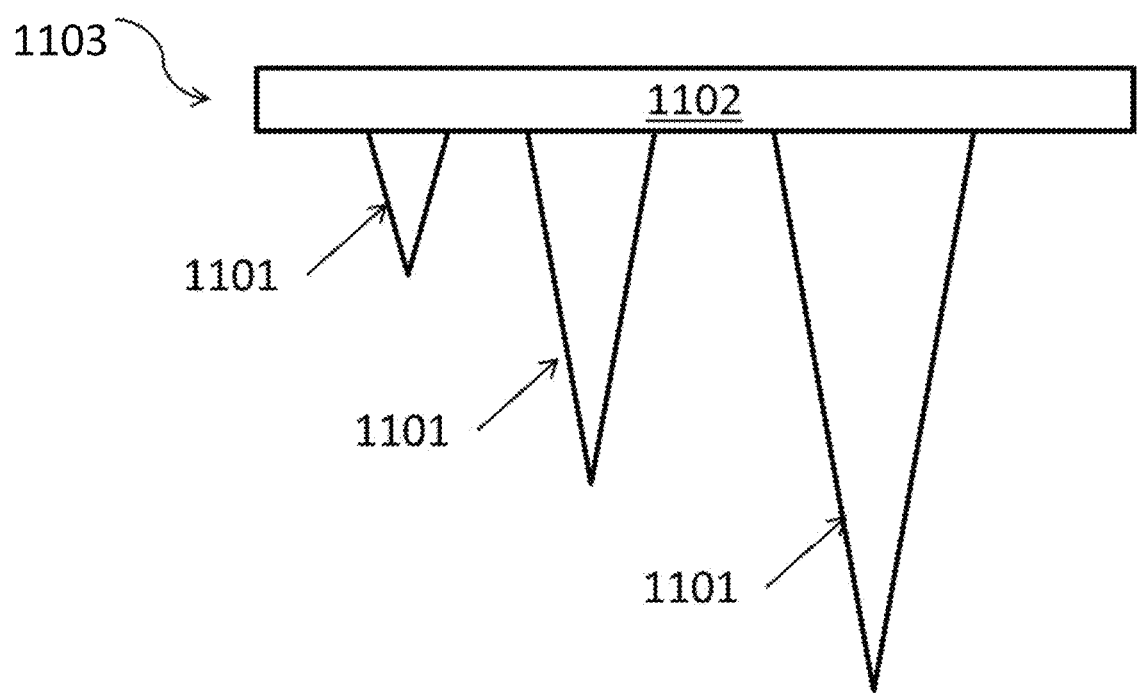
FIG. 11 depicts a rake for pushing, spreading and/or leveling powder along a substrate without disturbing a 3D object in the powder.

The combing mechanism (e.g., rake) can comprise one or more blades. FIG. 11 depicts an example of a rake 1103 that can move powder along a substrate. The combing mechanism can have one or more blades 1101 that contact the bed of powder material. The blades can have different sizes or a single substantially uniform size. The blades can extend away from a top 1102 of the rake different distances. The blades can be oriented at different angles (e.g., different angles of attack). The angle of attack can be an angle of a surface of the blade relative to a surface of the powder. In some cases a shallow angles of attack can apply relatively less pressure to the part relative to a steep angle of attack. A shallow angle of attach can be an angle of at most about 45°, 40°, 35°, 30°, 25°, 20°, 15°, 10°, or 5° between the surface of the blade and the average top surface of the powder layer. The shallow angle of attach may be about 0° between the surface of the blade and the average top surface of the powder layer. The blades can be provided in a series on the combing mechanism, the series of blades can have an increasing or decreasing angle of contact relative to each other. The angles of the blades can be arranged in a pattern (e.g., in a line) or at random. In some cases the combing mechanism (e.g., rake) can comprise a plow. The powder level (e.g., layer thickness) ahead of the rake can be actively or passively controlled.

The blades can be made of material that is rigid such that a blade within the combing mechanism does not move when translated along a surface of the powder. In some cases, the rigid material can be metal (e.g., elemental or alloy), hard plastic, ceramic, or any combination thereof. In some cases, at least a fraction of the blades can be made from a material that is flexible such that the blades at least partially deform when dragged along a surface of the powder. The flexible material can be metal foil, rubber, soft plastic, or any combination thereof.

Any of the systems descried herein (collectively "the system") may comprise a powder dispensing mechanism, a powder leveling mechanism, powder removing mechanism a controller, or any combination thereof.

The controller may control the vibrator(s). The controller may control the operation of the vibrator(s). The controller may control the amplitude of vibrations of the vibrator(s). The controller may control the frequency of vibration of the vibrator(s). When the system comprises more than one vibrator, the controller may control each of them individually, or as a group (e.g., collectively). The controller may control each of the vibrators sequentially. The controller may control the amount of powder material released by the powder dispenser. The controller may control the velocity of the powder material released by the powder dispenser. The controller may control the height of powder material depositing a layer of powder material (e.g., disposed in the powder bed). The controller may control the height from which powder is released from the powder dispenser.

The controller may control the height of the leveling member. The controller may control the height of leveling member blade. The controller may control the rate of movement of the leveling member (e.g., the blade). The controller may control the position of the powder dispenser. The controller may control the position of the leveling member. The position may comprise a vertical position, horizontal position, or angular position. The position may comprise coordinates.

The controller may control the height of the powder removing member. The controller may control the rate of movement of the powder removing member. The controller may control the position of the powder removing member. The position may comprise a vertical position, horizontal position, or angular position. The position may comprise coordinates. The controller may control the amount of material removed by the powder removing member. The controller may control the rate of material removed by the powder removing member.

The controller may control the path traveled by the powder dispensing mechanism, powder removal mechanism and/or the leveling mechanism. The controller may control the leveling of a top surface of a layer of powder material deposited in the enclosure. For example, the controller may control the final height of the newly deposited powder material. The controller may control the final height of the powder material (e.g., the last formed layer of powder material). In some embodiments, the powder dispenser may deposit at least part of a layer of powder material having a first vertical height. The leveling mechanism and/or powder removing mechanism may level the deposited powder material such that the vertical height of the leveled section of the layer of powder material may be at least about 0.02*, 0.04*, 0.05*, 0.06*, 0.08*, 0.1*, 0.2*, 0.3*, 0.4*, 0.5*, 0.6*, 0.7*, 0.8*, or 0.9 times (*) the first vertical height. The leveling member may level the deposited powder material such that the vertical height of the leveled section of the layer of powder material may be at most about 0.02*, 0.04*, 0.05*, 0.06*, 0.08*, 0.1*, 0.2*, 0.3*, 0.4*, 0.5*, 0.6*, 0.7*, 0.8*, or 0.9 times (*) the first vertical height. The leveling member may level the deposited powder material such that the vertical height of the leveled section of the layer of powder material may be a product of any value between the afore mentioned multiplier values (e.g., from about 0.02* to about 0.9*, from about 0.02* to about 0.5*, from about 0.4* to about 0.9*, or from about 0.05* to about 0.4*1.

Described herein are methods for generating 3D object from a powder material, comprising leveling powder material utilizing any of the apparatuses described herein. The powder material may be powder material disposed adjacent to (e.g., above) the bottom of the enclosure, the substrate or the base. The powder material may have been deposited by the layer dispensing mechanism (e.g., powder dispenser). Described herein is a method for generating 3D object from a powder material comprising dispensing the powder material towards the bottom of an enclosure (e.g., towards the substrate or the base) utilizing any apparatus described herein. Described herein is a method for generating 3D object from a powder material comprising dispensing the powder material towards the bottom of an enclosure (e.g., towards the substrate or the base) utilizing any of the layer dispensing mechanisms (e.g., powder dispenser) described herein. The method may comprise dispensing a layer of powder material. The method may comprise translating the apparatus, the layer dispensing mechanism, the powder dispensing mechanism, the leveling mechanism, the powder removing mechanism, the substrate, the base, the enclosure, or any combination thereof. The controller may control the translation. The powder material may be dispensed by the layer dispensing mechanism (e.g., the powder dispenser) when the layer dispensing mechanism travels in a first direction. The powder material may be leveled by the leveling mechanism when the leveling mechanism and/or powder removing mechanism travels in a second direction. The first and second direction may be the same direction. The first and second direction may be opposite directions.

The method may comprise vibrating at least part of the powder material, at least part of the powder dispensing mechanism, or at least part of the layer dispensing mechanism. The at least part of the powder dispensing mechanism may comprise vibrating at least part of the exit opening of the powder dispensing mechanism. The method may comprise vibrating the powder in the powder bed to level the powder material. The method may comprise vibrating the enclosure, the substrate, the base, the container that accommodates the powder bed, or any combination thereof, to level the powder material. The vibrations may be ultrasonic vibrations.

The method may comprise leveling at least part of a layer of powder material using the leveling mechanism. The leveling may be able to level the top surface of the powder material with a deviation from the average plane created by the top surface. The deviation from the average plane may be of any deviation from average plane value disclosed herein. The leveling may displace an object by the position alteration value disclosed herein.

In some cases, a surface of the powder layer can be maintained with substantially average planar uniformity by fluidizing the powder in the powder bed. The fluidized powder bed can have one or more properties of a liquid (e.g., with a similar volume as the volume of the powder bed). The fluidized powder bed can exhibit hydrostatic behavior such that a planar uniform powder surface is maintained without a combing mechanism (e.g., leveling or smoothing). A fluidized bed can be generated in the powder bed by forcing a pressurized gas through the powder bed. The gas can be flowed from the bottom, top or side of the powder bed. The gas can be an inert gas. The gas can be a noble gas. The gas can comprise argon, nitrogen, helium, neon, krypton, xenon, hydrogen, carbon monoxide, carbon dioxide, or air. The gas in the fluidized bed can be the same gas that is used in the chamber, or a different gas than the one used in the chamber.

At least a portion of the 3D object can sink in the fluidized bed. At least a portion of the 3D object can be surrounded by the fluidized bed (e.g., submerged). At least a portion of the 3D object can rest in the powder material without substantial sinking (e.g., vertical movement). Lack of substantial sinking can amount to a sinking (e.g., vertical movement) of at most about 40%, 20%, 10%, 5%, or 1% layer thickness. Lack of substantial sinking can amount to at most about 100 μm, 30 μm, 10 μm, 3 μm, or 1 μm. At least a portion of the 3D object can rest in the powder material without substantial movement (e.g., horizontal movement, movement at an angle). Lack of substantial movement can amount to at most 100 μm, 30 μm, 10 μm, 3 μm, 1 μm, or less. The 3D object can rest on the substrate when the 3D object is sunk or submerged in the fluidized powder bed.

The methods described may comprise a powder leveling method wherein the powder comprises a structure that protrudes from the exposed surface of the powder bed (i.e., the top surface of the powder bed). The structure may be a powder material that was transformed and subsequently hardened. The structure may be a 3D object, part of a 3D object, or a powder material that was transformed and subsequently hardened but did not form a part of the 3D object (i.e., debris). The height (i.e., vertical distance) of the protruding structure from the exposed (i.e., top) surface of the powder bed may be at least about 10 μm, 30 μm, 50 μm, 70 μm, 100 μm, 130 μm, 150 μm, 170 μm, 200 μm, 230 μm, 250 μm, 270 μm, or 300 μm. The height of the protruding structure (herein after "protrusion") from the top surface of the powder bed may be at most about 30 μm, 50 μm, 70 μm, 100 μm, 130 μm, 150 μm, 170 μm, 200 μm, 230 μm, 250 μm, 270 μm, 300 μm, or 1000 μm. The height of the protrusion from the top surface of the powder bed may be between any of the aforementioned values. For example, from about 10 μm to about 1000 μm, from about 50 μm to about 100 μm, from about 30 μm to about 300 μm, from about 20 μm to about 400 μm, or from about 100 μm to about 900 μm. The term "between" as used herein is meant to be inclusive unless otherwise specified. For example, between X and Y is understood herein to mean from X to Y.

In some examples, the method comprises depositing a layer of powder material on the powder bed comprises dispensing the powder material into the enclosure to provide a powder bed; generating the 3D object from a portion of the powder material by transforming the powder material into a transformed material that subsequently forms a hardened material, wherein the hardened material protrudes from the top surface of the powder bed, wherein the hardened material is movable within the powder bed; and adding a layer of powder material on the top surface of the powder bed. The movable hardened material may comprise auxiliary supports. The movable hardened material may be devoid of auxiliary supports. In some examples, the hardened material is suspended in the powder bed. In some examples, the hardened material comprising the auxiliary supports is suspended in the powder bed. In some examples, the hardened material is anchored (e.g., by auxiliary supports) to the enclosure. The anchors may be connected to the bottom or sides of the enclosure. The anchors may be connected to the substrate or to the base. The anchors may be the substrate, the base, the bottom of the enclosure, a scaffold structure, a sintered structure (e.g., a lightly sintered structure), or a mold (a.k.a., a mould).

In some example, adding a layer of powder material on the top surface of the powder bed displaces the hardened material by the position alteration value. In some example, adding a layer of powder material on the top surface of the powder bed displaces the hardened material by about 20 micrometers or less. In some examples, the hardened material comprises warping, buckling, bending, rolling, curling, bulging, or balling. For example, the hardened material can include at least a part of a 3D object that was deformed. The deformation may be any deformation disclosed herein such as warping, buckling, bulging, bending, rolling, curling or balling.

In some examples, the adding further comprises, using a powder dispenser to deposit the layer of powder material in the powder bed (e.g., by any deposition method or mechanism described herein). In some examples, the top surface of the added layer of powder material is substantially planar. In some examples, the top surface of the added layer of powder material is leveled to become substantially planar. The leveling may comprise a leveling mechanism and/or a powder removal mechanism as described herein. For example, the leveling of the top surface of the layer of powder material may comprise shearing an excess amount of the powder material. The shearing may include shearing with a knife (e.g., a hard, flexible or air knife as described herein). In some instances, the sheared powder material (i.e., the excess powder material) is displaced to another position in the powder bed. In some instances, the sheared powder material (i.e., the excess powder material) is not displaced to another position in the powder bed. For example, the excess powder material may be removed by the powder removal mechanism described herein. The removal of the powder material may comprise contacting the powder bed (e.g., the top surface of the powder bed). The removal of the powder material may exclude contacting the powder bed (e.g., the top surface of the powder bed). For example, the adding may comprise using a powder removal member to remove the excess amount of powder material without contacting the layer of powder material.

In some examples, the powder material, the hardened material, or both are devoid of at least two metals that are present at a ratio that forms a eutectic alloy. In some examples, the powder material, the hardened material, or both are made of a single elemental metal. In some examples, the powder material, the hardened material, or both include at most substantially a single elemental metal composition. In some examples, the powder material, the hardened material, or both are made of a single metal alloy. In some examples, the powder material, the hardened material, or both include at most substantially a single metal alloy composition.

In another aspect described herein is a system for generating a three dimensional object, comprising: an enclosure that accommodates a powder bed comprising powder material; an energy source that provides an energy beam to the powder material, and thereby transforms the powder material into a transformed material that subsequently hardens to form a hardened material. The hardened material can protrude from the top surface of the powder bed forming the protrusion described herein. The systems disclosed herein may further comprise a layer dispensing mechanism configured to add a planar powder layer into the powder bed. The layer dispensing mechanism may include the powder depositing mechanism. The layer dispensing mechanism may further include the powder leveling mechanism and/or the powder removing mechanism. The powder leveling mechanism (e.g., member) that levels an excess of powder material from the powder bed, may do so with or without contacting the powder bed. The powder leveling mechanism disclosed herein may be configured to at least shear, shave, clip, trim, crop, cut, scrape, pare, or cutoff an excess of the powder material from a top (i.e., exposed) portion of the powder bed. The powder leveling member may displace the excess amount of powder material to another position in the powder bed. In some instances, the powder leveling member may not displace the excess amount of powder material to another position in the powder bed.

The powder leveling mechanism may by any powder leveling mechanism disclosed herein. The layer dispensing mechanism may comprise a powder removal mechanism (e.g., member) that removes the excess of powder material from the top portion of the powder bed with or without contacting the top portion of the powder bed. The layer dispensing mechanism may comprise a powder removal mechanism (e.g., member) that removes the excess of powder material from the top portion of the powder bed while contacting the top portion of the powder bed. The layer dispensing mechanism may comprise a powder removal mechanism that removes the excess of powder material from the top portion of the powder bed without contacting the top portion of the powder bed. The layer dispensing mechanism may be separated from the top portion of the powder bed by a gap. The gap may be any gap disclosed herein. The powder removal mechanism may be any powder removing mechanism described herein. The powder removal mechanism may be coupled or not coupled to the powder leveling mechanism. The powder removal mechanism may be coupled or not coupled to the powder dispensing mechanism. The powder leveling mechanism may be coupled or not coupled to the powder dispensing mechanism.

The excess of powder material that was removed by the powder removal mechanism may be reused by the powder dispensing member. Reused may include continuously reused during the operation of the layer dispensing mechanism, reused after a layer of powder material is added into the powder bed, reused at a whim, reused manually, reused automatically, reused after a 3D object is generated.

The systems described herein may further comprise a controller operatively coupled to the energy source and to the layer dispensing mechanism or to at least one of its components. The controller may be programmed to (i) receive instructions to generate the three-dimensional object, (ii) generate the hardened material from a portion of the powder material, and (iii) direct the layer dispensing mechanism to add a layer of powder material into the powder bed. The added layer of powder material may have a top surface that is substantially planar. The added layer of powder material may have a top surface that is substantially non-planar. In some instances, the layer dispensing mechanism may displace the hardened material. In some instances, the layer dispensing mechanism may substantially not displace the hardened material. In some instances, the layer dispensing mechanism may displace the hardened material by the position alteration value disclosed herein. In some instances, the layer dispensing mechanism may displace the hardened material by at most 20 µm. The displacement may be vertical, horizontal, or angular displacement. The angular displacement may be a planar angle or a compound angle.

The controller may be operatively coupled to the powder dispensing mechanism (e.g., powder dispensing member, or powder dispenser) and may be programmed to direct the powder dispensing mechanism to add the layer of powder material into the powder bed. The controller may be operatively coupled to the powder leveling mechanism and may be programmed to level a top surface of the powder bed. The controller may be operatively coupled to the powder removal member and may be programmed to regulate the removal of the excess of powder material. The controller may control the recycling of the powder material that was removed by the powder removal mechanism. The controller can regulate an amount of the powder material that is dispensed by the powder dispensing member.

The system may further comprise one or more mechanical members operatively coupled to the powder dispensing member, wherein the one or more mechanical members subject the powder dispensing member to vibration. The mechanical members may be motors (e.g., rotary motors), or sonicators. The mechanical members may cause vibrations. The controller may be operatively coupled to the one or more mechanical members. The controller may be operatively coupled to the one or more vibrators. The controller may be programmed to control the one or more mechanical members to regulate an amount of the powder material that is dispensed by the powder dispensing member into the enclosure.

In another aspect, the methods described herein may comprise methods in which a layer of powder material is deposited in an enclosure to form a powder bed, at least part of the layer is hardened to form a hardened material (which may or may not comprise at least a part of the 3D object), the hardened material may or may not protrude from the exposed surface of the powder bed. A second layer of powder material is deposited in excess. The exposed surface of this second layer may or may not be leveled. The leveling of the second layer may take place in two distinct operations. The first one involves usage of the powder leveling mechanism, and the second one involves the usage of the powder removal mechanism. In some embodiments, the leveling of the second layer may involves usage of both the powder leveling mechanism and the powder removal mechanism in a single operation. In some embodiments, the leveling of the second layer may involves usage of the powder leveling mechanism closely followed by the powder removal mechanism. In some embodiments, depositing the second layer of powder material by the powder deposition mechanism, leveling it by the leveling mechanism (e.g., shearing) and removing the powder by the powder removal mechanism, are conducted one after another in one lateral run. For example, the three mechanisms may closely follow each other. For example, at least two of the three mechanisms may closely follow each other. For example, the three mechanisms may be integrated in one mechanism. For example, at least two of the three mechanisms may be integrated in one mechanism. The mechanism(s) may spread and/or level the powder in the entire powder bed, or in only a portion of the powder bed. The method may include spreading and leveling the powder bed as the mechanism(s) travel laterally in one direction. The method may include spreading the powder bed as the mechanism(s) travel laterally in a first direction, leveling as the mechanism(s) travel in the opposite direction, and finally removing as the mechanism(s) again go in the first direction. The method may include operation of one or two mechanisms as the mechanism(s) travel laterally in a first direction, and operation of one or two mechanisms as the mechanism(s) travel laterally in the opposite direction. The mechanisms may include the powder dispensing mechanism, the powder leveling mechanism, and the powder removal mechanism. The method may spread and level the powder material without substantially altering the position of the hardened material, whether or not it is anchored (e.g., by auxiliary supports).

In another aspect described herein are methods for generating a three-dimensional object relating to the deposition and leveling of a layer of powder material, wherein the final leveling operations takes place without contacting the top surface of the powder bed. The method comprises providing a first layer of powder material into an enclosure to provide a powder bed having a first top surface (the first top surface is at this stage the exposed surface); generating at least a portion of the three-dimensional object from at least a portion of the powder material; dispensing a second layer of powder material onto the powder bed, wherein the second layer of powder material comprises a second top surface (the second top surface is at this stage the exposed surface); removing (e.g., shearing) the second layer of powder material to form a first planar surface; and removing substantially all the powder material that is above a predetermined second planar surface from the second layer of powder material, wherein the removing occurs without contacting the powder bed. The first planar surface can be at or below the lowest point of the second top surface. The second planar surface can be located below the first planar surface. The removing operations may comprise any powder removal method utilized by the powder removal system described herein.

The generating operation can comprise transforming the powder material to generate a transformed material that subsequently hardens to form a hardened material, wherein at least a portion of the hardened material protrudes from the first top surface, thus forming a protrusion. In some instances, the first layer of powder material is provided on a powder bed. In some instances, the first layer of powder material comprises the protrusion. The protrusion can be any protrusion described herein (e.g., at least a part of the 3D object, or a debris). The protrusion may comprise warping, bending, bulging, curling, rolling, or balling of the hardened material. The height (i.e., vertical distance) of the protruding structure from the exposed (i.e., top) surface of the powder bed may be any of the protrusion values disclosed herein. In some examples, the second planar surface is situated above the first top surface.

Figure 26A:
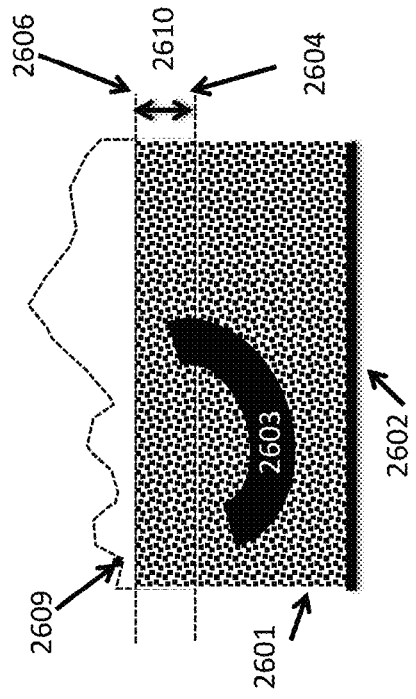
FIGS. 26A-26D schematically depict sequential stages in a method for dispensing and leveling a layer of powder material.
Figure 26C:
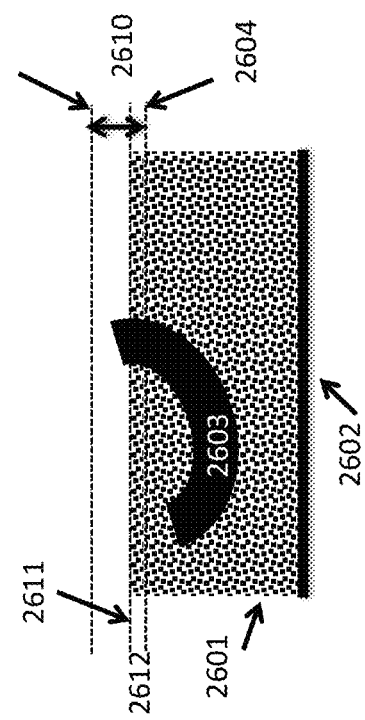
Figure 26B:
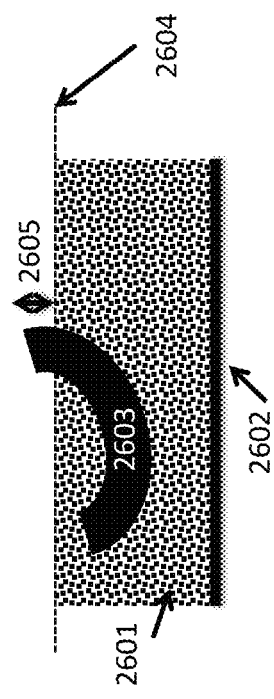
Figure 26D:
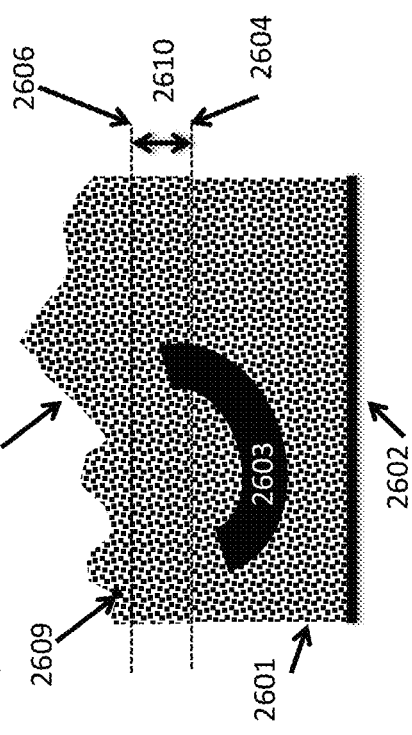

FIGS. 26A-D show examples of various stages of a layering method described herein. FIG. 26A shows a powder bed 2601 in which a (bent) 3D object 2603 is suspended in the powder bed, and is protruding from the exposed (top) surface of the powder bed by a distance 2605. The exposed surface of the powder bed can be leveled (e.g., as shown in FIG. 26A, having a leveled plane 2604), or not leveled. FIG. 26B shows a succeeding operation where a layer is deposited in the powder bed (e.g., above the plane 2604). The newly deposited layer may not have a leveled top surface (e.g., 2608). The unleveled top surface 2608 includes a lowest vertical point 2609. The plane 2606 is a plane that is situated at or below the lowest vertical point of the unleveled surface, and at or above the protruding height 2605. The plane 2606 is located higher than the top surface 2604 by a height 2610. FIG. 26C shows a succeeding operation where the layer is leveled to the vertical position of the plane 2606 by a leveling mechanism. That leveling can be shearing of the powder material. That leveling may not displace the excess of powder material to a different position in the powder bed. FIG. 26D shows a succeeding operation where the leveled layer is leveled to a lower vertical plane level that is above 2604 and below 2606, and is designated as 2611. This second leveling operation may be conducted by the powder removal mechanism, which may or may not contact the exposed layer of the powder bed. This second leveling operation may or may not expose the protruding object. This second leveling operation may be a higher fidelity leveling operation. The average vertical distance from the first top surface to the second planar surface can be at least about 5 µm, 10 µm, 50 µm, 100 µm, 150 µm, 200 µm, 250 µm, 300 µm, 350 µm, 400 µm, 450 µm, or 500 µm. The average vertical distance from the first top surface to the second planar surface can be at most about 700 µm, 500 µm, 450 µm, 400 µm, 350 µm, 300 µm, 250 µm, 200 µm, 150 µm, 100 µm, 50 µm, 10 µm, or 5 µm. The average vertical distance from the first top surface to the second planar surface can be between any of the afore-mentioned average vertical distance values. The average vertical distance from the first top surface to the second planar surface can be from about 5 µnm to about 500 µm, from about 10 µm to about 100 µm, from about 20 µm to about 300 µm, or from about 25 µm to about 250 µm.

The average vertical distance from the first top surface to the second top surface can be at least about 5 nm, 10 µm, 50 µm, 100 µm, 150 µm, 200 µm, 250 µm, 300 µm, 350 µm, 400 µm, 450 µm, 500 µm, 1000 µm, or 1500 µm. The average vertical distance from the first top surface to the second top surface can be at most about 2000 µm, 1500 µm, 1000 µm, 700 µm, 500 µm, 450 µm, 400 µm, 350 µm, 300 µm, 250 µm, 200 µm, 150 µm, 100 µm, 50 µm, 10 nm, or 5 µm. The average vertical distance from the first top surface to the second top surface can be between any of the afore-mentioned average vertical distance values. For example, the average vertical distance from the first top surface to the second top surface can be from about 5 µm to about 2000 µm, from about 50 µm to about 1500 µm, from about 100 µm to about 1000 µm, or from about 200 µm to about 500 µm.

The average vertical distance from the first top surface to the first planar surface can be at least about 5 µm, 10 µm, 50 µm, 100 µm, 150 µm, 200 µm, 250 µm, 300 µm, 350 µm, 400 µm, 450 µm, 500 µm, or 1000 µm. The average vertical distance from the first top surface to the first planar surface can be at most about 1000 µm, 700 µm, 500 µm, 450 µm, 400 µm, 350 µm, 300 µm, 250 µm, 200 µm, 150 µm, 100 µm, 50 µm, 10 µm, or 5 µm. The average vertical distance from the first top surface to the first planar surface can be between any of the afore-mentioned average vertical distance values. The average vertical distance first top surface to the first planar surface can be from about 5 µm to about 1000 µm, from about 50 µm to about 500 µm, from about 10 µm to about 100 µm, from about 20 µm to about 300 µm, or from about 25 µm to about 250 µm.

The removing comprises any methodology used herein by the powder removal mechanism. For example, the removing operation may comprise using vacuum. The removed powder material may be recycled or reused as described herein. For example, the removed (i.e., excess) powder material may be continuously reused in any of the methods described herein.

The dispensing method may utilize any of the powder dispensing mechanism described herein. For example, a dispensing method that utilizes gravitational force, and/or one that uses gas flow (e.g., airflow) that displaces the powder material.

In another aspect described herein are systems for generating a three dimensional object, comprising an enclosure that accommodates a powder bed; an energy source that provides an energy beam to the powder material, and thereby transforms the powder material into a transformed material that subsequently hardens to form a hardened material; a powder dispensing member that dispenses the powder material into the powder bed; a powder leveling member that levels an exposed surface of the powder bed; a powder removing member that removes powder material from an exposed surface of the powder bed without contacting the top surface of the powder bed; and a controller operatively coupled to the energy source, the powder dispensing member, the powder leveling member, and the powder removing member, and is programmed to: direct the powder dispenser to dispense a first layer of the powder material having a first top surface into the powder bed, receive instructions to generate at least part of the three-dimensional object, generate the at least part of the three-dimensional object from a portion of the powder material, direct the powder dispenser to dispense a second layer of powder material having a second top surface adjacent to the first top surface, direct the powder leveling mechanism (e.g., member) to level the second top surface to a first planar surface that is at or below the lowest point of the second top surface, and direct the powder removing mechanism (e.g., member) to remove an excess of powder material from the second layer to a predetermined second planar surface, wherein the second planar surface is below the first planar surface. The hardened material may form at least a part of the 3D object, or be a debris. The second planar surface may be situated above the first top surface. The powder dispensing member may be separated from the exposed surface of the powder bed by a gap. The gap may be any gap disclosed herein. The height (vertical distance) of the gap may be any gap height disclosed herein. For example, the gap distance is from about 10 µm to about 50 mm. The powder leveling mechanism and/or powder evacuating mechanism may displace the hardened material (e.g., 3D object) by about 300 micrometers or less. The powder leveling mechanism and/or powder evacuating mechanisms may be able to level the top surface of the powder bed while altering the position of the hardened material by at most about 1 micrometer (µm), 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 25 µm, 30 µm, 35 µm, 40 µm, 45 µm, 50 µm, 60 µm, 70 µm, 80 µm, 90 µm, 100 µm, 200 µm, or 300 µm. The powder leveling mechanism and/or powder evacuating mechanisms may be able to level the top surface of the powder bed while altering the position of the hardened material by any value between the aforementioned values. For example, the powder leveling mechanisms and/or powder removing mechanism may be able to level the top surface of the powder material while altering the position of the hardened material by a distance of from about 1 µm to about 300 µm, from about 1 µm to about 50 µm, from about 1 µm to about 20 µm, from about 1 µm to about 10 µm, from about 1 µm to about 50 µm, or from about 1 µm to about 100 µm.

The system described herein (e.g., 900) can comprise a recycling system (e.g., 907). The recycling system can collect unused powder material and return the unused powder material to a reservoir of a powder dispensing mechanism, or to the bulk reservoir. At least a fraction of the powder material pushed away by the translating mechanism (e.g., combing mechanism and/or roller) can be recovered by the recycling system. A vacuum (e.g., 908, which can be located at an edge of the powder bed) can collect unused powder. Unused powder can be removed from the powder bed without vacuum. Unused powder can be removed from the powder bed by actively pushing it from the powder bed (e.g., mechanically or using a positive pressurized gas). A gas flow (e.g., 909) can direct unused powder to the vacuum. A powder collecting mechanism (e.g., a shovel) can direct unused powder to exit the powder bed (and optionally enter the recycling system). The recycling system can comprise one or more filters to control a size range of the particles returned to the reservoir.

In some cases, unused powder can be collected by a Venturi scavenging nozzle. The nozzle can have a high aspect ratio (e.g., at least about 2:1, 5:1, 10:1, 20:1, 30:1, 40:1, or 100:1) such that the nozzle does not become clogged with powder particle(s). The nozzle can be aligned with one or more energy beams emitted (e.g., from the primary and/or complementary energy source). For example, the nozzle and the one or more energy beams can be aligned such that the energy source(s) can travel through the nozzle opening when heating the powder layer. The nozzle can collect unused powder as the energy beam is traveling through the nozzle to heat the powder layer.

In some cases, powder can be collected by one or more nozzles and/or vacuum suction ports provided on or adjacent to a heat transfer member, such as a cooling member (e.g., cooling plate), heating member or a heat stabilizing member (e.g., thermostat). The nozzles and/or vacuum suction ports can be mechanically coupled to the heat transfer member.

In some embodiments, the powder may be collected by a drainage system though one or more drainage ports that drain powder from the powder bed into one or more drainage reservoirs. The powder in the one or more drainage reservoirs may be re used (e.g., after filtration and/or further treatment).

The system components described herein can be adapted and configured to generate a 3D object. The 3D object can be generated through a 3D printing process. A first layer of powder can be provided adjacent to a base, substrate or bottom of an enclosure. A base can be a previously formed layer of the 3D object or any other surface upon which a layer or bed of powder is spread, held, placed, or supported. In the case of formation of the first layer of the 3D object the first powder layer can be formed in the powder bed without a base, without one or more auxiliary support features (e.g., rods), or without any other supporting structure other than the powder. Subsequent layers can be formed such that at least one portion of the subsequent layer melts, sinters, fuses, binds and/or otherwise connects to the at least a portion of a previously formed layer. In some instances, the at least a portion of the previously formed layer that is transformed and subsequently hardens into a hardened material, acts as a base for formation of the 3D object. In some cases the first layer comprises at least a portion of the base. The material of the powder can be any material used for 3D printing described herein. The powder layer can comprise particles of homogeneous or heterogeneous size and/or shape.

Figure 3:
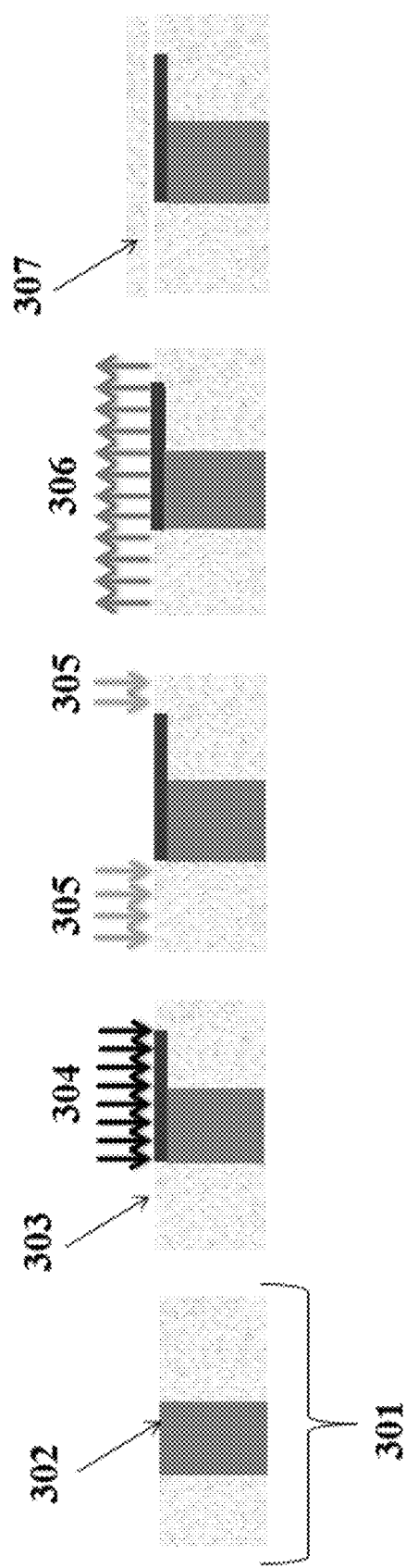
FIG. 3 illustrates a detailed view of the formation of a single solidified layer in the 3D printing process.

FIG. 3 depicts an example of a bed 301 having a partially formed 3D object 302. The partially formed 3D object 302 can comprise at least one layer that was previously transformed and hardened into the 3D object 302. A first layer of powder 303 can be provided adjacent to partially formed 3D object 302. The first layer of powder 303 can be provided at a first temperature ($T_1$). The first temperature can be substantially close to the ambient temperature. In some cases the first layer can have a first temperature ($T_1$) that is above or below room temperature. For example, the first temperature ($T_1$) can be at least about 0° C., 5° C., 10° C., 15° C., 20° C., 25° C., 30° C., 35° C., 40° C., 45° C., 50° C., 60° C., 70° C., 80° C., 90° C., 100° C., 200° C., 300° C., 400° C., or 500° C. The first temperature ($T_1$) can be at most about 0° C., 5° C., 10° C., 15° C., 20° C., 25° C., 30° C., 35° C., 40° C., 45° C., 50° C., 60° C., 70° C., 80° C., 90° C., 100° C., 200° C., 300° C., 400° C., or 500° C. The first temperature can be any value between the afore-mentioned temperature values (e.g., from about 0° C. to about 500° C., from about 0° C. to about 300° C., from about 200° C. to about 500° C., or from about 100° C. to about 400° C.). In some cases the first temperature ($T_1$) can be below 0° C.

Energy from a first (or primary) energy source 304 can be provided to at least a portion of the first layer of powder 303. Energy from the first energy source 304 can be provided to the portion of the first layer of powder (e.g., using a vector scanning technique). In some cases, the primary energy source can be a laser. In some cases, the primary energy source can project a radiation comprising electromagnetic, electron, positron, proton, plasma, or ionic radiation. The electromagnetic beam may comprise microwave, infrared (IR), ultraviolet (UV) or visible radiation. The ion beam may include a cation or an anion. The electromagnetic beam may comprise a laser beam. The primary energy source may include a laser source. The primary energy source may include an electron gun or any other energy source configured to provide targeted energy to a surface or base. The primary energy source can comprise a direct laser diode fiber coupled to a laser. The energy provided to the portion of the first layer of powder can be absorbed by the powder and the powder can experience and increase in temperature as a result of the absorption of energy. The energy provided by the primary energy source can fuse, sinter, melt, bind or otherwise connect one or more portions of a previously solidified layer. Melting of the previously solidified layer and the powder material can merge (e.g., fuse, sinter, melt, bind or otherwise connect) the two together to form the 3D object. In some cases the primary energy source can melt at least about 1, 2, 3, 4, 5, 6, 7, 8, 9, 10, 20, 30, 40, 50, 60, 70, 80, 90, or 100 layers of the previously solidified layer. A layer can have a thickness of at least about 1 µm, 5 µm, 10 µm, 15 µm, 20 µm, 25 µm, 30 µm, 35 µm, 40 µm, 45 µm, 50 µm, 60 µm, 70 µm, 80 µm, 90 µm, 100 µm, 150 µm, 200 µm, 250 µm, 300 µm, 350 µm, 400 µm, 450 µm, 500 µm, or 750 µm. In some cases the first energy source can be a beam of laser light. The laser light can have a power per unit area that is lower than or equal to the power per unit area of the second energy source. The laser light can have a power per unit area that is higher than the power per unit area of the second energy source. The rise in temperature can be sufficient to transform at least a portion of the first layer of powder. The rise in temperature can be sufficient to melt at least a portion of a first layer of powder and allow the molten powder to remain molten for at least about 1femtosecond (fs), 50 fs, 100 fs, 500 fs, 1 picosecond (ps), 50 ps, 100 ps, 500 ps, 1 nanosecond (ns), 50 ns, 100 ns, 500 ns, 1 microsecond (µs), 50 µs, 100 µs, 500 µs, 1 millisecond (ms), 50 ms, 100 ms, or 500 ms. The rise in temperature can be sufficient to melt the entire first layer of powder. The rise in temperature can be sufficient to sinter at least a portion first layer of powder in at least 1 femtosecond (fs), 50 fs, 100 fs, 500 fs, 1 picosecond (ps), 50 ps, 100 ps, 500 ps, 1 nanosecond (ns), 50 ns, 100 ns, 500 ns, 1 microsecond (µs), 50 µs, 100 µs, 500 µs, 1 millisecond (ms), 50 ms, 100 ms, or 500 ms. The rise in temperature can be sufficient to sinter at least a portion first layer of powder in a period of time between the aforementioned periods of time (e.g., from about 1 fs to about 500 ms, from about 1 ns to about 500 ms, from about 1 fs to about 50 ns, or from about 1 ps to about 1 ms). The rise in temperature can be sufficient to sinter the entire first layer of powder. The first layer of powder can be melted along a predetermined pattern or at random. Upon melting the first layer of powder can be at a second temperature ($T_2$). The second temperature ($T_2$) can be greater than the first temperature ($T_1$). The second temperature ($T_2$) can be lower than the first temperature ($T_1$). The second temperature ($T_2$) can be substantially equal to the first temperature ($T_1$). For example, the second temperature ($T_2$) can be at least about 500° C., 750° C., 1000° C., 1250° C., 1500° C., 1750° C., 2000° C., 2250° C., 2500° C., 2750° C., 3000° C., 3500° C., 4000° C., or 5000° C. The second temperature can be any value between the afore-mentioned temperature values (e.g., from about 500° C. to about 2500° C., from about 2250° C. to about 5000° C., or from about 1500° C. to about 3500° C.).

The primary energy source can deliver energy to at least one point in a first layer of powder during a fixed time period. The fixed time period can be chosen such that a specified volume of the powder may reach a target temperature. The time period can be chosen based on the thermal properties of the powder material and the amount of energy provided by the primary energy source. The fixed time period can be at least about 1 femtosecond (fs), 50 fs, 100 fs, 500 fs, 1 picosecond (ps), 50 ps, 100 ps, 500 ps, 1 nanosecond (ns), 50 ns, 0.1 microseconds (µs), 0.5 µs, 1.0 µs, 2.0 µs, 3.0 µs, 4.5 µs, 5.0 µs, 10 µs, 20 µs, 50 µs, 100 µs, 300 µs, 500 µs, or 1 ms. The fixed time period can be at most about 0.1 microseconds (µs), 0.5 µs, 1.0 µs, 2.0 µs, 3.0 µs, 4.5

μs, 5.0 μs, 10 μs, 20 μs, 50 μs, 100 μs, 300 μs, 500 μs, or 1 ms. The fixed time period can be any value between the above-mentioned values (e.g., from about 1 fs to about 1 ms, from about 1 μs to about 500 μs, from about 1 fs to about 50 μs, or from about 1 ps to about 1 ms). The fixed time period can comprise a time period that the primary energy source delivery energy to a point in the powder bed. A point can be a spot in the powder bed with an area equal to a beam fundamental length scale of the primary energy source. The overall time in which energy is applied to an area in the first powder layer can be at least about 1 μs, 50 μs, 100 μs, 500 μs, 1 ms, 50 ms, 0.1 second (s), 0.5 s, or 1 s. During the time that the primary energy source delivers energy to the first powder layer, the primary energy source can deliver energy to each point in the powder layer once, more than once, or not at all.

At least a portion of a powder can be selectively heated by an energy source to form an intended (e.g., predetermined and/or requested) 3D object. The portion of the powder that did not form at least a part of the intended 3D object can be referred to as the remainder. In some cases, the remainder does not form a continuous structure extending over 1 mm, 0.5 mm, 0.1 mm or more. The continuous structure may be a continuous solid structure or continuous solidified structure. A continuous structure can be formed by transforming or partially transforming portions of the powder. The systems and methods described herein may not produce a continuous solid structure in the remainder. For example, they may not produce a transformed portion of powder in the remainder. In some cases the continuous structure does not enclose the 3D object or part thereof. In some cases, the remainder does not form scaffold that encloses a part of, or the entire 3D object. In some cases, the remainder does not form a lightly sintered structure that encloses a part of, or the entire 3D object.

Energy from a second (or complementary) energy source 305 can optionally be provided to at least a portion of the remainder of the first powder layer. The complementary energy source 305 can be separate from the primary energy source 304. In some cases the second energy source is integrated with the primary energy source 304. The energy from the complementary energy source can be provided to the remainder of the first powder layer before, after, or concurrently with providing energy to the portion of the first powder layer with the primary energy source. In some cases, the primary energy source can transform the portion of the first powder layer. The complementary energy source can increase the temperature of at least a portion of the remainder of the first powder layer. In some cases the energy provided by the complementary energy source may not be sufficient to transform the remainder of the first powder layer. The primary energy source can be any energy source disclosed herein. The primary energy source can be any energy source generating an energy beam disclosed herein. The complementary energy source can be any energy source disclosed herein. The complementary energy source can be any energy source generating an energy beam disclosed herein. The complementary energy source can be a laser. The complementary energy source may include a radiation comprising electromagnetic, electron, positron, proton, plasma, or ionic radiation. The electromagnetic beam may comprise microwave, infrared, ultraviolet or visible radiation. The ion beam may include a cation or an anion. The electromagnetic beam may comprise a laser beam. The complementary source may include a laser source. The complementary energy source may include an electron gun or any other energy source configured to provide targeted energy to a surface or base. The complementary energy source can have a power per unit area that is less than the power per unit area of the primary energy source. For example, the complementary energy source can produce an energy beam with an area that is from about 100 to about 1,000,000 larger than the beam area of the first (e.g., primary) energy source. The complementary energy source can deliver energy to at least a portion of the remainder of the first layer of powder for a fixed time period. The fixed time period can be chosen such that a specified volume of the powder reaches a target temperature, the time period can be chosen based on the thermal properties of the powder and the amount of energy provided by the complementary energy source. The fixed time period can be at least about 1 μs, 50 μs, 100 μs, 500 μs, 1 ms, 5 ms, 10 ms, 15 ms, 20 ms, 50 ms, 100 ms, 200 ms, 500 ms, 1 s, 5 s, 10 s, or 1 minute. The fixed time period can be at most about 1 μs, 50 μs, 100 μs, 500 μs, 1 ms, 5 ms, 10 ms, 15 ms, 20 ms, 50 ms, 100 ms, 200 ms, 500 ms, 1s, 5 s, 10 s, or 1 minute. The fixed time period can be any value between the above-mentioned values (e.g., from about 1 μs to about 1 minute, from about 1 μs to about 100 ms, from about 50 ms to about 1 minute, or from about 100 ms to about 10 s). The target temperature can be a temperature below the transforming temperature of the powder material. In some cases, the complementary energy can be delivered to a single point, delivered to more than a single point, not delivered at all, delivered at least once, twice, 5 times, 10 times, 30 times, 100 times, or 1000 times to the same position or to different position(s) in the powder layer. Such delivery of the complementary energy can occur while, before, or after the powder layer is receiving energy from the primary energy source.

In some cases, the complementary energy source can provide energy to a fraction of the powder that is adjacent to at least one part of the 3D object. In some cases, the complementary energy source can preheat at least a fraction of the 3D object before the at least one fraction of the 3D object is heated by the primary energy source. Additionally or alternatively, the complementary energy source can post-heat at least a fraction of the 3D object after the 3D object is heated by the primary energy source. The complementary energy source can remove an oxidized material layer from at least a portion of a surface of the at least one fraction of the 3D object.

The complementary energy source can be an array, or a matrix, of laser diodes. Each of the laser diodes in the array, or matrix, can be independently controlled (e.g., by a control mechanism) such that the diodes can be turned off and on independently. At least a part of the laser diodes in the array or matrix can be collectively controlled such that the at least a part of the laser diodes can be turned off and on simultaneously. In some instances all the laser diodes in the array or matrices are collectively controlled such that all of the laser diodes can be turned off and on simultaneously.

The energy per unit area or intensity of each diode laser in the matrix or array can be modulated independently (e.g., by a control mechanism or system). At times, the energy per unit area or intensity of at least a part of the laser diodes in the matrix or array can be modulated collectively (e.g., by a control mechanism). At times, the energy per unit area or intensity of all of the laser diodes in the matrix or array can be modulated collectively (e.g., by a control mechanism). The complementary energy source can scan along a surface of the powder by mechanical movement of the energy source, an adjustable reflective mirror, or a polygon light scanner. The complementary energy source can project energy using a DLP modulator, a one-dimensional scanner, or a two-dimensional scanner.

After energy is provided to the portion of the first powder layer by the primary energy source and the portion of the remainder by the complementary energy source the energy can be removed from the powder bed by a cooling process where a cooling process may comprise transferring heat from the powder bed 306. In some cases, heat can be transferred from the powder bed to a heat sink. Energy (e.g., heat) can be removed from the powder bed uniformly such that the rate of energy transfer from the portion of the first powder layer heated by primary energy source and the portion of the remainder heated by the complementary energy source transfer heat to the heat sink at a substantially similar rate, at different rates, at patterned rates, at random rates or any combination thereof.

One or more primary energy sources and one or more complementary energy sources can be employed. For example, at least 1, 2, 3, 4, 5, 6, 7, 8, 9, 10, 30, 100, 300 or 1,000 primary energy sources and at least 1, 2, 3, 4, 5, 6, 7, 8, 9, 10, 30, 100, 300 or 1,000 complementary energy sources are employed. The primary and complementary energy sources can be independently or collectively controllable by a control mechanism (e.g., computer), as described herein. At times, at least part of the primary and complementary energy sources can be controlled independently or collectively by a control mechanism (e.g., computer).

The cooling process can be optimized to reduce the time needed to cool the powder bed. At the conclusion of the cooling process the powder bed can have a substantially uniform temperature. A substantially uniform temperature can be a temperature in the powder bed wherein the difference between the average temperature between a first and second point varies by at most about 20%, 15%, 10%, 8%, 6%, 4%, 2%, 1%, 0.5%, or 0.1%. The difference between the average temperature between a first and second point varies by any percentage value between the aforementioned percentage values (e.g., from about 0.1% to about 20%, from about 0.1% to about 5%, or from about 5% to about 20%). The first layer can be cooled to a predetermined temperature within a fixed time period. For example, the fixed cooling time period can be at most about 1 µs, 50 µs, 100 µs, 500 µs, 1 ms, 5 ms, 10 ms, 15 ms, 20 ms, 50 ms, 100 ms, 200 ms, 500 ms, 1 s, 5 s, 10 s, 20 s, 30 s, 40 s, 50 s, 60 s, 70 s, 80 s, 90 s, 100 s, 110 s, 120 s, 130 s, 140 s, 150 s, 160 s, 170 s, 180 s, 190 s, 200 s, 210 s, 220 s, 230 s, 240 s, 250 s, 260 s, 270 s, 280 s, 290 s, 300 s, 10 minutes, 15 minutes, 30 minutes, 1 hour, 3 hours, 6 hours, 12 hours, or 1 day. The fixed time period can be between any of the aforementioned time values (e.g., from about 1 ms to about 1 day, from about 1 µs to about 300 s, from about 1 µs to about 90 s, or from about 1 µs to about 10 s).

After the first layer of powder has reached a sufficiently low temperature of at most about 15° C., 20° C., 25° C., 30° C., 35° C., 40° C., 45° C., 50° C., 55° C., 60° C., 65° C., 70° C., 75° C., 80° C., 85° C., 90° C., 100° C., 200° C., 300° C., 400° C., or 500° C., the process can repeat by providing a second layer of powder 307 adjacent to the first layer. In some cases the second layer of powder 307 can be cooled to a temperature below the temperature of the powder bed. The second layer of powder 307 can absorb heat from the powder bed to aid in the cooling of the powder bed. In some cases at least a fraction of the first powder layer can be removed prior to providing the second layer of powder adjacent to the first layer (e.g., using the powder removing mechanism and/or the powder leveling mechanism). The primary energy source can selectively provide energy to at least a portion of the second powder layer. The primary energy source can be configured to provide sufficient energy to the portion of the second powder layer such that at least a portion of the second powder layer transforms. The complementary energy source can selectively provide energy to at least a portion of the remainder of the second powder layer. The complementary energy source can be configured to provide energy to the remainder of the second powder layer such that at least a portion of the second powder layer undergoes a temperature increase. The temperature increase can be one that is insufficient to transform at least one part of the second powder layer.

In some instances, the 3D object can be formed using only a primary energy source. For example, a first layer of powder can be provided at a first temperature ($T_0$). $T_0$ can be the average temperature in the first layer of powder. The primary energy source can transform at least a portion of the first layer of powder to form a transformed (e.g., fused, sintered or molten) material. Powder material in the first powder layer adjacent to the transformed material can reach a temperature below the transforming temperature of the powder. Powder material in the first powder layer adjacent to the transformed material can reach a temperature below the transformation (e.g., fusion, sintering or melting) temperature of the powder. The transformed material can experience a temperature increase such that the temperature within the transformed material can reach a maximum temperature ($T_2$). The entire first layer of powder can be cooled to an average temperature ($T_1$). $T_1$ may be the predetermined temperature. The powder layer can be cooled from a surface of the powder layer. In some instances $T_1$ may not be greater than $T_0$ by a factor $K_{T20}$ times ($T_2-T_0$). In some instances $T_1$ may not be greater than $T_0$ by at most 0.1 times ($T_2-T_0$). In some instances $T_1$ may not be greater than $T_0$ by at most 0.2 times ($T_2-T_0$). In some instances $T_1$ may not be greater than $T_0$ by at most 0.8 times ($T_2-T_0$). The cooling of the first layer can take time as delineated for cooling time period described herein. In some cases the first layer can be cooled to a temperature such that an average individual can touch it without burning or harming the average individual. In some cases the first layer can be cooled to the sufficiently low temperature described herein. The transformed (e.g., molten) material can harden (e.g., solidify) during the cooling of the first layer. A second powder layer can be provided adjacent to (e.g., above) the first powder layer and the process of transforming at least a portion of the powder layer, and the process of cooling at least a portion of the powder layer (e.g., cooling the entire powder layer, or the entire powder bed), can be repeated. The repetition comprises providing a subsequent powder layer, melting at least a portion of the powder layer, and cooling at least a portion of the powder layer can occur until a final or partial form of a 3D object is obtained. Cooling of the layer can occur by energy transfer from a layer to a cooling member (e.g., a heat sink). Energy can be transferred from a layer along a direction that is oriented away from a powder layer disposed in the powder bed. In some cases, energy can be transferred in a direction toward the surface of a heat sink. The energy can be transferred in the direction of the exposed surface of the powder bed. The energy can be transferred upwards. The energy can be transferred to a cooling member located above the powder bed, or to the side of the powder bed. At times, at least about 20%, 30%, 40%, 50%, 60%, 70%, 70%, 80%, 90%, or 95% of the energy (e.g., heat) is transferred towards the cooling member. At times, at most about 95%, 90%, 80%, 70%, 60%, 50%, 40%, 30%, 30%, or 20% of the energy is transferred towards the cooling member. Sometimes, the energy transferred towards the cooling member can have a percentage value between any of the aforementioned percentage values (e.g., from about 20% to about 95%, from about 20% to about 60%, from about 50% to about 95%).

The final form of the 3D object can be retrieved soon after cooling of a final powder layer. Soon after cooling may be at most about 1 day, 12 hours, 6 hours, 3 hours, 2 hours, 1 hour, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the aforementioned time values (e.g., from about is to about 1 day, from about is to about 1 hour, from about 30 minutes to about 1 day, or from about 20 s to about 240 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen.

In some cases, unused powder can surround the three-dimensional (3D) object in the powder bed. The unused powder can be substantially removed from the 3D object. Substantial removal may refer to powder covering at most about 20%, 15%, 10%, 8%, 6%, 4%, 2%, 1%, 0.5%, or 0.1% of the surface of the 3D object after removal. Substantial removal may refer to removal of all the powder that was disposed in the powder bed and remained as powder at the end of the 3D printing process (i.e., the remainder), except for at most about 10%, 3%, 1%, 0.3%, or 0.1% of the weight of the remainder. Substantial removal may refer to removal of all the remainder except for at most about 50%, 10%, 3%, 1%, 0.3%, or 0.1% of the weight of the printed 3D object. The unused powder can be removed to permit retrieval of the 3D object without digging through the powder. For example, the unused powder can be suctioned out of the powder bed by one or more vacuum ports built adjacent to the powder bed. After the unused powder is evacuated, the 3D object can be removed and the unused powder can be re-circulated to a powder reservoir for use in future builds.

The 3D object can be generated on a mesh substrate. A solid platform (e.g., base or substrate) can be disposed underneath the mesh such that the powder stays confined in the powder bed and the mesh holes are blocked. The blocking of the mesh holes may not allow a substantial amount of powder material to flow though. The mesh can be moved (e.g., vertically or at an angle) relative to the solid platform by pulling on one or more posts connected to either the mesh or the solid platform (e.g., at the one or more edges of the mesh or of the base) such that the mesh becomes unblocked. The one or more posts can be removable from the one or more edges by a threaded connection. The mesh substrate can be lifted out of the powder bed with the 3D object to retrieve the 3D object such that the mesh becomes unblocked. Alternatively, the solid platform can be tilted, horizontally moved such that the mesh becomes unblocked. When the mesh is unblocked, at least part of the powder flows from the mesh while the 3D object remains on the mesh.

The 3D object can be built on a construct comprising a first and a second mesh, such that at a first position the holes of the first mesh are completely obstructed by the solid parts of the second mesh such that no powder material can flow though the two meshes at the first position, as both mesh holes become blocked. The first mesh, the second mesh, or both can be controllably moved (e.g., horizontally or in an angle) to a second position. In the second position, the holes of the first mesh and the holes of the second mesh are at least partially aligned such that the powder material disposed in the powder bed is able to flow through to a position below the two meshes, leaving the exposed 3D object.

In some cases, cooling gas can be directed to the hardened material (e.g., 3D object) for cooling the hardened material during its retrieval. The mesh can be sized such that the unused powder will sift through the mesh as the 3D object is exposed from the powder bed. In some cases, the mesh can be attached to a pulley or other mechanical device such that the mesh can be moved (e.g., lifted) out of the powder bed with the 3D part.

In some cases, the 3D object (i.e., 3D part) can be retrieved within at most about 12 hours (h), 6 h, 5 h, 4 h, 3 h, 2 h, 1 h, 30 minutes (min), 20 min, 10 min, 5 min, 1 min, 40 s, 20 s, 10 s, 9 s, 8 s, 7 s, 6 s, 5 s, 4 s, 3 s, 2 s, or 1 s after cooling of a last powder layer. The 3D object can be retrieved during a time period between any of the aforementioned time periods (e.g., from about 12 h to about 1 s, from about 12 h to about 30 min, from about 1 h to about 1 s, or from about 30 min to about 40 s). The generated 3D object can require very little or no further processing after its retrieval. Further processing may comprise trimming, as disclosed herein. Further processing may comprise polishing (e.g., sanding). For example, in some cases the generated 3D object can be retrieved and finalized without removal of transformed powder and/or auxiliary features. The 3D object can be retrieved when the three-dimensional part, composed of hardened (e.g., solidified) material, is at a handling temperature that is suitable to permit the removal of the 3D object from the powder bed without substantial deformation. The handling temperature can be a temperature that is suitable for packaging of the 3D object. The handling temperature a can be at most about 120° C., 100° C., 80° C., 60° C., 40° C., 30° C., 25° C., 20° C., 10° C., or 5° C. The handling temperature can be of any value between the aforementioned temperature values (e.g., from about 120° C. to about 20° C., from about 40° C. to about 5° C., or from about 40° C. to about 10° C.)

The systems and methods disclosed herein can provide a process for generating a 3D object wherein the process maintains a powder bed, comprising layers of powder material, at a substantially uniform averaged temperature. The powder bed can include a fully or partially formed 3D object wherein the 3D object can be formed by repetitive transforming and subsequent cooling operations of at least a portion of the powder. The completely or partially formed 3D object can be fully supported by the powder bed such that the fully or partially formed object floats or is suspended in the powder bed. The substantially uniform temperature can be lower than a melting temperature of the powder material. For example, the substantially uniform temperature can be at most about 15° C., 25° C., 30° C., 50° C., 75° C., 100° C., 150° C., 200° C., 300° C., 400° C., 600° C., or 1000° C. The substantially uniform temperature can be between any of the aforementioned temperature values (e.g., from about 15° C. to about 1000° C., from about 15° C. to about 300° C., from about 200° C. to about 1000° C., or from about 100° C. to about 500° C.).

A first layer of powder can be provided at an initial time ($t_0$). At least a portion of the first powder layer can be heated or transformed. In some cases, a portion of the first powder layer is not heated or transformed; the powdered portion of the first layer can be heated directly (e.g., by an energy source) or indirectly (e.g., by heat transfer from the transformed portion(s) of powder material). The powder can have a temperature below the transformation temperature of the powder material. In cases where the powder is heated directly, powder can be exposed to an energy source (e.g., the complementary energy source). The energy source that heats the powder can provide energy per unit area ($S_2$) to the powder portion. The energy per unit area $S_2$ can be within at most about 60%, 50%, 40%, 30%, 20%, 15%, 10%, or 5% of a first energy per unit area ($S_1$).

At least a portion of the first layer of powder can be transformed with an energy beam, for example with an energy beam from the primary energy source. The maximum energy per unit area in the first powder layer can be the first energy per unit area ($S_1$). In some cases, a remainder of the first powder is not transformed. The remainder of the first powder layer can be supplied with energy at a third energy per unit area $S_3$ that is less than or equal to about a factor $Ks_{13}$ times $S_1$. The factor Ks can have a value of at least about 0.8, 0.9, 0.7, 0.6, 0.5, 0.4, 0.3, 0.2, 0.1, 0.07, 0.05, 0.03, or 0.01. The factor $Ks_{13}$ can have a value of at most about 0.01, 0.03, 0.05, 0.07, 0.1, 0.2, 0.3, 0.4, 0.5, 0.6, 0.7, 0.8, or 0.9. The factor $Ks_{13}$ can have any value between the afore-mentioned $Ks_{13}$ values. For example, $Ks_{13}$ can have a value of from about 0.01 to about 0.9, from about 0.07 to about 0.5, from about 0.3 to about 0.8, or from about 0.05 to about 0.2. The remainder of the first powder layer can be supplied with energy at a third energy per unit area $S3$ that is less than or equal to about 0.1 times $S_1$. At least a fraction of the energy used to transform the portion of the first powder layer can be removed from the first powder layer, for example using the cooling member. A time $t_2$ can be a later time that occurs after the initial time $t_1$. A second layer can be provided adjacent to the first layer at the time $t_2$. Overall, the energy per unit area that is flowing through a cross section below the first layer in the time interval from about $t_1$ to $t_2$ can be less than about $Ks_{13}$ times $S_1$. A cross section below the first layer can be a region parallel to the first layer. The cross section can be a planar (e.g., horizontal) cross section. In some cases the cross section can be at least about 1 μm, 5 μm, 10 μm, 100 μm, 1 mm, 5 mm, 10 mm, 15 mm, 20 mm, 25 mm, 50 mm, 100 mm, 200 mm, 300 mm, 400 mm, or 500 mm below the first layer. The cross section can be between any of the aforementioned values. For example, the cross section can be from about 1 μm to about 500 mm, from about 100 μm to about 50 mm, from about 5 μm to about 15 mm, from about 10 mm to about 100 mm, or from about 50 mm to about 500 mm.

Energy transfer can occur from a first powder layer to an adjacent (e.g., second) powder layer in a time interval from $t_1$ to $t_2$. In some cases energy transfer can occur from the first powder layer in a direction that is oriented away from the second powder layer (e.g., in the direction of the cooling member and/or in the direction above the exposed surface of the powder bed). The energy transfer from the first powder layer can occur at an energy per unit area $S_2$. The second energy per unit area $S_2$ can be equal to a factor $Ks_{12}$ times $S_1$. $Ks_{12}$ can have a value of at least about 0.1, 0.15, 0.2, 0.25, 0.3, 0.35, 0.4, 0.45, 0.5, 0.55, 0.6, 0.65, 0.7, 0.75, 0.8, 0.85, or 0.9. $Ks_{12}$ can have a value of at most about 0.9, 0.85, 0.8, 0.75, 0.7, 0.65, 0.6, 0.55, 0.5, 0.45, 0.4, 0.35, 0.3, 0.25, 0.2, 0.15, or 0.1. $Ks_{12}$ can have a value between any of the aforementioned $Ks_{12}$ values. For example, $Ks_{12}$ can have a value from about 0.1 to about 0.9, from about 0.25 to about 0.9, from about 0.3 to about 0.8, from about 0.2 to about 0.6 or from about 0.15 to about 0.7. In some instances, the energy transfer may occur via a cooling member (e.g., heat sink). The cooling member may be located above, below or to the side of the powder layer. The cooling member may comprise an energy conductive material. The cooling member may comprise an active energy transfer or a passive energy transfer. The cooling member may comprise a cooling liquid (e.g., aqueous or oil), cooling gas or cooling solid. The cooling member may be further connected to a cooler or a thermostat. The gas or liquid comprising the cooling member may be stationary or circulating.

During formation of a 3D object with the systems and methods provided herein, at least a portion of a powder layer can be heated by an energy source to a temperature sufficient to transform at least a portion of the powder layer. In some cases, the time interval for which a portion of the powder is held at the transforming temperature can be small relative to the total time required to form the 3D object such that the time averaged temperature of the powder is below the transforming temperature of the powder.

Figure 4:
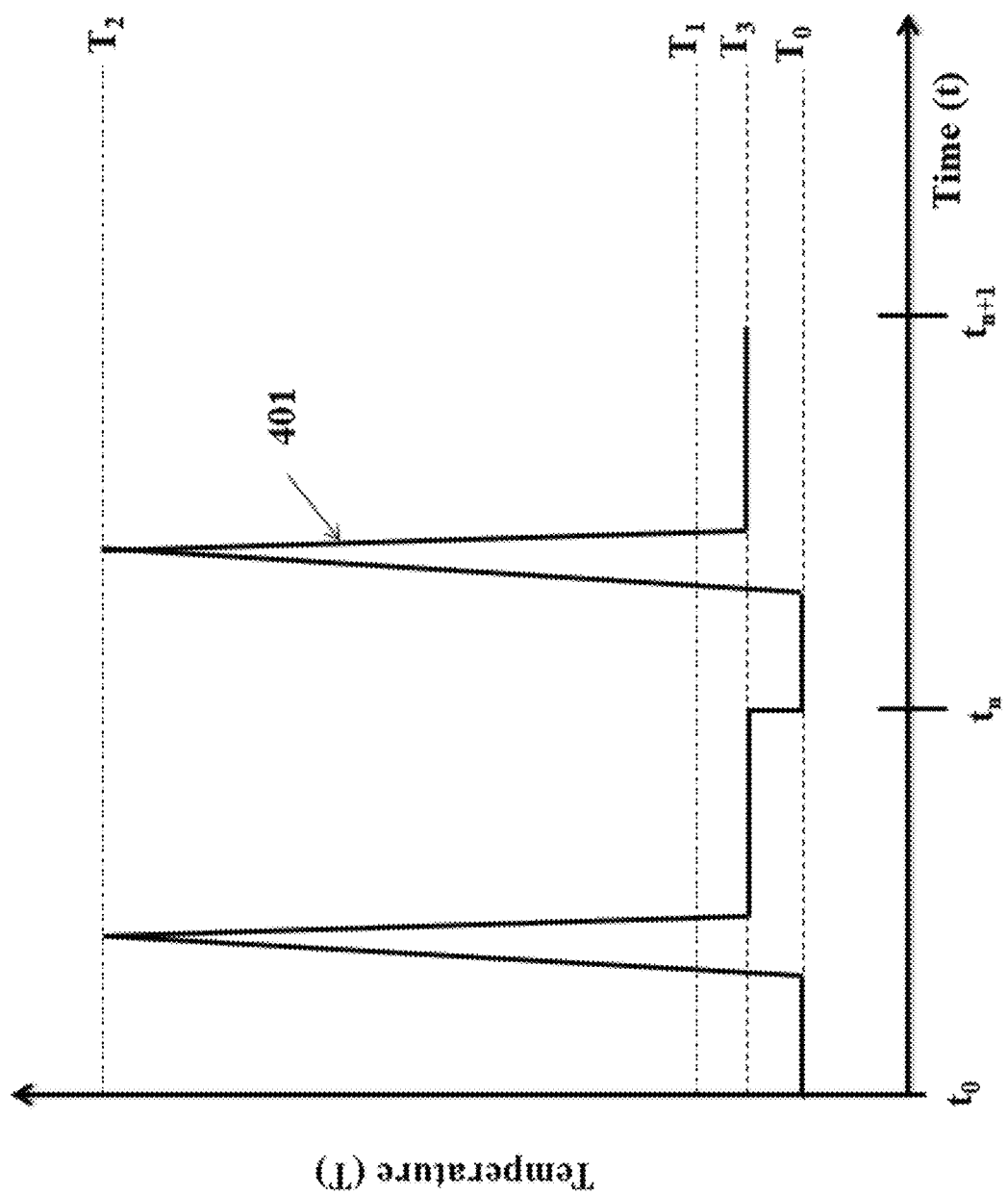
FIG. 4 shows a graph of a temperature time history of a powder layer or group of powder layers.

FIG. 4 is an example of a graphical time temperature history for a system described. The graph in FIG. 4 depicts a temperature profile 401 as a function of time. The temperature profile can represent the temperature as a function of time of at least a portion of a single powder layer, a group of powder layers, or all of the powder layers in the powder bed (e.g., stacked in the powder bed). At an initial time ($t_0$) a layer of powder material can be provided. The layer of powder material can be provided in a chamber or in an enclosure. The powder can be provided at an initial temperature $T_0$. The initial temperature $T_0$ can be the minimum temperature of any powder layer. The initial temperature $T_0$ can be the average, median or mean temperature of any powder layer. The powder layer can be exposed to an energy source that can raise at least a portion of the powder to a temperature $T_2$. In some cases, $T_2$ can be a temperature at or above a transforming temperature of the powder material. The temperature $T_2$ can be the maximum temperature in a powder layer. Energy can be removed from the powder layer, for example by a cooling member (e.g., heat sink), such that the powder layer cools to a temperature $T_3$. The processes of providing a powder layer, heating a powder layer to temperature $T_2$, and cooling the powder layer to a temperature $T_3$ can be repeated n times, where n can be an integer greater than or equal to 1. The repetition of these processes can generate a collection of adjacent powder layers (e.g., stacked powder layers) from one layer to an $n^{th}$ layer. The repetition of these processes n times can occur over a time interval from the initial time $t_0$ to a later time $t_0$. An additional powder layer, the n+1 powder layer, can be provided adjacent to (e.g., above) the $n^{th}$ powder layer. The n+1 powder layer can be provided in the chamber. The n+1 powder layer can be provided at an initial temperature $T_0$. The initial temperature $T_0$ can be the minimum temperature of any powder layer in the collection of powder layers one (i.e., the first powder layer) to n+1. The n+1 powder layer can be exposed to the energy source that can raise at least a portion of the powder layer number n+1 to a temperature $T_2$. In some cases, $T_2$ can be a temperature at or above a transforming temperature of the powder material. The temperature $T_2$ can be the maximum temperature in a powder layer in the collection of powder layers from the first layer to the n+1 layer. Energy can be removed from the n+1 powder layer, for example by a heat sink, such that the n+1 powder layer cools to a temperature $T_3$. Removal of the energy from the n+1 powder layer can end at a time $t_{n+1}$. A time average temperature of at least a portion of a single powder layer, a group of powder layers, or all of the powder layers in the collection (e.g., layers one through n+1) can be considered for the time interval from $t_0$ to $t_{n+1}$. The temperature $T_2$ can be the maximum temperature in the n+1 layer in the time interval from $t_0$ to $t_{n+1}$. The temperature $T_0$ can be the minimum temperature of any of the layers in the time interval from $t_0$ to $t_{n+1}$. The temperature $T_0$ can be the mean, average or median temperature of any of the layers in the time interval from $t_0$ to $t_{n+1}$. The temperature $T_1$ can be the time average temperature of any point or group of points in at least a subset of the layers in the time interval from $t_0$ to $t_{n+1}$. In some cases the temperature $T_1$ can be greater than $T_0$ by a factor $K_{T20}$ times $(T_2-T_0)$. The factor $K_{T20}$ can have a value of at least about 0.01, 0.03, 0.05, 0.07, 0.1, 0.2, 0.3, 0.4, 0.5, 0.6, 0.7, 0.8, or 0.9. The factor $K_{T20}$ can have a value of at most about 0.9, 0.8, 0.7, 0.6, 0.5, 0.4, 0.3, 0.2, 0.1, 0.07, 0.05, 0.03, or 0.01. The factor $K_{T20}$ can have a value between any of the aforementioned values. For example, $K_{T20}$ can have a value from about 0.01 to about 0.9, from about 0.1 to about 0.5, from about 0.01 to about 0.2, or from about 0.1 to about 0.9. In some cases the temperature $T_1$ can be greater than $T_0$ by no more than about 0.2 times $(T_2-T_0)$. In some cases the temperature $T_1$ can be greater than $T_0$ by no more than about 0.1 times $(T_2-T_0)$. In some cases the temperature $T_1$ can be greater than $T_0$ by no more than about 0.05 times $(T_2-T_0)$. In some cases the temperature $T_1$ can be greater than $T_0$ by no more than about 0.01 times $(T_2-T_0)$.

In one instance, at least one layer comprising powder material can be provided adjacent to (e.g., above) the base, the substrate or the bottom of the enclosure. An additional layer of powder can be provided adjacent to (e.g., above) the at least one layer at a time $t_1$. At least a portion of the additional layer can be transformed by providing energy to at least a portion of the additional layer. At least a fraction of the provided energy can be removed from the additional layer such that the energy removal is completed by a time $t_2$. Time $t_2$ can be a greater (e.g., later) time than $t_1$. In a time interval form $t_1$ to $t_2$ a maximum temperature in the additional layer can be a temperature $(T_2)$. A minimum temperature in any of the layers can be a temperature $(T_0)$. $T_2$ can be greater than $T_0$. The highest time averaged temperature in any point in the layers can be a temperature $(T_1)$. In some cases the temperature $T_1$ can be greater than $T_0$ by $K_{T20}$ times $(T_2-T_0)$.

The primary energy source and complementary energy source can provide energy to a base and/or a powder layer with variable power per unit area. Power per unit area can refer to amount of power delivered to an area (e.g., energy per unit area per time). In some cases the primary energy source can provide energy with a first power per unit area $(P_1)$. The complementary energy source can provide energy with a second power per unit area $(P_2)$. The first power per unit area $(P_1)$ can be higher than the second power per unit area $(P_2)$. For example, the second power per unit area $(P_2)$ can have a value of at least $0.01*P_1$, $0.02*P_1$, $0.03*P_1$, $0.04*P_1$, $0.05*P_1$, $0.06*P_1$, $0.07*P_1$, $0.08*P_1$, $0.09*P_1$, $0.1*P_1$, $0.2*P_1$, $0.3*P_1$, $0.4*P_1$, $0.5*P_1$, $0.6*P_1$, $0.7*P_1$, $0.8*P_1$, or $0.9*P_1$. The second power per unit area $(P_2)$ can have a value of at most $0.01*P_1$, $0.02*P_1$, $0.03*P_1$, $0.04*P_1$, $0.05*P_1$, $0.06*P_1$, $0.07*P_1$, $0.08*P_1$, $0.09*P_1$, $0.1*P_1$, $0.2*P_1$, $0.3*P_1$, $0.4*P_1$, $0.5*P_1$, $0.6*P_1$, $0.7*P_1$, $0.8*P_1$, or $0.9*P_1$. In some cases the second power per unit area (P2) can be in between any of the values listed. For example, the second power per unit area $(P_2)$ can be from about $0.01*P_1$ to about $0.9*P_1$, from about $0.3*P_1$ to about $0.9*P_1$, from about $0.01*P_1$ to about $0.4*P_1$, or from about $0.1*P_1$ to about $0.8*P_1$. The first power per unit area $(P_1)$ can be selected such that the portion of the powder layer that is provided energy from the primary energy source is less than or equal to about 1%, 5%, 10%, 20%, 30%, 40%, or 50% of the total surface area of the powder layer.

Figure 5:
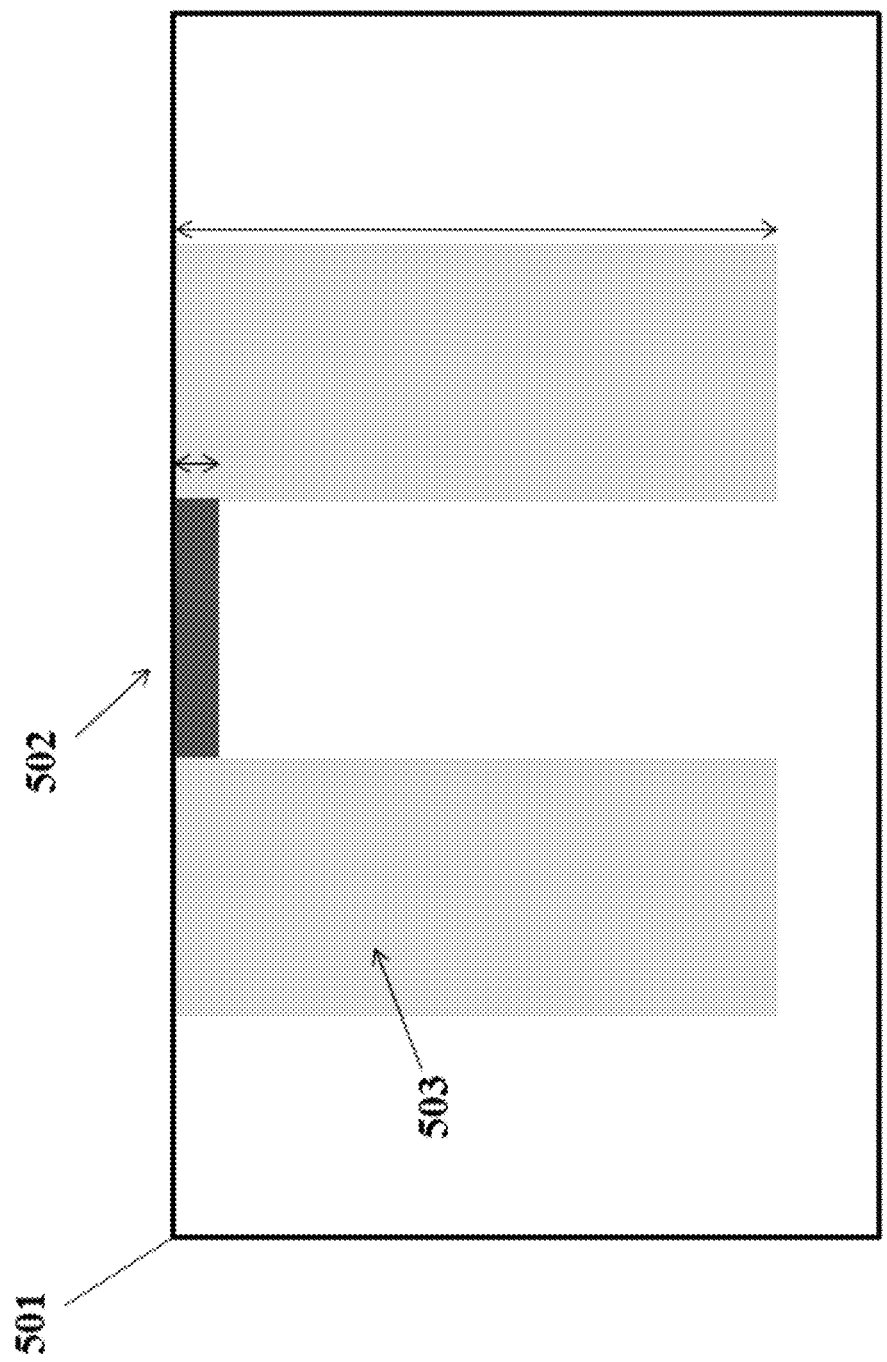
FIG. 5 schematically illustrates the volume of the powder bed heated by the primary and complementary energy sources.

The power per unit area can be controlled by varying any combination of the area over which the energy is provided, the intensity of the delivered energy, and the time over which the energy is provided. Providing the energy over a longer period of time will cause the energy to permeate deeper into the powder bed that can result in a temperature increase in deeper powder layers (i.e., earlier deposited powder layers). The power per unit area of the primary energy source $(P_1)$ and the complementary energy source $(P_2)$ can be varied such that the energy per unit area (e.g., amount of energy per unit area) delivered to the powder bed by the primary and complementary energy sources is substantially similar. FIG. 5 depicts an example of volumes of the powder bed 501 that can increase in temperature from the primary and complementary energy sources. The primary energy source can provide a high intensity energy beam to a relatively small area of the powder bed for a period of time on the order of about 1 μs or less. As a result a small volume 502 (e.g., area and depth) of the powder bed can experience an increase in temperature sufficient to transform the portion of the powder bed that is exposed to the primary energy source. The powder adjacent to the portion of the powder bed that is exposed to the primary energy source may not transform. In comparison, the complementary energy source can deliver an energy beam with a lower intensity than the primary energy beam to a relatively larger area for a relatively longer time period. As a result, the area exposed to the complementary energy beam can experience a lower temperature increase than the area exposed to the primary energy beam. The area exposed to the complementary energy beam can experience a temperature increase to a temperature below the transforming temperature such that the area exposed to the complementary energy beam does not transform. Furthermore, the area exposed to the complementary energy beam can experience a temperature rise deeper in to the powder bed (e.g., over a larger volume, 503).

In some cases the primary energy source and complementary energy source power per unit areas can be adjusted non-uniformly across the portion of the powder layer and the remainder of the powder layer respectively. The power per unit areas can be adjusted non-uniformly to decrease the influence of imperfections. For example a region with enhanced heat transfer, for example an edge of the powder bed can lose heat more quickly than an area of the powder bed towards the center. In order to compensate for such imperfection the primary and/or complementary energy source can provide a slightly higher power per unit area to the edges as compared to the center of the powder bed. The temperature of the powder bed can be monitored continuously using at least one temperature sensor and the power per unit area of the primary and/or complementary energy source can be modulated in real time to correct temperature gradients and/or non-uniformities.

Figure 6:
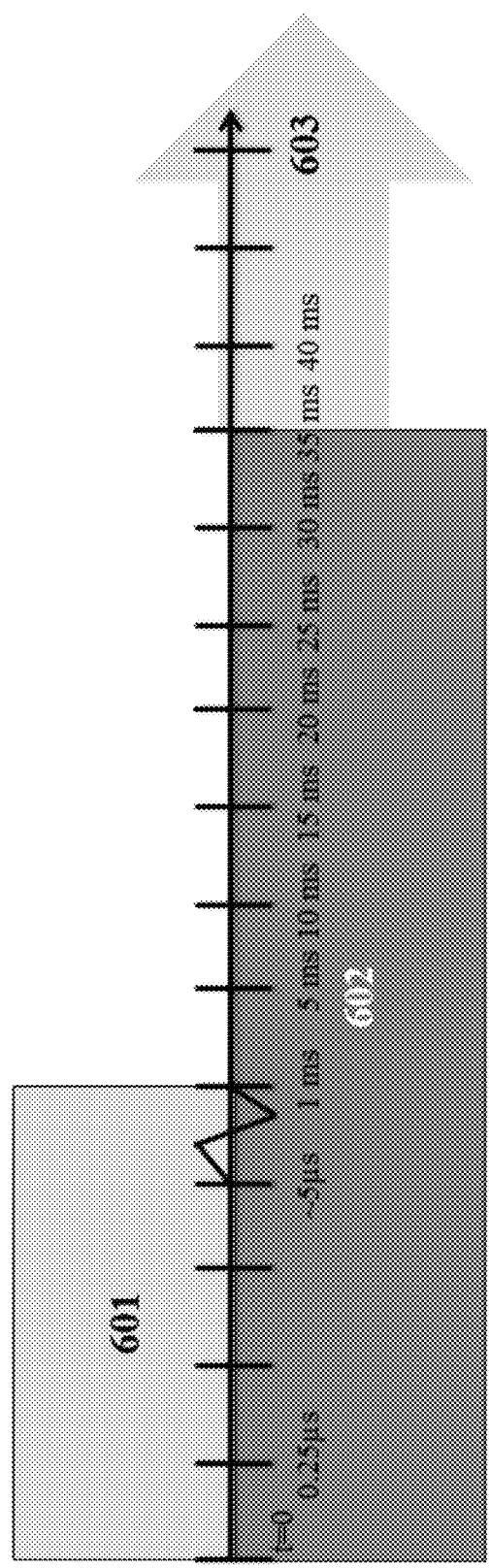
FIG. 6 illustrates a timeline of the 3D printing process for a single layer.

The primary and complementary energy sources can heat the powder layer at substantially the same time. FIG. 6 depicts an example of a timeline that can be implemented to form a layer of the 3D object. Starting at an initial time $t_0$ the primary energy source and the complementary energy source can begin heating the powder bed. The primary energy source can heat the powder surface for a finite period of time (e.g., for a few micro seconds 601). After the primary energy source finished heating the powder bed it may turn off. Concurrently the complementary energy source can heat the remainder of the first layer and/or a lateral portion of the base 602. The complementary energy source can heat the remainder of the first layer and/or a lateral portion of the base for a second time period (e.g., time period of 10-60 milliseconds). Once both the primary and complementary energy sources have finished heating the powder bed the powder bed can be cooled 603. Formation of one layer including heating and cooling of the powder layer can take up to about 30 seconds. The portion of the powder bed heated by the primary energy source and the portion of the powder bed heated by the complementary energy source can be cooled at substantially the same rate. Cooling both portions of the powder bed at the same rate can reduce thermal stresses such that the three-dimensional part formed by transforming (e.g., melting) and cooling the portion of the powder bed does not move or deform (e.g., warp) during the cooling process. Cooling both portions of the powder bed at substantially the same rate can reduce or eliminate the need for auxiliary support features to hold the 3D object in place during the printing process. The energy beam of the primary and/or complementary beam can have a variable intensity and/or a variable spot size and spot geometries.

At least a portion of the powder layer (e.g., first powder layer) can be heated by the primary energy source. The portion of the powder layer can be heated to a temperature that is greater than or equal to a temperature wherein at least part of the powder material is transformed to a liquid state (referred to herein as the liquefying temperature) at a given pressure. The liquefying temperature can be equal to a liquidus temperature where the entire material is at a liquid state at a given pressure. The liquefying temperature of the powder material can be the temperature at or above which at least part of the powder material transitions from a solid to a liquid phase at a given pressure. The remainder of the powder layer can be heated by the complementary energy source. The remainder of the powder layer can be at a temperature that is less than the liquefying temperature. The maximum temperature of the transformed portion of the powder and the temperature of the remainder of the powder can be different. The solidus temperature of the powder material can be a temperature wherein the powder material is in a solid state at a given pressure. After the portion of the first layer is heated to the temperature that is greater than or equal to a liquefying temperature of the powder material by the primary energy source, the portion of the first layer is cooled to allow the transformed powder portion to harden (e.g., solidify). Once the portion of the first layer hardens, a subsequent (e.g., second) powder layer can be provided adjacent to (e.g., above) the first powder layer. The portion of the first layer can harden during cooling of both the transformed portion, and the remaining powder of the first layer in the powder bed. In some cases, the liquefying temperature can be at least about 100° C., 200° C., 300° C., 400° C., or 500° C., and the solidus temperature can be at most 500° C., 400° C., 300° C., 200° C., or 100° C. For example, the liquefying temperature is at least about 300° C. and the solidus temperature is at most about 300° C. As another example, the liquefying temperature is at least about 400° C. and the solidus temperature is at most about 400° C. The liquefying temperature may be different than the solidus temperature. In some instances, the temperature of the powder material is maintained above the solidus temperature of the material and below its liquefying temperature. In some instances, the material from which the powder material is composed has a super cooling temperature (or super cooling temperature regime). As the energy source heats up the powder material to cause at least part of the powder material to melt, the melted material will remain melted as the powder bed is held at or above the material super cooling temperature of the material, but below its melting point. When two or more materials make up the powder bed at a specific ratio, the materials may form a eutectic material on transforming (e.g., fusion, sintering, melting, bonding, or connecting) the powder material. The liquefying temperature of the formed eutectic material may be the temperature at the eutectic point, close to the eutectic point, or far from the eutectic point. Close to the eutectic point may designate a temperature that is different from the eutectic temperature (i.e., temperature at the eutectic point) by at most about 0.1° C., 0.5° C., 1° C., 2° C., 4° C., 5° C., 6° C., 8° C., 10° C., or 15° C. A temperature that is farther from the eutectic point than the temperature close to the eutectic point is designated herein as a temperature far from the eutectic point. The process of transforming (e.g., liquefying) and hardening (e.g., solidifying) a portion of the first layer can be repeated until all layers of a 3D object are formed. At the completion of the formation process, the generated 3D object can be removed from the powder bed. The powered powder can be separated from the portion at the completion of the process. The 3D object can be solidified and removed from the container accommodating the powder bed.

A 3D object can be formed from a powder bed. The powder can comprise particles of a material that is the desired composition material of the 3D object. The powder bed can comprise a mixture of materials that upon transforming will comprise the material that is the desired composition material of the 3D object. A layer of powder material can be provided adjacent to a base (or to a substrate, bottom of the enclosure, or bottom of the container accommodating the powder bed) or to another layer of the powder material. The powder can be confined in a container (referred to herein as "powder bed"). In some cases the powder bed can be insulated, actively cooled, actively heated, or held at a constant temperature using a temperature-adjusting unit (e.g., a heater or a refrigerator). At least part of the temperature-adjusting unit may be embedded in the walls of the powder bed. The 3D object can be formed by sequential addition of material layers in a predetermined pattern. A first layer can be formed by transforming a portion of a first powder layer without transforming a remainder of the first powder layer. At times, the first deposited powder layer remains untransformed, and transformation occurs in subsequently deposited powder layers. A primary energy source can propagate (e.g., scan) along the surface of at least a portion of the first powder layer in a predetermined pattern. The portion of the first powder layer that interacts with (e.g., scanned by) the primary energy source can experience a temperature increase. The temperature increase can transform the material to create a transformed material that subsequently hardens (e.g., solidifies) from at least a portion of the powder layer (e.g., the first powder layer). The scan rate of the primary energy source can be at least about 0.01 mm/s, 0.1 mm/s, 1 mm/s, 5 mm/s, 10 mm/s, 15 mm/s, 20 mm/s, 25 mm/s, or 50 mm/s. The scan rate of the primary energy source can be at most about 0.01 mm/s, 0.1 mm/s, 1 mm/s, 5 mm/s, 10 mm/s, 15 mm/s, 20 mm/s, 25 mm/s, or 50 mm/s. The scan rate of the primary energy source can be any value in between the above-mentioned values (e.g., from about 0.01 mm/s to about 50 mm/s, from about 0.01 mm/s to about 20 mm/s, or from about 15 mm/s to about 50 mm/s).

A complementary energy source can provide energy to heat up a remainder of the first powder layer. The remainder can be an area on the surface of the first powder layer that is adjacent to the portion of the first powder layer that is scanned by the primary energy source. The remainder can be heated to a temperature below the transforming temperature such that the remaining powder does not transform (e.g., melt). The remaining powder can remain in a solid state throughout the formation of the 3D object. The microstructure and/or grain structure of the remaining powder can remain substantially unaltered throughout the formation of the 3D object, as compared with the deposited powder material. Substantially unaltered refers to the lack of phase change, and to a change of grain size or microstructure size of at most about 20%, 10%, 5%, 1% or less.

Figure 7:
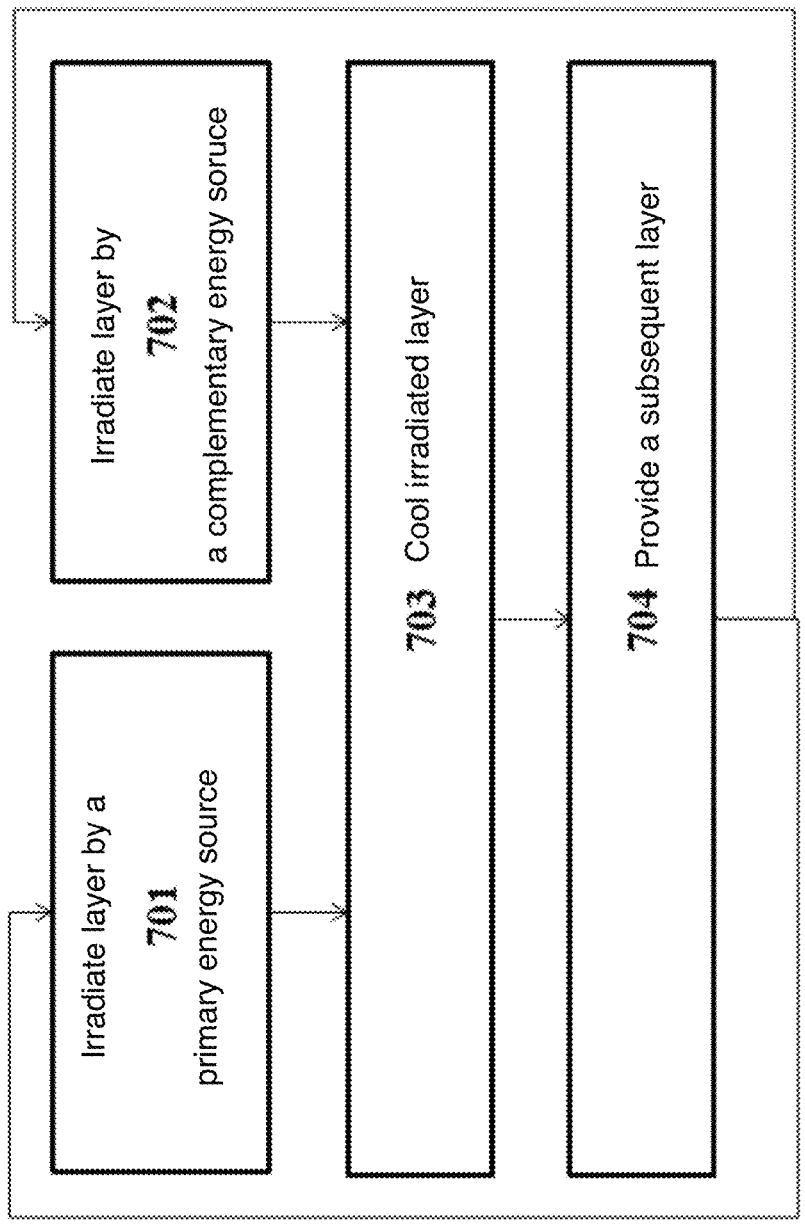
FIG. 7 illustrates a flow chart describing a 3D printing process.

After providing the primary and complementary energy source to the portion of the first powder layer and the remainder of the first powder layer, respectively, the first powder layer can be cooled. The transformed portion of the first powder layers can harden (e.g., solidify) while the first powder layer is cooled. The portion and the remaining powder can be cooled at substantially the same rate. After the powder layer is cooled, a subsequent (e.g., second) powder layer can be provided adjacent to (e.g., above) the first powder layer and the process can be repeated until all layers (e.g., cross sections) of the 3D object are formed such that the complete 3D object is generated. FIG. 7 summarizes a printing process as described herein. A first powder layer can be irradiated by a primary energy source 701. The first layer can be irradiated by a complementary energy source 702; the irradiation by the complementary energy source can be before, after, or concurrent with the irradiation by the primary energy source. In some cases the complementary energy source is not used to irradiate the first layer or subsequent layers. The first powder layer can then be cooled 703. The first powder layer can be cooled uniformly such that temperature gradients are mild or substantially not present in the powder bed. In some cases portions of the powder bed that were transformed by the primary energy source can solidify during the cooling operation 703. After the cooling, a subsequent (e.g., second) layer of powder can be provided adjacent to the first layer 704. The process can repeat with irradiation of the subsequent layer of powder until the 3D object is formed.

The 3D object can be formed without one or more auxiliary features and/or without contacting a base. The one or more auxiliary features (which may include a base support) can be used to hold or restrain the 3D object during formation. In some cases auxiliary features can be used to anchor or hold a 3D object or a portion of a 3D object in a powder bed. The one or more auxiliary features can be specific to a part and can increase the time needed to form the 3D object. The one or more auxiliary features can be removed prior to use or distribution of the 3D object. The longest dimension of a cross-section of an auxiliary feature can be at most about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a cross-section of an auxiliary feature can be at least about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a cross-section of an auxiliary feature can be any value between the above-mentioned values (e.g., from about 50 nm to about 300 mm, from about 5 μm to about 10 mm, from about 50 nm to about 10 mm, or from about 5 mm to about 300 mm).

Without wishing to be bound to theory, the cooling rate of the powder bed that surrounds the solidifying part, may affect the thermal stresses within that solidifying part. In the methods and systems provided herein, the powder bed is cooled at substantially the same rate such that the temperature gradients in the powder bed are substantially flat. The flat temperature gradients provided by the systems and methods herein may at least reduce (e.g., eliminate) thermal stresses on the solidifying part, and thus at least may reduce thermal stresses in the formed 3D object. As a result of the reduction of thermal stresses on the 3D object during formation, the 3D object may be formed without auxiliary features. Eliminating the need for auxiliary features can decrease the time and cost associated with generating the three-dimensional part. In some examples, the 3D object may be formed with auxiliary features. In some examples, the 3D object may be formed with contact to the container accommodating the powder bed.

The methods and systems provided herein can result in fast and efficient formation of 3D objects. In some cases, the 3D object can be transported within at most about 120 min, 100 min, 80 min, 60 min, 40 min, 30 min, 20 min, 10 min, or 5 min after the last layer of the object hardens (e.g., solidifies). In some cases, the 3D object can be transported within at least about 120 min, 100 min, 80 min, 60 min, 40 min, 30 min, 20 min, 10 min, or 5 min after the last layer of the object hardens. In some cases, the 3D object can be transported within any time between the above-mentioned values (e.g., from about 5 min to about 120 min, from about 5 min to about 60 min, or from about 60 min to about 120 min). The 3D object can be transported once it cools to a temperature of at most about 100° C., 90° C., 80° C., 70° C., 60° C., 50° C., 40° C., 30° C., 25° C., 20° C., 15° C., 10° C., or 5° C. The 3D object can be transported once it cools to a temperature value between the above-mentioned temperature values (e.g., from about 5° C. to about 100° C., from about 5° C. to about 40° C., or from about 15° C. to about 40° C.). Transporting the 3D object can comprise packaging and/or labeling the 3D object. In some cases the 3D object can be transported directly to a consumer, government, organization, company, hospital, medical practitioner, engineer, retailer, or any other entity, or individual that is interested in receiving the object.

The system can comprise a controlling mechanism (e.g., a controller) comprising a computer processing unit (e.g., a computer) coupled to the primary (first) and optionally to a complementary (e.g., second) energy sources. The computer can be operatively coupled to the primary and optionally to the complementary energy sources through a wired or through a wireless connection. In some cases, the computer can be on board a user device. A user device can be a laptop computer, desktop computer, tablet, smartphone, or another computing device. The controller can be in communication with a cloud computer system or a server. The controller can be programmed to selectively direct a first energy source to apply energy to the portion of the layer of powder at a power per unit area ($P_1$). The controller can be in communication with the scanner configured to articulate the first energy source to apply energy to the portion of the layer of powder at a power per unit area ($P_1$). The controller can be further programmed to selectively direct (e.g., articulate to) the second energy source to apply energy to at least a portion of the remainder of the layer and/or the lateral portion of the base at a second power per unit area ($P_2$). The controller can be operatively connected to the scanner configured to articulate the first energy source to apply energy to the portion of the layer of powder at a power per unit area ($P_1$). The controller (e.g., computer) can be programmed to direct the first energy source and second energy source to apply energy substantially simultaneously.

In some cases, the system can comprise a controller (e.g., computer) coupled to an energy source. The controller can be programmed to transform or heat a portion of a powder layer with the energy source such that the portion reaches a maximum temperature $T_2$. The temperature $T_2$ can be higher than an initial temperature of the powder layer $T_0$. The controller can be further configured to facilitate the cooling of the powder layer to an average temperature $T_1$ in a time period that is at most about 1 day, 12 hours, 6 hours, 3 hours, 2 hours, 1 hour, 30 minutes, 15 minutes, 5 minutes, 240 seconds (s), 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s, to form a hardened material that is at least a portion of the 3D object. In some cases $T_1$ is not greater than $T_0$ than about 0.2 times $(T_2-T_1)$. In some instances $T_1$ may not be greater than $T_0$ by at most about 0.1 times $(T_2-T_0)$. In some instances $T_1$ may not be greater than $T_0$ by at most about 0.2 times $(T_2-T_0)$. In some instances $T_1$ may not be greater than $T_0$ by at most about $K_{T20}$ times $(T_2-T_0)$.

The scanner can be included in an optical system that is configured to direct energy from the first energy source to a predetermined position of the powder layer. The controller can be programmed to control a trajectory of the first and/or the second energy source with the aid of the optical system. The control system can regulate a supply of energy from the energy source to a powder layer to form a 3D object or a portion thereof.

The controller (e.g., computer having one or more computer processors) can be in network communication with a remote computer system that supplies instructions to the computer system to generate the 3D object. The controller can be in network communication with the remote computer through a wired or through a wireless connection. The remote computer can be a laptop, desktop, smartphone, tablet, or other computer device. The remote computer can comprise a user interface through which a user can input design instructions and parameters for the 3D object. The instructions can be a set of values or parameters that describe the shape and dimensions of the 3D object. The instructions can be provided through a file having a Standard Tessellation Language file format. In an example, the instructions can come from a 3D modeling program (e.g., AutoCAD, SolidWorks, Google SketchUp, or SolidEdge). In some cases, the model can be generated from a provided sketch, image, or 3D object. The remote computer system can supply design instruction to the computer processor. The controller can direct the first and the optionally second energy source in response to the instructions received from the remote computer. The controller can be further programmed to optimize a trajectory of path (e.g., vector) of the energy applied from the first and/or second energy source to a portion or remainder of the powder layer, respectively. Optimizing the trajectory of energy application can comprise minimizing time needed to heat the powder, minimizing time needed to cool the powder, minimizing the time needed to scan the area that needs to receive energy or minimizing the energy emitted by the energy source(s).

In some cases, the controller can be programmed to calculate the necessary first power per unit area $(P_1)$ and second power per unit area $(P_2)$ that should be provided to the powder layer in order to achieve the desired result. The controller can be programmed to determine the time that an energy source should be incident on an area of a determined size in order to provide the necessary first or second powder density. In some cases the desired result can be to provide uniform energy per unit area within the powder bed. Additionally the desired result can be to transform a portion of the layer of the powder bed with the primary energy source at the first power per unit area $(P_1)$ and to not transform the remainder of the layer with the complementary energy source at the second power per unit area $(P_2)$. The controller can be programmed to optimize the application of energy from the first and/or second energy sources. Optimizing the energy application can comprises minimizing time needed to heat the powder, minimizing time needed to cool the powder, minimizing the energy emitted by the energy source(s), or any combination thereof.

The system can further comprise a cooling member (e.g., heat sink) configured to cool, heat or stabilize the temperature of the portion of the transformed powder layer and/or at least a portion of the remainder of the powder layer. The cooling member can be configured to cool, heat or stabilize (e.g., equilibrate) the temperature of the portion of the powder layer and the at least a portion of the remainder of the powder layer at substantially the same rate. The cooling member can cool, heat or stabilize the temperature of the portion of the powder layer and/or at least a portion of the remainder of the powder layer by initiating heat transfer from the powder to the cooling member. For example, the cooling member can be configured to remove energy at a rate greater than or equal to about $P_1$. The cooling member can be maintained at a temperature that is substantially lower than the temperature of the powder bed. Heat can be transferred from the powder material to the cooling member by any one or combination of heat transfer modes including conduction, natural convection, forced convection, or radiation. The cooling member may comprise a material that conducts heat efficiently. For example, the cooling member may comprise liquid (e.g., water). The liquid may circulate in the cooling member within channels in or on the cooling member. The heat (thermal) conductivity of the cooling member may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The thermal conductivity of the cooling member may be any value between the aforementioned thermal conductivity values (e.g., from about 20 W/mK to about 1000 W/mK, from about 20 W/mK to about 500 W/mK, or from about 500 W/mK to about 1000 W/mK). The aforementioned thermal conductivity can be at a temperature of equal to or above about 100° C., 200° C., 300° C., 400° C., 500° C., or 800° C. The cooling member can be separated from the powder bed or powder layer by a gap. The gap can have a variable or adjustable spacing. Alternatively, the cooling member can contact the powder bed or the powder layer. In some instances, the cooling member can be alternately and sequentially brought in contact with the powder layer. The gap can be filled with a gas. The gas can be chosen in order to achieve a specific heat transfer property between the powder and the cooling member. For example, a gas with high thermal conductivity can be chosen to increase the rate of conductive heat transfer from the powder to the plate. The gas between the plate and the powder layer can comprise argon, nitrogen, helium, neon, krypton, xenon, hydrogen, carbon monoxide, carbon dioxide, or oxygen. The gas can be air. The gas can by any gas mentioned herein. In some cases the system can be stored and operated in a vacuum chamber in which case there will be at most a thin layer (e.g., as compared to ambient atmosphere) between the plate and the powder layer. The distance between the cooling member and the powder layer can influence the heat transfer between the cooling member and the powder layer. The vertical distance of the gap from the exposed surface of the powder bed may be at least about 50 µm, 100 µm, 250 µm, 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The vertical distance of the gap from the exposed surface of the powder bed may be at most about 50 µm, 100 µm, 250 µm, 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. The vertical distance of the gap from the exposed surface of the powder bed may be any value between the aforementioned values (e.g., from about 50 µm to about 100 mm, from about 50 µm to about 60 mm, or from about 40 mm to about 100 mm). In some instances, there is no gap (i.e., the gap is zero). In some cases, the gap can be adjustable. The cross section of the gap can be controlled by a control system (e.g., a computer). The gap can have a substantially uniform dimension across the entire cooling member, or across the powder bed. In some cases, the gap distance can vary across the powder bed. In some instances, the gap can be adjusted such that the plate is in contact with the powder bed (e.g., the exposed surface of the powder bed). A mechanism can be used to flexibly move the cooling member in and out of contact with the powder bed. The mechanism can be electronically or manually controlled (e.g., by the controller). In an example, the mechanism can be an array of curved leaf springs, flexible needle springs, a set of rolling cylinders. The contact pressure between the cooling member (e.g., plate) and the powder bed can be electronically or manually adjusted.

In some cases, a gas bearing assisted cooling process can be utilized to increase the cooling rate of the powder. In this embodiment a planar air bearing can be creating using a set of openings in the cooling plate facing the powder bed. Pressurized gas can be injected from one set of openings to the gap and can leave the gap through a second set of openings. The gas bearing can induce forced convection and therefore increase the heat transfer rate of heat from the powder bed. In another example, thermo-acoustic heat extraction can be used to increase the cooling rate of the powder bed.

The cooling member can further comprise one or more holes or openings. In some cases at least as about 5%, 10%, 20%, 30%, 40%, 50%, 60% or 70% of the surface area of the cooling member can be an opening or hole. The holes or openings can be configured to allow the first and the optional second energy sources to access the powder layer. In some cases, the cooling member can be substantially transparent. The cooling member can be adapted to be selectively positioned between the powder bed (or the container accommodating the powder bed) and the first and optionally second energy sources. In some cases a scanner can translate the cooling member such that the hole(s) remains in a location such that the first and optionally second energy sources can access the powder layer as they are scanned across the powder layer. The scanner that controls movement of the plate can be synchronized with the at least one scanner that permit articulation of the first and second energy sources. The cooling member can controllably track energy applied to the portion of the powder layer from the first energy source. Movement of the cooling member can be controlled by the control mechanism (e.g., controller). The controller (e.g., computer) can be programmed to control movement of the cooling member. In some cases, the controller can be programmed to optimize the removal of energy from the portion and or remainder of the powder layer. Optimizing removal of energy from the portion and or remainder of the powder layer can include changing the gap length or width, moving the cooling member, initiating a forced convection system (e.g., fan), adjusting gas composition, or any other process that can influence time or efficiency variables. The controller can be further programmed to control (e.g., regulate) a temperature profile of the base separate from a temperature profile of the powder layer. The controller (e.g., computer) can additionally be programmed to ensure that regions of the powder bed surface are covered by solid portions and open (hole) portions of the cooling member for equal durations of time to maintain uniform heat transfer. If it is not possible to maintain uniform heat transfer by movement of the plate, the complementary heat source can provide more or less energy to area that will receive more or less time under the cooling member respectively.

One or more of the system components can be contained in the enclosure (e.g., chamber). The enclosure can include a reaction space that is suitable for introducing precursor to form a 3D object, such as powder material. The enclosure can contain the base. In some cases the enclosure can be a vacuum chamber, a positive pressure chamber, or an ambient pressure chamber. The enclosure can comprise a gaseous environment with a controlled pressure, temperature, and/or gas composition. The gas composition in the environment contained by the enclosure can comprise a substantially oxygen free environment. For example, the gas composition can contain at most at most about 100,000 parts per million (ppm), 10,000 ppm, 1000 ppm, 500 ppm, 400 ppm, 200 ppm, 100 ppm, 50 ppm, 10 ppm, 5 ppm, 1 ppm, 100,000 parts per billion (ppb), 10,000 ppb, 1000 ppb, 500 ppb, 400 ppb, 200 ppb, 100 ppb, 50 ppb, 10 ppb, 5 ppb, 1 ppb, 100,000 parts per trillion (ppt), 10,000 ppt, 1000 ppt, 500 ppt, 400 ppt, 200 ppt, 100 ppt, 50 ppt, 10 ppt, 5 ppt, or 1 ppt oxygen. The gas composition in the environment contained within the enclosure can comprise a substantially moisture (e.g., water) free environment. The gaseous environment can comprise at most about 100,000 ppm, 10,000 ppm, 1000 ppm, 500 ppm, 400 ppm, 200 ppm, 100 ppm, 50 ppm, 10 ppm, 5 ppm, 1 ppm, 100,000 ppb, 10,000 ppb, 1000 ppb, 500 ppb, 400 ppb, 200 ppb, 100 ppb, 50 ppb, 10 ppb, 5 ppb, 1 ppb, 100,000 ppt, 10,000 ppt, 1000 ppt, 500 ppt, 400 ppt, 200 ppt, 100 ppt, 50 ppt, 10 ppt, 5 ppt, or 1 ppt water. The gaseous environment can comprise a gas selected from the group consisting of argon, nitrogen, helium, neon, krypton, xenon, hydrogen, carbon monoxide, carbon dioxide, and oxygen. The gaseous environment can comprise air. The chamber pressure can be at least about $10^7$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 760 Torr, 1000 Torr, 1100 Torr, 2 bar, 3 bar, 4 bar, 5 bar, or 10 bar. The chamber pressure can be of any value between the afore-mentioned chamber pressure values (e.g., from about $10^{-7}$ Torr to about 10 bar, from about $10^{-7}$ Torr to about 1 bar, or from about 1 bar to about 10 bar). In some cases the enclosure pressure can be standard atmospheric pressure.

The enclosure can be maintained under vacuum or under an inert, dry, non-reactive and/or oxygen reduced (or otherwise controlled) atmosphere (e.g., a nitrogen ($N_2$), helium (He), or argon (Ar) atmosphere). In some examples, the enclosure is under vacuum, such as at a pressure that is at most about 1 Torr, $10^{-3}$ Torr, $10^{-6}$ Torr, or $10^{-8}$ Torr. The atmosphere can be provided by providing an inert, dry, non-reactive and/or oxygen reduced gas (e.g., Ar) in and/or flowing the gas through the chamber.

In some examples, a pressure system is in fluid communication with the enclosure. The pressure system can be configured to regulate the pressure in the enclosure. In some examples, the pressure system includes one or more vacuum pumps selected from mechanical pumps, rotary vain pumps, turbomolecular pumps, ion pumps, cryopumps and diffusion pumps. The one or more vacuum pumps may comprise a Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves, such as throttle valves. The pressure system can include a pressure sensor for measuring the pressure of the chamber and relaying the pressure to the controller, which can regulate the pressure with the aid of one or more vacuum pumps of the pressure system. The pressure sensor can be coupled to a control system. The pressure can be electronically or manually controlled.

In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump.

Systems and methods presented herein can facilitate formation of custom or stock 3D objects for a customer. A customer can be an individual, a corporation, an organization, a government organization, a non-profit organization, or another organization or entity. A customer can submit a request for formation of a 3D object. The customer can provide an item of value in exchange for the 3D object. The customer can provide a design for the 3D object. The customer can provide the design in the form of a stereo lithography (STL) file. Alternatively, the customer can provide a design where the design can be a definition of the shape and dimensions of the 3D object in any other numerical or physical form. In some cases, the customer can provide a three-dimensional model, sketch, or image as a design of an object to be generated. The design can be transformed in to instructions usable by the printing system to additively generate the 3D object. The customer can further provide a request to form the 3D object from a specific material or group of materials. For example the customer can specify that the 3D object should be made from one or more than one of the materials used for 3D printing described herein. The customer can request a specific material within that group of material (e.g., a specific elemental metal, a specific alloy, a specific ceramic or a specific allotrope of elemental carbon). In some cases, the design does not contain auxiliary features.

In response to the customer request the 3D object can be formed or generated with the printing system as described herein. In some cases, the 3D object can be formed by an additive 3D printing process. Additively generating the 3D object can comprise successively depositing and melting a powder comprising one or more materials as specified by the customer. The 3D object can subsequently be delivered to the customer. The 3D object can be formed without generation or removal of auxiliary features. Auxiliary features can be support features that prevent a 3D object from shifting, deforming or moving during formation. The apparatuses, system and methods provided herein can eliminate the need for auxiliary features. In some cases, the 3D object can be additively generated in a period of at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. In some cases, the 3D object can be additively generated in a period between any of the aforementioned time periods (e.g., from about 10 seconds to about 7 days, from about 10 seconds to about 12 hours, from about 12 hours to about 7 days, or from about 12 hours to about 10 minutes).

The 3D object (e.g., solidified material) that is generated for the customer can have an average deviation value from the intended dimensions of at most about 0.5 microns (µm), 1 µm, 3 µm, 10 µm, 30 µm, 100 µm, 300 µm or less. The deviation can be any value between the aforementioned values. The average deviation can be from about 0.5 µm to about 300 µm, from about 10 µm to about 50 µm, from about 15 µm to about 85 µm, from about 5 µm to about 45 µm, or from about 15 µm to about 35 µm. The 3D object can have a deviation from the intended dimensions in a specific direction, according to the formula $Dv+L/K_{dv}$, wherein Dv is a deviation value, L is the length of the 3D object in a specific direction, and $K_{dv}$ is a constant. Dv can have a value of at most about 300 µm, 200 µm, 100 µm, 50 µm, 40 µm, 30 µm, 20 µm, 10 µm, 5 µm, 1 µm, or 0.5 µm. Dv can have a value of at least about 0.5 µm, 1 µm, 3 µm, 5 µm, 10 µm, 20 µm, 30 µm, 50 µm, 70 µm, 100 µm, 300 µm or less. Dv can have any value between the aforementioned values. Dv can have a value that is from about 0.5 µm to about 300 µm, from about 10 µm to about 50 µm, from about 15 µm to about 85 µm, from about 5 µm to about 45 µm, or from about 15 µm to about 35 µm. $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the aforementioned values. $K_{dv}$ can have a value that is from about 3000 to about 500, from about 1000 to about 2500, from about 500 to about 2000, from about 1000 to about 3000, or from about 1000 to about 2500.

The intended dimensions can be derived from a model design. The 3D part can have the stated accuracy value immediately after formation without additional processing or manipulation. Receiving the order for the object, formation of the object, and delivery of the object to the customer can take at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. In some cases, the 3D object can be additively generated in a period between any of the aforementioned time periods (e.g., from about 10 seconds to about 7 days, from about 10 seconds to about 12 hours, from about 12 hours to about 7 days, or from about 12 hours to about 10 minutes). The time can vary based on the physical characteristics of the object, including the size and/or complexity of the object. The generation of the 3D object can be performed without iterative and/or without corrective printing. The 3D object may be devoid of auxiliary supports or an auxiliary support mark (e.g., that is indicative of a presence or removal of the auxiliary support feature).

Figure 8:
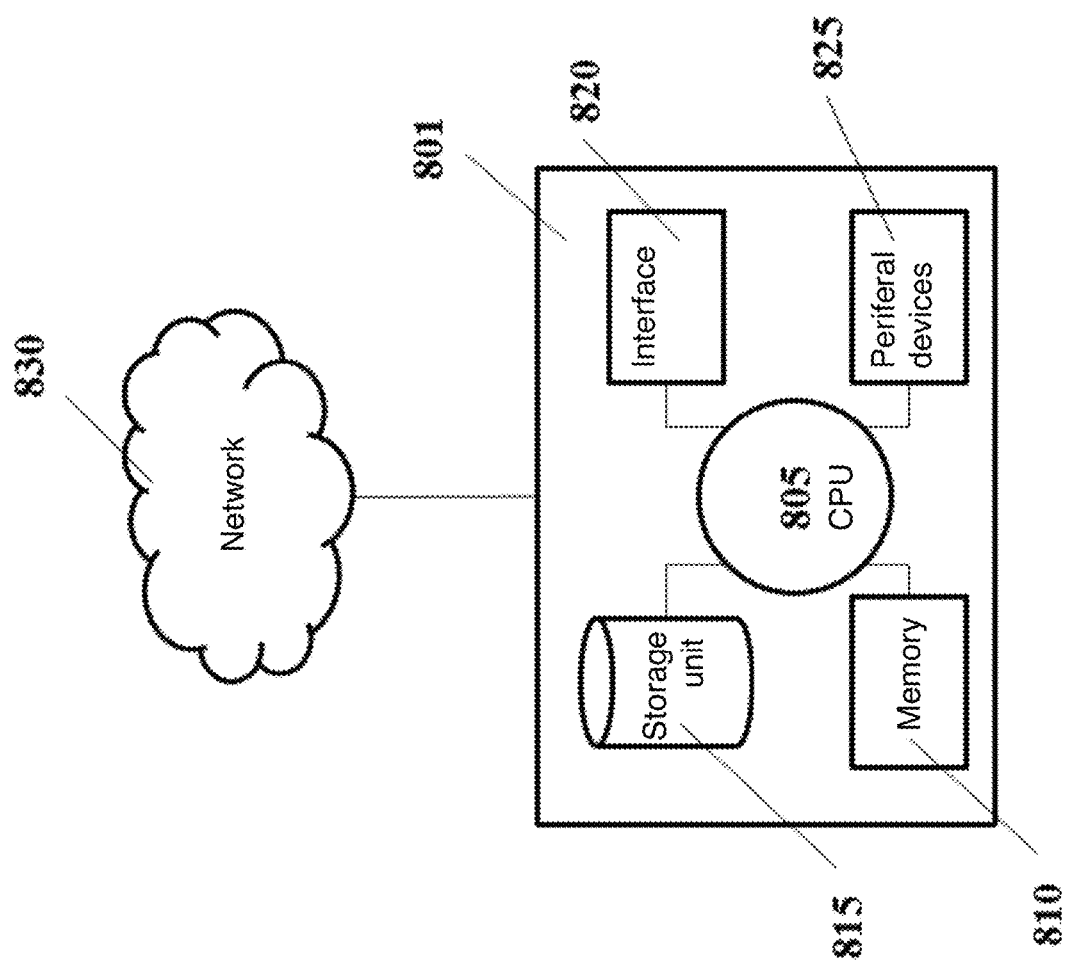
FIG. 8 schematically illustrates a computer control system that is programmed or otherwise configured to facilitate the formation of a 3D object.

The present disclosure also provides controllers or control mechanisms (e.g., comprising a computer system) that are programmed to implement methods of the disclosure. FIG. 8 schematically depicts a computer system 801 that is programmed or otherwise configured to facilitate the formation of a 3D object according to the methods provided herein. The computer system 801 can regulate various features of printing methods and systems of the present disclosure, such as, for example, regulating heating, cooling and/or maintaining the temperature of a powder bed, process parameters (e.g., chamber pressure), the scanning route of the energy source, and/or the application of the amount of energy emitted to a selected location of a powder bed by the energy source. The computer system 801 can be part of or be in communication with a printing system or apparatus, such as a 3D printing system or apparatus of the present disclosure. The computer may be coupled to one or more sensors connected to various parts of the 3D printing system or apparatus.

The computer system 801 can include a central processing unit (CPU, also "processor," "computer" and "computer processor" used herein) 805, which can be a single core or multi core processor, or a plurality of processors for parallel processing. Alternatively or in addition to, the computer system 801 can include a circuit, such as an application-specific integrated circuit (ASIC). The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an Internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and write back.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine-readable code can be provided in the form of software. During use, the processor 805 can execute the code. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; wire (e.g., copper wire) and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual or programmed. The control may rely on feedback mechanisms that have been pre-programmed. The feedback mechanisms may rely on input from sensors (described herein) that are connected to the control unit (i.e., control system or control mechanism e.g., computer). The computer system may store historical data concerning various aspects of the operation of the 3D printing system. The historical data may be retrieved at predetermined times or at a whim. The historical data may be accessed by an operator or by a user. The historical and/or operative data may be displayed on a display unit. The display unit (e.g., monitor) may display various parameters of the 3D printing system (as described herein) in real time or in a delayed time. The display unit may display the current 3D printed object, the ordered 3D printed object, or both. The display unit may display the printing progress of the 3D printed object. The display unit may display at least one of the total time, time remaining and time expanded on printing the 3D object. The display unit may display the status of sensors, their reading and/or time for their calibration or maintenance. The display unit may display the type of powder material used and various characteristics of the material such as temperature and flowability of the powder. The display unit may display the amount of oxygen, water and pressure in the printing chamber (i.e., the chamber where the 3D object is being printed). The computer may generate a report comprising various parameters of the 3D printing system at predetermined time(s), on a request (e.g., from an operator), or at a whim.

Methods and systems of the present disclosure can be implemented by way of one or more algorithms. An algorithm can be implemented by way of software upon execution by one or more computer processors.

EXAMPLES

The following are illustrative and non-limiting examples of methods of the present disclosure.

Example 1

In a 25 cm by 25 cm by 30 cm container at ambient temperature and pressure, 1.56 kg Stainless Steel 316L powder of average particle size 35 μm is deposited in a container accommodating a powder bed. The container is disposed in an enclosure. The enclosure is purged with Argon gas for 5 min. A layer of an average height of 2 mm was placed in the container. Two substantially flat surfaces were fabricated with a 200 W fiber 1060 nm laser beam using the selected laser melting method. The two substantially flat surfaces were connected to the base via auxiliary supports to serve as reference points (as shown in FIG. 21A, 2103 and 2104). Two additional flat planes were fabricated without auxiliary supports using a method described herein (as shown in FIG. 21A, 2101 and 2102). The four surfaces were fabricated such that they lay substantially on the same plane. Subsequently, a layer of powder material having an average height of 75 μm was deposited on top of the planes using a powder dispenser described herein. The powder was leveled to 50 μm using a leveling member described herein. The surfaces were subsequently revealed using a soft puff of air from a direction substantially perpendicular to the exposed surface of the powder bed. Images were collected by a 2 Mega pixel charge-coupled device (CCD) camera and analyzed via image processing program to ascertain the degree of plane movement. FIGS. 21A-B show examples of the experimental results, with FIG. 21A showing the planes before leveling by the leveling member, and FIG. 21B showing the planes after leveling by the leveling member (FIG. 21B shows the two anchored reference planes 2113 and 2114, and the two suspended planes 2111 and 2112).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a three-dimensional object, comprising:

(I) providing a system for generating a three-dimensional object, which system comprises:
  (a) an enclosure that accommodates a powder bed, which powder bed comprises individual particles formed of at least one material selected from the group consisting of an elemental metal, metal alloy, ceramic, and an allotrope of elemental carbon;
  (b) an energy source that provides an energy beam to a portion of the powder bed during use; and
  (c) at least one controller operatively coupled to the energy source and programmed to: (i) receive instructions to generate at least a portion of the three-dimensional object, and (ii) direct the energy beam along a path to transform a portion of the powder bed to a transformed material such that a remainder of the powder bed that does not transform into the transformed material is at an average temperature having a value of at most 400 degrees Celsius as the portion of the powder bed is transformed into the transformed material, wherein the three-dimensional object (1) comprises a plurality of layers of hardened material and (2) is suspended anchorlessly in the powder bed during formation, wherein during use, the plurality of layers of hardened material is devoid of at least two metals at a ratio capable of forming a eutectic alloy; and
(II) using the system to generate the three-dimensional object.

2. The method of claim 1, wherein the individual particles are formed of the elemental metal or metal alloy.

3. The method of claim 1, wherein upon formation of the plurality of layers of hardened material, the powder bed comprises individual particles that are flowable.

4. The method of claim 1, wherein the powder bed is disposed within an enclosure, and wherein during transformation of the portion of the powder bed to the transformed material, the enclosure is at or above ambient pressure.

5. The method of claim 1, wherein transforming the portion of the powder bed comprises fusing individual particles of the portion of the powder bed.

6. The method of claim 1, wherein hardening the transformed material comprises solidifying the transformed material.

7. The method of claim 1, wherein the plurality of layers of hardened material has a radius of curvature of at least five centimeters up to substantially flat.

8. The method of claim 1, wherein the plurality of layers of hardened material is devoid of a metal alloy that is formed from at least a first metal and a second metal during generation of the three-dimensional object.

9. The method of claim 1, wherein the plurality of layers of hardened material comprises at most an elemental metal that is of a single elemental metal composition.

10. The method of claim 1, wherein the plurality of layers of hardened material comprises a metal alloy that is of a single metal alloy composition.

11. The method of claim 1, wherein the plurality of layers of hardened material is of a single material composition.

12. The method of claim 1, wherein a fundamental length scale of the three-dimensional object is 120 micrometers or more.

13. The method of claim 1, wherein upon formation of the plurality of layers of hardened material, the three-dimensional object is not supported by auxiliary support in the powder bed.

14. The method of claim 1, wherein upon formation of the plurality of layers of hardened material, the three-dimensional object is devoid of auxiliary support.

15. The method of claim 1, wherein upon formation of the plurality of layers of hardened material, the three-dimensional object comprises an auxiliary support feature that is suspended anchorlessly in the powder bed.

16. The method of claim 1, wherein the powder bed is provided adjacent to a base, and wherein upon formation of the plurality of layers of hardened material, the three-dimensional object is disconnected from the base.

17. The method of claim 1, wherein the remainder of the powder bed that does not transform into the transformed material is at the average temperature having a value of at most 300 degrees Celsius while the portion of the powder bed is transformed into the transformed material.

18. The method of claim 1, wherein during generation of the three-dimensional object, the at least one controller is programmed to non-uniformly modulate the energy source.

19. A system for generating a three-dimensional object, comprising:
  (a) an enclosure that accommodates a powder bed, which powder bed comprises individual particles formed of at least one material selected from the group consisting of an elemental metal, metal alloy, ceramic, and an allotrope of elemental carbon;
  (b) an energy source that provides an energy beam to a portion of the powder bed during use; and
  (c) at least one controller operatively coupled to the energy source and programmed to: (i) receive instructions to generate at least a portion of the three-dimensional object, and (ii) direct the energy beam along a path to transform a portion of the powder bed to a transformed material such that a remainder of the powder bed that does not transform into the transformed material is at an average temperature having a value of at most 400 degrees Celsius as the portion of the powder bed is transformed into the transformed material, wherein the three-dimensional object (1) comprises a plurality of layers of hardened material and (2) is suspended anchorlessly in the powder bed during formation, and wherein during use, the plurality of layers of hardened material is devoid of at least two metals at a ratio capable of forming a eutectic alloy.

20. The system of claim 19, wherein the at least one controller is operatively coupled to the enclosure and is programmed to maintain the enclosure at or above ambient pressure while the portion of the powder bed is transformed to the transformed material.

21. The system of claim 19, wherein the enclosure comprises a base, wherein during use the powder bed is disposed adjacent to the base that is positioned in the enclosure, and wherein upon formation of the plurality of layers of hardened material, the three-dimensional object is disconnected from the base.

22. The system of claim 19, wherein the at least one controller is programmed to facilitate formation of the three-dimensional object such that the three-dimensional object is devoid of auxiliary support.

23. The system of claim 19, wherein the energy beam comprises an electromagnetic energy beam or a charged particle beam.

24. The system of claim 19, wherein the at least one controller is programmed to permit the transformed material to harden to form the plurality of layers of hardened material as part of the three-dimensional object, such that each of the plurality of layers of hardened material has a radius of curvature of from at least five centimeters up to substantially flat.

25. The system of claim 19, wherein a remainder of the powder bed that did not transform to form the transformed material is at the average temperature having a value of at most 300 degrees Celsius while the portion of the powder bed is transformed into the transformed material.

26. The system of claim 19, wherein to correct a temperature in the powder bed, the at least one controller is configured to modulate the energy beam as the energy beam transforms the portion of the powder bed based at least in part on the temperature of the powder bed.

27. The system of claim 19, wherein during generation of the three-dimensional object, the at least one controller is programmed to non-uniformly modulate the energy source.

28. The system of claim 19, wherein during generation of the three-dimensional object, the at least one controller is programmed to direct sensing a temperature in the powder bed to modulate the energy source in real time.

* * * * *